(12) United States Patent
Sung et al.

(10) Patent No.: US 10,849,353 B2
(45) Date of Patent: Dec. 1, 2020

(54) COOKING APPARATUS

(71) Applicant: Samsung Electronics Co., Ltd., Suwon-si (KR)

(72) Inventors: Han Jun Sung, Seoul (KR); Boo Keun Yoon, Yongin-si (KR); Yong Jong Park, Seongnam-si (KR); Jong Sung Park, Seoul (KR); Eung Ryeol Seo, Suwon-si (KR); Jeong Su Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 686 days.

(21) Appl. No.: 15/641,901

(22) Filed: Jul. 5, 2017

(65) Prior Publication Data

US 2018/0007949 A1    Jan. 11, 2018

Related U.S. Application Data

(60) Provisional application No. 62/360,654, filed on Jul. 11, 2016.

(30) Foreign Application Priority Data

Aug. 12, 2016    (KR) .................. 10-2016-0103171

(51) Int. Cl.
*A23P 20/20*    (2016.01)
*A23L 5/10*    (2016.01)
(Continued)

(52) U.S. Cl.
CPC ............. *A23P 20/20* (2016.08); *A23L 5/10* (2016.08); *A23P 30/25* (2016.08); *A47J 27/002* (2013.01); *B33Y 30/00* (2014.12); *B33Y 70/00* (2014.12); *B33Y 80/00* (2014.12); *A23P 2020/253* (2016.08)

(58) Field of Classification Search
CPC .. A23P 20/20; A23P 30/25; A23P 1/12; A23P 2001/089; A23P 30/20; A23P 30/00; A23P 2020/253; A23L 5/10; A47J 27/002
(Continued)

(56) References Cited

U.S. PATENT DOCUMENTS

| 2012/0088023 A1 | 4/2012 | Begun |
| 2013/0089642 A1 | 4/2013 | Lipson et al. |
| 2016/0135493 A1* | 5/2016 | Kuo .................. A23P 30/20 425/130 |

FOREIGN PATENT DOCUMENTS

| CN | 103125540 A | 6/2013 |
| CN | 104921281 A | 9/2015 |

(Continued)

OTHER PUBLICATIONS

Extended European Search Report dated Mar. 27, 2019, issued in a counterpart European application No. 17827875.0-1006/3435789.

*Primary Examiner* — Phuong T Nguyen
(74) *Attorney, Agent, or Firm* — Jefferson IP Law, LLP

(57) ABSTRACT

A cartridge assembly, a cartridge device, a food forming module, and a cooking apparatus capable of using three-dimensional (3D) printing technology to form and cook food are provided. The cooking apparatus includes a main body, a cooking compartment is provided in the main body, and a cartridge assembly is installed in the cooking compartment to be capable of linear motion and rotational motion. The cartridge assembly includes a cartridge body having cartridge mounts formed therein, cartridge cases are mounted on the cartridge mounts, and cartridges are disposed in the cartridge cases and include food ingredients that are accommodated therein.

15 Claims, 115 Drawing Sheets

(51) Int. Cl.
  *B33Y 30/00*      (2015.01)
  *B33Y 70/00*      (2020.01)
  *B33Y 80/00*      (2015.01)
  *A23P 30/25*      (2016.01)
  *A47J 27/00*      (2006.01)
  *A23P 20/25*      (2016.01)

(58) Field of Classification Search
  USPC .......... 99/353, 494, 451; 426/115, 231, 233, 426/515
  See application file for complete search history.

(56) References Cited

FOREIGN PATENT DOCUMENTS

| | | |
|---|---|---|
| CN | 105284973 A | 2/2016 |
| JP | 2006-088572 A | 4/2006 |
| KR | 10-2014-0036285 A | 3/2014 |
| KR | 10-2015-0116694 A | 10/2015 |
| KR | 10-2015-0124477 A | 11/2015 |
| KR | 10-2015-0126120 A | 11/2015 |
| KR | 10-2015-0137787 A | 12/2015 |
| KR | 10-2016-0009067 A | 1/2016 |
| KR | 10-2016-0014220 A | 2/2016 |
| KR | 10-2016-0022086 A | 2/2016 |
| KR | 10-2016-0024452 A | 3/2016 |
| KR | 10-2016-0046642 A | 4/2016 |
| KR | 10-1633221 B1 | 6/2016 |
| KR | 10-2016-0076544 A | 7/2016 |
| WO | 2012103005 A2 | 8/2012 |
| WO | 2014/190217 A1 | 11/2014 |
| WO | 2014190168 A1 | 11/2014 |
| WO | 2016059023 A1 | 4/2016 |
| WO | 2017084812 A1 | 5/2017 |

\* cited by examiner

FIG. 72

| TEMPERATURE / TIME | 100°C | 120°C | 120°C | 160°C |
|---|---|---|---|---|
| 10 MINUTES | | | | |
| 20 MINUTES | | ... | ... | ... |
| 30 MINUTES | | ... | ... | ... |
| 40 MINUTES | | ... | ... | ... |

COOKING APPARATUS

CROSS-REFERENCE TO RELATED APPLICATION(S)

This application claims the benefit under 35 U.S.C. § 119(e) of a U.S. Provisional application filed on Jul. 11, 2016 in the U.S. Patent and Trademark Office and assigned Ser. No. 62/360,654, and under 35 U.S.C. § 119(a) of a Korean patent application filed on Aug. 12, 2016 in the Korean Intellectual Property Office and assigned Serial number 10-2016-0103171, the entire disclosure of each of which is hereby incorporated by reference.

TECHNICAL FIELD

The present disclosure relates to a cartridge assembly, a cartridge unit, a food forming module, and a cooking apparatus. More particularly, the present disclosure relates to a cartridge assembly, a cartridge unit, a food forming module, and a cooking apparatus capable of using three-dimensional (3D) printing technology to form and cook food.

BACKGROUND

Recently, interest in cooking apparatuses to which three-dimensional (3D) printing technology is applied is gradually increasing. A cooking apparatus is a home appliance for cooking food, and a 3D printer is an apparatus capable of producing a 3D object.

A user may easily cook desired food using a cooking apparatus with a 3D printing function. For example, when a user inputs a recipe of food to be cooked into the cooking apparatus, printing and cooking the food may proceed, and the desired food can be obtained after a predetermined amount of time. In this way, a user may conveniently cook desired food using a cooking apparatus with a 3D printing function. Due to an aspect in which a cooking apparatus with a 3D printing function can reduce a user's burden on cooking, demand of a cooking apparatus with a 3D printing function is expected to continuously increase.

A cooking apparatus may include a cartridge configured to accommodate food ingredients used in printing food and an extruding unit configured to extrude the food ingredients accommodated in the cartridge. When extrusion of the food ingredients accommodated in the cartridge is not properly performed, a considerable amount of food ingredients is expected to be left in the cartridge and wasted. Therefore, seeking various ways for preventing waste of food ingredients is required.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a cartridge assembly, a cartridge unit or device, a food forming module, and a cooking apparatus having an improved structure for cooking various types of food using three-dimensional (3D) printing technology.

Another aspect of the present disclosure to provide a cooking apparatus having an improved structure for easily replacing a cartridge or a cartridge assembly.

Another aspect of the present disclosure to provide a cartridge assembly, a cartridge unit, a food forming module, and a cooking apparatus having an improved structure for reducing the amount of unused and wasted food ingredients.

Another aspect of the present disclosure to provide a cooking apparatus having an improved structure so that whether food ingredients are discharged and a discharge amount of the food ingredients can be adjusted.

In accordance with an aspect of the present disclosure, a cooking apparatus for three-dimensionally forming and cooking food is provided. The cooking apparatus includes a main body, an inner space formed in the main body and including a first space and a second space, and a cartridge assembly installed in the inner space. The cartridge assembly is configured to be capable of linear motion and rotational motion. The cartridge assembly is located in the first space when the food is being formed. The cartridge assembly is located in the second space when the formed food is being cooked. The cartridge assembly includes a cartridge body having cartridge mounts formed therein, cartridge cases mounted on the cartridge mounts, and cartridges disposed in the cartridge cases and having food ingredients accommodated therein.

In accordance with another aspect of the present disclosure, a cooking apparatus is provided. The cooking apparatus includes a partitioning frame separably arranged in the inner space to partition the first space and the second space from each other.

In accordance with another aspect of the present disclosure, a cooking apparatus is provided. Thee cooking apparatus includes one or more heaters installed in the first space to heat the food.

In accordance with another aspect of the present disclosure, a cooking apparatus is provided. The cooking apparatus includes a tray installed in the first space to have the food placed thereon.

Each of the cartridges may include an accommodator and a nozzle connected to the accommodator. The nozzle includes an outlet through which the food ingredient is discharged, and a corrugation may be formed in at least a part of the accommodator.

In accordance with another aspect of the present disclosure, a cooking apparatus is provided. The cooking apparatus includes an extruder installed in the inner space, such that, when the cartridges are pressed, the food ingredients are discharged from the cartridges.

The extruder may include an extruder cylinder and a piston including a presser. The piston is coupled to the extruder cylinder, and capable of reciprocating motion. The presser may press the cartridges.

The inner space may include an open front surface, and the cartridge assembly may be installed in the inner space to be capable of front-and-rear movement, left-and-right movement, and up-and-down movement.

In accordance with another aspect of the present disclosure, a cooking apparatus is provided. The cooking apparatus includes a rotation adjusting device having a rotating shaft coupled to the cartridge body to enable the rotation of the cartridge assembly.

The cartridges may be provided so that a portion of each of the cartridges selectively protrudes from each of the cartridge cases toward a bottom surface of the inner space.

Each of the cartridge cases may include an opening facing the bottom surface of the inner space, and the cartridge assembly may further include an elastic member accommodated in each of the cartridge cases to be disposed between the cartridge and the opening of the cartridge case corresponding to the cartridge.

The cartridge body may have a cylindrical shape, and the cartridge mounts may be recessed in a side surface of the cartridge body along a circumferential direction of the cartridge body.

The cartridge body may have a cylindrical shape, and the cartridge mounts may be formed to pass through the cartridge body.

The main body may include an opening formed at one surface of the main body to allow the cartridge assembly to be replaced, and an additional door to open and close the opening may be installed at the main body.

Each of the cartridges may include an outlet through which the food ingredient is discharged, and the cooking apparatus according to an aspect of the present disclosure may further include an outlet opening-closing member provided to selectively open or close the outlet.

In accordance with another aspect of the present disclosure, a cartridge assembly is provided. The cartridge assembly includes a cartridge body having a cylindrical shape and cartridge mounts recessed in a side surface of the cartridge body along a circumferential direction of the cartridge body, cartridge cases mounted on the cartridge mounts, and cartridges disposed in the cartridge cases and having food ingredients accommodated therein.

According to an aspect of the present disclosure, a rotating shaft may be coupled to the cartridge body, and the cartridge assembly may be provided to be rotatable about the rotating shaft.

Each of the cartridges may include an accommodator and a nozzle connected to the accommodator. The nozzle may include an outlet through which the food ingredient is discharged, and a corrugation may be formed in at least part of the accommodator.

The nozzle may further include cutting lines radially extending from the outlet.

Each of the cartridge cases may include an opening, and the cartridge assembly according to an aspect of the present disclosure may further include an elastic member accommodated in each of the cartridge cases to be disposed between the cartridge and the opening of the cartridge case corresponding to the cartridge.

In accordance with another aspect of the present disclosure, a cartridge unit or device is provided. The cartridge device includes a container having a food ingredient accommodated therein and an inlet, a cartridge cover attached to the inlet to seal the inlet, a container cap coupled to the inlet and having an outlet, and a strap removably arranged between the container and the container cap.

A corrugation may be formed in at least a part of the container.

A first screw thread may be formed at an inner surface of the inlet.

The container cap may include a nozzle with the outlet and a connector connected to the nozzle and having a nozzle introducer therein corresponding to the inlet, and a second screw thread corresponding to the first screw thread may be formed at an inner surface of the nozzle introducer.

When the container cap is pressed after the strap is removed, the inlet may be coupled to the nozzle introducer, and the cartridge cover may be torn by the coupling between the inlet and the nozzle introducer.

The cartridge cover may include one or more materials of a polymer and a metal.

A cutting reference line formed along a circumferential direction of the inlet may be formed in the cartridge cover.

In accordance with an aspect of the present disclosure, a food forming module is provided. The food forming module includes a cartridge having a food ingredient accommodated therein and an extruder provided so that the food ingredient is discharged from the cartridge by the cartridge being pressed, and the cartridge includes a main body that includes a main body front portion, a main body rear portion, and a main body side portion connecting the main body front portion and the main body rear portion, a nozzle coupled to the main body and having an outlet, and an adhesive member arranged in the main body side portion.

The main body may further include a first side end pressed portion formed by one side edge of the main body front portion and one side edge of the main body side portion being pressed and a second side end pressed portion formed by one side edge of the main body rear portion and the other side edge of the main body side portion being pressed, and the adhesive member may be arranged on at least one of the first side end pressed portion and the second side end pressed portion.

A thin aluminum plate may be further arranged on at least one of the first side end pressed portion and the second side end pressed portion.

The main body may further include a lower end pressed portion formed by a lower end of the main body front portion, a lower end of the main body rear portion, and a lower end of the main body side portion for being pressed, and the nozzle may be partially inserted into the lower end pressed portion and coupled to the main body.

The extruder may include one or more rollers arranged to rotate and press the main body.

The main body may further include an upper end pressed portion formed by an upper end of the main body front portion, an upper end of the main body rear portion, and an upper end of the main body side portion for being pressed, the one or more rollers may include a plurality of rollers, and the upper end pressed portion may be pressed by the plurality of rollers while being fitted between the plurality of rollers.

In accordance with an aspect of the present disclosure, a cooking apparatus is provided. The cooking apparatus includes a main body, a cooking compartment provided in the main body, and a cartridge assembly installed in the cooking compartment to be capable of linear motion and rotational motion. The cartridge assembly includes a cartridge body having cartridge mounts formed therein, cartridge cases mounted on the cartridge mounts, and cartridges disposed in the cartridge cases and having food ingredients accommodated therein.

The cooking compartment may include an open front surface, and the cartridge assembly may be installed in the cooking compartment to be capable of front-and-rear movement, left-and-right movement, and up-and-down movement.

The cooking apparatus according to an aspect of the present disclosure may further include a rotating shaft coupled to the cartridge body so that the rotation of the cartridge assembly is possible.

Each of the cartridges may include an accommodator and a nozzle connected to the accommodator and having an outlet through which the food ingredient is discharged, and a corrugation may be formed in at least a part of the accommodator.

The nozzle may further include cutting lines radially extending from the outlet.

In accordance with another aspect of the present disclosure, a cooking apparatus is provided. The cooking apparatus includes a tray arranged on a bottom surface of the cooking compartment, and cartridges may be provided so that a portion of each of the cartridges selectively protrudes from each of the cartridge cases toward the tray.

Each of the cartridge cases may include an opening facing the bottom surface of the cooking compartment, and the cartridge assembly may further include an elastic member accommodated in the each of the cartridge cases to be disposed between the cartridges and the opening of the cartridge case corresponding to the cartridge.

The cooking apparatus according to an aspect of the present disclosure may further include an extruding unit or extruder installed in the cooking compartment so that the food ingredients are discharged from the cartridges toward the tray by each of the cartridges being pressed.

The cartridge body may have a cylindrical shape, and the cartridge mounts may be recessed in a side surface of the cartridge body along a circumferential direction of the cartridge body.

The cartridge body may have a cylindrical shape, and the cartridge mounts may be formed to pass through the cartridge body.

Each of the cartridges may include an accommodator, a nozzle connected to the accommodator and having an outlet through which the food ingredient is discharged, and a groove recessed along a circumference of the nozzle to have a smaller diameter than the outlet, and the outlet may be opened and closed by a clamp selectively coupled to the groove.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 72 illustrates an example of data for generating a food preview according to an embodiment of the present disclosure;

Throughout the drawings, like reference numerals will be understood to refer to like parts, components, and structures.

DETAILED DESCRIPTION

Figure 1:
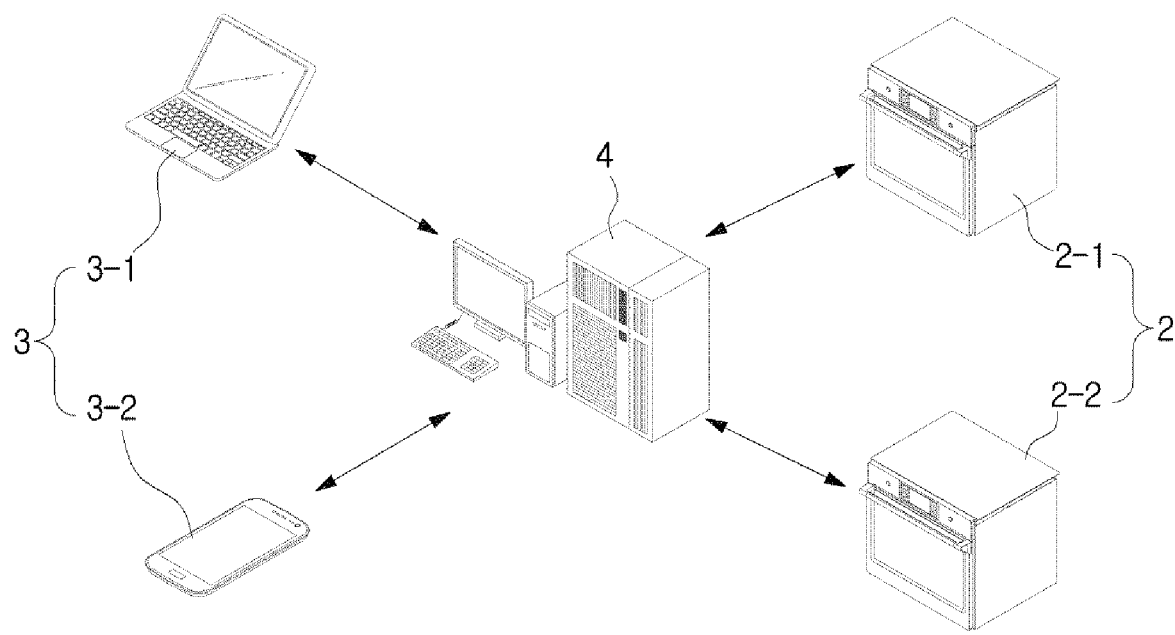
FIG. 1 illustrates a cooking system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Not all elements of embodiments are described herein, and general content in an art to which the disclosure pertains or overlapping content between embodiments will be omitted. Terms such as "part," "module," "member," and "block," when used herein, may be implemented by software or hardware. According to embodiments, a plurality of "parts," "modules," "members," or "blocks" may be implemented as a single element, or a single "part," "module," "member," or "block" may include a plurality of elements.

Throughout the specification, when a certain part is described as being "connected" to another part, both a case in which the certain part is indirectly connected to the other part as well as a case in which the certain part is directly connected to the other part are included therein, and the indirect connection includes a connection via a wireless network.

When a certain part is described as "including" a certain element, this signifies that the certain part may also include another element rather than excluding the other element unless particularly described otherwise.

Throughout the specification, when a certain member is described as being "on" another member, both a case in which still another member is present between the two members as well as a case in which the certain member is in contact with the other member are included therein.

Terms such as "first" and "second" are used to distinguish one element from another element, and an element is not limited by the above-mentioned terms.

A singular expression includes a plural expression unless context clearly indicates otherwise.

Reference numerals for steps are used for convenience of description and are not intended to describe an order of the steps. The steps may be performed in a different order from the stated order unless context clearly describes a specific order.

Hereinafter, various embodiments will be described in detail with reference to the accompanying drawings. Terms such as "front end," "rear end," "upper portion," "lower portion," "upper end," and "lower end," when used in the description below, are defined on the basis of the drawings, and a shape and a position of each of the elements are not limited by the terms.

Hereinafter, an action principle and embodiments will be described with reference to the accompanying drawings.

FIG. 1 illustrates a cooking system according to an embodiment of the present disclosure.

Referring to FIG. 1, a cooking system may include a cooking apparatus 2 (e.g., a laptop computer 3-1 and a smartphone 3-2) configured to form and heat food, a user device 3 configured to acquire information on the food from a user, and an information relay apparatus 4 configured to relay communication between the cooking apparatus 2 and the user device 3.

The cooking apparatus 2 may use three-dimensional (3D) printing to form food. Food may be a mixture of ingredients and/or condiments for cooking, may be in an uncooked or unheated state, and may be cooked or heated by the cooking apparatus 2, and may then be ingested by a user.

The cooking apparatus 2 may receive an input of a 3D shape of food and form 3D food via 3D printing. For example, the cooking apparatus 2 may form food ingredient layers, each having a suitable thickness, by repeatedly discharging a suitable amount of food ingredients, and may form 3D food by stacking the food ingredient layers.

The cooking apparatus 2 may receive an input of a 3D shape of food from a user in various ways. For example, the cooking apparatus 2 may receive information on a 3D shape of food from the user device 3 through communication or directly receive an input of the 3D shape of the food from a user via a user interface.

The cooking apparatus 2 may heat 3D food in various ways. For example, the cooking apparatus 2 may directly apply heat to food using a heater or heat air around the food using convection.

Also, the cooking apparatus 2 may heat food using microwaves.

The cooking apparatus 2 may include an electric oven configured to heat food using an electric heater, a convection oven configured to heat food using hot air, a microwave oven configured to heat food using microwaves, and a gas oven configured to heat food by burning a gas fuel.

The user device 3 may receive an input of a 3D shape of food from a user and transmit information on the 3D shape of the food to the cooking apparatus 2. For example, the user device 3 may receive an input of a 3D shape of food from a user via a user interface and transmit information on the 3D shape of the food to the cooking apparatus 2 via the information relay apparatus 4.

The user device 3 may distribute a cooking task to a plurality of cooking apparatuses 2-1 and 2-2 according to operational states of the cooking apparatuses 2-1 and 2-2. For example, when the first cooking apparatus 2-1 is cooking, the user device 3 may transmit a cooking task to the second cooking apparatus 2-2.

The user device 3 may be implemented with a computer, a portable terminal, or the like capable of accessing a network. Here, the computer may include, for example, a notebook, a desktop, a laptop, a tablet personal computer (PC), a slate PC, or the like having a web browser embedded therein. Also, the portable terminal is, for example, a wireless communication device with guaranteed portability and mobility, and may include all types of handheld wireless communication devices such as a personal communication system (PCS) terminal, a global system for mobile communications (GSM) terminal, a personal digital cellular (PDC) terminal, a personal handyphone system (PHS) terminal, a personal digital assistant (PDA) terminal, an international mobile telecommunication (IMT)-2000 terminal, a code division multiple access (CDMA)-2000 terminal, a W-CDMA terminal, a wireless broadband internet (Wibro) terminal, and a smartphone, and wearable items such as a watch, a ring, a bracelet, an anklet, a necklace, glasses, contact lenses, or a wearable device such as a head-mounted device (HMD).

The information relay apparatus 4 may relay information between the cooking apparatus 2 and the user device 3. For example, the information relay apparatus 4 may receive information on a 3D shape of food from the user device 3 and transmit the information on the 3D shape of the food to the cooking apparatus 2. Also, the information relay apparatus 4 may receive information on an operational state from the cooking apparatus 2 and transmit the information on the operational state of the cooking apparatus 2 to the user device 2.

The information relay apparatus 4 may include a server device configured to simply relay a signal between the cooking apparatus 2 and the user device 2 or may include a network relay device configured to relay communication between the cooking apparatus 2 and the user device 3. For example, the information relay apparatus 4 may include a server device configured to provide a service to a client, a repeater configured to amplify an attenuated signal, a hub configured to transmit data received via any one of a plurality of ports through another port, a bridge configured to connect different divisions in a network, a switch configured to transmit data received via any one of a plurality of ports to a target port, a router configured to connect independent networks, and a gateway configured to connect networks having different protocols.

Hereinafter, the cooking apparatus 2, the user device 3, and the information relay apparatus 4 will be described in more detail.

FIGS. 2 to 8 illustrate cases in which a cartridge assembly 200 according to a first embodiment is applied to a cooking apparatus.

Figure 2:
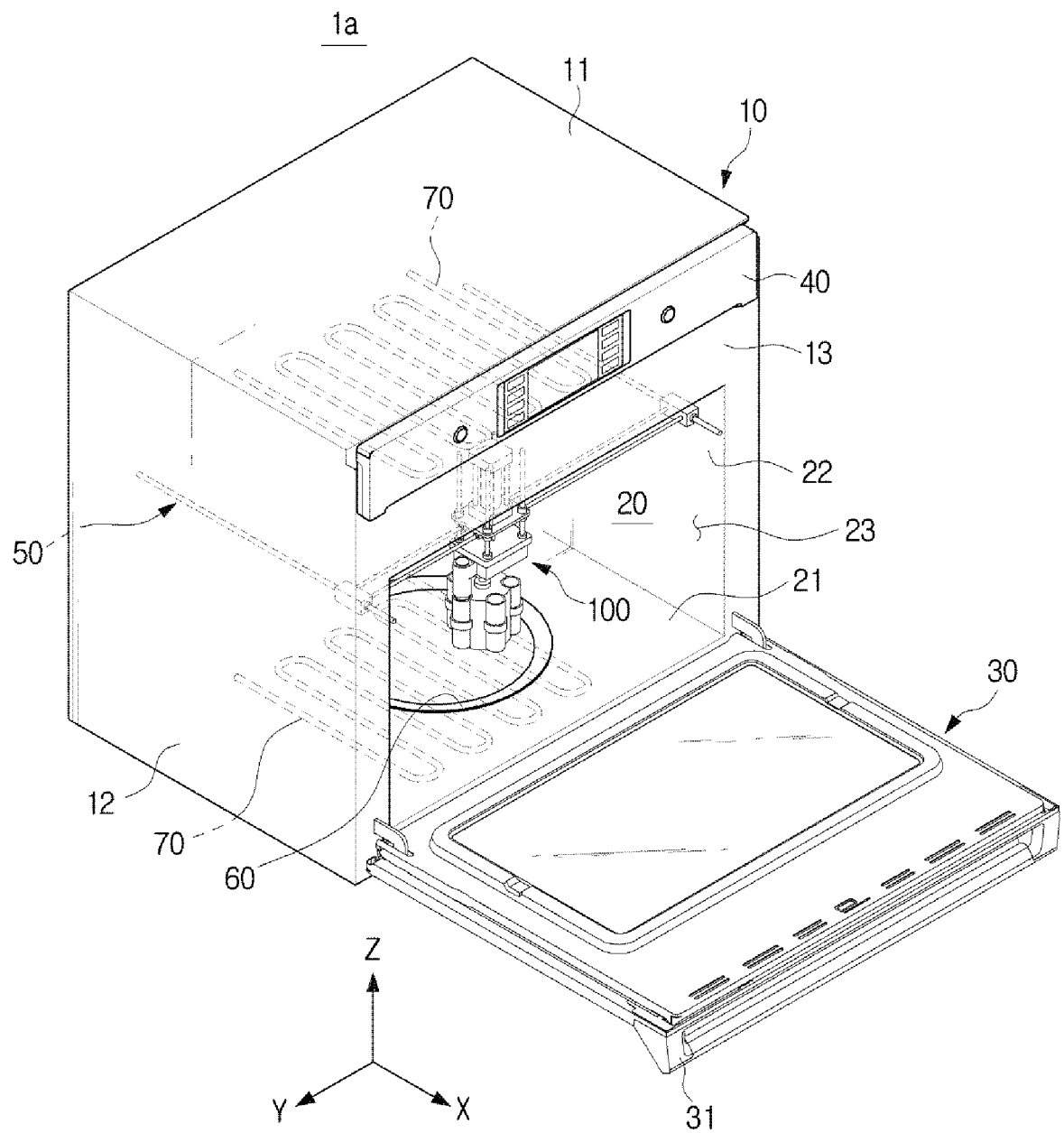
FIG. 2 is a perspective view illustrating a cooking apparatus according to an embodiment of the present disclosure.

FIG. 2 is a perspective view illustrating a cooking apparatus according to an embodiment of the present disclosure.

Referring to FIG. 2, a cooking apparatus 1a may include a main body 10. The main body 10 may form an exterior of the cooking apparatus 1a. The main body 10 may include an upper surface 11, a lower surface (not illustrated), a rear surface (not illustrated), both side surfaces 12, and a front surface 13.

The cooking apparatus 1a may also include a cooking compartment 20 provided in the main body 10. The cooking compartment 20 may be defined by an upper surface (not illustrated), a bottom surface 21, a rear surface (not illustrated), both side surfaces 22, and an open front surface 23. An insulating member (not illustrated) may be arranged in a space between the cooking compartment 20 and the main body 10 to insulate the cooking compartment 20.

The cooking apparatus 1a may also include a door 30. The door 30 may be rotatably installed at the main body 10 to open and close the front surface 23 of the cooking compartment 20. The door 30 may form the exterior of the cooking apparatus 1a together with the main body 10. A handle 31 may be provided at the door 30 for convenience of the user.

The cooking apparatus 1a may also include a control panel 40 for controlling operation of the cooking apparatus 1a. Although the control panel 40 may be installed at an upper portion of the front surface 13 of the main body 10, the position of the control panel 40 may be changed in various ways.

The cooking apparatus 1a may also include a food forming module 100. The food forming module 100 may be movably provided in the cooking compartment 20. The food forming module 100 may include the cartridge assembly 200 and a driving device 120 configured to drive the cartridge assembly 200. The food forming module 100 will be described in detail below.

The cooking apparatus 1a may also include a guide rod 50 provided to guide the food forming module 100. The guide rod 50 may include fixed rods 51 fixed and installed at both of the side surfaces 22 of the cooking compartment 20. The fixed rods 51 may be fixed and installed at both of the side surfaces 22 of the cooking compartment 20 to longitudinally extend in a front-rear direction X of the cooking apparatus 1a. The fixed rods 51 installed at both of the side surfaces 22 of the cooking compartment 20 may be parallel to each other. The guide rod 50 may also include a movable rod 52 configured to move along the fixed rods 51. The movable rod 52 may longitudinally extend in a left-right direction Y of the cooking apparatus 1a, and both ends of the movable rod 52 may be coupled to the fixed rods 51. Specifically, both of the ends of the movable rod 52 may be coupled to the fixed rods 51 by binding members 53 so that the movable rod 52 can move along the fixed rods 51 in the front-rear direction X of the cooking apparatus 1a. The food forming module 100 may be movably coupled to the movable rod 52. Specifically, the food forming module 100 may be coupled to the movable rod 52 to be movable along the movable rod 52 in the left-right direction Y of the cooking apparatus 1a. Movement of the food forming module 100 will be described in detail below.

The cooking apparatus 1a may also include a tray 60 arranged on the bottom surface 21 of the cooking compartment 20. The tray 60 may be rotatably installed on the bottom surface 21 of the cooking compartment 20. The tray 60 may be installed on the bottom surface 21 of the cooking compartment 20 so that a height at which the tray 60 is located can be adjusted in an up-down direction Z of the cooking apparatus 1a.

The cooking apparatus 1a may also include one or more heaters 70 for heating food. The one or more heaters 70 may be installed in the cooking compartment 20. Although the one or more heaters 70 may be installed on the bottom surface 21 of the cooking compartment 20 or the upper surface (not illustrated) of the cooking compartment 20 as an example, installation positions of the one or more heaters 70 may be changed in various ways.

The cooking apparatus 1a may also include an electric component compartment (not illustrated) in which various electric components for driving the cooking apparatus 1a are installed. As an example, the electric component compartment may be provided in a space between the cooking compartment 20 and the main body 10. However, the position of the electric component compartment is not limited thereto, and may be changed in various ways.

The cooking apparatus 1a may also include a fan (not illustrated) installed to circulate air heated by the one or more heaters 70.

Figure 3:
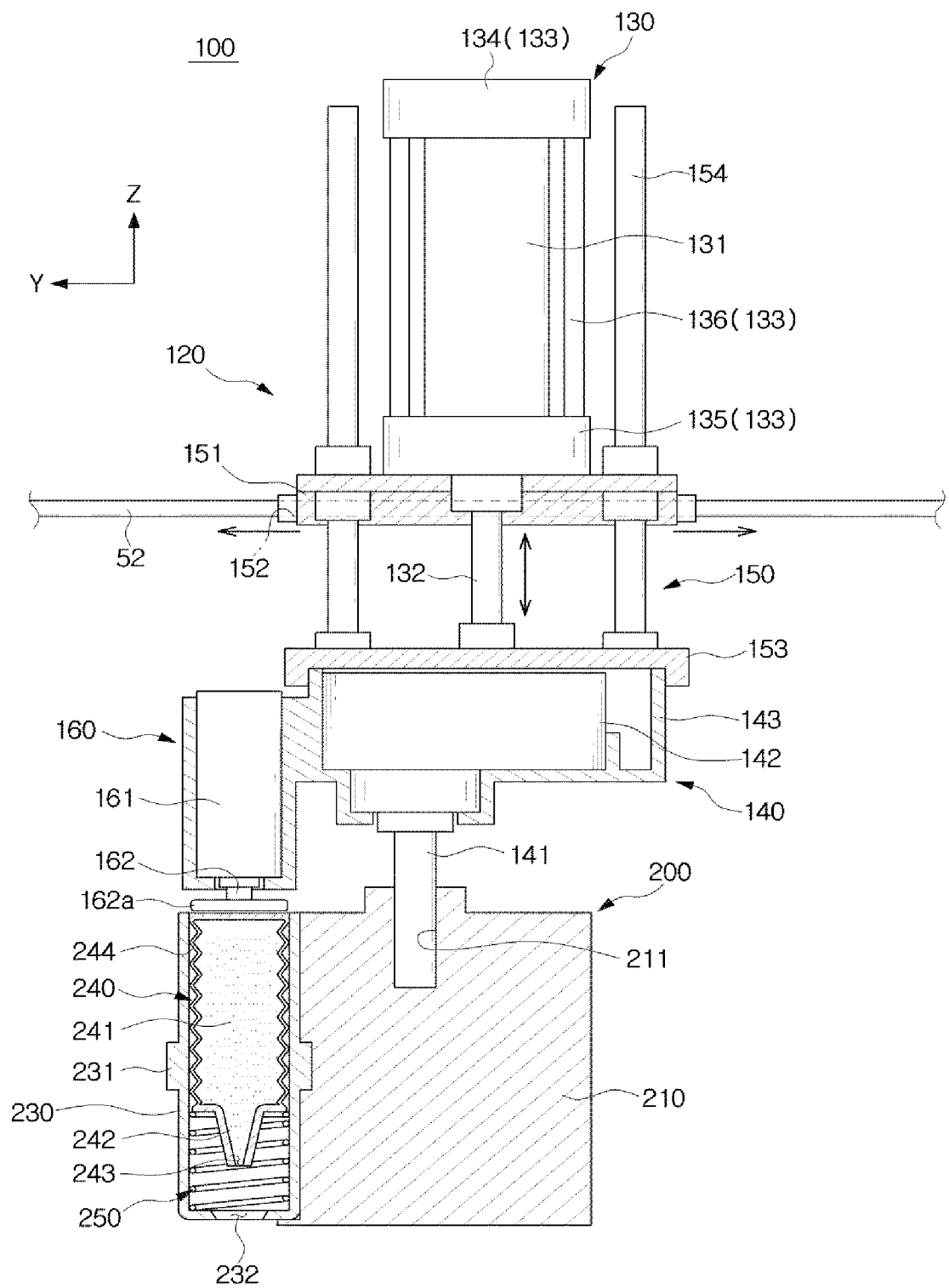
FIG. 3 is a cross-sectional view illustrating a food forming module of the cooking apparatus according to an embodiment of the present disclosure.

FIG. 3 is a cross-sectional view illustrating a food forming module of the cooking apparatus according to an embodiment of the present disclosure.

Referring to FIG. 3, the food forming module 100 may include the cartridge assembly 200 and the driving device 120 configured to drive the cartridge assembly 200.

The driving device 120 may include an up-and-down movement adjusting unit 130 (e.g., an up-and-down movement adjusting device or a vertical movement adjusting device) configured to move the cartridge assembly 200 in the up-down direction Z of the cooking apparatus 1a.

The up-and-down movement adjusting unit 130 may include an actuator. As an example, the up-and-down movement adjusting unit 130 may include an electric actuator, a pneumatic actuator, a hydraulic actuator, or the like. Hereinafter, a case in which a pneumatic actuator is used as the up-and-down movement adjusting unit 130 will be described as an example.

The up-and-down movement adjusting unit 130 may include a cylinder 131. Although the cylinder 131 may have a cylindrical shape, the shape of the cylinder 131 may be changed in various ways.

The up-and-down movement adjusting unit 130 may also include a piston rod 132 configured to be reciprocated by pneumatic pressure. The piston rod 132 may be accommodated in the cylinder 131 so that one end of the piston rod 132 is fixed to a connecting unit 150 (e.g., a connection device). Specifically, the end of the piston rod 132 may be fixed to a bottom plate 153 of the connecting unit 150.

The up-and-down movement adjusting unit 130 may also include a housing 133. The housing 133 may be arranged on the connecting unit 150. Specifically, the housing 133 may be arranged on a top plate 151 of the connecting unit 150. The housing 133 may include a top cover 134 coupled to an upper end of the cylinder 131 and a bottom cover 135 coupled to a lower end of the cylinder 131. Also, the housing 133 may also include a plurality of connecting rods 136 configured to connect the top cover 134 and the bottom cover 135. The plurality of connecting rods 136 may be disposed outside the cylinder 131. In another aspect, the cylinder 131 may be accommodated in a space defined by the top cover 134, the bottom cover 135, and the plurality of connecting rods 136. One end of the piston rod 132 may pass through the bottom cover 135 and the top plate 151 and be fixed to the bottom plate 153.

The type of the up-and-down movement adjusting unit 130 is not limited to an actuator and may be anything capable of adjusting a height at which the cartridge assembly 200 is located.

The driving device 120 may also include a rotation adjusting unit 140 (e.g., a rotation adjusting device) configured to rotate the cartridge assembly 200.

The rotation adjusting unit 140 may include a rotating shaft 141 coupled to the cartridge assembly 200. The rotating shaft 141 may be coupled to a cartridge body 210 so that the cartridge assembly 200 can be rotated.

The rotation adjusting unit 140 may also include a driving motor 142. The driving motor 142 is connected to the rotating shaft 141 to provide a rotational force to the rotating shaft 141.

The rotation adjusting unit 140 may also include a casing 143 provided to accommodate the driving motor 142 therein. The casing 143 may be fixed to the connecting unit 150. Specifically, the casing 143 may be fixed to the bottom plate 153 of the connecting unit 150.

The driving device 120 may also include the connecting unit 150 configured to connect the up-and-down movement adjusting unit 130 and the rotation adjusting unit 140. The connecting unit 150 may be disposed between the up-and-down movement adjusting unit 130 and the rotation adjusting unit 140.

The connecting unit 150 may include the top plate 151 provided to support the up-and-down movement adjusting unit 130. The bottom cover 135 of the up-and-down movement adjusting unit 130 may be fixed on the top plate 151. The top plate 151 may include a movable rod mounting hole 152 to which the movable rod 52 is coupled. The number of movable rod mounting holes 152 and a size of the movable rod mounting hole 152 may correspond to the number of movable rods 52 and a size of the movable rods 52. The food forming module 100 may move along the movable rod 52 in the left-right direction Y of the cooking apparatus 1a by the movable rod 52 being movably coupled to the movable rod mounting hole 152 of the connecting unit 150.

The connecting unit 150 may also include the bottom plate 153 coupled to the rotation adjusting unit 140. Specifically, the bottom plate 153 of the connecting unit 150 may be coupled to the casing 143 of the rotation adjusting unit 140. The one end of the piston rod 132 of the up-and-down movement adjusting unit 130 may be fixed on the bottom plate 153 of the connecting unit 150.

The connecting unit 150 may also include a guide rod 154 configured to connect the top plate 151 and the bottom plate 153. The guide rod 154 may pass through the top plate 151. Also, one end of the guide rod 154 may be fixed on the bottom plate 153. The up-and-down movement adjusting unit 130 may be disposed inward from the guide rod 154. The guide rod 154 may integrally move with the bottom plate 153. For example, when the piston rod 132 of the up-and-down movement adjusting unit 130 moves toward a lower portion of the cooking apparatus 1a, a gap between the top plate 151 and the bottom plate 153 of the connecting unit 150 increases while a length ratio of the guide rod 154 disposed between the top plate 151 and the bottom plate 153 of the connecting unit 150 increases. A stopper (not illustrated) may be provided at the guide rod 154. The stopper limits movement of the guide rod 154 toward the lower portion of the cooking apparatus 1a and prevents the guide rod 154 from being separated from the top plate 151. The connecting unit 150 may include a plurality of guide rods 154.

The driving device 120 may also include an extruding unit 160 (e.g., an extruding device). The extruding unit 160 may be provided to press one or more cartridges 240. The extruding unit 160 may be installed in the cooking compartment 20 so that food ingredients accommodated in the one or more cartridges 240 are discharged from the one or more cartridges 240 onto the tray 60 (see FIG. 2) by the one or more cartridges 240 being pressed.

The extruding unit 160 may include an actuator. As an example, the extruding unit 160 may include an electric actuator, a pneumatic actuator, a hydraulic actuator, or the like. Hereinafter, a case in which a pneumatic actuator is used as the extruding unit 160 will be described as an example.

The extruding unit 160 may include an extruding unit cylinder 161. Although the extruding unit cylinder 161 may have a cylindrical shape, the shape of the extruding unit cylinder 161 may be changed in various ways.

The extruding unit 160 may also include a piston 162 configured to be reciprocated by pneumatic pressure. The piston 162 may include a presser 162a provided at one end of the piston 162 to press the one or more cartridges 240.

The extruding unit 160 may be accommodated in the casing 143. Specifically, the extruding unit 160 may be accommodated in the casing 143 so that one end of the piston 162 is disposed outside the casing 143. In other words, the extruding unit 160 may be accommodated in the casing 143 so that the presser 162a of the piston 162 is disposed outside the casing 143. However, the extruding unit 160 may also be accommodated in a separate casing only for the extruding unit 160.

The driving device 120 may also include a plurality of extruding units 160 corresponding to the plurality of cartridges 240.

The cartridge assembly 200 may include the plurality of cartridges 240 having food ingredients accommodated therein. The extruding unit 160 may be provided to selectively press any one of the plurality of cartridges 240. The cartridge assembly 200 will be described in detail below. The type of the extruding unit 160 is not limited to an actuator and may be anything capable of pressing the plurality of cartridges 240.

Figure 4:
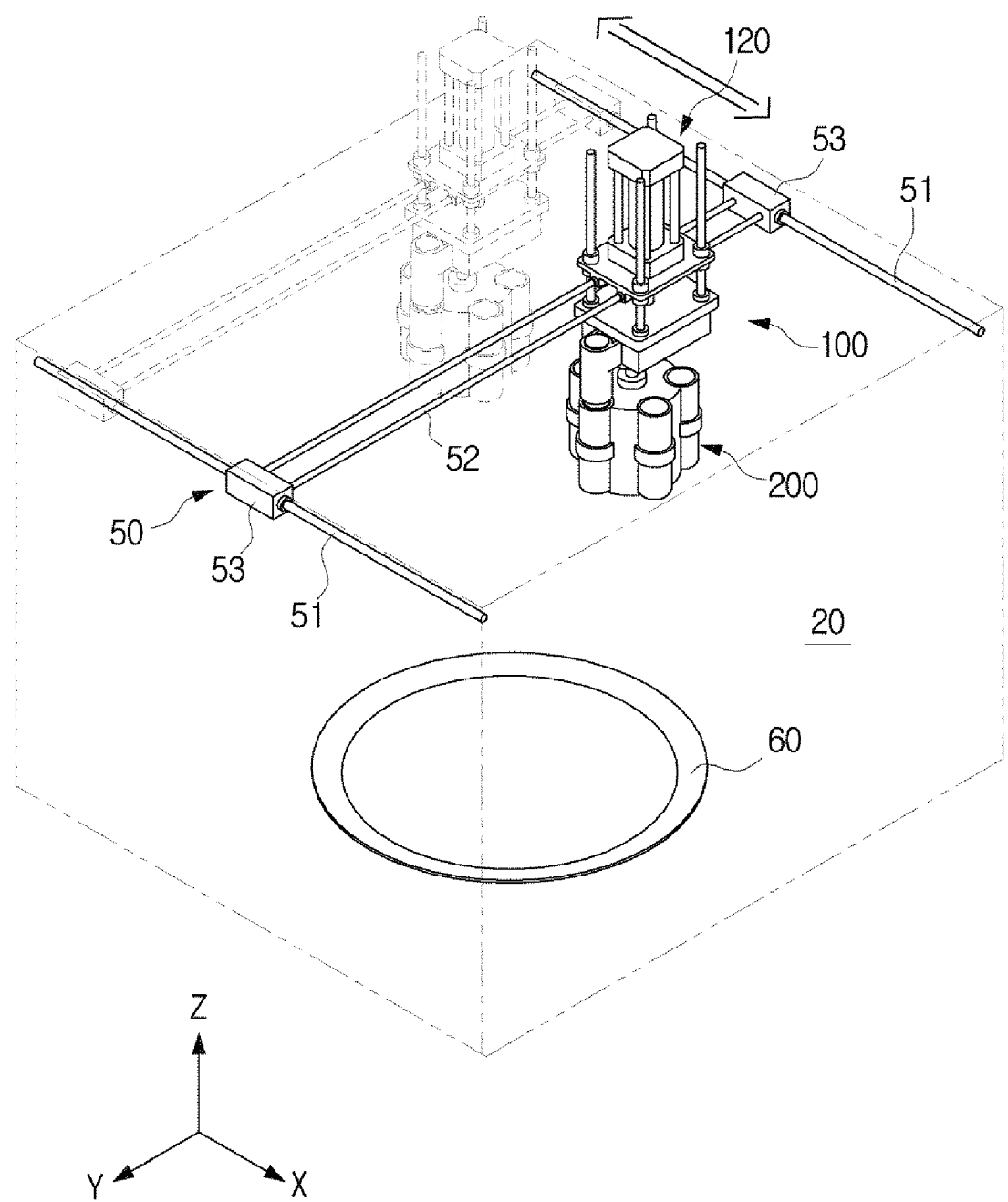
FIG. 4 is a view illustrating a state in which a cartridge assembly moves in an X-direction in the cooking apparatus according to an embodiment of the present disclosure.

FIG. 4 is a view illustrating a state in which a cartridge assembly moves in an X-direction in the cooking apparatus according to an embodiment of the present disclosure.

Referring to FIG. 4, the cartridge assembly 200 may move in the front-rear direction X of the cooking apparatus 1a.

Movement of the cartridge assembly 200 in the front-rear direction X of the cooking apparatus 1a may be implemented by movement of the movable rod 52 moving along the fixed rods 51. The movable rod 52 may move along the fixed rods 51 in the front-rear direction X of the cooking apparatus 1a. Consequently, the food forming module 100 coupled to the movable rod 52 may also move along the fixed rods 51 in the front-rear direction X of the cooking apparatus 1a integrally with the movable rod 52.

Figure 5:
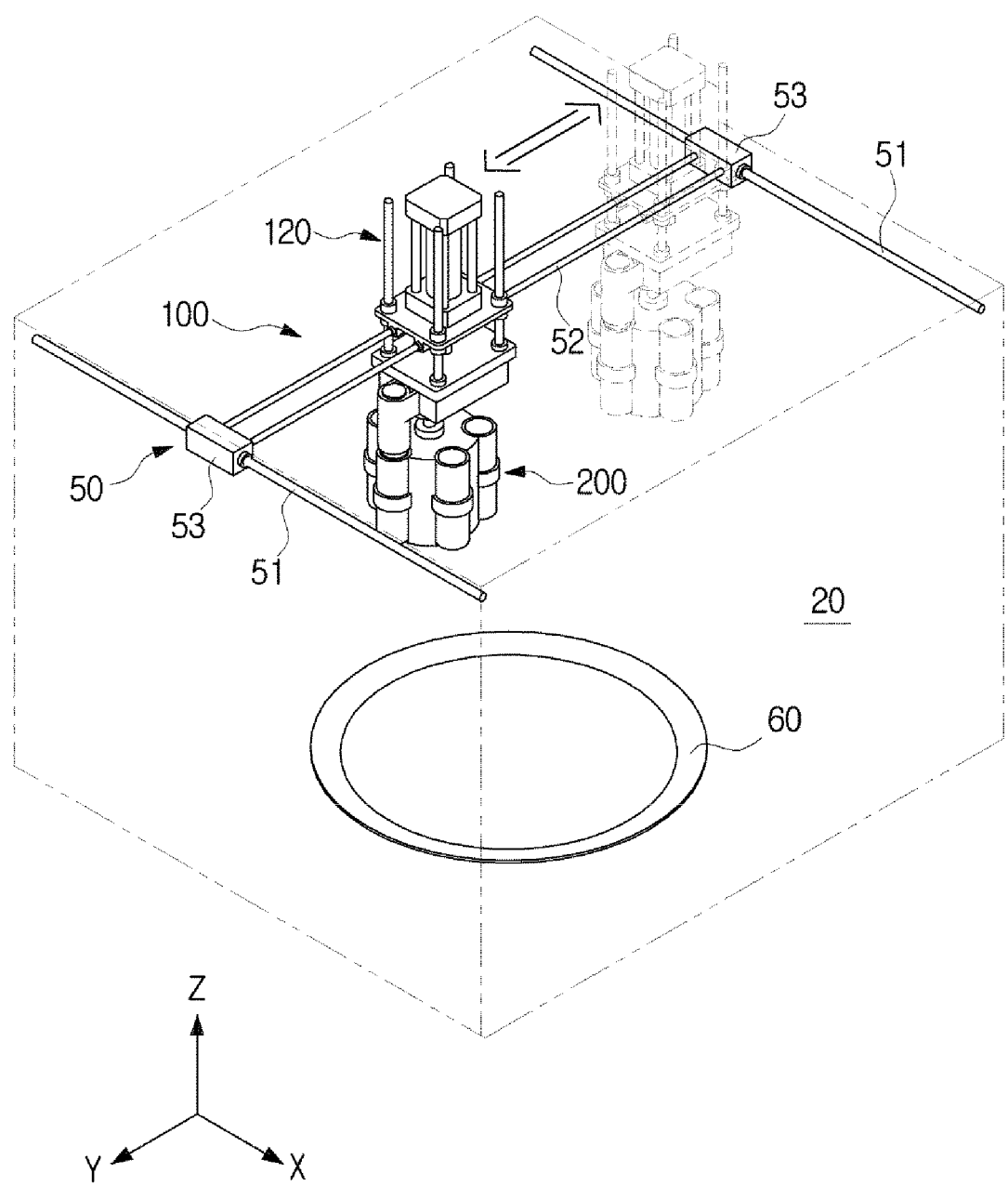
FIG. 5 is a view illustrating a state in which the cartridge assembly moves in a Y-direction in the cooking apparatus according to an embodiment of the present disclosure.

FIG. 5 is a view illustrating a state in which the cartridge assembly moves in a Y-direction in the cooking apparatus according to an embodiment of the present disclosure.

Referring to FIG. 5, the cartridge assembly 200 may move in the left-right direction Y of the cooking apparatus 1a.

The food forming module 100 may be coupled to the movable rod 52 to be movable along the movable rod 52 in the left-right direction Y of the cooking apparatus 1a. Consequently, the cartridge assembly 200, which is an element of the food forming module 100, may also move in the left-right direction Y of the cooking apparatus 1a.

Figure 6:
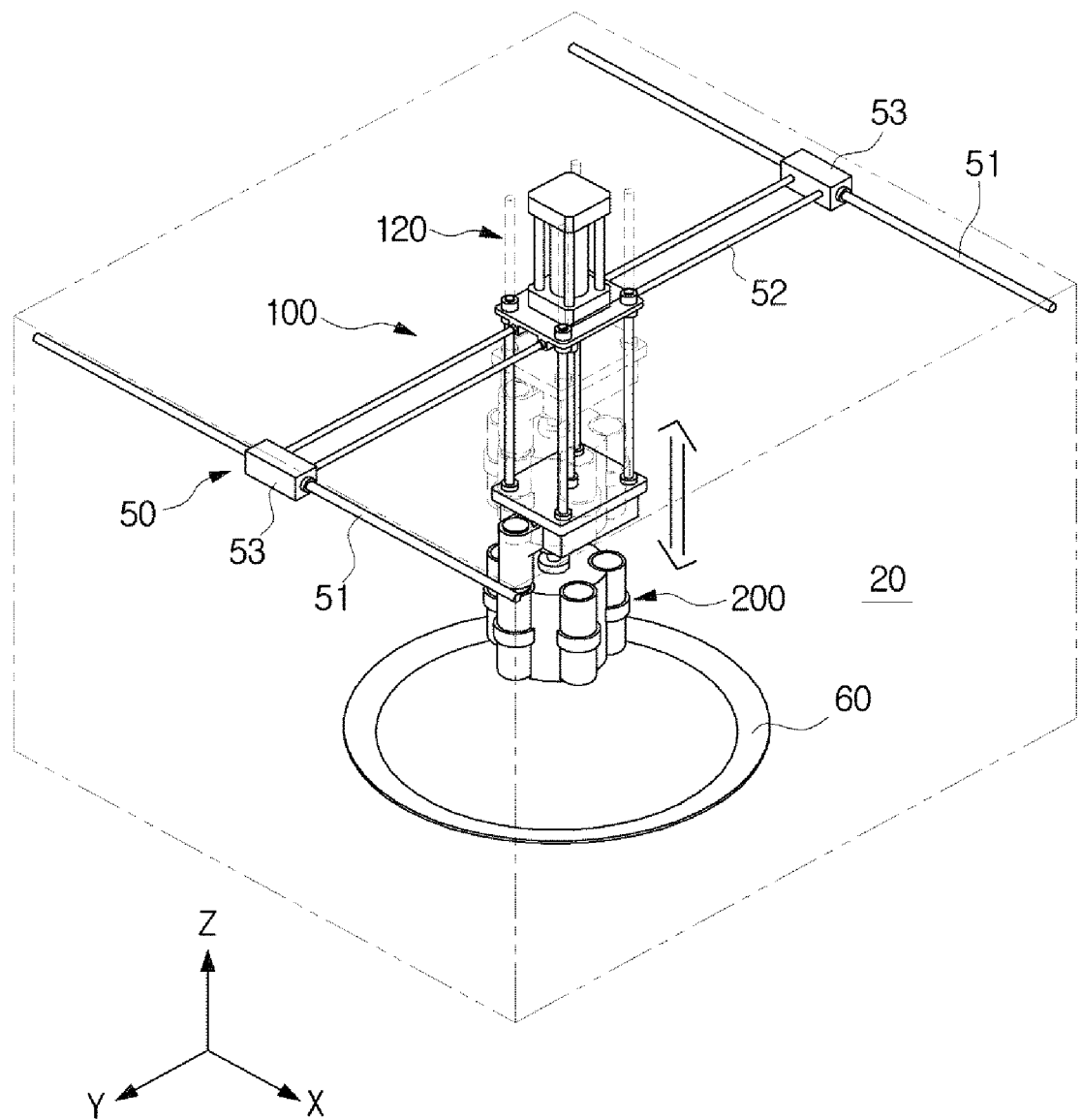
FIG. 6 is a view illustrating a state in which the cartridge assembly moves in a Z-direction in the cooking apparatus according to an embodiment of the present disclosure.

FIG. 6 is a view illustrating a state in which the cartridge assembly moves in a Z-direction in the cooking apparatus according to an embodiment of the present disclosure. Refer to FIG. 3 for unmarked reference numerals.

Referring to FIG. 6, the cartridge assembly 200 may move in the up-down direction Z of the cooking apparatus 1a.

Movement of the cartridge assembly 200 in the up-down direction Z of the cooking apparatus 1a may be implemented by an action of the up-and-down movement adjusting unit 130. Specifically, the movement of the cartridge assembly 200 in the up-down direction Z of the cooking apparatus 1a is decided by movement of the piston rod 132. When the piston rod 132 of the up-and-down movement adjusting unit 130 moves toward the lower portion of the cooking apparatus 1a, the cartridge assembly 200 also moves toward the lower portion of the cooking apparatus 1a. Conversely, when the piston rod 132 of the up-and-down movement adjusting unit 130 moves toward the upper portion of the cooking apparatus 1a, the cartridge assembly 200 also moves toward the upper portion of the cooking apparatus 1a.

Figure 7:
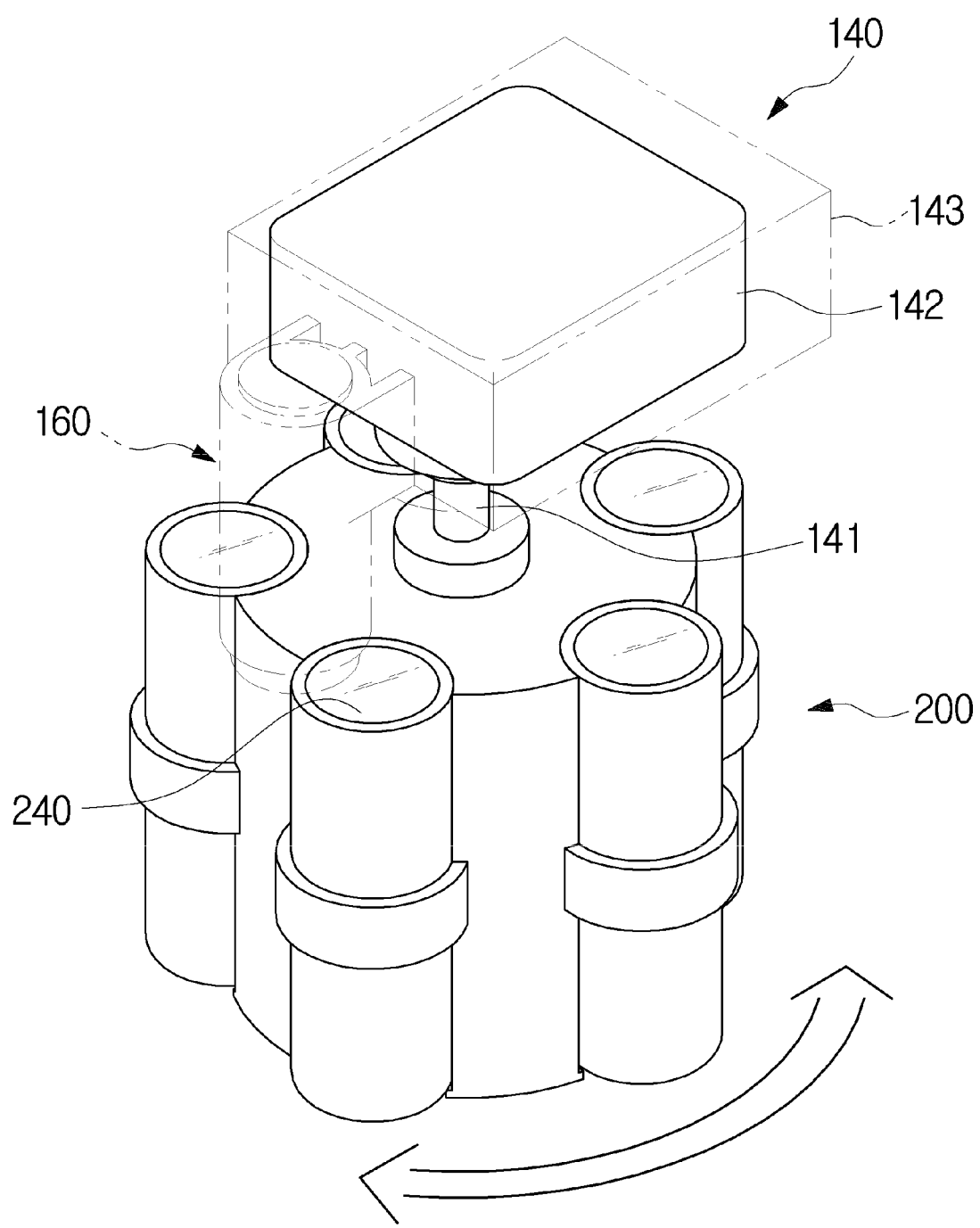
FIG. 7 is a view illustrating a state in which the cartridge assembly rotates in the cooking apparatus according to an embodiment of the present disclosure.

FIG. 7 is a view illustrating a state in which the cartridge assembly rotates in the cooking apparatus according to an embodiment of the present disclosure.

Referring to FIG. 7, the cartridge assembly 200 may rotate about the rotating shaft 141 of the rotation adjusting unit 140. The rotating shaft 141 may be rotated by receiving power from the driving motor 142 of the rotation adjusting unit 140. The cartridge assembly 200 may rotate in one direction or both directions.

In this way, when the cartridge assembly 200 is designed to be rotatable, the plurality of cartridges 240 may be pressed by only one extruding unit 160. As an example, when it is assumed that different food ingredients are accommodated in the plurality of cartridges 240, a degree of rotation of the cartridge assembly 200 may be controlled so that the extruding unit 160 presses a specific cartridge 240 among the plurality of cartridges 240.

However, the number of the extruding unit 160 is not limited to one. As an example, the driving device 120 may include the plurality of extruding units 160 corresponding to the number of the plurality of cartridges 240.

Figure 8:
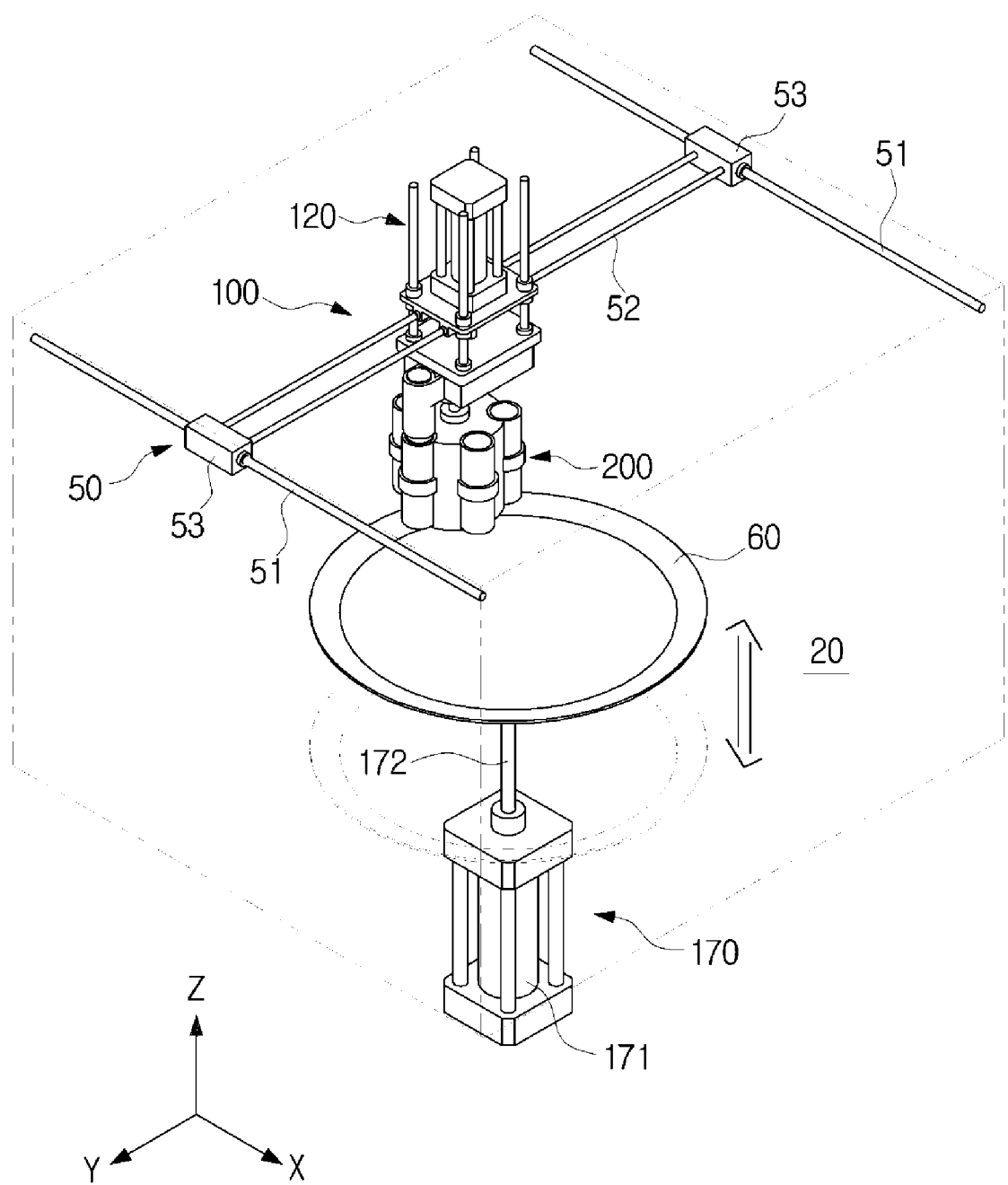
FIG. 8 is a view illustrating a state in which a tray moves in the Z-direction in the cooking apparatus according to an embodiment of the present disclosure.

FIG. 8 is a view illustrating a state in which a tray moves in the Z-direction in the cooking apparatus according to an embodiment of the present disclosure.

Referring to FIG. 8, the tray 60 may be installed on the bottom surface 21 of the cooking compartment 20 to be movable in the up-down direction Z of the cooking apparatus 1a. That is, the tray 60 may be installed on the bottom surface 21 of the cooking apparatus 1a so that the height at which the tray 60 is located can be adjusted.

The cooking apparatus 1a may also include a tray height adjusting unit 170 (e.g., a tray height adjusting device).

The tray height adjusting unit 170 may include an actuator. As an example, the tray height adjusting unit 170 may include an electric actuator, a pneumatic actuator, a hydraulic actuator, or the like. Hereinafter, a case in which a pneumatic actuator is used as the tray height adjusting unit 170 will be described as an example.

The tray height adjusting unit 170 may include a tray cylinder 171 and a tray piston rod 172. The tray piston rod 172 may be reciprocated in the up-down direction Z of the cooking apparatus 1a by pneumatic pressure.

Movement of the tray 60 in the up-down direction Z of the cooking apparatus 1a may be implemented by an action of the tray height adjusting unit 170. Specifically, movement of the tray 60 in the up-down direction Z of the cooking apparatus 1a is decided by movement of the tray piston rod 172. When the tray piston rod 172 moves toward the upper portion of the cooking apparatus 1a, the tray 60 also moves toward the upper portion of the cooking apparatus 1a. Conversely, when the tray piston rod 172 moves toward the lower portion of the cooking apparatus 1a, the tray 60 also moves toward the lower portion of the cooking apparatus 1a.

The tray height adjusting unit 170 may be arranged between the cooking compartment 20 and the main body 10. Specifically, the tray height adjusting unit 170 may be arranged between the bottom surface 21 of the cooking compartment 20 and the main body 10. However, the position of the tray height adjusting unit 170 is not limited thereto, and may be changed in various ways.

The type of the tray height adjusting unit 170 is not limited to an actuator and may be anything capable of adjusting the height at which the tray 60 is located.

The tray 60 may be rotatably installed on the bottom surface 21 of the cooking compartment 20.

As described with reference to FIGS. 4 to 6, the cartridge assembly 200 may be installed in the cooking compartment 20 to be capable of linear motion. Also, as described with reference to FIG. 7, the cartridge assembly 200 may be installed in the cooking compartment 20 to be capable of rotation.

Figure 9:
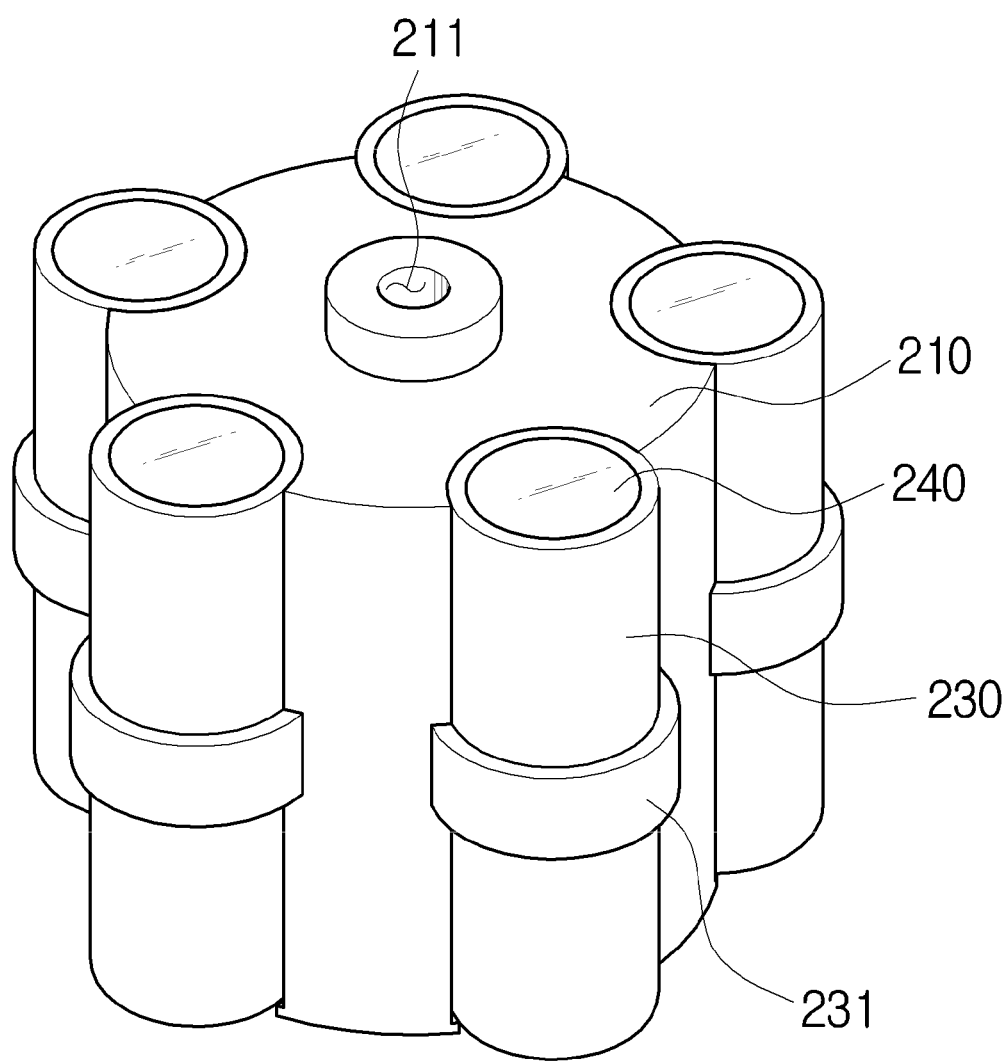
FIG. 9 is a perspective view illustrating a cartridge assembly according to an embodiment of the present disclosure.
Figure 10:
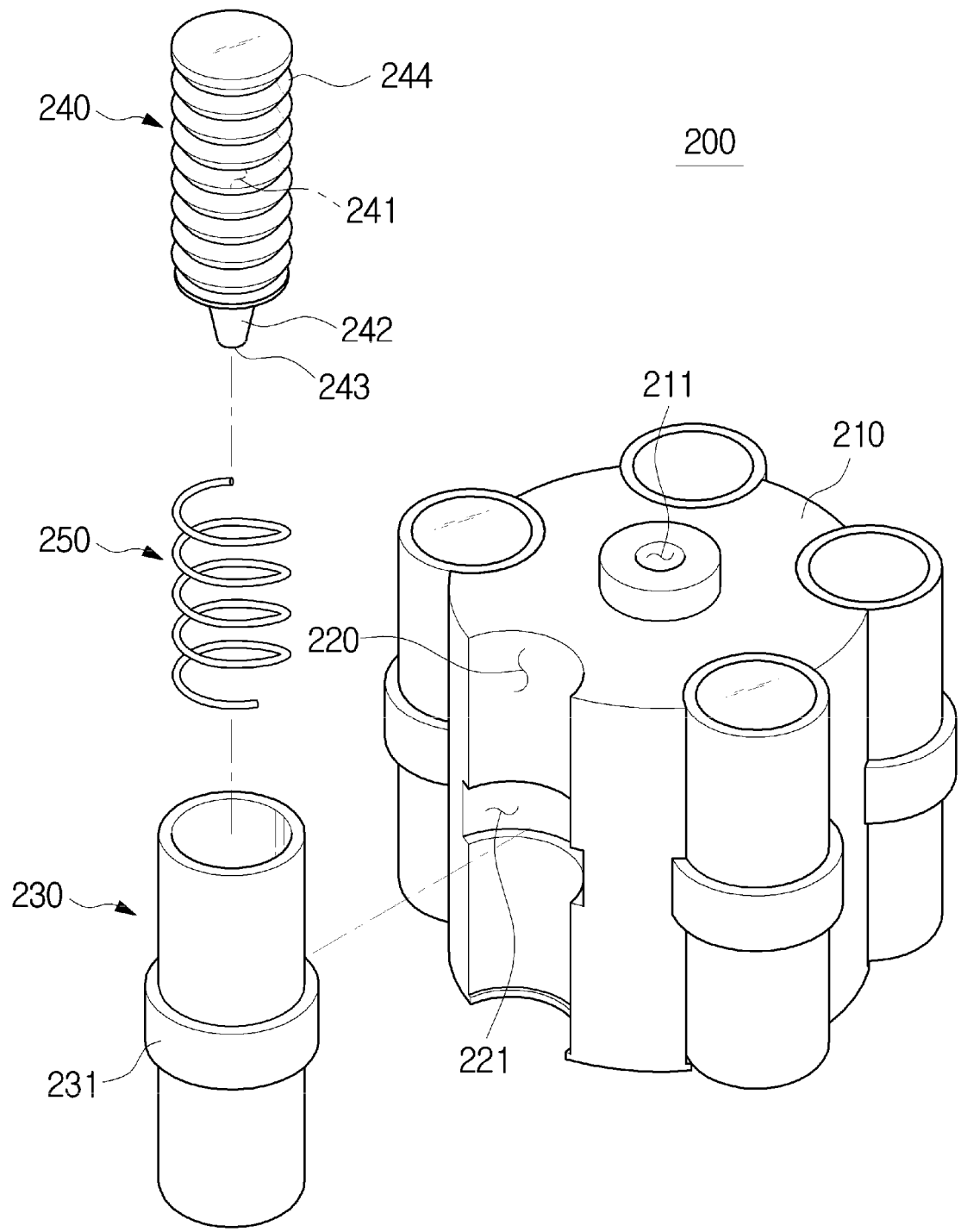
FIG. 10 is an exploded perspective view of the cartridge assembly of the cooking apparatus according to an embodiment of the present disclosure.

FIG. 9 is a perspective view illustrating a cartridge assembly according to the first embodiment of the cooking apparatus of the present disclosure, and FIG. 10 is an exploded perspective view of the cartridge assembly according to the first embodiment of the cooking apparatus according to an embodiment of the present disclosure.

Referring to FIGS. 9 and 10, the cartridge assembly 200 may include the cartridge body 210. The cartridge body 210 may have a cylindrical shape. However, the shape of the cartridge body 210 is not limited to the above example, and may be changed in various ways. A plurality of cartridge mounts 220 may be formed in the cartridge body 210. When the cartridge body 210 has a cylindrical shape, the plurality of cartridge mounts 220 may be recessed in a side surface of the cartridge body 210 along a circumferential direction of the cartridge body 210. A groove 221 may be formed in a side of the cartridge body 210 defining each of the plurality of cartridge mounts 220. A rotating shaft coupler 211 may be provided in the cartridge body 210 so that the rotating shaft 141 of the rotation adjusting unit 140 can be coupled thereto.

The cartridge assembly 200 may also include a plurality of cartridge cases 230 mounted on the plurality of cartridge mounts 220. The plurality of cartridge cases 230 may have a cylindrical shape with one open base plane. As an example, the plurality of cartridge cases 230 may have a cylindrical shape with an open upper base plane. Each of the plurality of cartridge cases 230 may include a protrusion 231 corresponding to the groove 221 in the cartridge mount 220. The protrusion 231 may protrude from side surface of the cartridge case 230 to be coupled to the groove 221 in the cartridge mount 220. Each of the plurality of cartridge cases 230 may also include an opening 232. The opening 232 may be formed in the cartridge case 230 to face the bottom surface 21 of the cooking compartment 20. As an example, the opening 232 may be formed at a lower base plane of the cartridge case 230. A nozzle 242 of each of the plurality of cartridges 240 may selectively protrude outside the cartridge case 230 via the opening 232.

The plurality of cartridge cases 230 are not limited to having a cylindrical shape, and may have a shape corresponding to the plurality of cartridge mounts 220.

The cartridge assembly 200 may also include the plurality of cartridges 240 disposed in the plurality of cartridge cases 230. Food ingredients may be accommodated in the plurality of cartridges 240. The food ingredients may be in a liquid state or a solid state. Also, the food ingredients may be in a powder form.

The plurality of cartridges 240 may be formed of a transparent or opaque material.

The plurality of cartridges 240 may be formed of one or more materials of plastic, paper, vinyl, and a coating fiber. As an example, the plurality of cartridges 240 may be formed of a polyethylene (PE) material. As another example, the plurality of cartridges 240 may be formed of a paper material with an inner surface covered with vinyl. As still another example, the plurality of cartridges 240 may be formed of a waterproof coating fiber material.

Each of the plurality of cartridges 240 may include an accommodator 241.

Each of the plurality of cartridges 240 may also include the nozzle 242 connected to the accommodator 241 and having an outlet 243 through which the food ingredient is discharged.

A corrugation 244 may be formed in at least one part of the accommodator 241. Preferably, the corrugation 244 may be formed in the accommodator 241 over an entire length thereof. In this way, since the corrugation 244 is formed in at least one part of the accommodator 241, the food ingredients may be easily discharged when the plurality of cartridges 240 are pressed by the extruding unit 160. That is, because the food ingredient is expected to be smoothly discharged when the corrugation 244 is formed in at least a part of the accommodator 241, the plurality of cartridges 240 can be prevented from being discarded or replaced when the food ingredients remain in the plurality of cartridges 240.

The cartridge assembly 200 may also include an elastic member 250. The elastic member 250 may be accommodated in each of the plurality of cartridge cases 230. Specifically, the elastic member 250 may be accommodated in each of the plurality of cartridge cases 230 to be disposed between the cartridge 240 and the opening 232 in the up-down direction Z of the cooking apparatus 1a. The nozzle 242 of the cartridge 240 may selectively protrude outside the cartridge case 230 via the opening 232 due to an elastic force of the elastic member 250. As an example, the elastic member 250 may include a spring.

Different food ingredients may be accommodated in the plurality of cartridges 240.

Figure 11A:
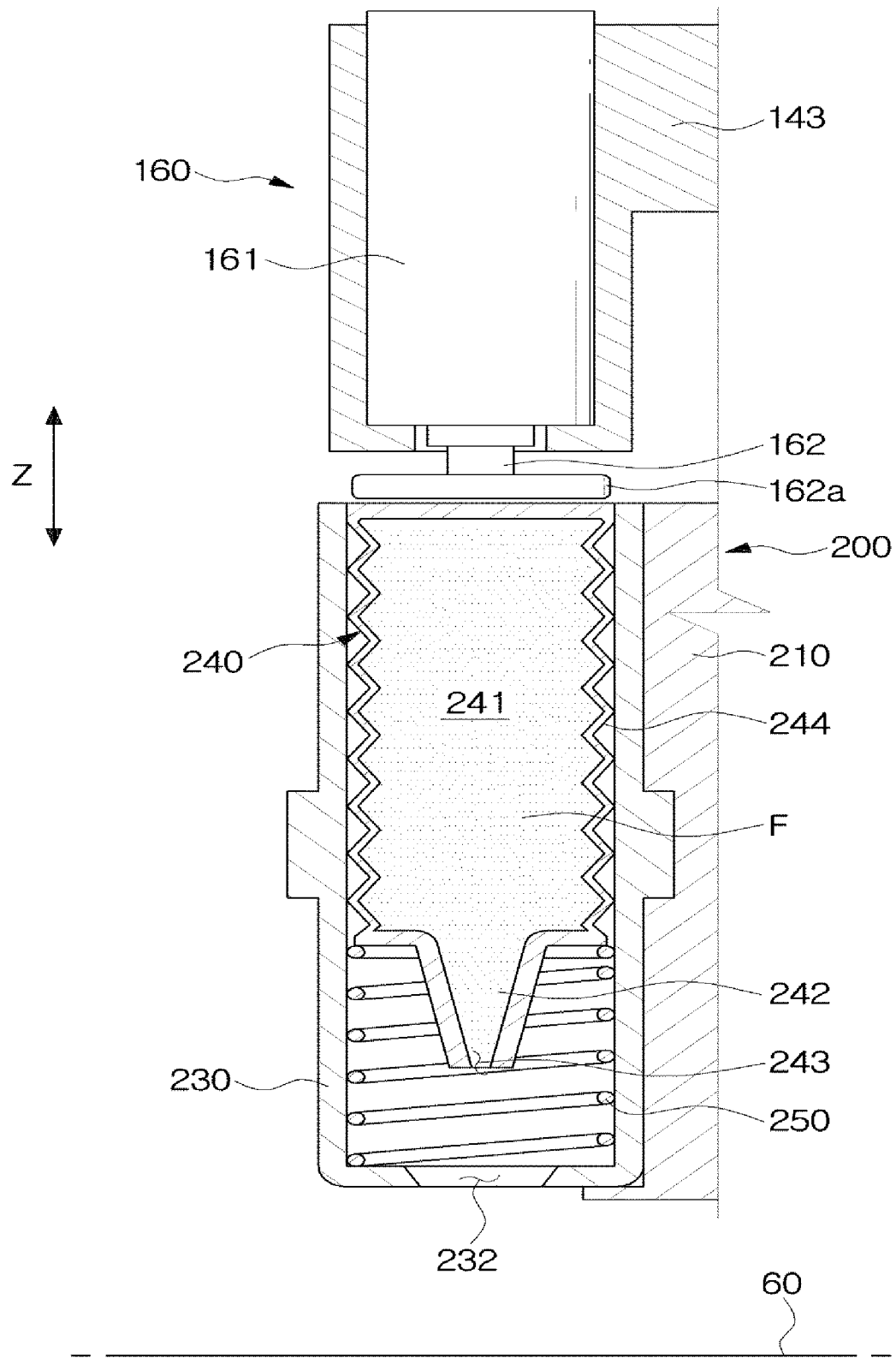
FIGS. 11A and 11B are views illustrating a process of pressing a cartridge in the cartridge assembly of the cooking apparatus according to various embodiments of the present disclosure.
Figure 11B:
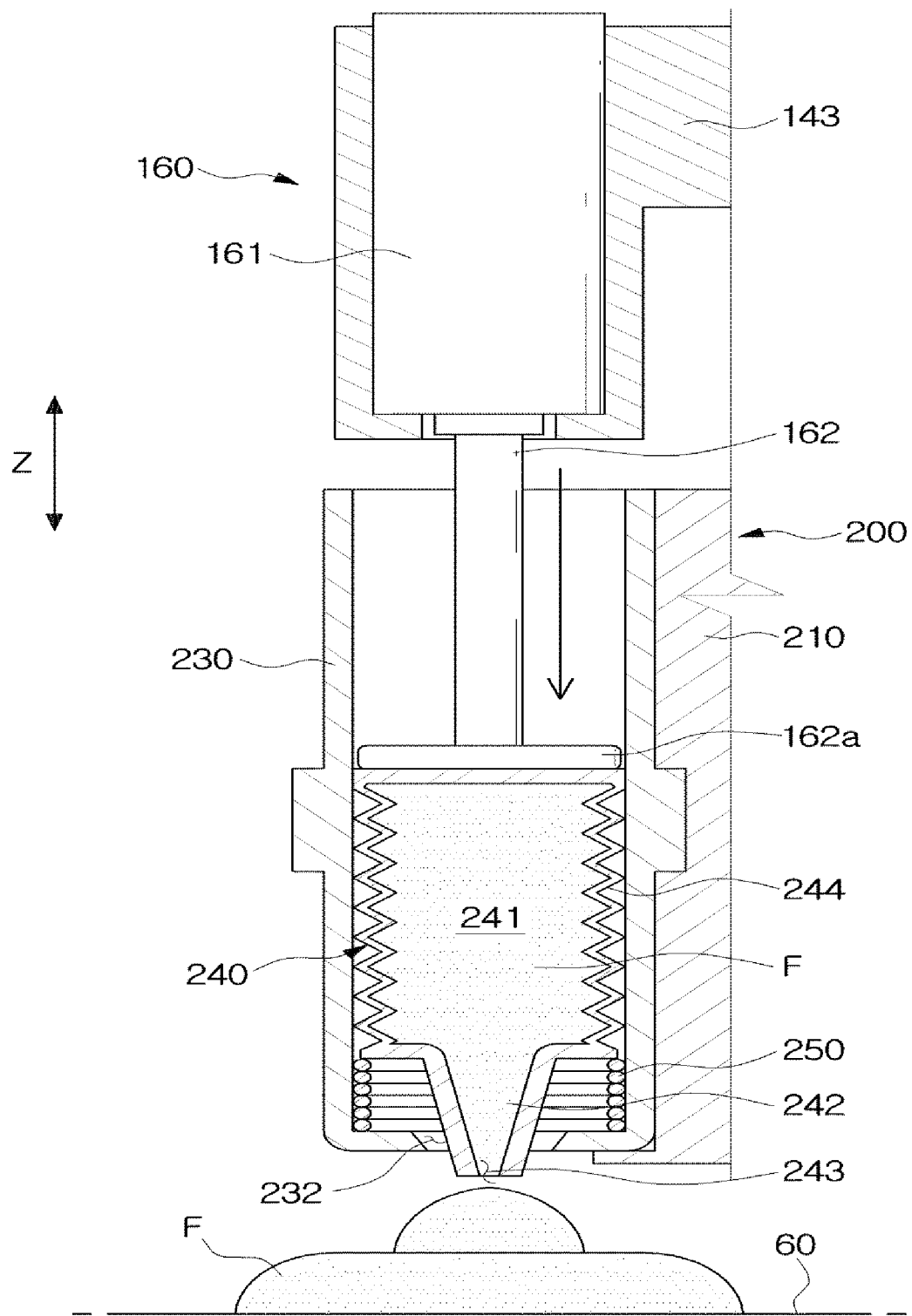

FIGS. 11A and 11B are views illustrating a process of pressing a cartridge in the cartridge assembly according to the first embodiment of the cooking apparatus according to an embodiment of the present disclosure. In FIGS. 11A and 11B, "F" indicates the food ingredient.

Referring to FIGS. 11A and 11B, the plurality of cartridges 240 may be pressed in the up-down direction Z of the cooking apparatus 1a by the extruding unit 160.

When the piston 162 of the extruding unit 160 presses each of the plurality of cartridges 240, the elastic member 250 is contracted, and the nozzle 242 of the cartridge 240 protrudes outside the cartridge case 230 via the opening 232. Here, because the plurality of cartridges 240 are compressed by the extruding unit 160, the food ingredients accommodated in the plurality of cartridges 240 are discharged onto the tray 60 via the outlets 243.

A discharge amount of a food ingredient may be adjusted by changing a pressure with which the piston 162 of the extruding unit 160 presses each of the plurality of cartridges 240, a distance over which the piston 162 of the extruding unit 160 moves, and the like. The discharge amount of the food ingredient may also be adjusted by a solenoid valve, a rotary valve, and the like.

Figure 12A:
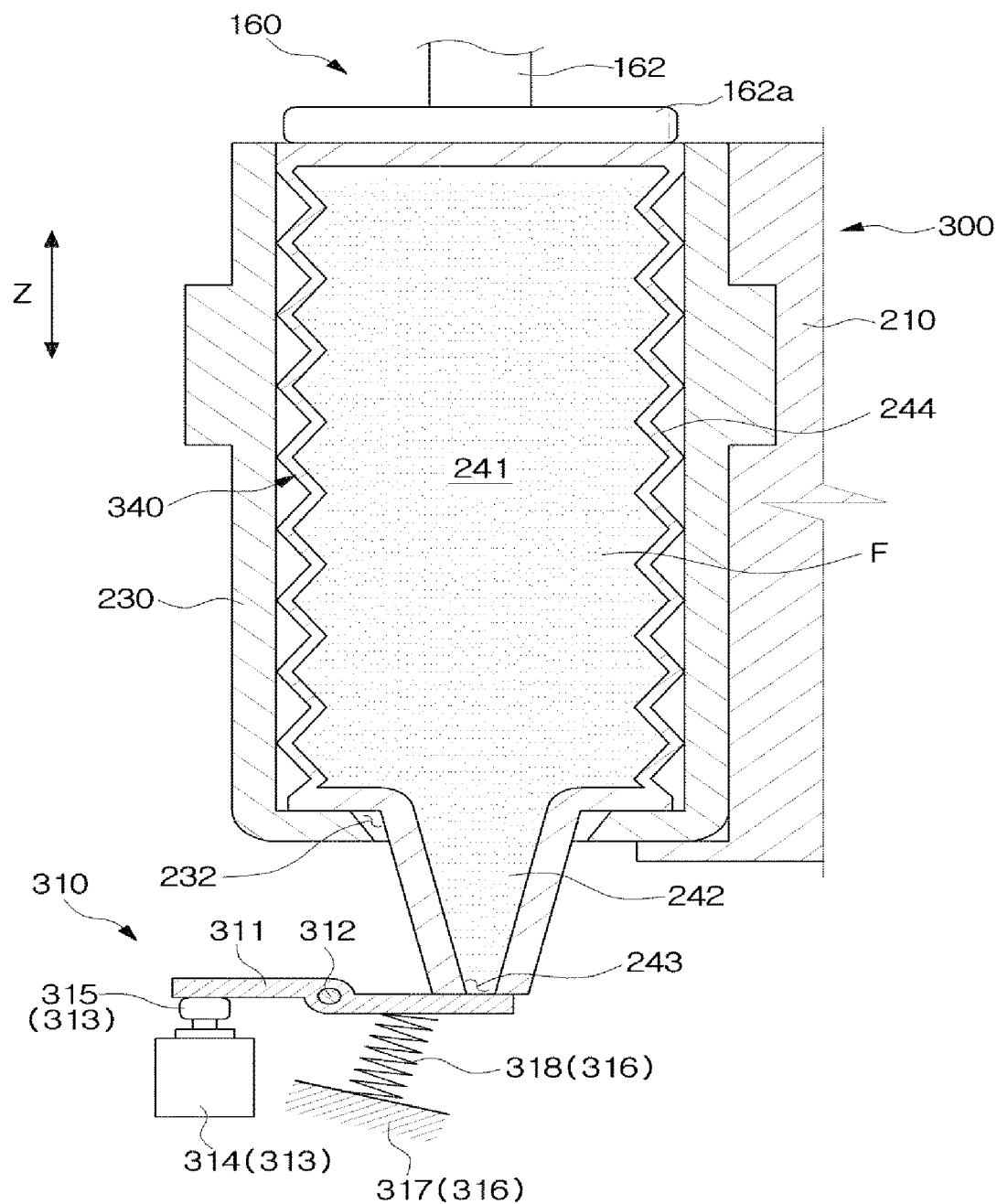
FIGS. 12A and 12B are views schematically illustrating a first way of adjusting an amount of food ingredients extruded from a cartridge in a cartridge assembly of the cooking apparatus according to an embodiment of the present disclosure.
Figure 12B:
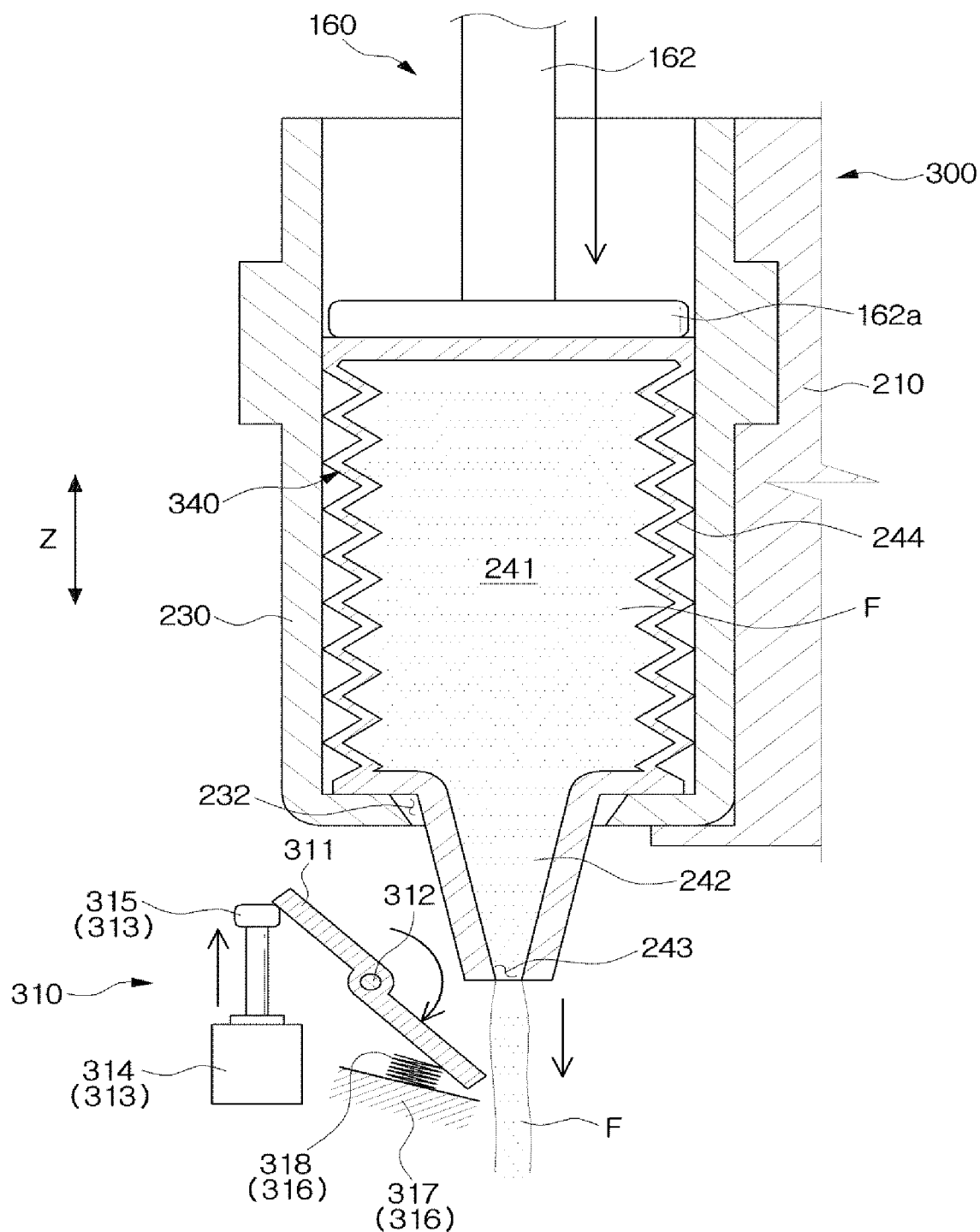

FIGS. 12A and 12B are views schematically illustrating a first way of adjusting an amount of a food ingredient extruded from the cartridge in a cartridge assembly according to a second embodiment of the cooking apparatus according to an embodiment of the present disclosure. A cartridge assembly 300 according to the second embodiment has a structure in which the elastic member 250 is omitted from the structure of the cartridge assembly 200 according to the first embodiment. In the cartridge assembly 300 according to the second embodiment, the nozzle 242 of each of a plurality of cartridges 340 remains protruded outside of the cartridge case 230 via the opening 232. In FIGS. 12A and 12B, "F" indicates a food ingredient. Descriptions overlapping those made with reference to FIGS. 2 to 11B will be omitted.

Referring to FIGS. 12A and 12B, the cooking apparatus 1a may also include an outlet opening-closing member 310 provided to selectively open or close the outlet 243 of the cartridges 340.

The outlet opening-closing member 310 may include a rotating bar 311. The rotating bar 311 may be provided to be rotatable about a shaft 312 to open and close the outlet 243.

The outlet opening-closing member 310 may also include an actuator 313. As an example, the actuator 313 may include an electric actuator, a pneumatic actuator, a hydraulic actuator, or the like. The actuator 313 may include a cylinder 314 and a piston rod 315 configured to be reciprocated by pneumatic pressure while being coupled to the cylinder 314. The piston rod 315 of the actuator 313 interacts with one end of the rotating bar 311 that is away from the outlet 243 of the cartridge 340.

The outlet opening-closing member 310 may also include a spring unit 316 (e.g., a spring device). The spring unit 316 may include a support 317 and a spring 318 fixed to the support 317. The spring 318 of the spring unit 316 interacts with one end of the rotating bar 311 that is in the vicinity of the outlet 243 of the cartridge 340.

Referring to FIG. 12A, before each of the plurality of cartridges 340 is pressed by the extruding unit 160, the outlet 243 of the cartridge 340 is held closed by the rotating bar 311 of the outlet opening-closing member 310.

Referring to FIG. 12B, when each of the plurality of cartridges 340 is pressed by the extruding unit 160, the outlet 243 of the cartridge 340 is opened as the rotating bar 311 of the outlet opening-closing member 310 rotates about the shaft 312. Here, the piston rod 315 of the actuator 313 protrudes from the cylinder 314 so that one end of the rotating bar 311 is pushed in an opposite direction from a direction in which the plurality of cartridges 340 are pressed, and the spring 318 supports the other end of the rotating bar 311 while the spring 318 is contracted.

An amount of a food ingredient extruded from each of the plurality of cartridges 340 may be easily adjusted by the outlet opening-closing member 310 illustrated in FIGS. 12A and 12B.

Figure 13A:
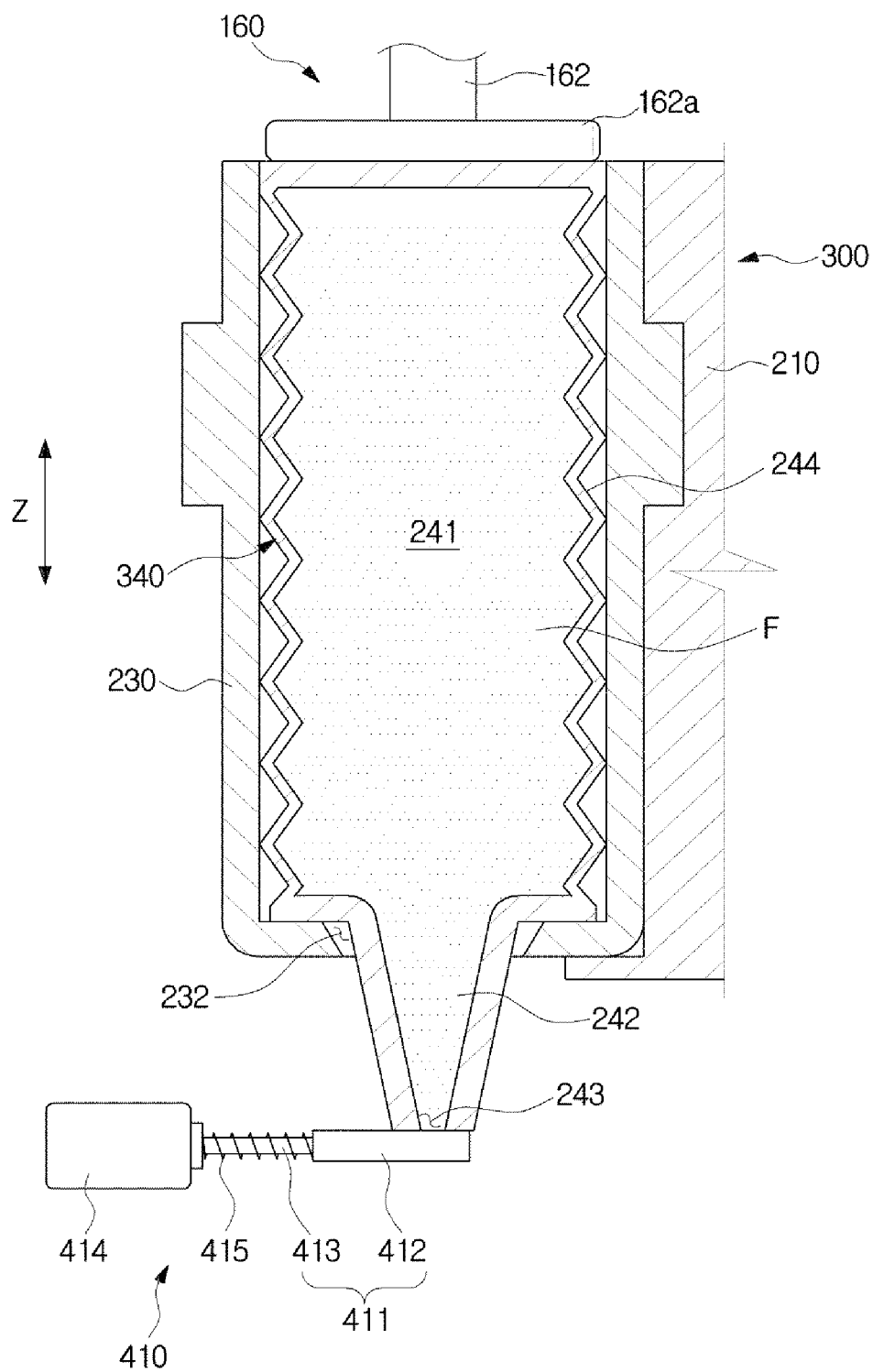
FIGS. 13A and 13B are views schematically illustrating a second way of adjusting the amount of food ingredients extruded from the cartridge in the cartridge assembly of the cooking apparatus according to an embodiment of the present disclosure.
Figure 13B:
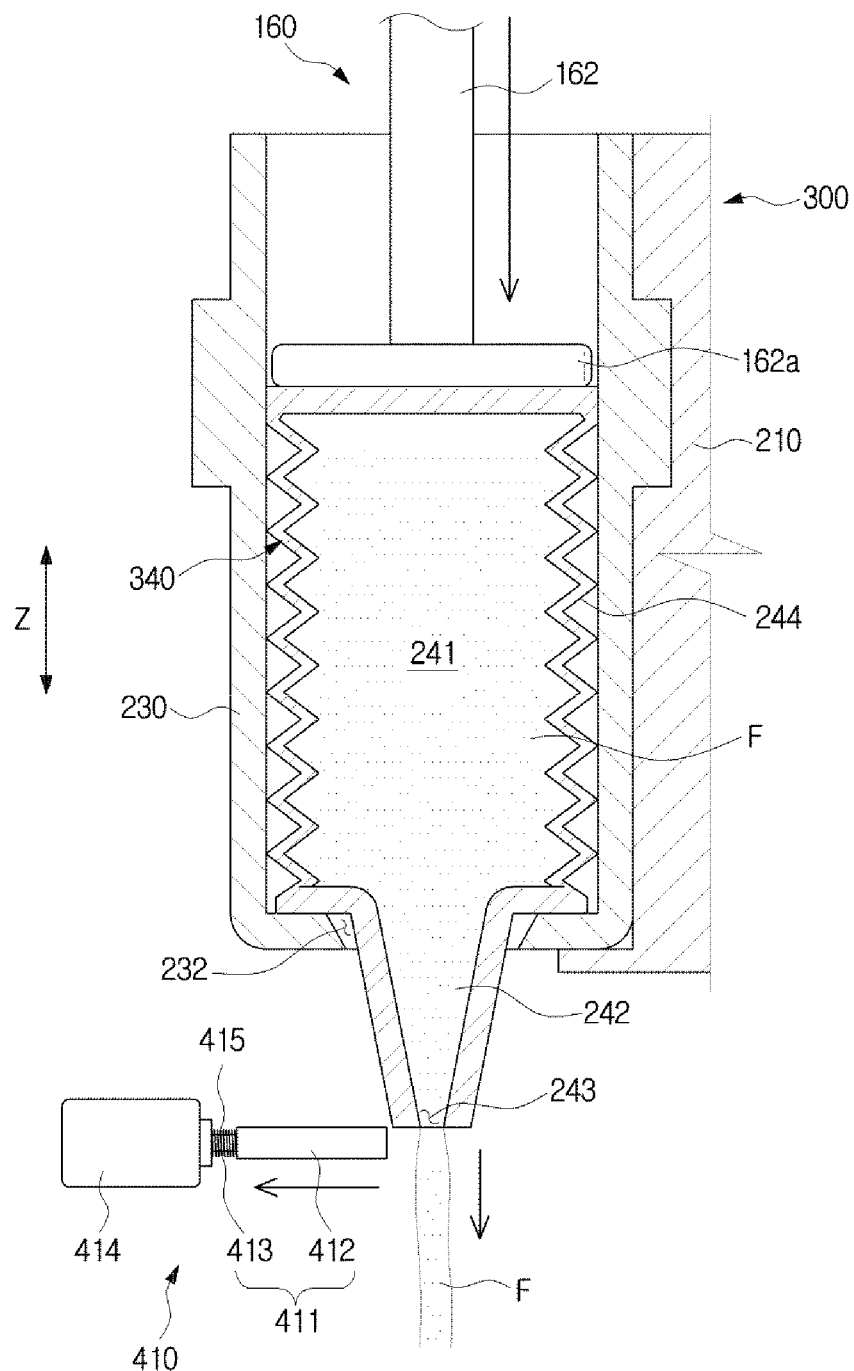

FIGS. 13A and 13B are views schematically illustrating a second way of adjusting the amount of a food ingredient extruded from the cartridge in the cartridge assembly according to the second embodiment of the cooking apparatus according to an embodiment of the present disclosure. A description of the cartridge assembly 300 according to the second embodiment will be omitted because the description overlaps that made with reference to FIGS. 12A and 12B. Descriptions overlapping those made with reference to FIGS. 2 to 10, 11A and 11B will be omitted.

Referring to FIGS. 13A and 13B, the cooking apparatus 1a may also include an outlet opening-closing member 410 provided to selectively open or close the outlet 243 of each of the plurality of cartridges 340.

The outlet opening-closing member 410 may include a movable bar 411. The movable bar 411 may linearly move to open or close the outlet 243. In other words, the movable bar 411 may move in a horizontal direction to open or close the outlet 243. The movable bar 411 may include a head 412 provided to directly come into contact with the outlet 243 and a body 413 connected to the head 412.

The outlet opening-closing member 410 may also include a driver 414 (e.g., a driving device). The movable bar 411 may be coupled to the driver 414 to move in the horizontal direction.

The outlet opening-closing member 410 may also include a spring 415. The spring 415 may be coupled to the movable bar 411. Specifically, the spring 415 may be coupled to the body 413 of the movable bar 411.

Referring to FIG. 13A, before the each of plurality of plurality of cartridges 340 is pressed by the extruding unit 160, the outlet 243 of the cartridge 340 is held closed by the movable bar 411 of the outlet opening-closing member 410. Specifically, the outlet 243 of the cartridge 340 is held closed by the head 412 of the movable bar 411.

Referring to FIG. 13B, when each of the plurality of cartridges 340 is pressed by the extruding unit 160, the outlet 243 of the cartridge 340 is opened as the movable bar 411 of the outlet opening-closing member 410 moves toward the driver 414. Here, the spring 415 is contracted.

That is, a force moving the movable bar 411 toward the driver 414 to be spaced apart from the outlet 243 is involved in opening the outlet 243 of the cartridge 340. A force moving the movable bar 411 toward the outlet 243 to come into contact with the outlet 243 acts to close the outlet 243 of the cartridge 340. A restoring force of the spring 415 may act as the force involved in closing the outlet 243 of the cartridge 340.

Figure 14A:
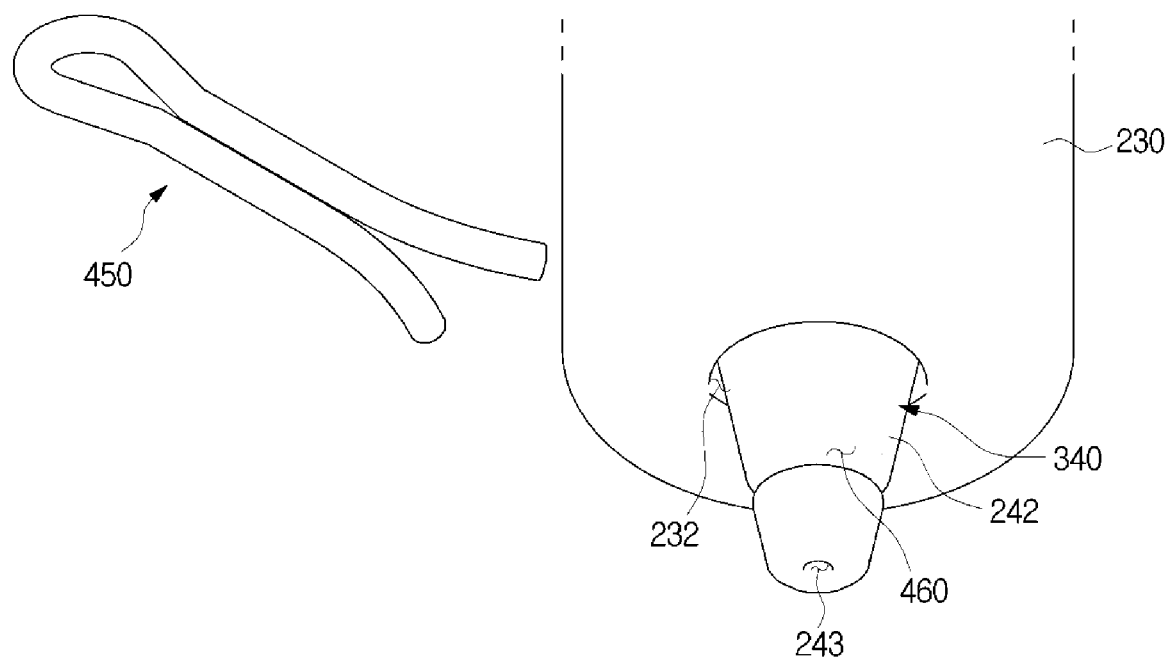
FIGS. 14A and 14B are views schematically illustrating a third way of adjusting the amount of food ingredients extruded from the cartridge in the cartridge assembly of the cooking apparatus according to an embodiment of the present disclosure.
Figure 14B:
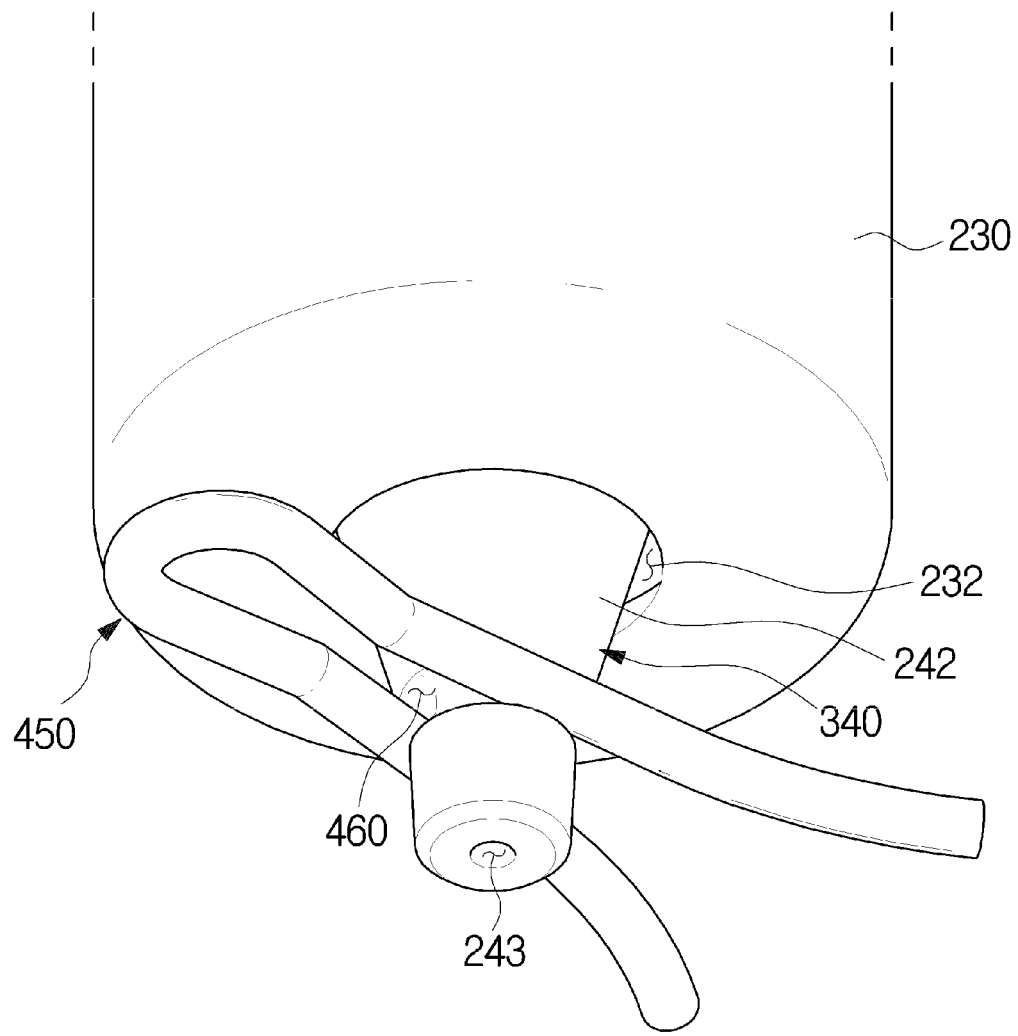

FIGS. 14A and 14B are views schematically illustrating a third way of adjusting the amount of a food ingredient extruded from the cartridge in the cartridge assembly according to the second embodiment of the cooking apparatus according to an embodiment of the present disclosure. A description of the cartridge assembly 300 according to an embodiment will be omitted because the description overlaps that made with reference to FIGS. 12A and 12B.

Referring to FIGS. 14A and 14B, the cooking apparatus 1a may also include an outlet opening-closing member provided to selectively open or close the outlet 243 of the cartridge 340.

The outlet opening-closing member may include a clamp 450. The clamp 450 may be separably coupled to the nozzle 242 of the cartridge 340. A groove 460 may be formed in each of the plurality of cartridges 340. Specifically, the groove 460 may be recessed along the circumference of the nozzle 242 to have a smaller diameter than the outlet 243. The clamp 450 may be separably coupled to the groove 460.

FIG. 14A illustrates a state in which the outlet 243 of the cartridge 340 is open. Here, because the clamp 450 is separated from the groove 460, a path along which the food ingredient may flow is secured in the cartridge 340. Consequently, the food ingredient may be discharged outside the cartridge 340 via the outlet 243 of the cartridge 340.

FIG. 14B illustrates a state in which the outlet 243 of the cartridge 340 is closed by the clamp 450. Here, because the clamp 450 is coupled to the groove 460 and presses the nozzle 242, the path along which the food ingredient may flow is blocked in the cartridge 340. Consequently, it is difficult for the food ingredient to be discharged to the outside of the cartridge 340 via the outlet 243 of the cartridge 340.

Description from another aspect is as follows.

The clamp 450 may have elasticity. The clamp 450 may remain coupled to the nozzle 242 of the cartridge 340 regardless of a discharge of the food ingredient. That is, the clamp 450 may remain coupled to the groove 460 regardless of the discharge of the food ingredient. Before each of the plurality of cartridges 340 is pressed by the extruding unit 160, the outlet 243 of the cartridge 340 is held closed by being pressed by the clamp 450. However, when each of the plurality of cartridge 340 is pressed by the extruding unit 160, the clamp 450 is opened due to movement of the food ingredient in the cartridge 340, and accordingly the food ingredient movement path in the cartridge 340 is secured and the outlet 243 is opened.

Figure 15A:
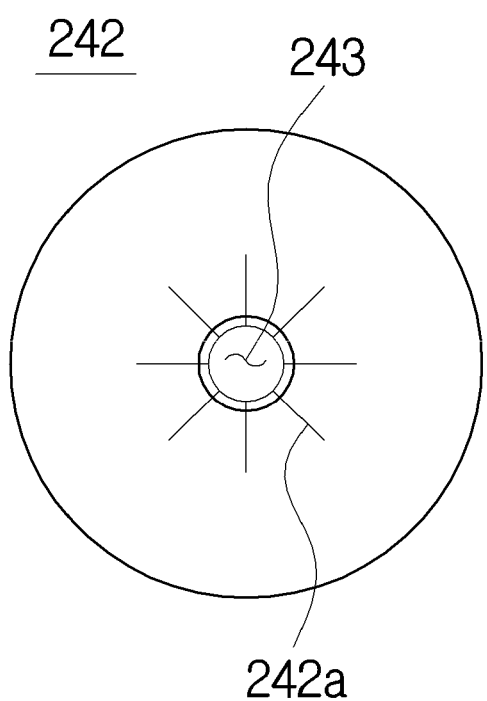
FIGS. 15A, 15B and 15C are views schematically illustrating a fourth way of adjusting the amount of food ingredients extruded from the cartridge in the cartridge assembly of the cooking apparatus according to an embodiment of the present disclosure.
Figure 15B:
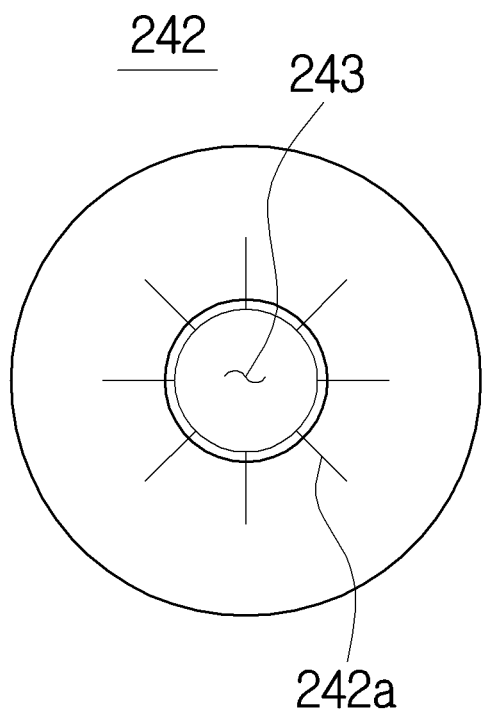
Figure 15C:
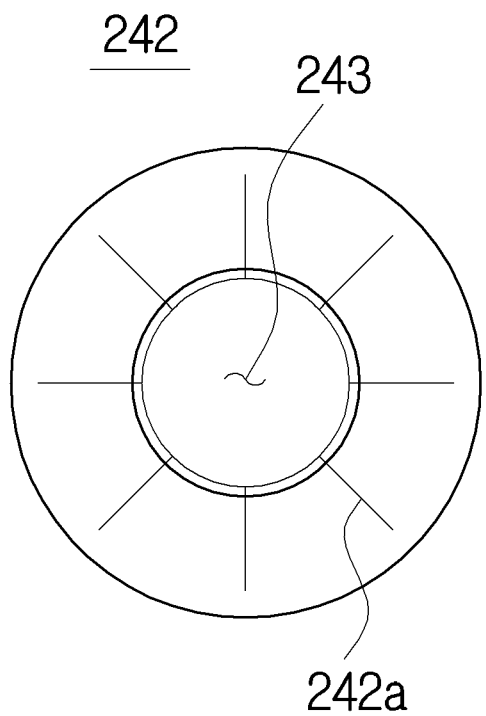

FIGS. 15A, 15B, and 15C are views schematically illustrating a fourth way of adjusting the amount of a food ingredient extruded from the cartridge in the cartridge assembly according to the second embodiment of the cooking apparatus according of the present disclosure. A description of the cartridge assembly 300 according to the second embodiment will be omitted because the description overlaps that made with reference to FIGS. 12A and 12B. Refer to FIGS. 12A and 12B for unmarked reference numerals.

Referring to FIGS. 15A. 15B, and 15C, each of the plurality of cartridges 340 may include the nozzle 242 having various sizes of outlet 243. A large-sized outlet 243 can discharge a large amount of a food ingredient. A small-sized outlet 243 can discharge a small amount of a food ingredient.

Each of the plurality of cartridges 340 may include the accommodator 241 and the nozzle 242 separably coupled to the accommodator 241. The nozzle 242 coupled to the accommodator 241 may be decided depending on the amount of the food ingredient to be extruded from the cartridge 340. For example, when a large extrusion amount of the food ingredient from the cartridge 340 is attempted, the nozzle 242 having the large-sized outlet 243 illustrated in FIG. 15C may be selected and coupled to the accommodator 241. When a small extrusion amount of the food ingredient from the cartridge 340 is attempted, the nozzle 242 having the small-sized outlet 243 illustrated in FIG. 15A may be selected and coupled to the accommodator 241. When an intermediate extrusion amount of the food ingredient from the cartridge 340 is attempted, the nozzle 242 having an intermediate-sized outlet 243 illustrated in FIG. 15B may be selected and coupled to the accommodator 241.

The nozzle 242 may also have a plurality of cutting lines 242a radially extending from the outlet 243. Here, the nozzle 242 may be formed of an elastic material. The plurality of cutting lines 242a may facilitate deformation of the nozzle 242 according to whether the cartridge 340 is pressed by the extruding unit 160. For example, when the each of plurality of cartridges 340 is pressed by the extruding unit 160, the nozzle 242 may be easily elastically deformed by the plurality of cutting lines 242a, and the amount of the food ingredient discharged through the outlet 243 may increase. Conversely, when the cartridge 340 is not pressed by the extruding unit 160, the nozzle 242 may be restored to an original state thereof by a restoring force, and the amount of the food ingredient discharged through the outlet 243 may decrease. Alternatively, the discharge of the food ingredient through the outlet 243 may be prevented.

Preferably, the nozzle 242 illustrated in FIGS. 15A, 15B, and 15C may be applied in a case in which a food ingredient is in a powder form. When the food ingredient is in a liquid form, the nozzle 242 having the shape of a syringe needle may be applied to the cartridge 340.

FIGS. 16A, 16B, 16C, and 16D are views schematically illustrating a fifth way of adjusting the amount of a food ingredient extruded from the cartridge in the cartridge assembly according to the second embodiment of the cooking apparatus of the present disclosure. A description of the cartridge assembly 300 according to the second embodiment will be omitted because the description overlaps that made with reference to FIGS. 12A and 12B. Refer to FIGS. 12A and 12B for unmarked reference numerals.

Referring to FIGS. 16A, 16B, 16C and 16D, each of the plurality of cartridges 340 may include the nozzle 242 having the various sizes of outlet 243. The large-sized outlet 243 can discharge a large amount of a food ingredient. The small-sized outlet 243 can discharge a small amount of a food ingredient.

Each of the plurality of cartridges 340 may include the accommodator 241 and the nozzle 242 separably coupled to the accommodator 241. The nozzle 242 coupled to the accommodator 241 may be decided depending on the amount of the food ingredient to be extruded from the cartridge 340. A description of a relationship between the amount of the food ingredient to be extruded from the cartridge 340 and the nozzle 242 will be omitted because the description overlaps that made with reference to FIGS. 15A, 15B, and 15C.

Figure 16A:
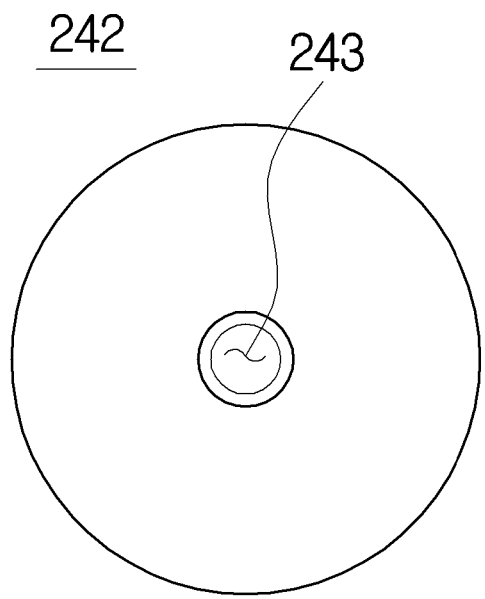
FIGS. 16A, 16B, 16C and 16D are views schematically illustrating a fifth way of adjusting the amount of food ingredients extruded from the cartridge in the cartridge assembly of the cooking apparatus according to an embodiment of the present disclosure.
Figure 16B:
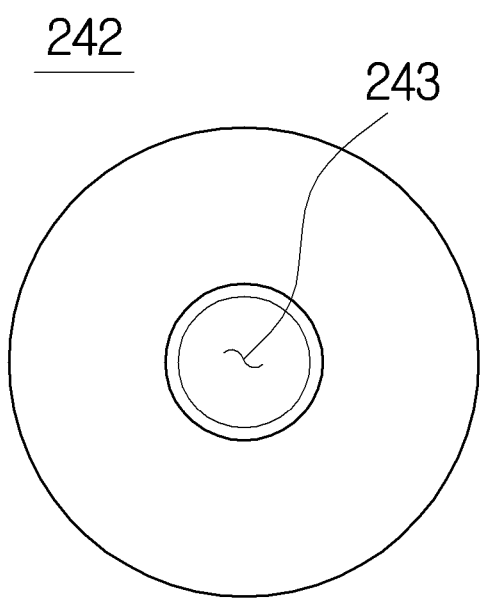
Figure 16C:
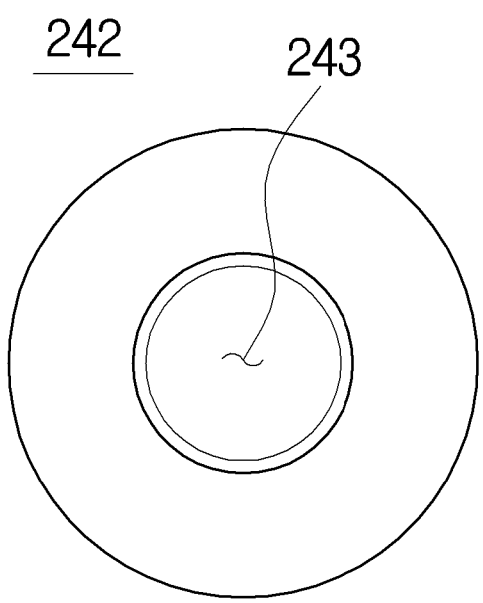
Figure 16D:
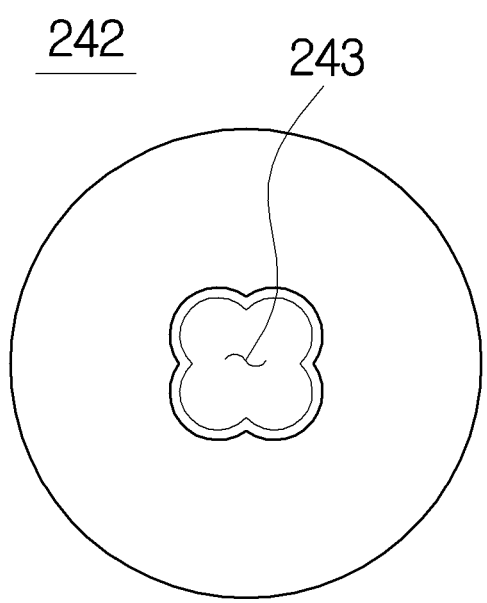

Characteristics of the food ingredients to be extruded from the plurality of cartridges 340 as well as the amount of the food ingredients to be extruded from the plurality of cartridges 340 may affect the size of the outlet 243. When it is assumed that amounts of food ingredients to be extruded from the plurality of cartridges 340 are equal, because it is difficult for a food ingredient with high viscosity to pass through the outlet 243, a large-sized outlet 243 illustrated in FIG. 16C is suitable. Conversely, because it is easy for a food ingredient with low viscosity to pass through the outlet 243, a small-sized outlet 243 illustrated in FIG. 16A is suitable. An intermediate-sized outlet 243 illustrated in FIG. 16B is suitable for a food ingredient with intermediate viscosity.

Each of the plurality of cartridges 340 may include the nozzle 242 having various shapes of outlet 243. The nozzle 242 may have a circularly-shaped outlet 243 illustrated in FIGS. 16A to 16C. The nozzle 242 may also have a clover-shaped outlet 243 illustrated in FIG. 16D. The clover shape illustrated in FIG. 16D may use surface tension to realize linearity of a food ingredient discharged through the outlet 243. The shape of the outlet 243 is not limited to the above examples, and may be changed in various ways.

Figure 17:
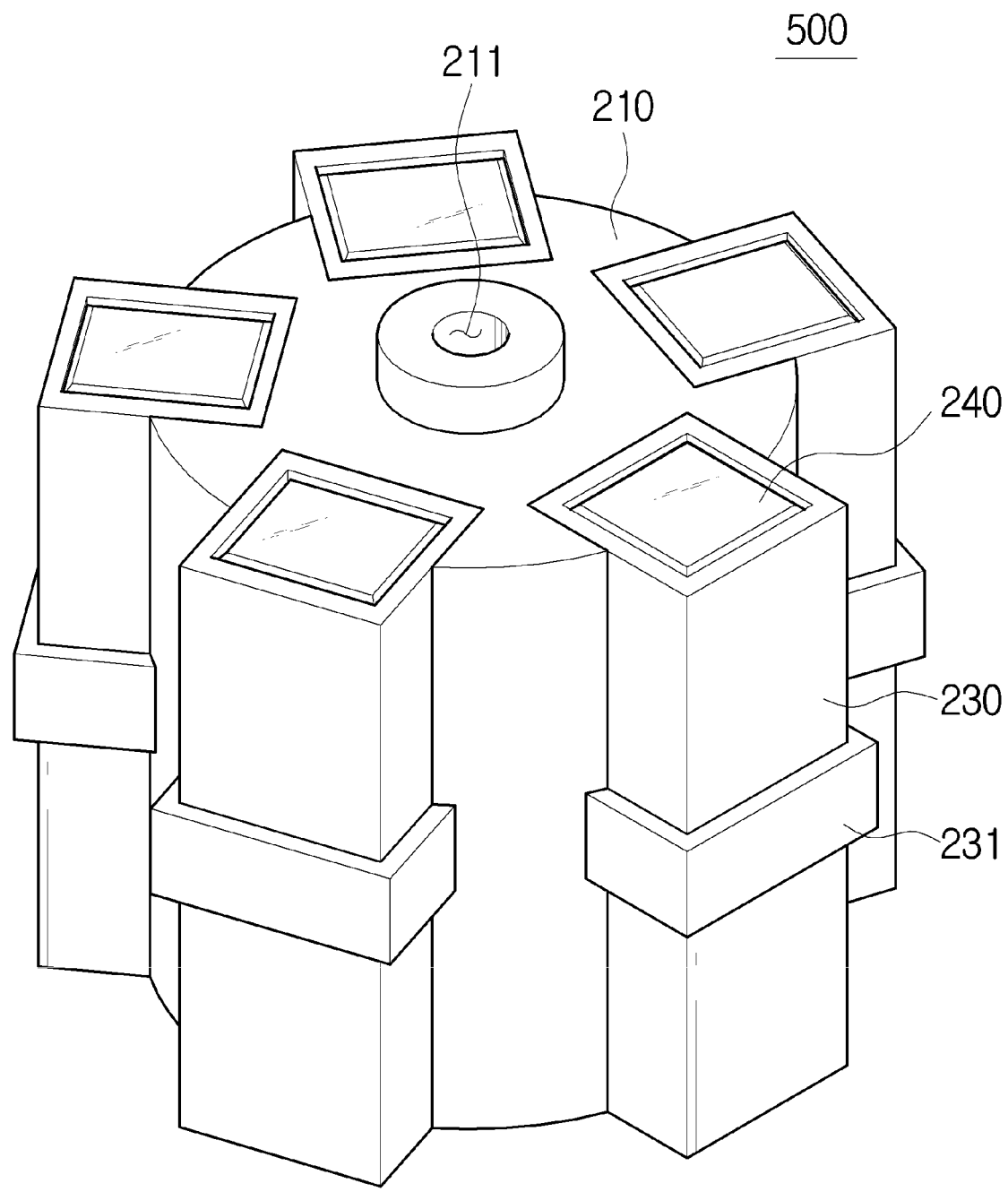
FIG. 17 is a perspective view illustrating a cartridge assembly of the cooking apparatus according to an embodiment of the present disclosure.

FIG. 17 is a perspective view illustrating a cartridge assembly according to a third embodiment of the cooking apparatus according to an embodiment of the present disclosure. Hereinafter, a description overlapping that of the cartridge assembly 200 according to the first embodiment illustrated in FIG. 9 may be omitted. Refer to FIGS. 9 and 10 for unmarked reference numerals.

Referring to FIG. 17, a cartridge assembly 500 may include the cartridge body 210. Although the cartridge body 210 may have a cylindrical shape, the shape of the cartridge body 210 is not limited thereto. A description of the plurality of cartridge mounts 220 will be omitted because the description overlaps that made with reference to FIG. 9.

The cartridge assembly 500 may also include the plurality of cartridge cases 230 mounted on the plurality of cartridge mounts 220. Each of the plurality of cartridge cases 230 may have a rectangular cylindrical shape with one open base plane. As an example, each of the plurality of cartridge cases 230 may have a rectangular cylindrical shape with an open upper base plane. Each of the plurality of cartridge cases 230 may include the protrusion 231 corresponding to the groove 221 in the cartridge mount 220. The protrusion 231 may protrude from a side surface of each of the plurality of cartridge cases 230 to be coupled to the groove 221 in the cartridge mount 220. Each of the plurality of cartridge cases 230 may also include the opening 232. A description of the opening 232 will be omitted because the description overlaps that made with reference to FIG. 8.

The cartridge assembly 500 may also include the plurality of cartridges 240 disposed in the plurality of cartridge cases 230. The plurality of cartridges 240 may have a shape corresponding to the plurality of cartridge cases 230.

The cartridge assembly 500 may also include the elastic member 250. A description of the elastic member 250 will be omitted because the description overlaps that made with reference to FIG. 9.

Figure 18:
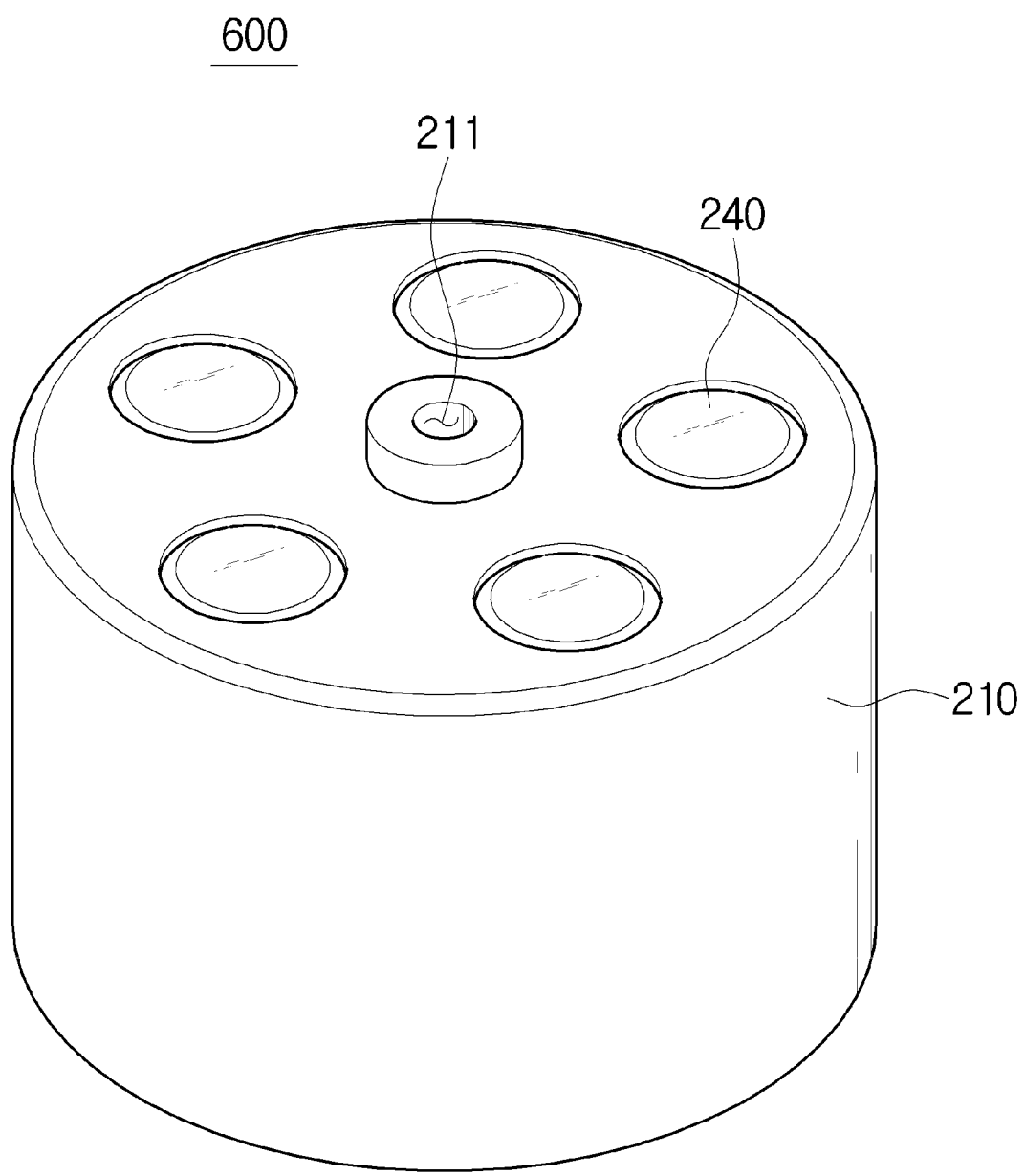
FIG. 18 is a perspective view illustrating a cartridge assembly of the cooking apparatus according to an embodiment of the present disclosure.

FIG. 18 is a perspective view illustrating a cartridge assembly according to a fourth embodiment of the cooking apparatus of the present disclosure. Hereinafter, description overlapping that of the cartridge assembly 200 according to the first embodiment illustrated in FIG. 9 may be omitted. Refer to FIGS. 9 and 10 for unmarked reference numerals.

Referring to FIG. 18, a cartridge assembly 600 may include the cartridge body 210. Although the cartridge body 210 may have a cylindrical shape, the shape of the cartridge body 210 is not limited thereto. The plurality of cartridge mounts 220 may be formed in the cartridge body 210. The plurality of cartridge mounts 220 may be formed to pass through the cartridge body 210. The rotating shaft coupler 211 may be provided in the cartridge body 210 so that the rotating shaft 141 of the rotation adjusting unit 140 can be coupled thereto. As an example, the plurality of cartridge mounts 220 may be disposed outside the rotating shaft coupler 211 and may be arranged to be spaced apart the circumferential direction of the cartridge body 210.

The cartridge assembly 600 may also include the plurality of cartridge cases 230 mounted on the plurality of cartridge mounts 220. A description of the plurality of cartridge cases 230 will be omitted because the description overlaps that made with reference to FIG. 8.

The cartridge assembly 600 may also include the plurality of cartridges 240 disposed in the plurality of cartridge cases 230. A description of the plurality of cartridges 240 will be omitted because the description overlaps that made with reference to FIG. 9.

The cartridge assembly 600 may also include the elastic member 250. A description of the elastic member 250 will be omitted because the description overlaps that made with reference to FIG. 8.

Figure 19:
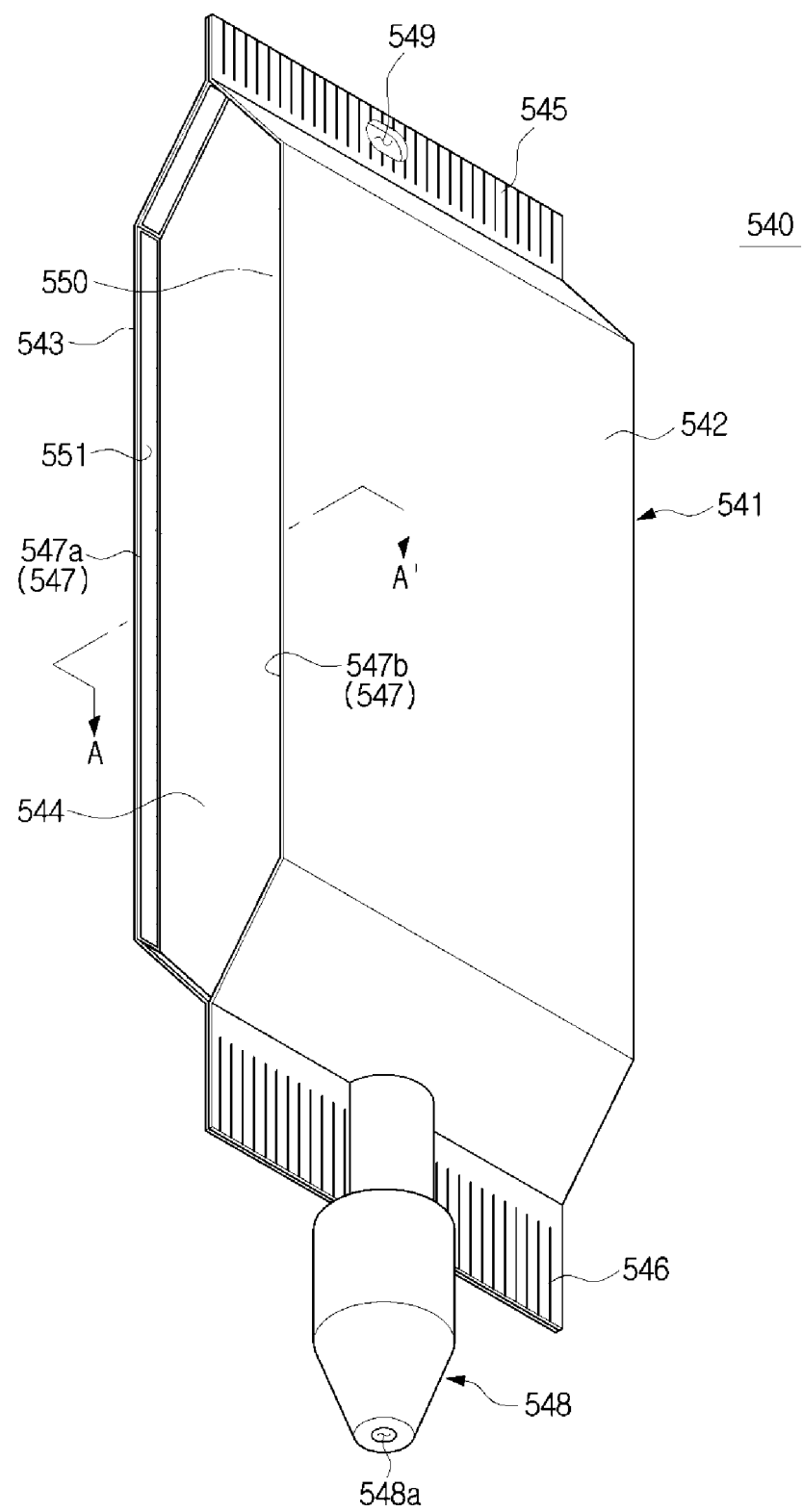
FIG. 19 is a perspective view illustrating a cartridge in a cartridge assembly of the cooking apparatus according to an embodiment of the present disclosure.
Figure 20:
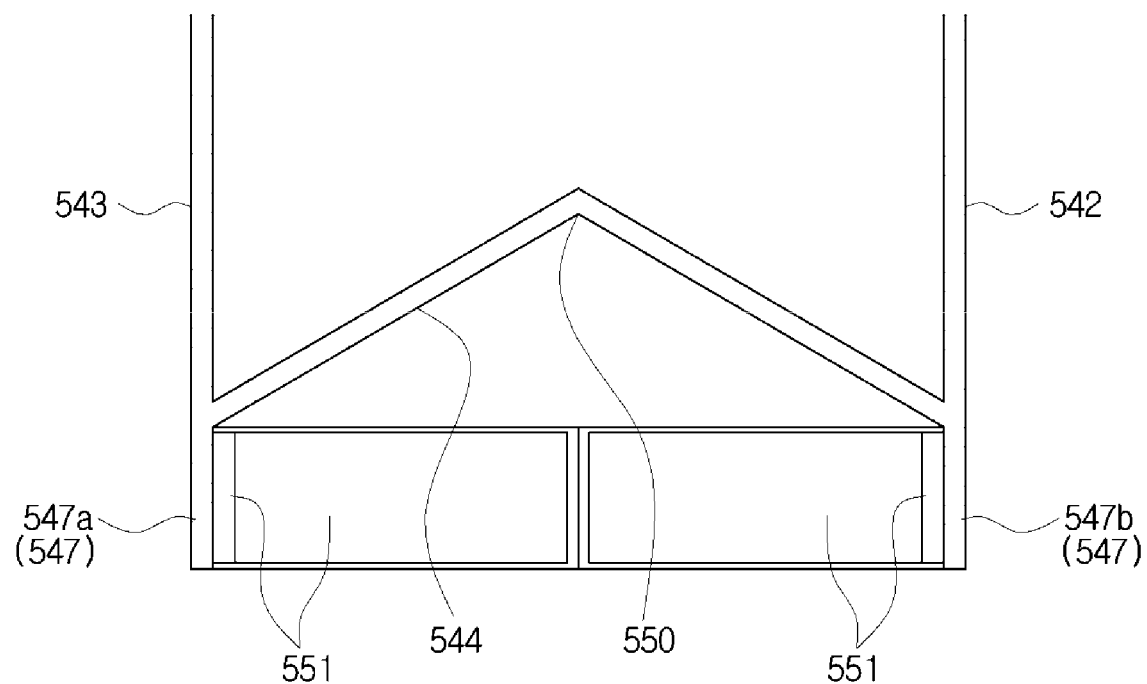
FIG. 20 is a cross-sectional view of the cartridge of FIG. 19 taken along line A-A' according to an embodiment of the present disclosure.

FIG. 19 is a perspective view illustrating a cartridge in a cartridge assembly according to a fifth embodiment of the cooking apparatus of the present disclosure, and FIG. 20 is a cross-sectional view of the cartridge of FIG. 19 taken along line A-A'.

Referring to FIGS. 19 and 20, the cartridge assembly according to an embodiment may include a plurality of cartridges 540 having food ingredients accommodated therein.

Each of the plurality of cartridges 540 may include a main body 541. The main body 541 may include a main body front portion 542 forming a front surface of the cartridge 540 and a main body rear portion 543 forming a rear surface of the cartridge 540. Also, the main body 541 may also include a main body side portion 544 forming a side surface of the cartridge 540. The main body side portion 544 may connect the main body front portion 542 and the main body rear portion 543.

The main body 541 may also include pressed portions 545, 546, and 547. The pressed portions 545, 546, and 547 may include an upper end pressed portion 545 formed by an upper end of the main body front portion 542, an upper end of the main body rear portion 543, and an upper end of the main body side portion 544 being pressed together. The pressed portions 545, 546, and 547 may also include a lower end pressed portion 546 formed by a lower end of the main body front portion 542, a lower end of the main body rear portion 543, and a lower end of the main body side portion 544 being pressed together. The pressed portions 545, 546, and 547 may also include a side end pressed portion 547 formed by one side edge of any one of the main body front portion 542 and the main body rear portion 543 and one side edge of the main body side portion 544 being pressed together. The side end pressed portion 547 may include a first side end pressed portion 547a formed by one side edge of the main body front portion 542 and one side edge of the main body side portion 544 being pressed together, and a second side end pressed portion 547b formed by one side edge of the main body rear portion 543 and one side edge of the main body side portion 544 being pressed together.

Each of the plurality of cartridges 540 may also include a nozzle 548 having an outlet 548a. The nozzle 548 may be coupled to the main body 541 so that a food ingredient accommodated in the main body 541 can be discharged through the outlet 548a. As an example, the nozzle 548 may be partially inserted into the lower end pressed portion 546 and coupled to the main body 541.

Each of the plurality of cartridges 540 may also include an installation hole 549. The installation hole 549 may be formed in the upper end pressed portion 545 so that the cartridge 540 can be mounted on the cartridge body of the cartridge assembly according to the fifth embodiment.

Each of the plurality of cartridges 540 may also include a fold line 550. The fold line 550 may be formed at the main body side portion 544 of the main body 541. Specifically, the fold line 550 may be longitudinally formed at the main body side portion 544 of the main body 541 along an up-down direction of the plurality of cartridges 540. The main body side portion 544 may have a recessed shape. Here, the fold line 550 may be the most recessed portion.

Each of the plurality of cartridges 540 may also include an adhesive member 551. The adhesive member 551 may be arranged at the main body 541 so that an empty space in the main body 541 generated due to a discharge of the food ingredient in a process in which the cartridge 540 is pressed using the extruding unit 160 can be effectively removed. Specifically, the adhesive member 551 may be arranged at the main body side portion 544. More specifically, the adhesive member 551 may be arranged at one or more of the first side end pressed portion 547a and the second side end pressed portion 547b.

A thin aluminum plate may also be used to effectively remove the empty space in the main body 541 generated due to the discharge of the food ingredient in the process in which the cartridge 540 is pressed using the extruding unit 160. This is due to rigidity of the thin aluminum plate. The thin aluminum plate may be arranged at one or more of the first side end pressed portion 547*a* and the second side end pressed portion 547*b*. A thickness of the thin aluminum plate is preferably in a range of 0.05 mm to 0.2 mm, but the thickness of the thin aluminum plate is not limited to the above example.

An embodiment in which both the adhesive member 551 and the thin aluminum plate are arranged at one or more of the first side end pressed portion 547*a* and the second side end pressed portion 547*b* is also possible.

Figure 21A:
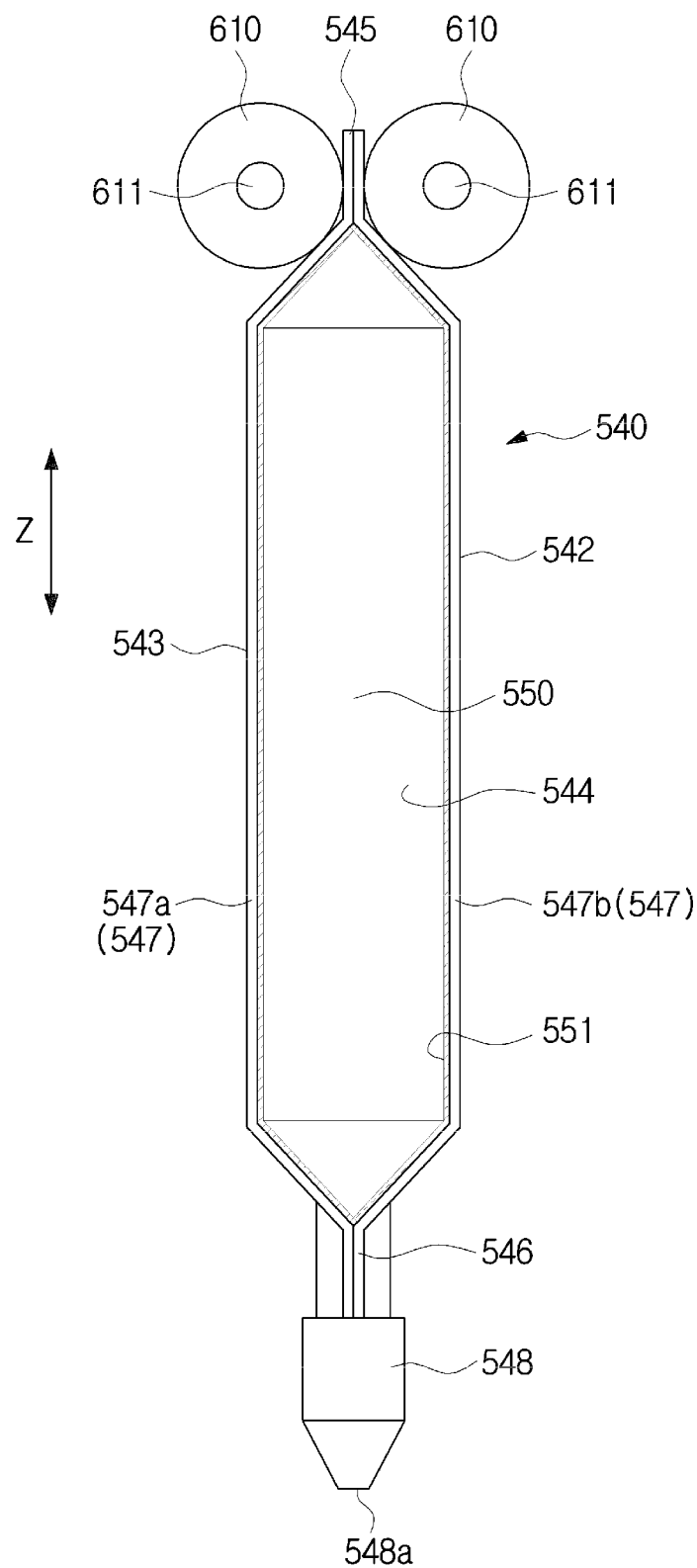
FIGS. 21A and 21B are views illustrating a process of pressing the cartridge of FIG. 19 according to an embodiment of the present disclosure.
Figure 21B:
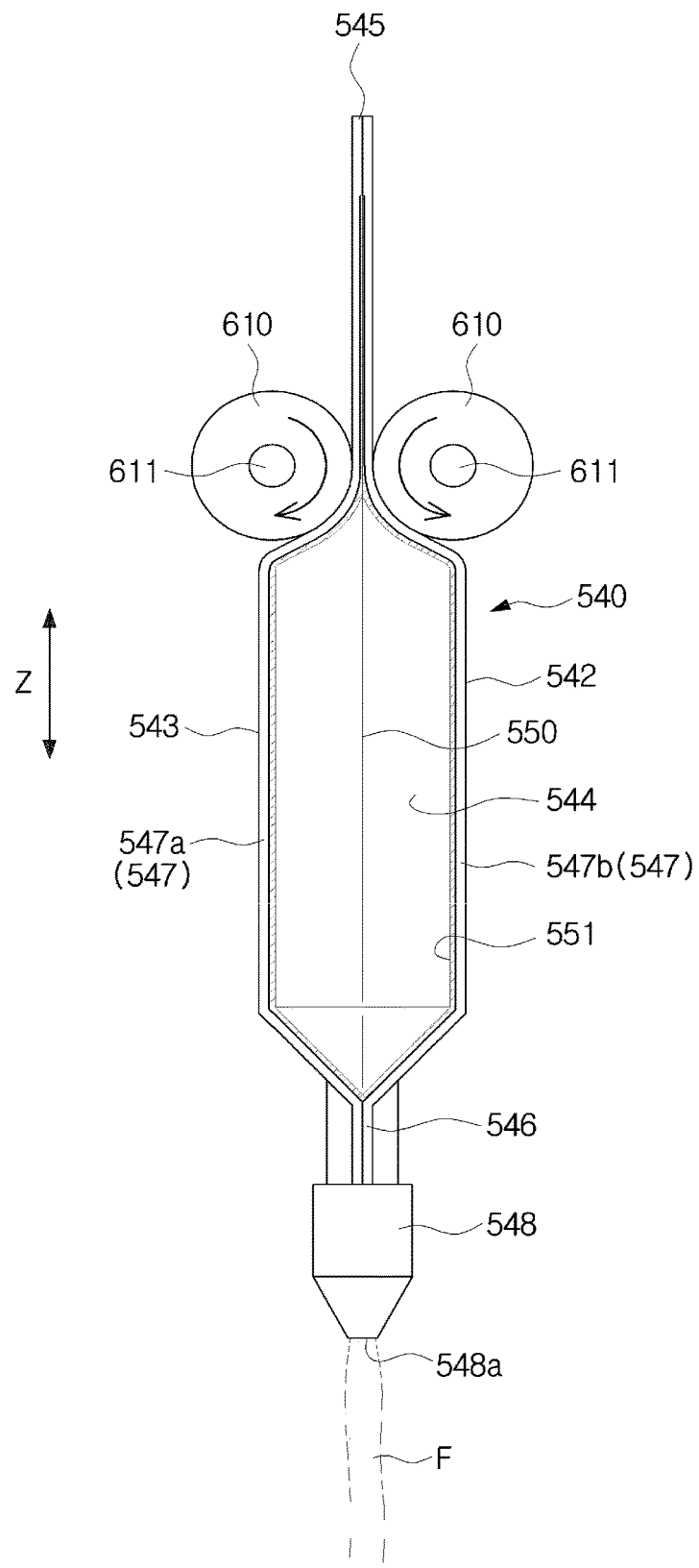

FIGS. 21A and 21B are views illustrating a process of pressing the cartridge of FIG. 19 according to an embodiment of the present disclosure. FIGS. 21A and 21B are side views of the cartridge 540 of FIG. 19. In FIGS. 21A and 21B, "F" indicates a food ingredient.

Referring to FIGS. 21A and 21B, each of the plurality of cartridges 540 of the cartridge assembly according to the fifth embodiment may be pressed by an extruding unit (e.g., an extruder or an extruding device). The extruding unit may include a plurality of rollers 610. Each of the plurality of cartridges 540 may be pressed by the plurality of rollers 610 while being fitted between the plurality of rollers 610. The plurality of rollers 610 may rotate about roller rotating shafts 611.

FIG. 21A illustrates a state before the cartridge 540 is pressed by the extruding unit. Referring to FIG. 21A, the cartridge 540 may be arranged between the plurality of rollers 610. Specifically, the cartridge 540 may be arranged so that the upper end pressed portion 545 of the main body 541 is fitted between the plurality of rollers 610.

FIG. 21B illustrates a state in which the cartridge 540 is pressed by the extruding unit. Referring to FIG. 21B, the cartridge 540 may be pressed as the plurality of rollers 610 rotate about the roller rotating shafts 611. Here, the plurality of rollers 610 may rotate in directions opposite each other. As the cartridge 540 is pressed by the plurality of rollers 610, the food ingredient accommodated in the cartridge 540 may be discharged through the outlet 548*a* of the nozzle 548. Pressed portions of the cartridge 540 pressed by the plurality of rollers 610 may be adhered to each other by the adhesive member 551 arranged at one or more of the first side end pressed portion 547*a* and the second side end pressed portion 547*b*. As the pressed portions of the cartridge 540 pressed by the plurality of rollers 610 are adhered to each other, the food ingredient is gathered into an unpressed portion of the cartridge 540 which is not pressed by the plurality of rollers 610. Accordingly, a pressing force due to the plurality of rollers 610 may intensively act on the food ingredient gathered into the unpressed portion of the cartridge 540, and accordingly, waste of the food ingredient accommodated in the cartridges 540 can be prevented.

The discharge amount of the food ingredient may be adjusted by changing the number of rotations or the like of the plurality of rollers 610.

Figure 22A:
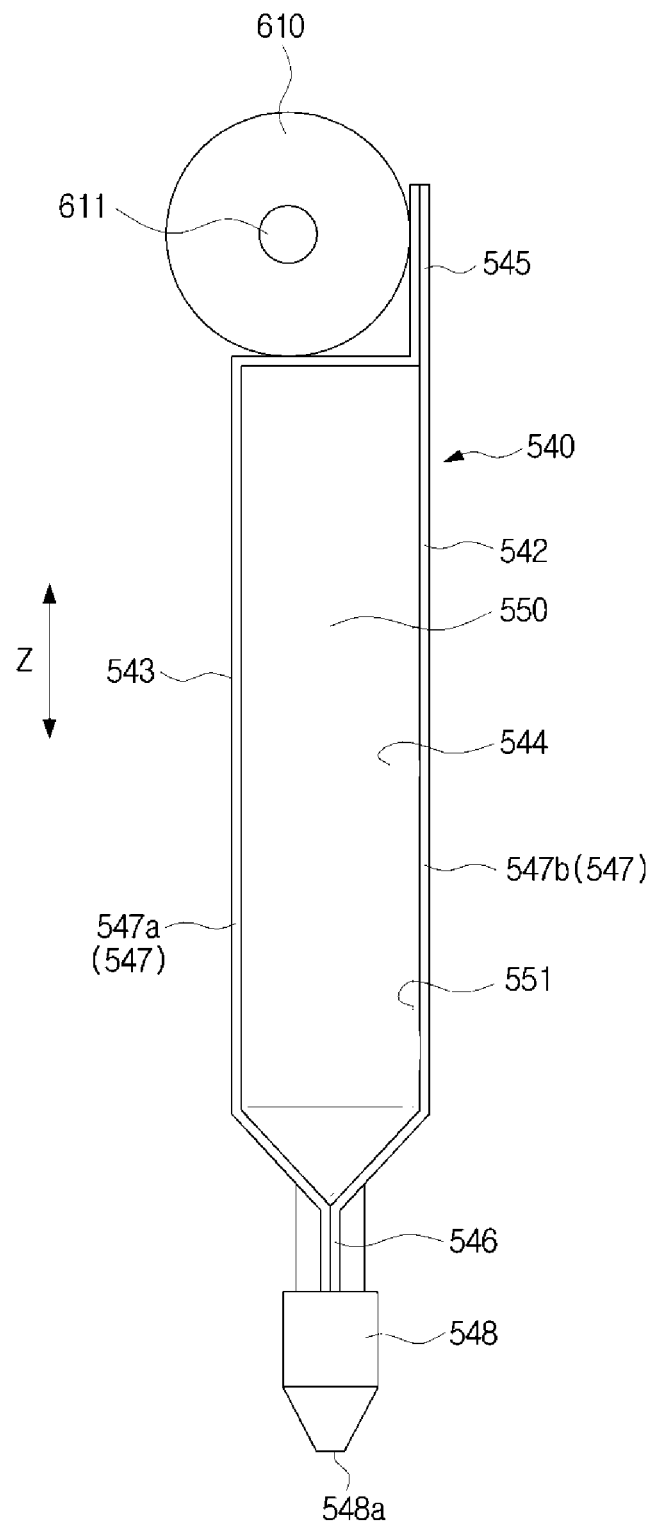
FIGS. 22A and 22B are views illustrating another process of pressing the cartridge in the cartridge assembly of the cooking apparatus according to an embodiment of the present disclosure.
Figure 22B:
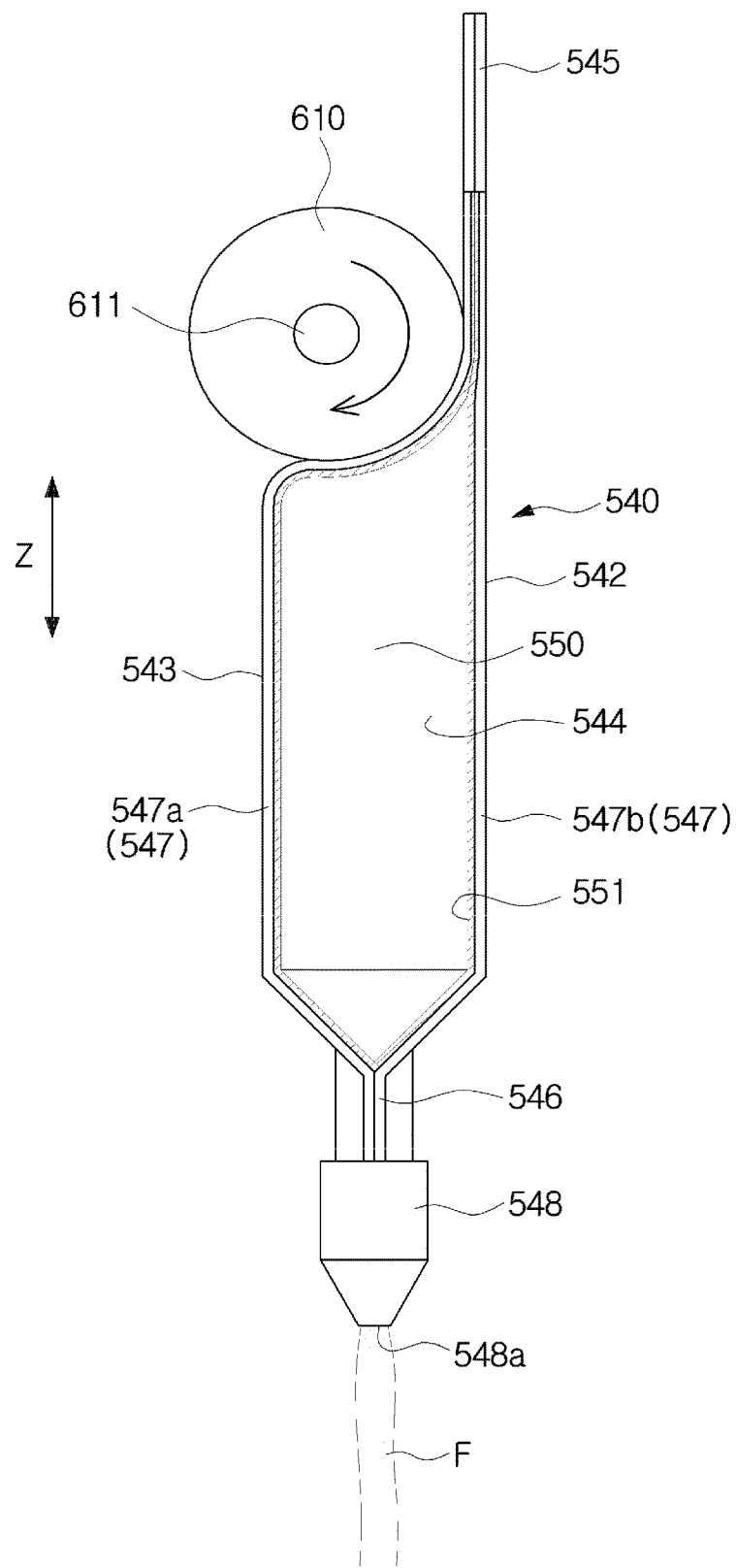

FIGS. 22A and 22B are views illustrating another process of pressing the cartridge in the cartridge assembly according to the fifth embodiment of the cooking apparatus according to an embodiment. In FIGS. 22A and 22B, "F" indicates a food ingredient.

Referring to FIGS. 22A and 22B, the cartridge 540 of the cartridge assembly according to the fifth embodiment may be pressed by the extruding unit 160. The extruding unit 160 may include the single roller 610. The single roller 610 may rotate about the roller rotating shaft 611.

FIG. 22A illustrates a state before the cartridge 540 is pressed by the extruding unit 160, and FIG. 22B illustrates a state in which the cartridge 540 is pressed by the extruding unit 160. Referring to FIG. 22B, the cartridge 540 may be pressed as the single roller 610 rotates about the roller rotating shaft 611. As the cartridge 540 is pressed by the single roller 610, the food ingredient accommodated in the cartridge 540 may be discharged through the outlet 548*a* of the nozzle 548. Pressed portions of the cartridge 540 pressed by the single roller 610 may be adhered to each other by the adhesive member 551 arranged at one or more of the first side end pressed portion 547*a* and the second side end pressed portion 547*b*. A description of an effect of the adhering between the pressed portions of the cartridges 540 pressed by the single roller 610 will be omitted because the description overlaps that made with reference to FIGS. 21A and 21B.

Figure 23:
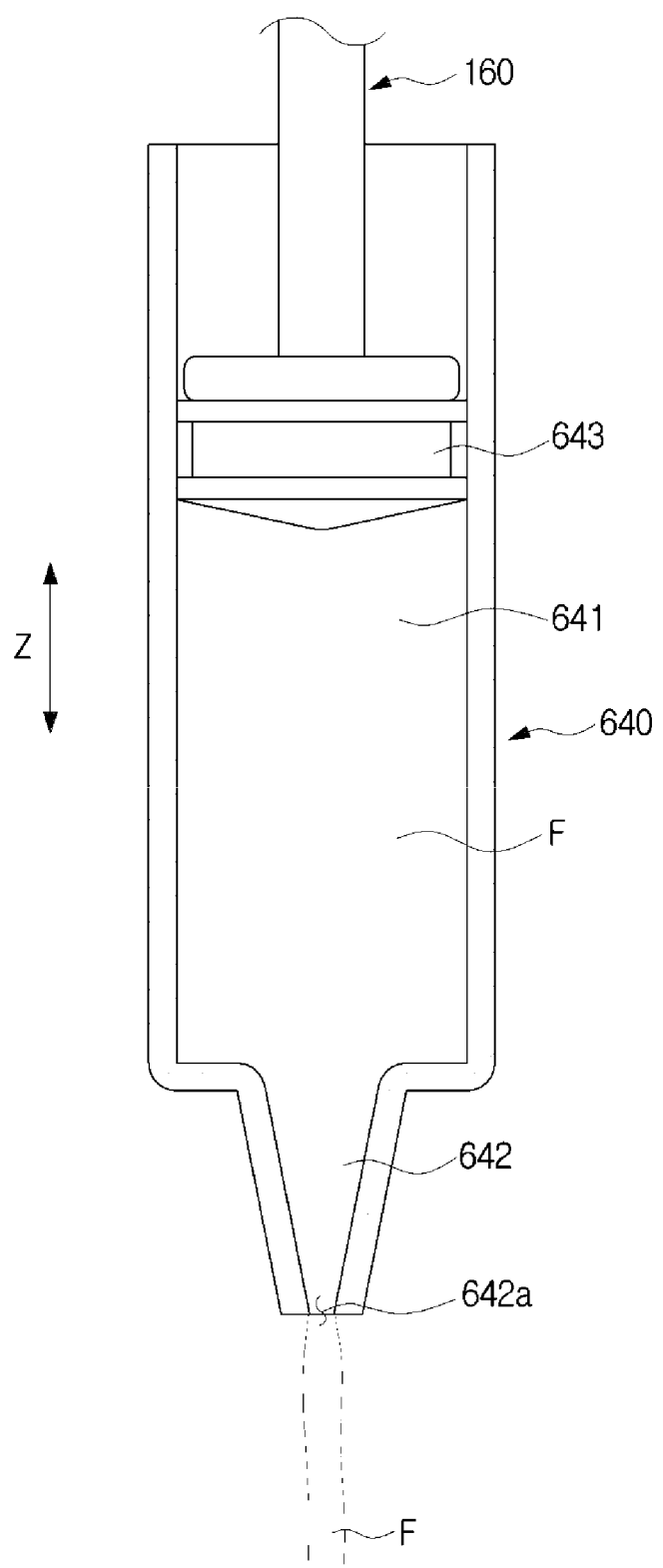
FIG. 23 is a view illustrating a cartridge in a cartridge assembly of the cooking apparatus according to an embodiment of the present disclosure.

FIG. 23 is a view illustrating a cartridge in a cartridge assembly according to a sixth embodiment of the cooking apparatus. In FIG. 23, "F" indicates a food ingredient.

Referring to FIG. 23, the cartridge assembly according to an embodiment may include a plurality of cartridges 640. The plurality of cartridges 640 may be formed of a hard material. As an example, while the plurality of cartridges 240 of the cartridge assembly 200 according to the first embodiment are formed of a flexible material that can be deformed by the extruding unit 160, the plurality of cartridges 640 of the cartridge assembly according to the sixth embodiment may be formed of a hard material that is not deformed by the extruding unit 160.

Each of the plurality of cartridges 640 may include an accommodator 641 and a nozzle 642 connected to the accommodator 641 and having an outlet 642*a* through which a food ingredient is discharged. The accommodator 641 may be formed of a hard material that is not deformed by the extruding unit 160.

Each of the plurality of cartridges 640 may also include a cap 643 arranged in the accommodator 641 to be movable in a pressing direction of the extruding unit 160.

As the extruding unit 160 presses the cap 643, the cap 643 may move toward the outlet 642*a* in the pressing direction of the extruding unit 160, and through this process, the food ingredient accommodated in the cartridge 640 may be extruded through the outlet 642*a*.

Figure 24:
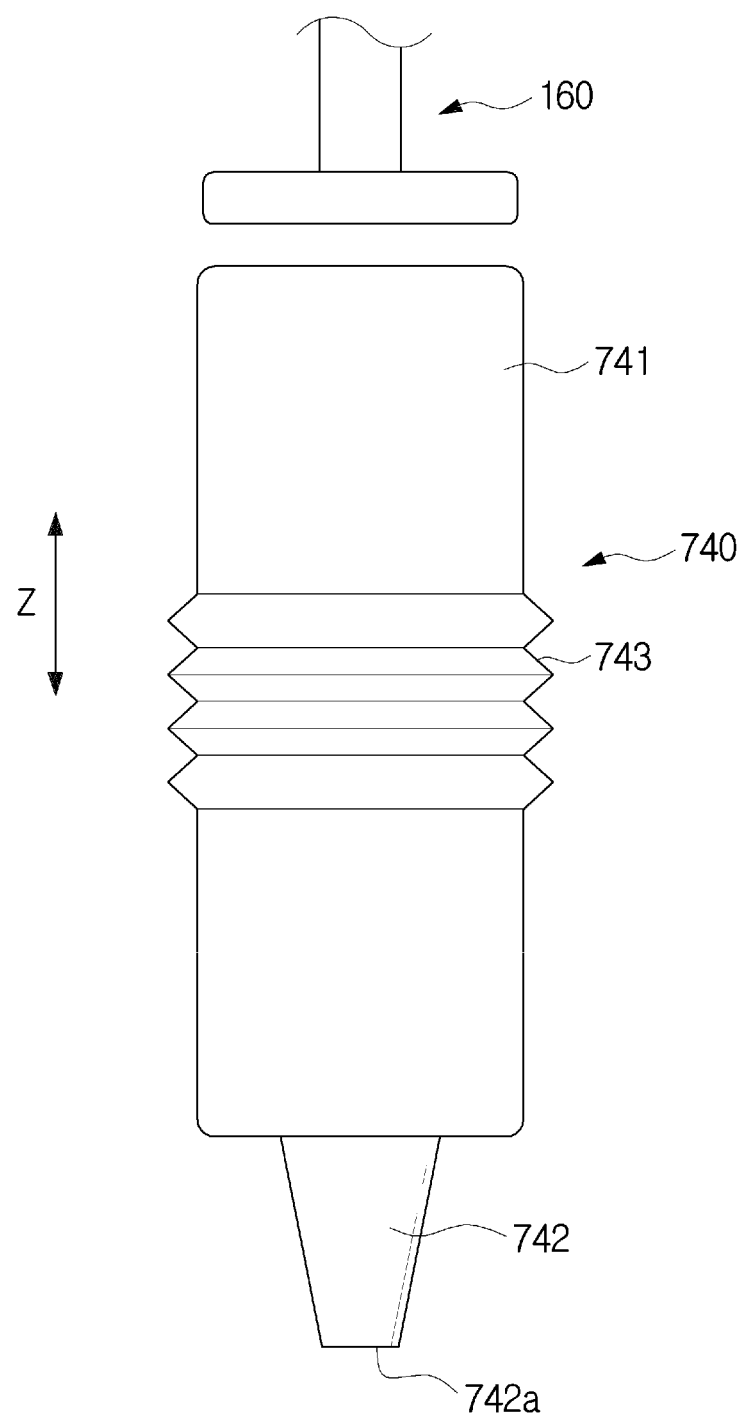
FIG. 24 is a view illustrating a cartridge in a cartridge of the cooking apparatus according to an embodiment of the present disclosure.

FIG. 24 is a view illustrating a cartridge in a cartridge assembly according to a seventh embodiment of the cooking apparatus of the present disclosure.

Referring to FIG. 24, the cartridge assembly according to the seventh embodiment may include a plurality of cartridges 740. The plurality of cartridges 740 may be formed of a flexible material. That is, the plurality of cartridges 740 may be formed of a flexible material that can be deformed by the extruding unit 160.

Each of the plurality of cartridges 740 may include an accommodator 741 and a nozzle 742 connected to the accommodator 741 and having an outlet 742*a* through which a food ingredient is discharged. That accommodator 741 may be formed of a flexible material that can be deformed by the extruding unit 160.

A corrugation 743 may be formed in at least part of the accommodator 741. In this way, by the corrugation 743 being formed in at least part of the accommodator 741, the food ingredient can be easily discharged when the cartridge 740 is pressed by the extruding unit 160. That is, because the food ingredient is expected to be smoothly discharged when the corrugation 743 is formed in at least part of the accommodator 741, the cartridge 740 can be prevented from being discarded or replaced when the food ingredient remains in the cartridge 740.

Figure 25:
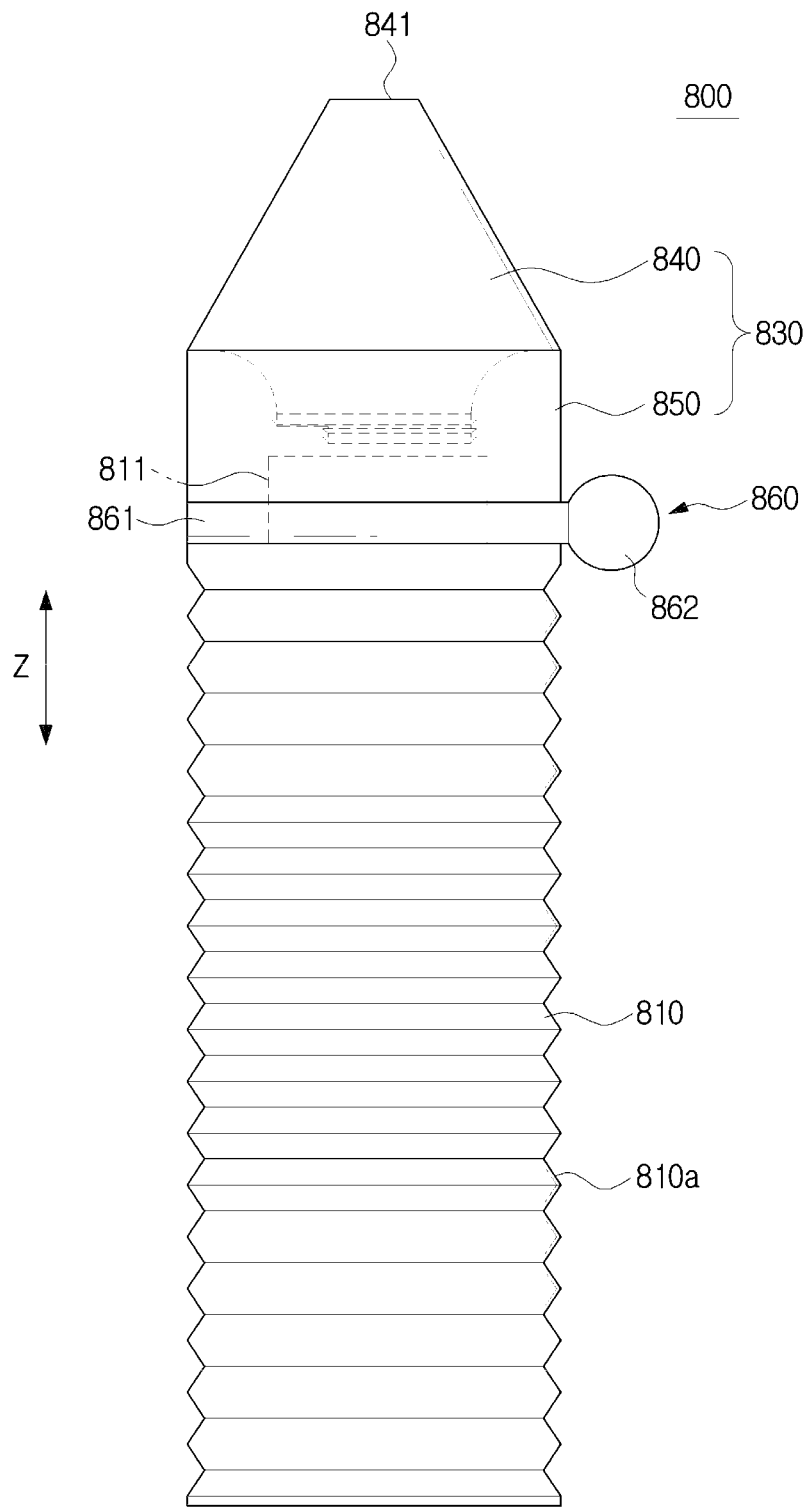
FIG. 25 is a view illustrating a cartridge unit in a cartridge assembly of the cooking apparatus according to an embodiment of the present disclosure.
Figure 26:
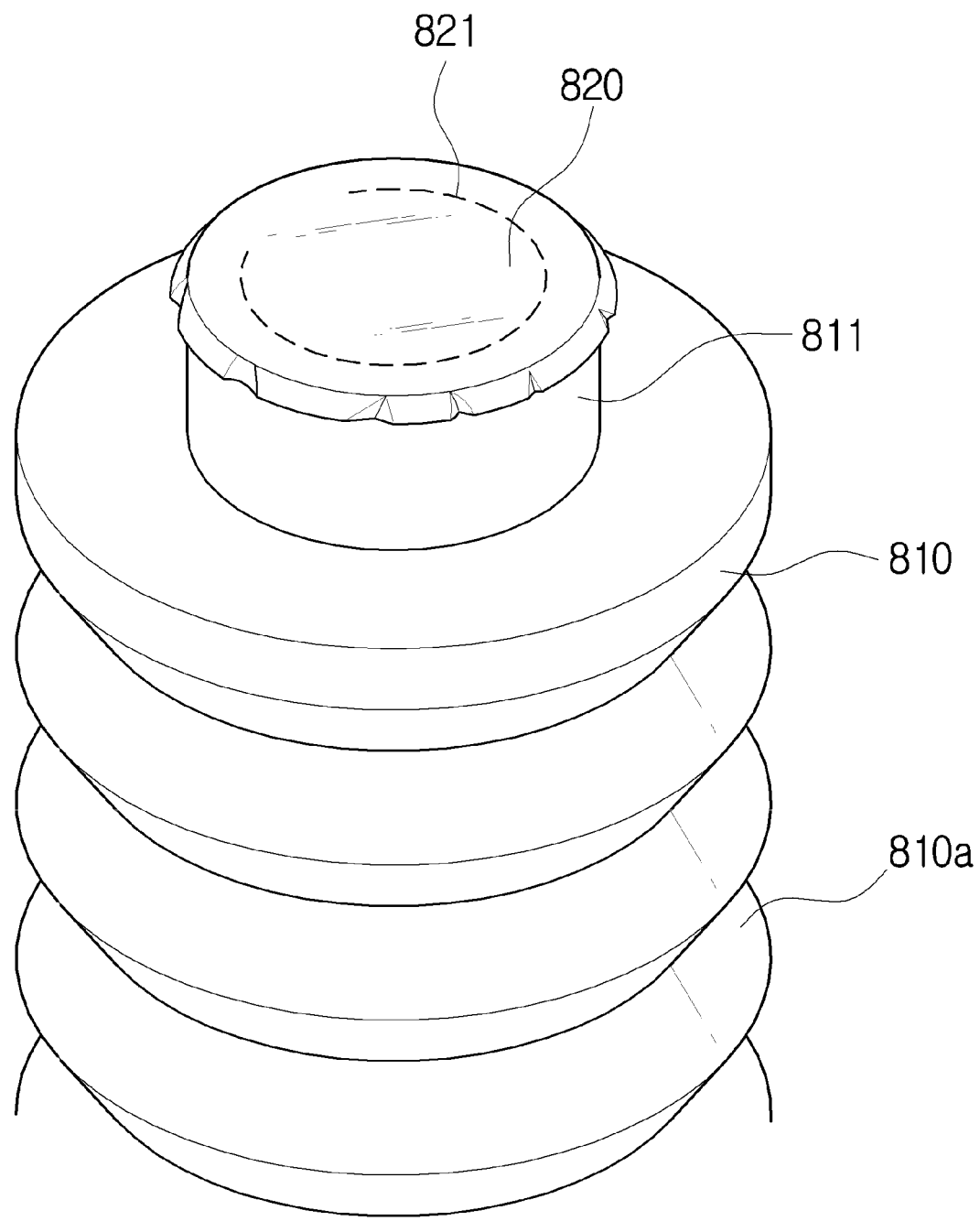
FIG. 26 is a perspective view illustrating a container of the cartridge unit of FIG. 25 according to an embodiment of the present disclosure.
Figure 27:
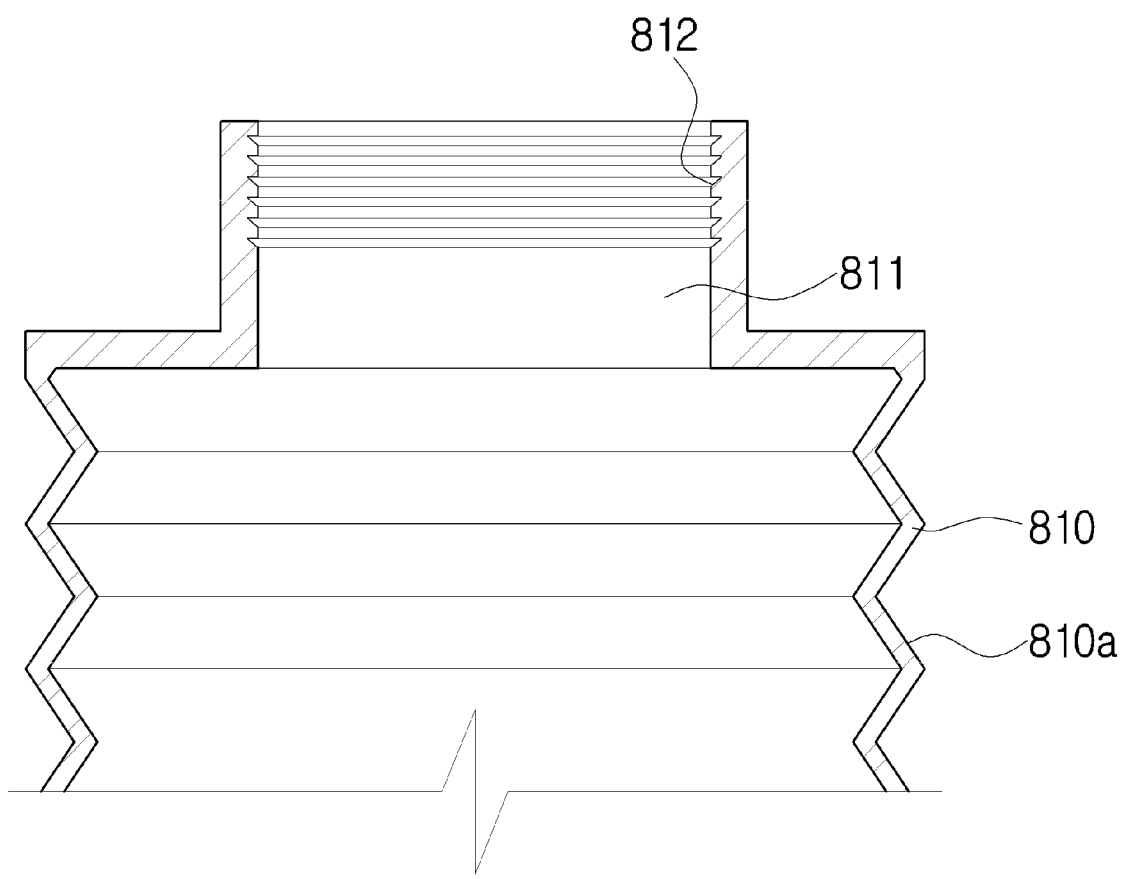
FIG. 27 is an enlarged cross-sectional view of a part of the container of FIG. 25 according to an embodiment of the present disclosure.
Figure 28:
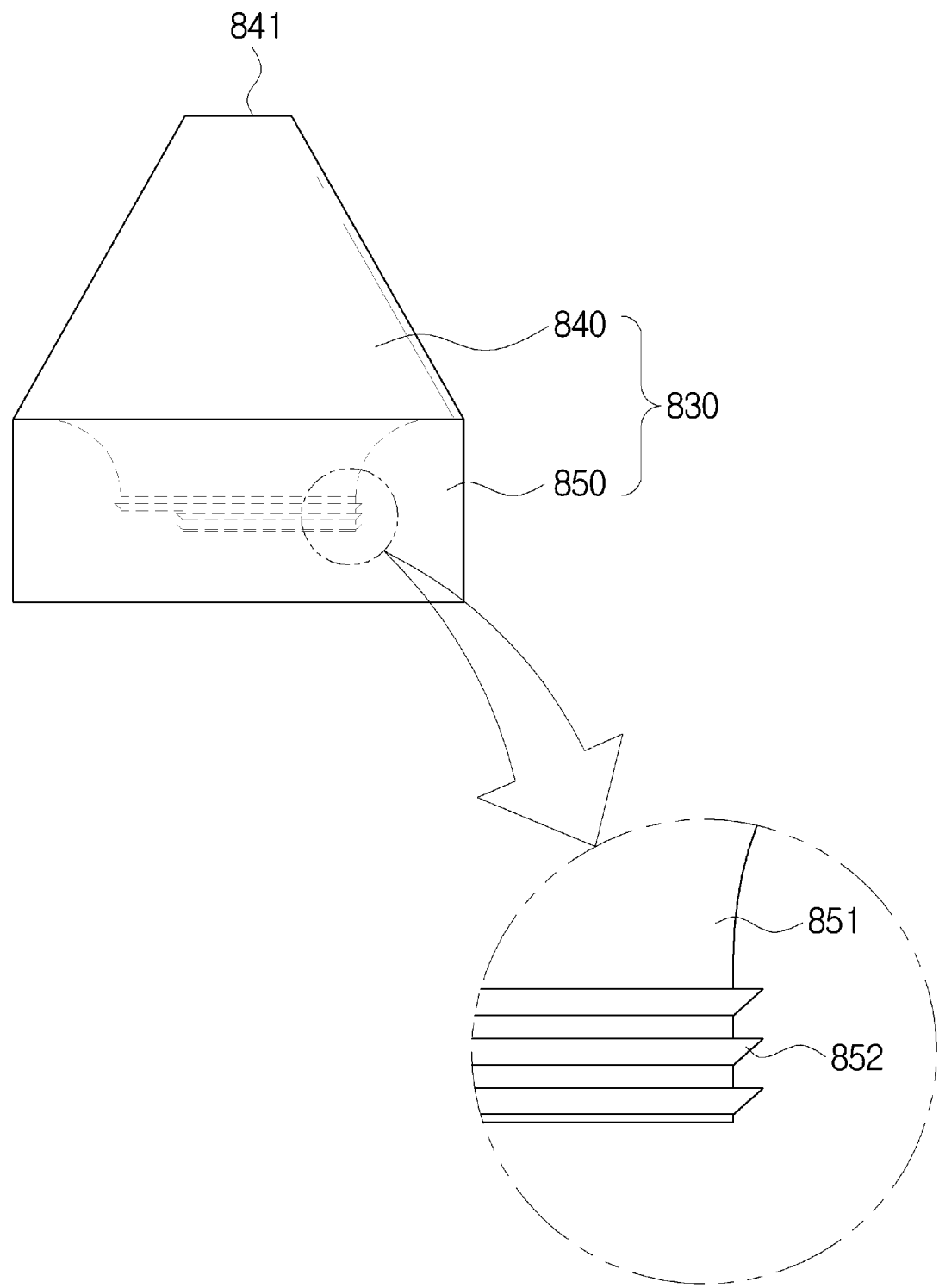
FIG. 28 is a view illustrating a container cap of the cartridge unit of FIG. 25 according to an embodiment of the present disclosure.

FIG. 25 is a view illustrating a cartridge unit in a cartridge assembly according to an eighth embodiment of the cooking apparatus of the present disclosure, and FIG. 26 is a perspective view illustrating a container of the cartridge unit of FIG. 25 according to an embodiment of the present disclosure. FIG. 27 is an enlarged cross-sectional view of a part of the container of FIG. 25 according to an embodiment of the present disclosure, and FIG. 28 is a view illustrating a container cap of the cartridge unit of FIG. 25 according to an embodiment of the present disclosure.

Referring to FIGS. 25 to 28, the cartridge assembly according to the eighth embodiment may include a cartridge unit 800 (e.g., a cartridge device).

The cartridge unit 800 may include a container 810 having a food ingredient accommodated therein. The container 810 may include an inlet 811. The food ingredient accommodated in the container 810 is discharged outside the container 810 via the inlet 811. A first screw thread 812 may be formed at an inner surface of the inlet 811.

The container 810 may include a plastic material. Preferably, a thickness of the container 810 may be 500 μm or less.

A corrugation 810a may be formed in at least a part of the container 810. Preferably, the corrugation 810a may be formed in the container 810 over an entire length thereof. A description of an effect of the formation of the corrugation 810a in at least a part of the container 810 will be omitted because the effect is the same as that of the above-described corrugation 244.

The cartridge unit 800 may also include a cartridge cover 820 attached to the inlet 811 to seal the container 810. The cartridge cover 820 may be removably attached to the inlet 811.

The cartridge cover 820 may have a thin film form.

The cartridge cover 820 may include one or more materials of a polymer and a metal. As an example, the cartridge cover 820 may include an aluminum foil.

The cartridge cover 820 may have a structure that is torn when a force of a predetermined level or higher is applied. Such a structure can be implemented by a cutting reference line 821 illustrated in FIG. 26. The cutting reference line 821 may be formed at the cartridge cover 820. The cutting reference line 821 may be formed along a circumferential direction of the inlet 811.

The cartridge unit 800 may also include a container cap 830. The container cap 830 may be coupled to the container 810. Specifically, the container cap 830 may be separably coupled to the inlet 811 of the container 810.

The container cap 830 may include one or more materials of a plastic and a metal.

The container cap 830 may include a nozzle 840 having an outlet 841.

The container cap 830 may also include a connector 850 connected to the nozzle 840. A nozzle introducer 851 corresponding to the inlet 811 of the container 810 may be provided in the connector 850. The food ingredient accommodated in the container 810 pass through the inlet 811 of the container 810 and then are discharged outside the cartridge unit 800 through the outlet 841 via the nozzle introducer 851. A second screw thread 852 coupled to the first screw thread 812 of the inlet 811 may be formed at an inner surface of the nozzle introducer 851. When the container cap 830 is pressed after removing a strap 860, the inlet 811 of the container 810 may be coupled to the nozzle introducer 851 of the container cap 830. Here, the first screw thread 812 and the second screw thread 852 may be engaged and coupled to each other. A firm coupling between the first screw thread 812 and the second screw thread 852 may prevent leakage of the food ingredient in a process in which the food ingredient in the container 810 is transmitted to the container cap 830 and then discharged outside the cartridge unit 800 through the outlet 841.

The cartridge unit 800 may also include the strap 860. The strap 860 may be provided to connect the container 810 and the container cap 830. The strap 860 may be removably arranged between the container 810 and the container cap 830.

The strap 860 may include a band 861 configured to connect the container 810 and the container cap 830 and a grip 862 extending from the band 861. A user may use the grip 862 to easily remove the strap 860.

Figure 29A:
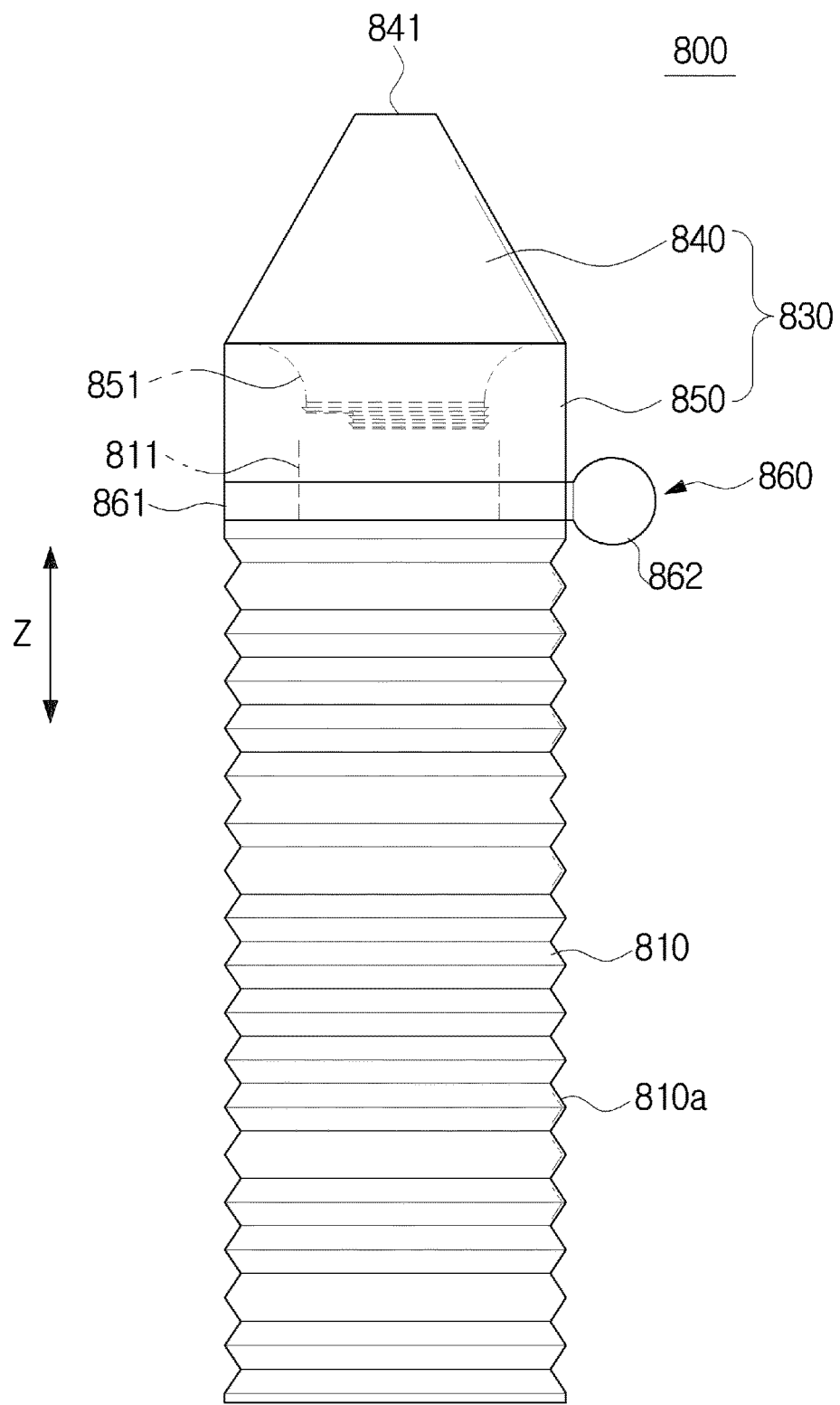
FIGS. 29A, 29B, and 29C are views illustrating a process of using the cartridge unit in the cartridge assembly of the cooking apparatus according to an embodiment of the present disclosure.
Figure 29B:
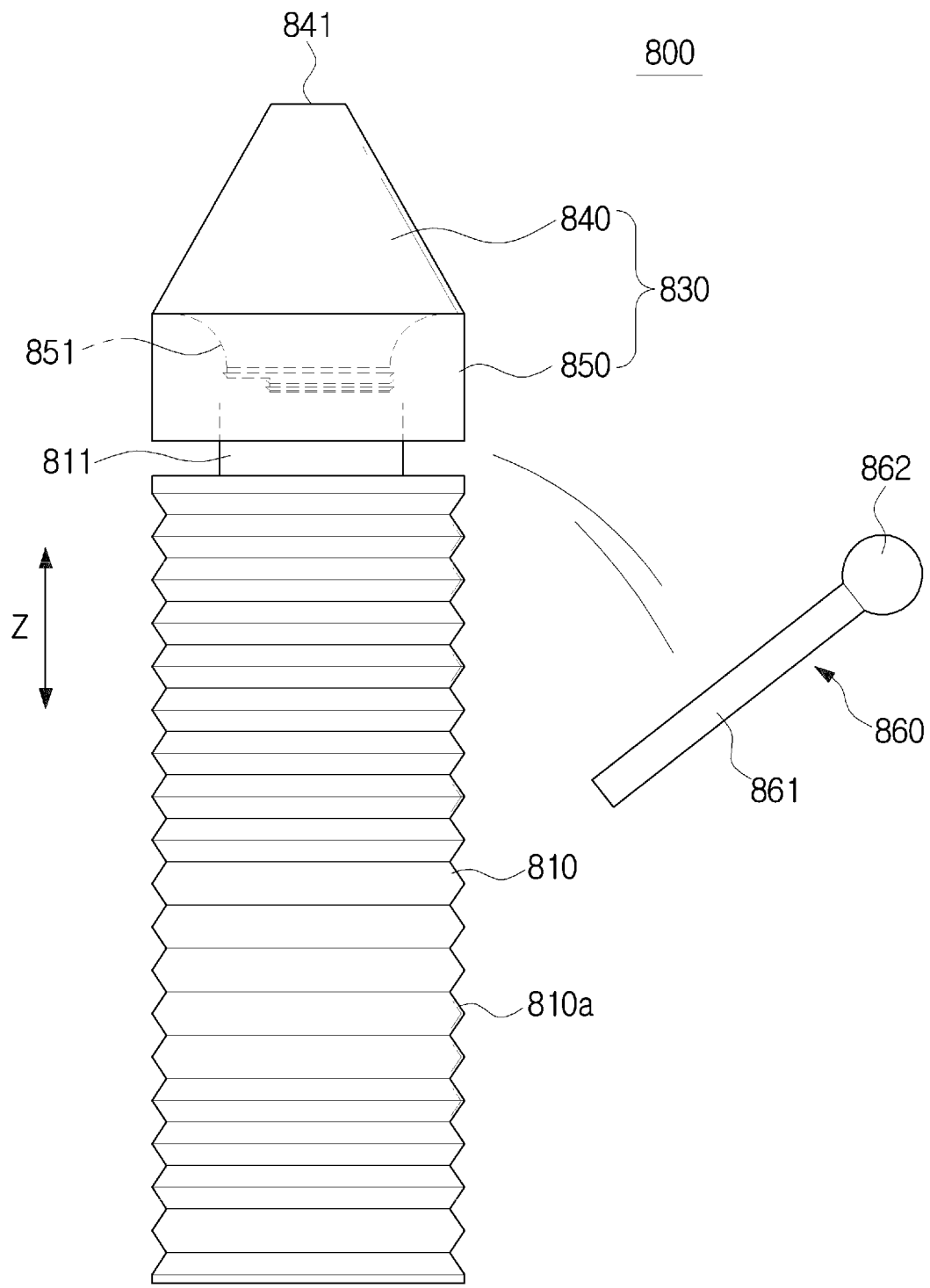
Figure 29C:
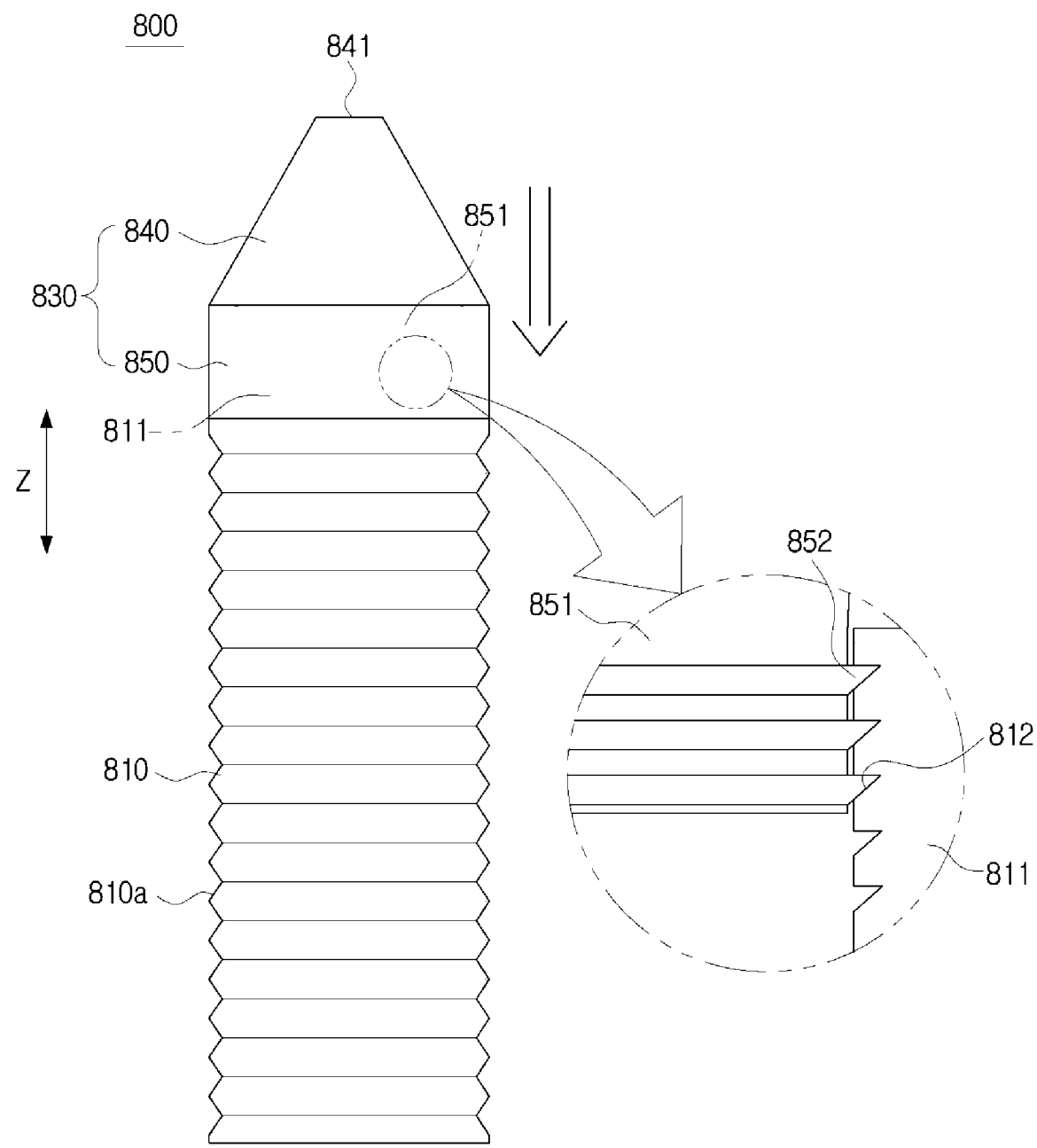

FIGS. 29A, 29B, and 29C are views illustrating a process of using the cartridge unit in the cartridge assembly according to the eighth embodiment of the cooking apparatus of the present disclosure.

Referring to FIG. 29A, the cartridge unit 800 is in a state in which the container 810 and the container cap 830 are connected by the strap 860. Here, the inlet 811 of the container 810 and the nozzle introducer 851 of the container cap 830 are spaced apart from each other.

Referring to FIGS. 29B and 29C, when the container cap 830 is pressed after the strap 860 is removed, the container cap 830 and the container 810 are coupled to each other. Specifically, the nozzle introducer 851 of the container cap 830 and the inlet 811 of the container 810 are coupled to each other. Here, the cartridge cover 820 attached to the inlet 811 of the container 810 may be torn as the nozzle introducer 851 of the container cap 830 presses the inlet 811 of the container 810. As the cartridge cover 820 is torn, the container 810 and the container cap 830 communicate with each other. Consequently, the food ingredient accommodated in the container 810 is transmitted to the container cap 830 and discharged outside the cartridge unit 800 through the outlet 841 of the nozzle 840.

Figure 30:
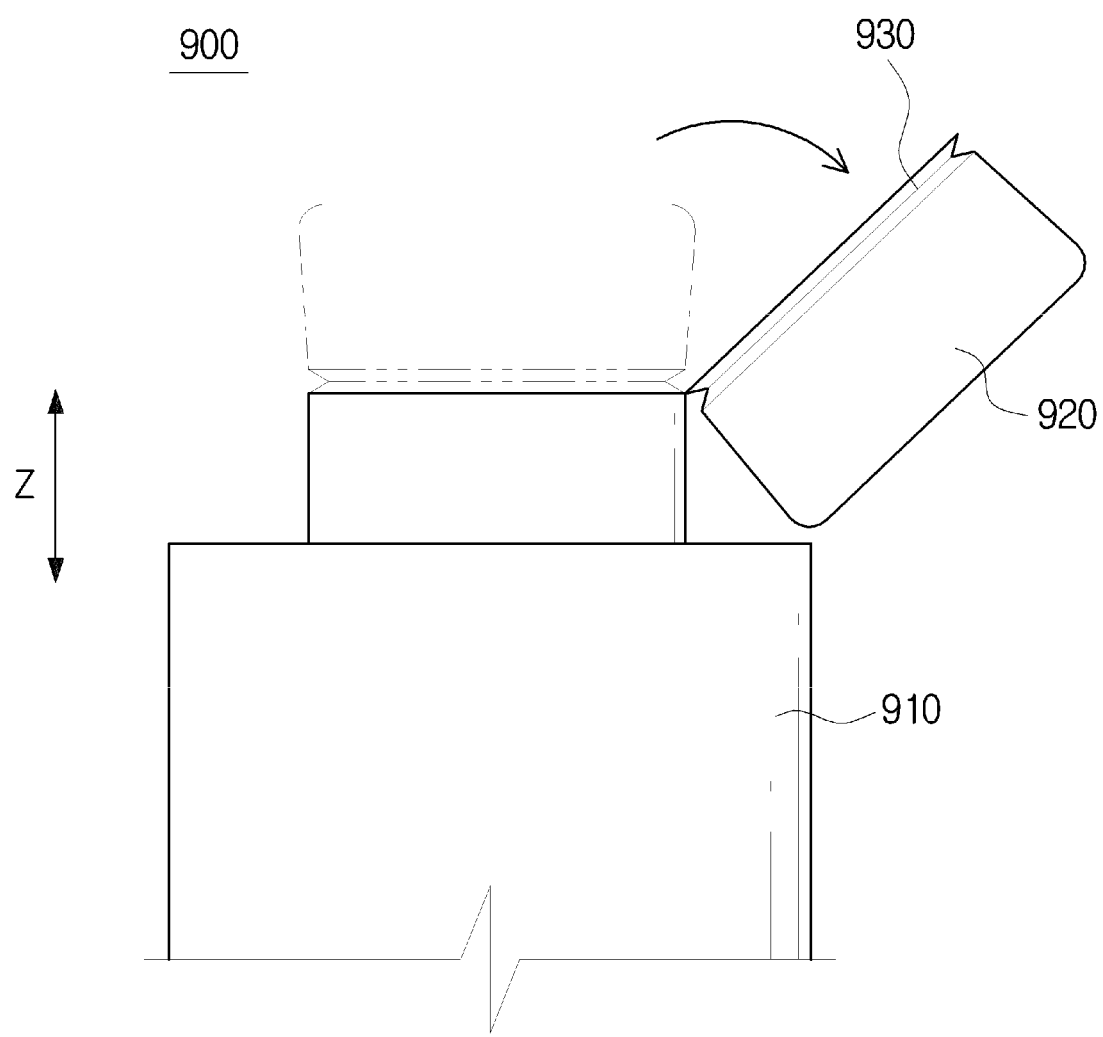
FIG. 30 is a view illustrating a method removing a container cap of a cartridge unit in a cartridge assembly of the cooking apparatus according to an embodiment of the present disclosure.

FIG. 30 is a view illustrating a method of removing a container cap of a cartridge unit in a cartridge assembly according to a ninth embodiment of the cooking apparatus of the present disclosure.

Referring to FIG. 30, the cartridge assembly according to an embodiment may include a cartridge unit 900.

The cartridge unit 900 may include a container 910 having a food ingredient accommodated therein.

The cartridge unit 900 may also include a container cap 920 integrally formed with the container 910. The container cap 920 may be integrally formed with the container 910 and removable from the container 910.

A perforated groove 930 may be formed in the cartridge unit 900. The perforated groove 930 may be formed at a boundary between the container 910 and the container cap 920. In other words, the container 910 and the container cap 920 may be defined on the basis of the perforated groove 930. The container cap 920 may be separated from the container 910 along the perforated groove 930. Specifically, when the user bends the container cap 920, the container cap 920 is separated from the container 910 along the perforated groove 930 and the container 910 is opened.

A nozzle (not illustrated) having an outlet may be coupled to the container 910 from which the container cap 920 is removed.

Figure 31:
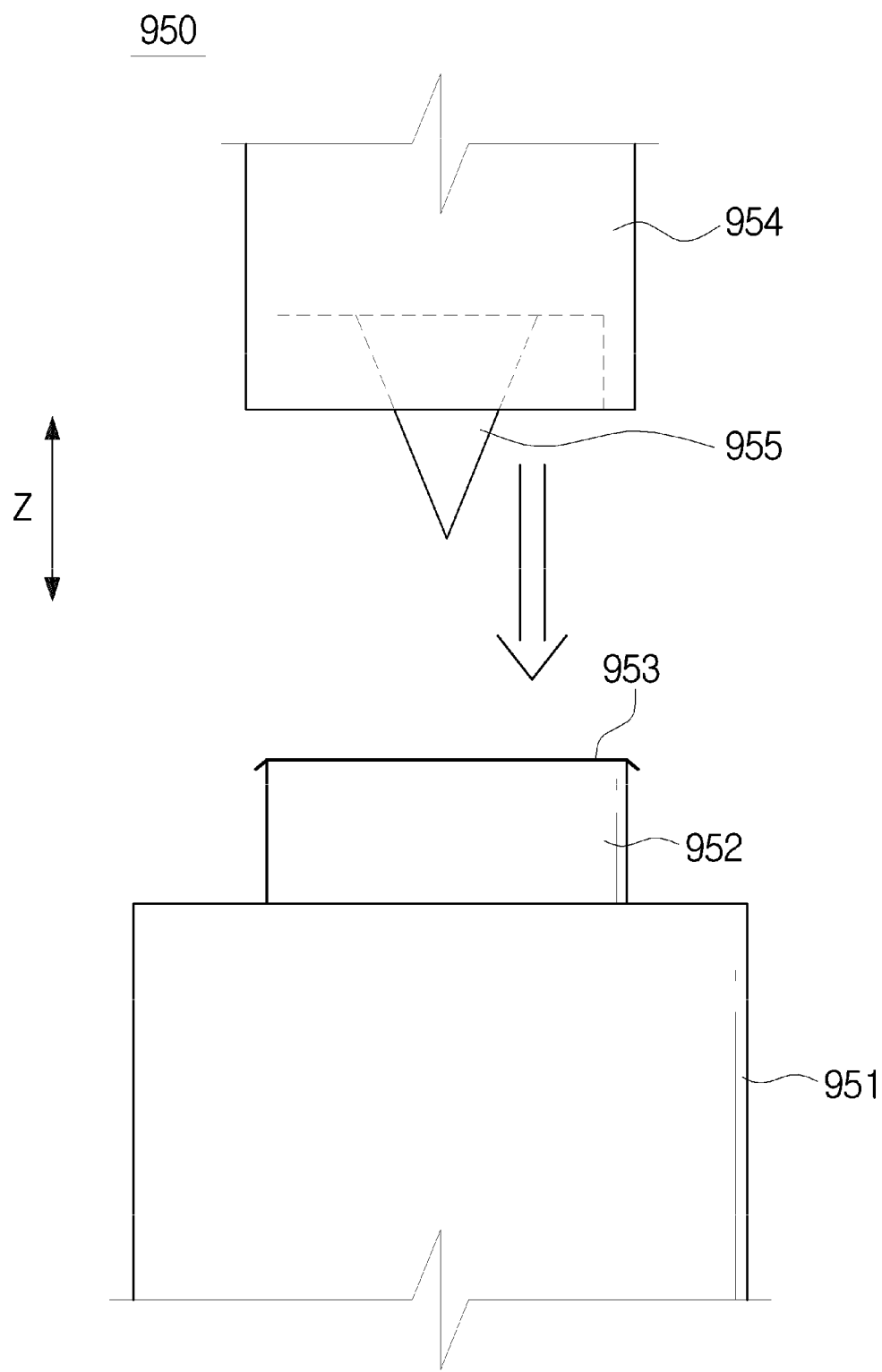
FIG. 31 is a view illustrating a method of removing a container cover of a cartridge unit in a cartridge assembly of the cooking apparatus according to an embodiment of the present disclosure.

FIG. 31 is a view illustrating a method of removing a container cover of a cartridge unit in a cartridge assembly according to a tenth embodiment of the cooking apparatus of the present disclosure.

Referring to FIG. 31, the cartridge assembly according to the tenth embodiment of the present disclosure may include a cartridge unit 950 (e.g., a cartridge device).

The cartridge unit 950 may include a container 951 having a food ingredient accommodated therein. The container 951 may include an inlet 952. The food ingredient accommodated in the container 951 is discharged outside the container 951 through the inlet 952.

The cartridge unit 950 may also include a cartridge cover 953 attached to the inlet 952 to seal the container 951. The cartridge cover 953 may be removably attached to the inlet 952.

The cartridge cover 953 may have a thin film form.

The cartridge cover 953 may include one or more materials of a polymer and a metal. As an example, the cartridge cover 953 may include an aluminum foil.

The cartridge unit 950 may also include a container cap 954. The container cap 954 may be coupled to the container 951. Specifically, the container cap 954 may be separably coupled to the inlet 952 of the container 951.

The cartridge unit 950 may also include a cartridge cover opener 955 provided to remove the cartridge cover 953. The cartridge cover opener 955 may have a sharp shape. The cartridge cover opener 955 may be formed in the container cap 954. Specifically, the cartridge cover opener 955 may be integrally formed with the container cap 954 at an outer side of the container cap 954.

The user may separate the container cap 954 from the container 951 and then use the cartridge cover opener 955 formed in the container cap 954 to remove the cartridge cover 953. Specifically, the user may open the container 951 by scratching the cartridge cover 953 using the cartridge cover opener 955.

A nozzle (not illustrated) having an outlet may be coupled to the container 951 from which the cartridge cover 953 is removed.

Figure 32:
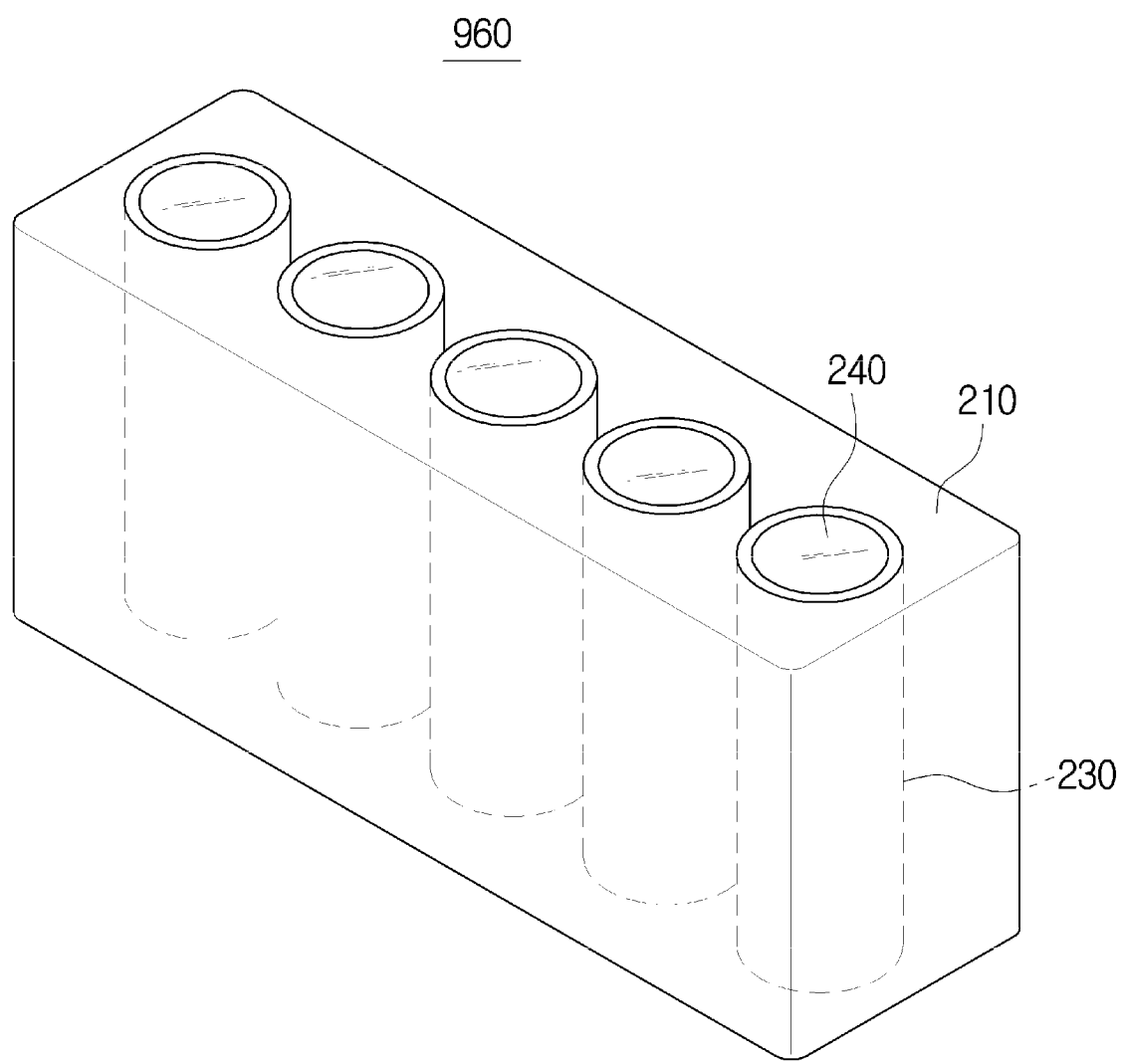
FIG. 32 is a view illustrating a cartridge assembly of the cooking apparatus according to an embodiment of the present disclosure.

FIG. 32 is a view illustrating a cartridge assembly according to an eleventh embodiment of the cooking apparatus of the present disclosure. Refer to FIGS. 2, 9, and 10 for unmarked reference numerals.

Referring to FIG. 32, a cartridge assembly 960 according to an embodiment may include the cartridge body 210. The cartridge body 210 may have a box shape. However, the shape of the cartridge body 210 is not limited to the above example, and may be changed in various ways. The plurality of cartridge mounts 220 may be formed in the cartridge body 210. The plurality of cartridge mounts 220 may be formed to pass through the cartridge body 210.

The cartridge assembly 960 according to the eleventh embodiment may be provided in the cooking compartment 20 to be capable of linear motion and rotation. A description of a method of linear motion and rotation of the cartridge assembly 960 according to the eleventh embodiment will be omitted because the method is the same as that of the cartridge assembly 200 according to the first embodiment.

The cartridge assembly 960 may also include the plurality of cartridge cases 230 mounted on the plurality of cartridge mounts 220. Each of the plurality of cartridge cases 230 may have a cylindrical shape with one open base plane. Each of the plurality of cartridge cases 230 may also include the opening 232. The opening 232 may be formed in the cartridge case 230 to face the bottom surface 21 of the cooking compartment 20. The nozzle 242 of the plurality of cartridges 240 may selectively protrude outside the plurality of cartridge cases 230 via the opening 232.

The plurality of cartridge cases 230 are not limited to having a cylindrical shape, and may have a shape corresponding to the plurality of cartridge mounts 220.

The cartridge assembly 960 may also include the plurality of cartridges 240 disposed in the plurality of cartridge cases 230. Food ingredients may be accommodated in the plurality of cartridges 240. A description of the plurality of cartridges 240 and the food ingredients will be omitted because the description overlaps that made with reference to FIGS. 8 and 9.

The cartridge assembly 960 may also include the elastic member 250. A description of the elastic member 250 will be omitted because the description overlaps that made with reference to FIGS. 9 and 10.

Figure 33A:
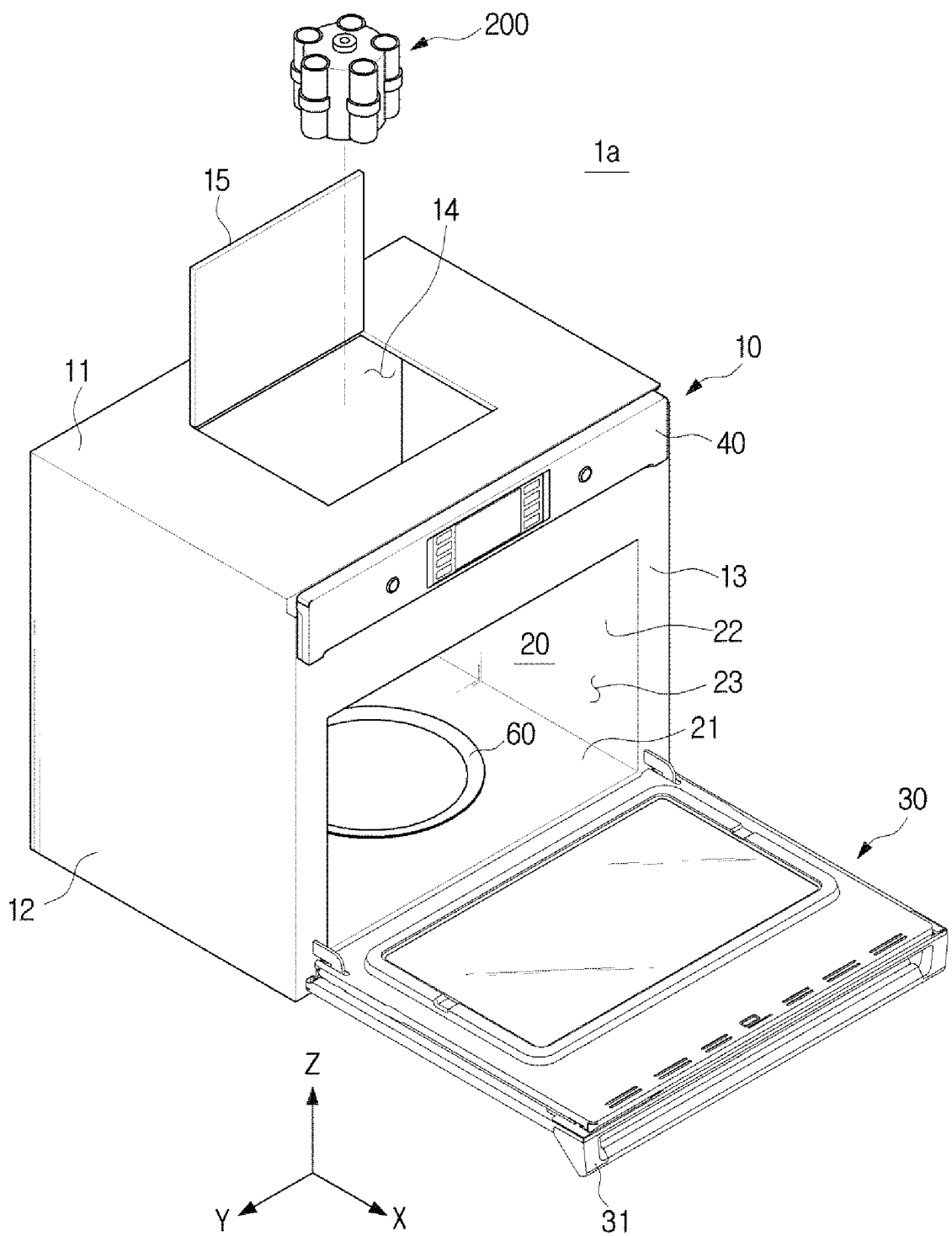
FIGS. 33A and 33B are views for describing a method of replacing the cartridge assembly in the cooking apparatus according to an embodiment of the present disclosure.
Figure 33B:
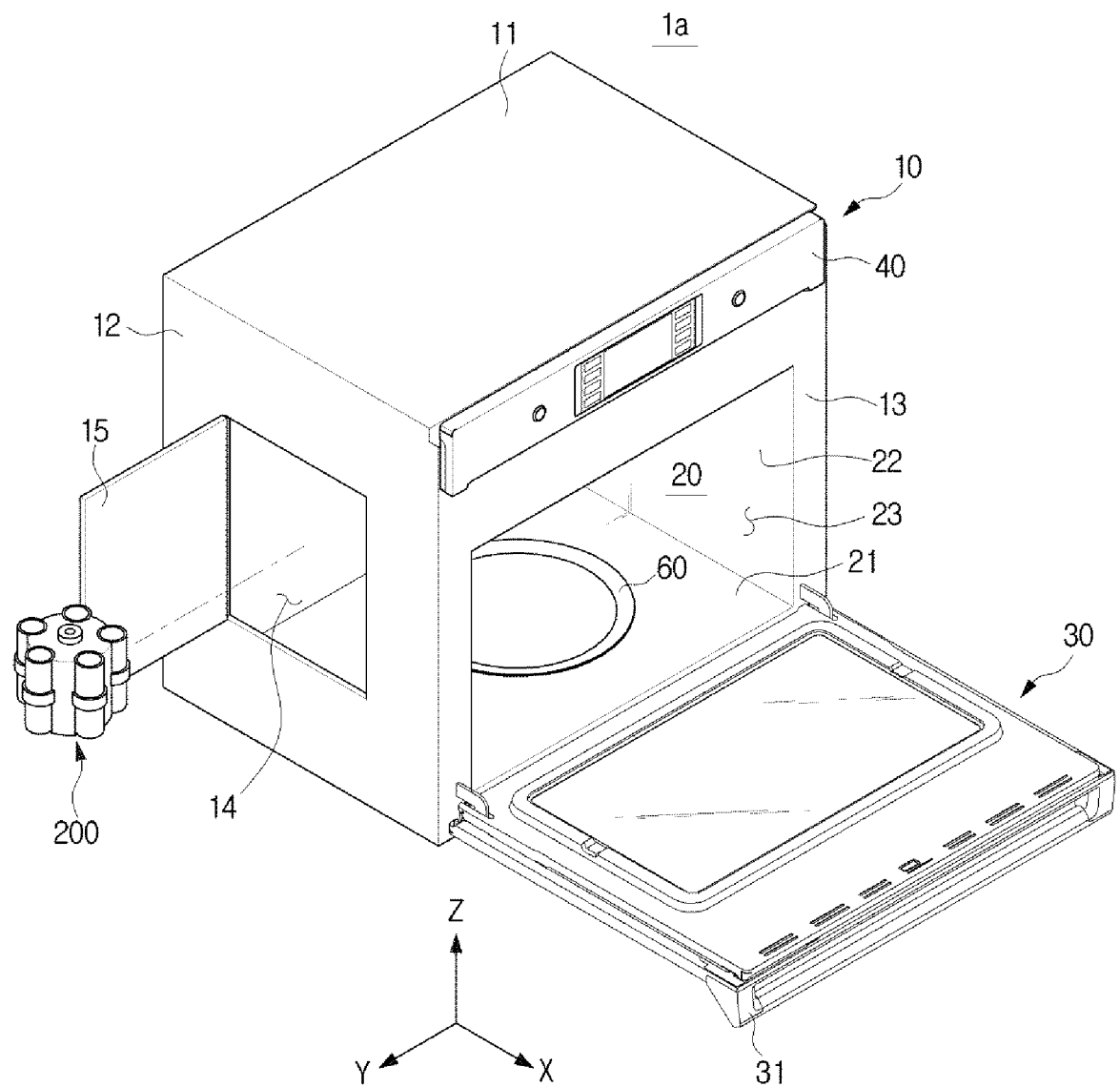

FIGS. 33A and 33B are views for describing a method of replacing the cartridge assembly in the cooking apparatus according to an embodiment of the present disclosure. For convenience of description, the method of replacing the cartridge assembly 200 according to the first embodiment will be mainly described with reference to FIGS. 33A and 33B. Refer to FIG. 2 for unmarked reference numerals. Also, a description overlapping that made with reference to FIG. 2 may be omitted.

Referring to FIGS. 33A and 33B, the cartridge assembly 200 may be arranged in the cooking compartment 20 to be replaceable.

The main body 10 may include an opening 14 formed at one surface of the main body 10 so that the cartridge assembly 200 is replaceable. Specifically, the opening 14 may be formed on the upper surface 11 or at least one of both of the side surfaces 12 of the main body 10. FIG. 33A illustrates a case in which the opening 14 is formed at the upper surface 11 of the main body 10, and FIG. 33B illustrates a case in which the opening 14 is formed on at least one of both of the side surfaces 12 of the main body 10.

The cooking apparatus 1a may also include an additional door 15 provided to open and close the opening 14. The additional door 15 may be installed at the main body 10. As an example, the additional door 15 may be rotatably installed at the main body 10 to open and close the opening 14. As another example, the additional door 15 may be slidably installed at the main body 10 to open and close the opening 14. As still another example, the additional door 15 may be separably installed at the main body 10 to open and close the opening 14. FIG. 33A illustrates a case in which the additional door 15 is installed at the upper surface 11 of the main body 10 to open and close the opening 14, and FIG. 33B illustrates a case in which the additional door 15 is installed in at least one of both of the side surfaces 12 of the main body 10 to open and close the opening 14.

Figure 34A:
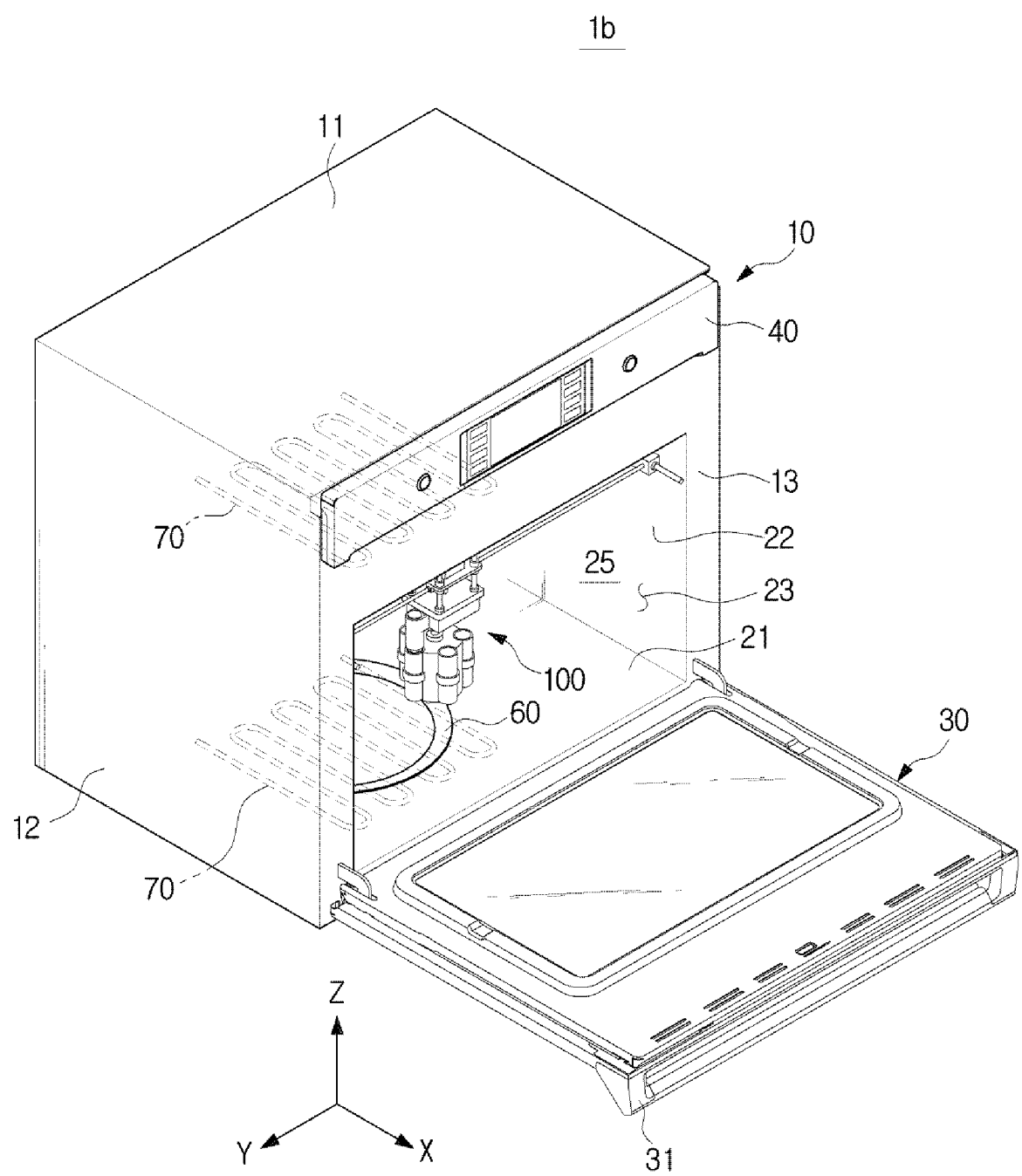
FIGS. 34A, 34B, and 34C are views illustrating a process of partitioning an inner space of a main body into a plurality of spaces in a cooking apparatus according to an embodiment of the present disclosure.
Figure 34B:
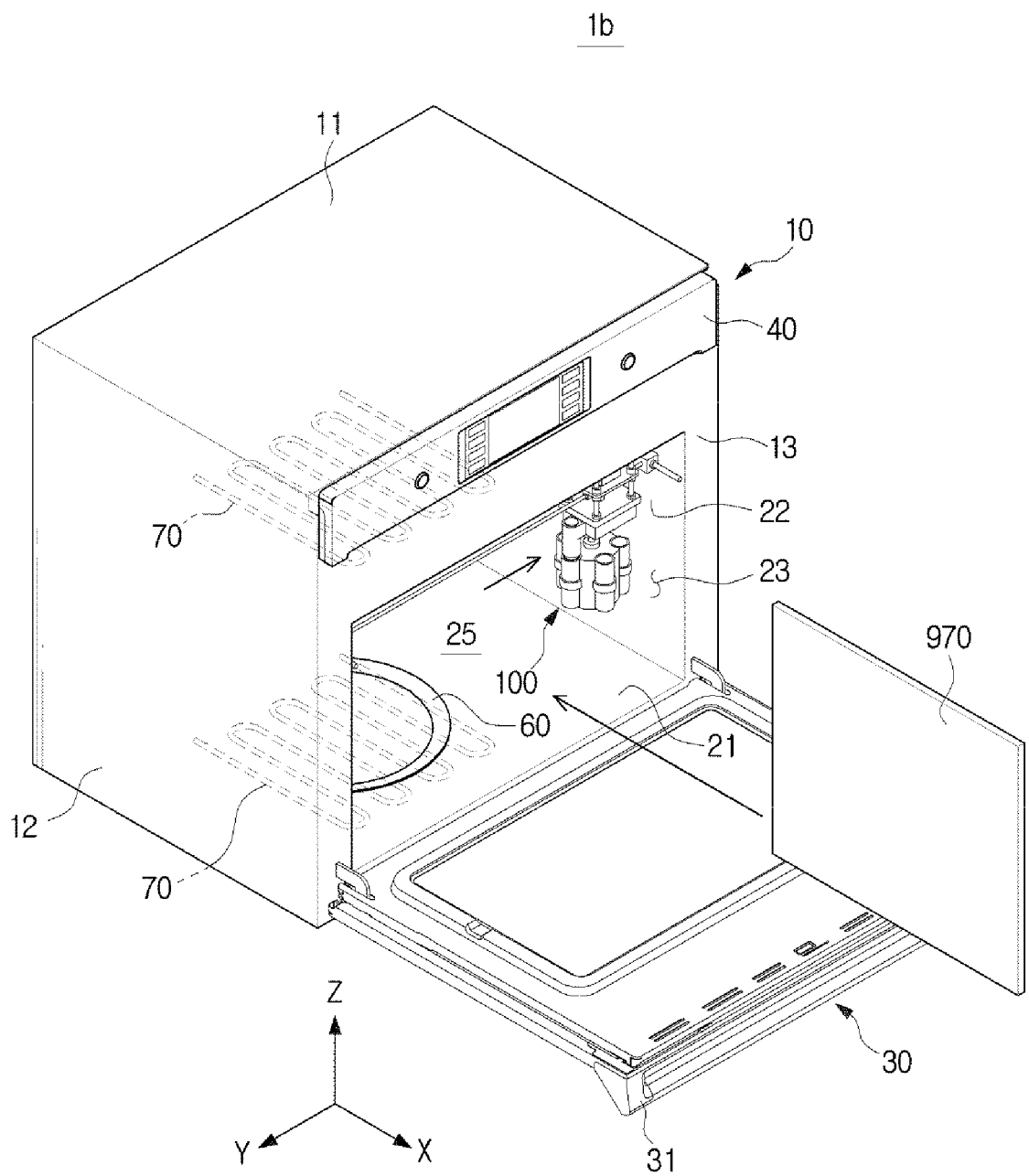
Figure 34C:
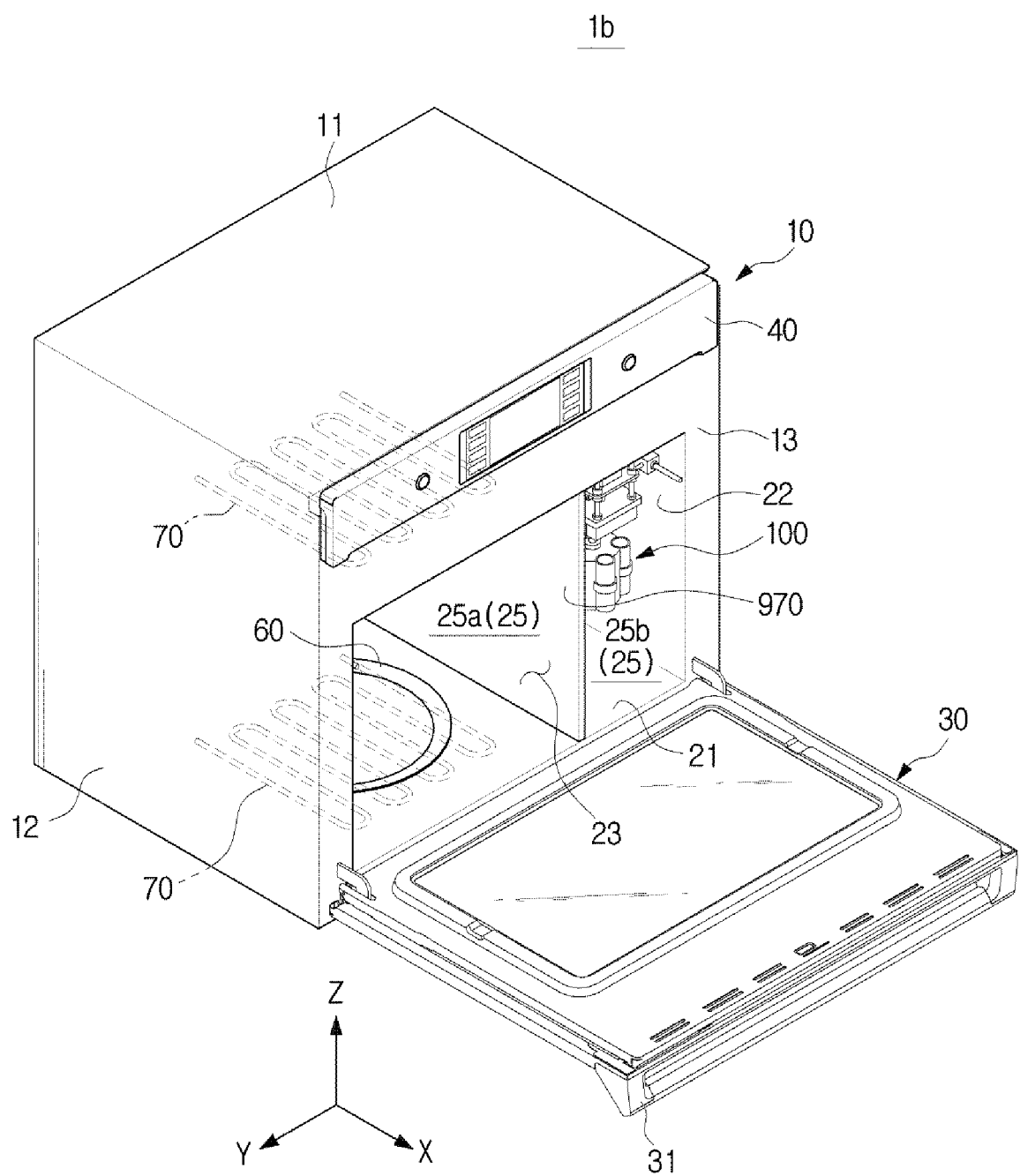

FIGS. 34A, 34B, and 34C are views illustrating a process of partitioning an inner space of a main body into a plurality of spaces in a cooking apparatus according to another embodiment of the present disclosure. Hereinafter, a description overlapping that made with reference to FIGS. 2 to 10 may be omitted. Refer to FIGS. 2 to 10 for unmarked reference numerals.

Referring to FIGS. 34A, 34B, and 34C, a cooking apparatus 1b may include the main body 10. The main body 10 may form an exterior of the cooking apparatus 1b. The main body 10 may include the upper surface 11, a lower surface (not illustrated), a rear surface (not illustrated), both of the side surfaces 12, and the front surface 13.

The cooking apparatus 1b may also include an inner space 25 formed in the main body 10. The inner space 25 may be defined by an upper surface (not illustrated), the bottom surface 21, a rear surface (not illustrated), both of the side surfaces 22, and the open front surface 23. An insulating member (not illustrated) may be arranged in a space between the inner space 25 and the main body 10 to insulate the inner space 25.

The inner space 25 may include a first space 25a and a second space 25b.

The cooking apparatus 1b may also include a partitioning frame 970 arranged in the inner space 25 to partition the first space 25a and the second space 25b from each other. The partitioning frame 970 may be separably arranged in the inner space 25.

While partitioning the inner space 25 into the first space 25a and the second space 25b, the partitioning frame 970 may also prevent a heat transfer between the first space 25a and the second space 25b.

An inside of the partitioning frame 970 may remain in vacuum.

An insulating material may be accommodated in the partitioning frame 970.

The cooking apparatus 1b may also include the door 30. The door 30 may be rotatably installed at the main body 10 to open and close the front surface 23 of the inner space 25. A description of the door 30 will be omitted because the description overlaps that made with reference to FIG. 2.

The cooking apparatus 1b may also include the control panel 40 configured to control operation of the cooking apparatus 1b. A description of the control panel 40 will be omitted because the description overlaps that made with reference to FIG. 2.

The cooking apparatus 1b may also include the food forming module 100. The food forming module 100 may be movably provided in the inner space 25. The food forming module 100 may include the cartridge assembly 200 and the driving device 120 configured to drive the cartridge assembly 200. A description of the food forming module 100 will be omitted because the description overlaps that made with reference to FIGS. 2 to 10.

The cooking apparatus 1b may also include the guide rod 50 provided to guide the food forming module 100. The guide rod 50 may include the fixed rods 51 fixed and installed at both of the side surfaces 22 of the inner space 25. The guide rod 50 may also include the movable rod 52 configured to move along the fixed rods 51. A description of the guide rod 50 will be omitted because the description overlaps that made with reference to FIG. 2.

The cooking apparatus 1b may also include the tray 60 arranged on the bottom surface 21 of the inner space 25. Food may be placed on the tray 60. The tray 60 may be installed in the first space 25a. Specifically, the tray 60 may be installed on the bottom surface 21 of the first space 25a. A description of the tray 60 will be omitted because the description overlaps that made with reference to FIGS. 2 to 10.

The cooking apparatus 1b may also include the one or more heaters 70 for heating food. The one or more heaters 70 may be installed in the first space 25a. Although the one or more heaters 70 may be installed on the bottom surface 21 of the first space 25a or an upper surface (not illustrated) of the first space 25a as an example, the installation positions of the one or more heaters 70 may be changed in various ways.

The food forming module 100 may be located in the first space 25a of the inner space 25 when forming food. In other words, when performing 3D printing of food to be cooked using the food ingredients accommodated in the plurality of cartridges 240, the food forming module 100 may be located in the first space 25a of the inner space 25.

When cooking formed food, the food forming module 100 may be located in the second space 25b of the inner space 25. In other words, when cooking 3D-printed food, the food forming module 100 may be located in the second space 25b of the inner space 25. This is to prevent damage to the food forming module 100 due to heat that may be applied to food in the process of cooking the formed food.

From another aspect, the first space 25a may be defined as a space for forming food and cooking the formed food. The second space 25b may be defined as a space in which, when the food forming module 100 finishes forming food in the first space 25a, the food forming module 100 stands by until cooking the food is completed in the first space 25a.

Referring to FIGS. 34A and 34B, the inner space 25 may be partitioned by the partitioning frame 970 into the first space 25a and the second space 25b which abut each other in the horizontal direction. Specifically, the inner space 25 may be partitioned by the partitioning frame 970 into the first space 25a and the second space 25b which abut each other in the left-right direction Y of the cooking apparatus 1b. The inner space 25 may also be partitioned by the partitioning frame 970 into a plurality of spaces that abut each other in the front-rear direction X of the cooking apparatus 1b.

Figure 35A:
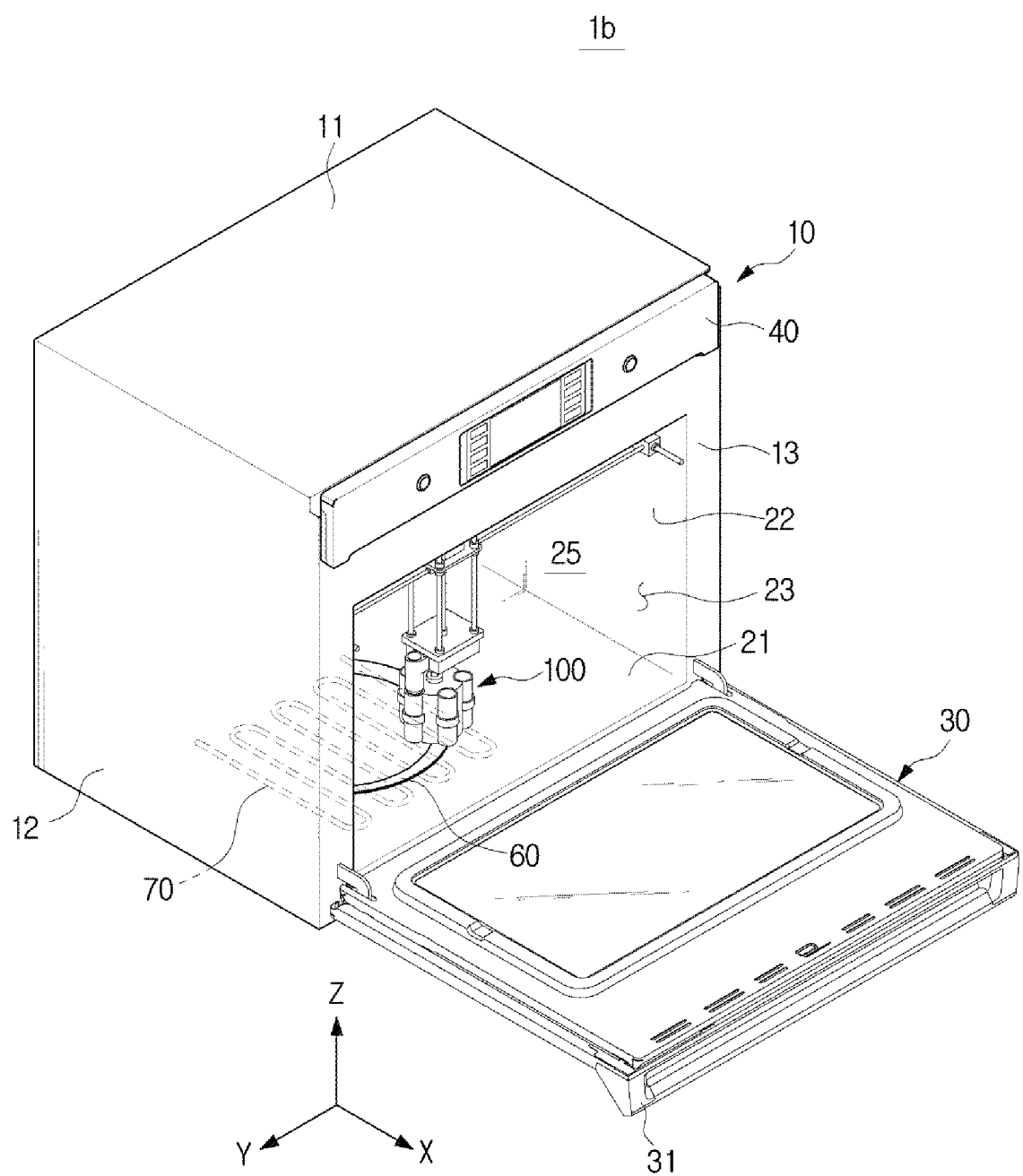
FIGS. 35A, 35B, and 35C are views illustrating a different process of partitioning the inner space of the main body into a plurality of spaces from that illustrated in FIGS. 34A to 34C in the cooking apparatus according to an embodiment of the present disclosure.
Figure 35B:
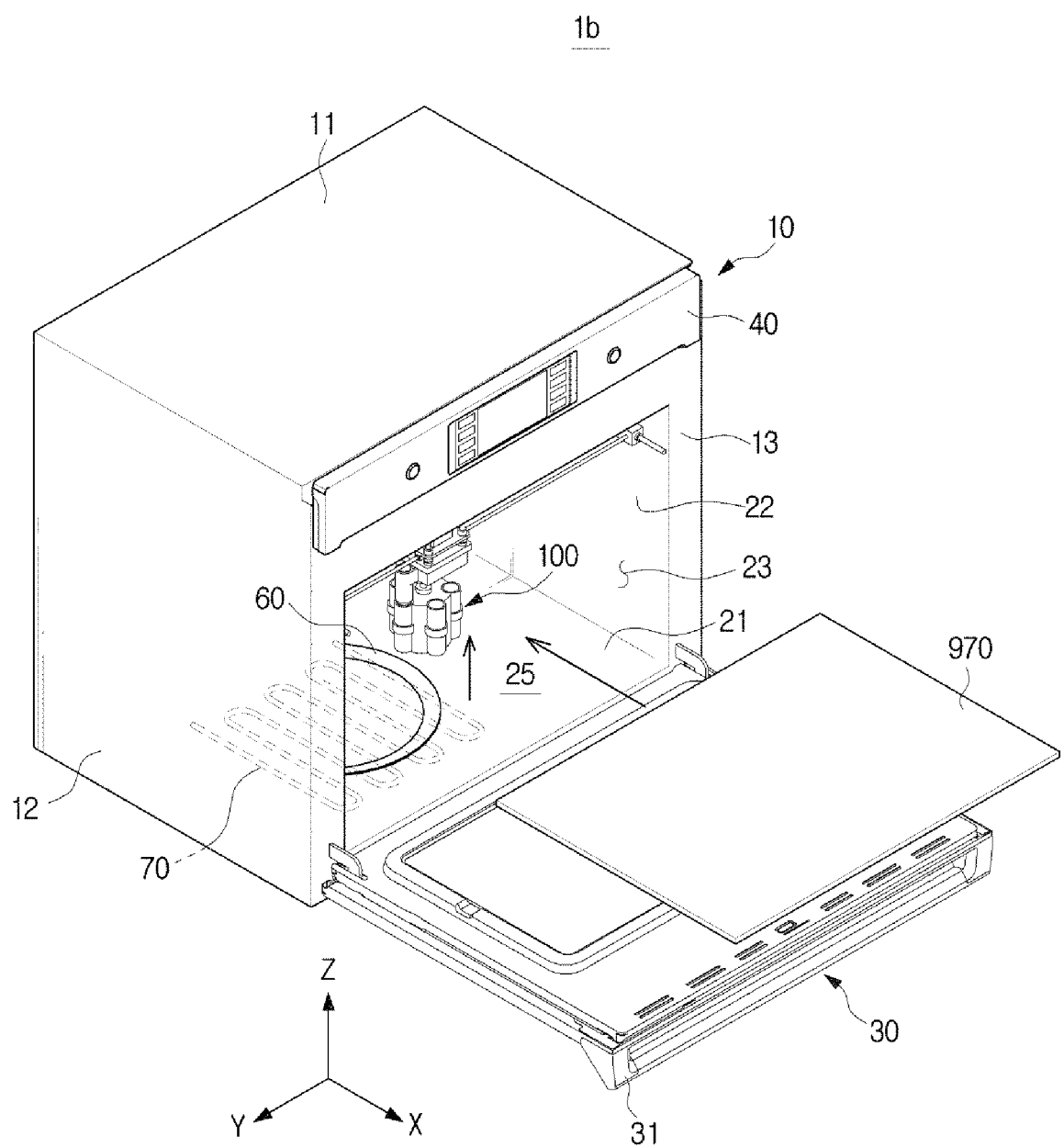
Figure 35C:
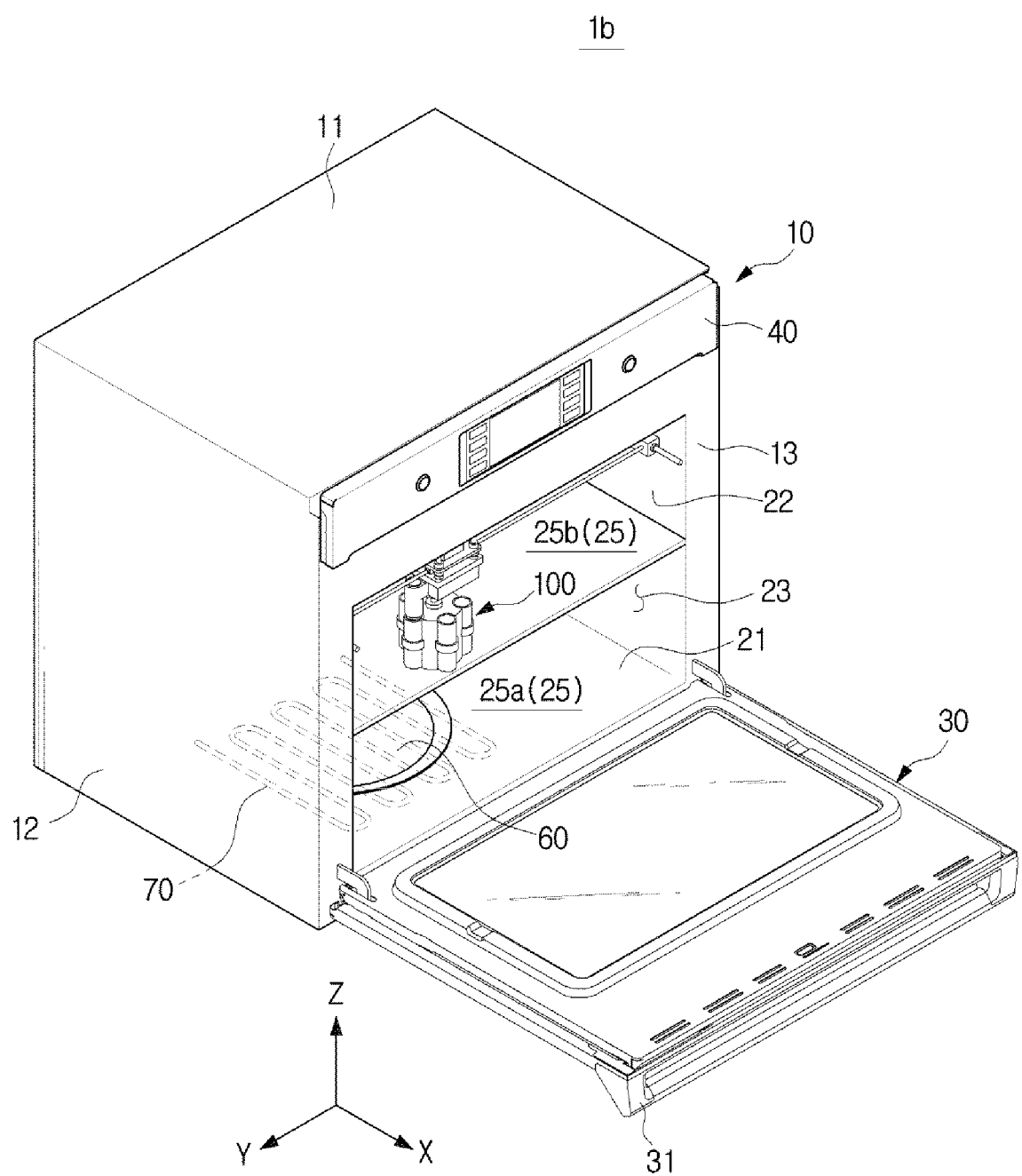

FIGS. 35A, 35B, and 35C are views illustrating a different process of partitioning the inner space of the main body into a plurality of spaces from that illustrated in FIGS. 34A, 35B, and 34C in the cooking apparatus according to another embodiment of the present disclosure. Hereinafter, a description overlapping that made with reference to FIGS. 34A, 34B, and 34C may be omitted. Also, like reference numerals may be given to elements having the same names as those described with reference to FIGS. 34A, 34B, and 34C.

Referring to FIGS. 35A, 35B, and 35C, the inner space 25 may be partitioned by the partitioning frame 970 into the first space 25a and the second space 25b which abut each other in a vertical direction. Specifically, the inner space 25 may be partitioned by the partitioning frame 970 into the first space 25a and the second space 25b which abut each other in the up-down direction Z of the cooking apparatus 1b.

Figure 36A:
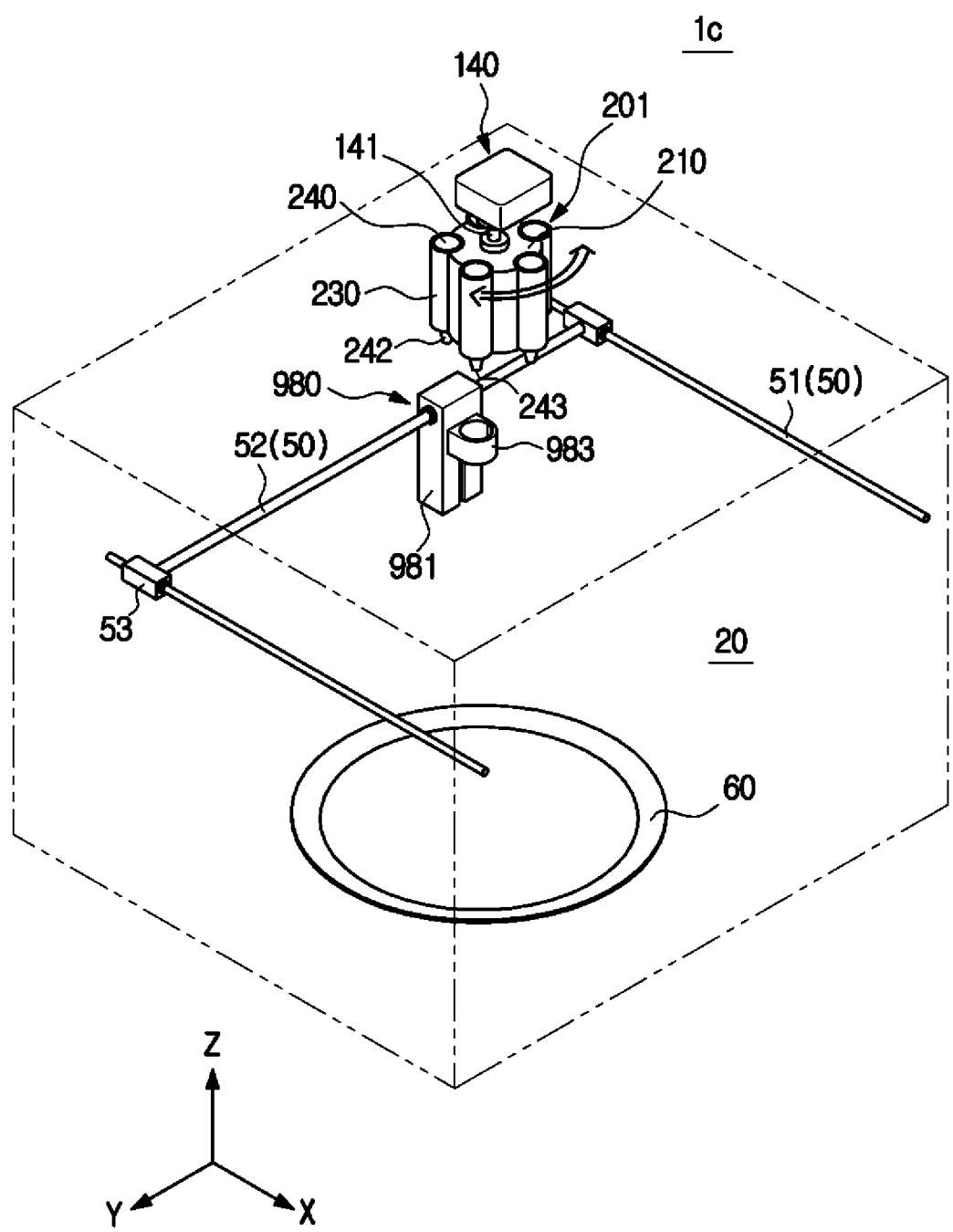
FIGS. 36A, 36B, and 36C are views illustrating a process in which a cartridge is separated from a cartridge body and is individually moved in a cooking apparatus according to an embodiment of the present disclosure.
Figure 36B:
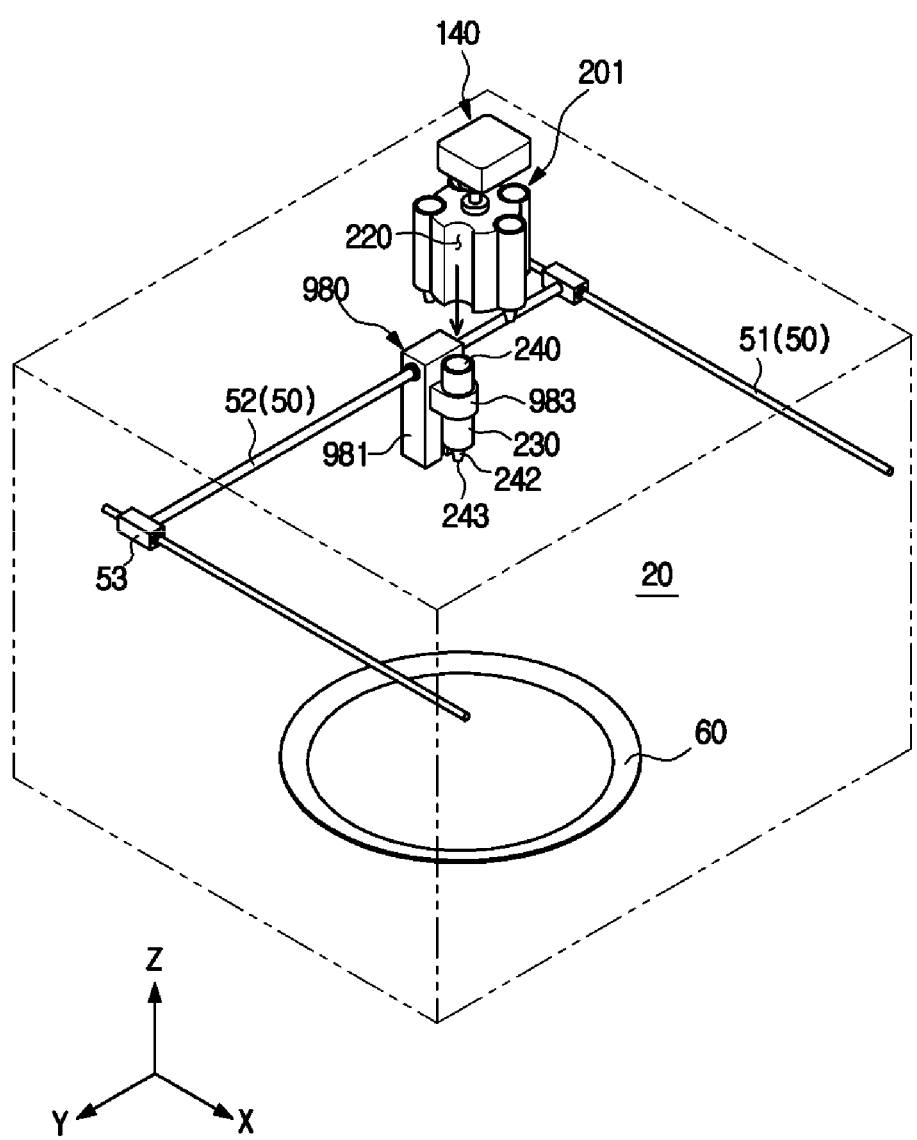
Figure 36C:
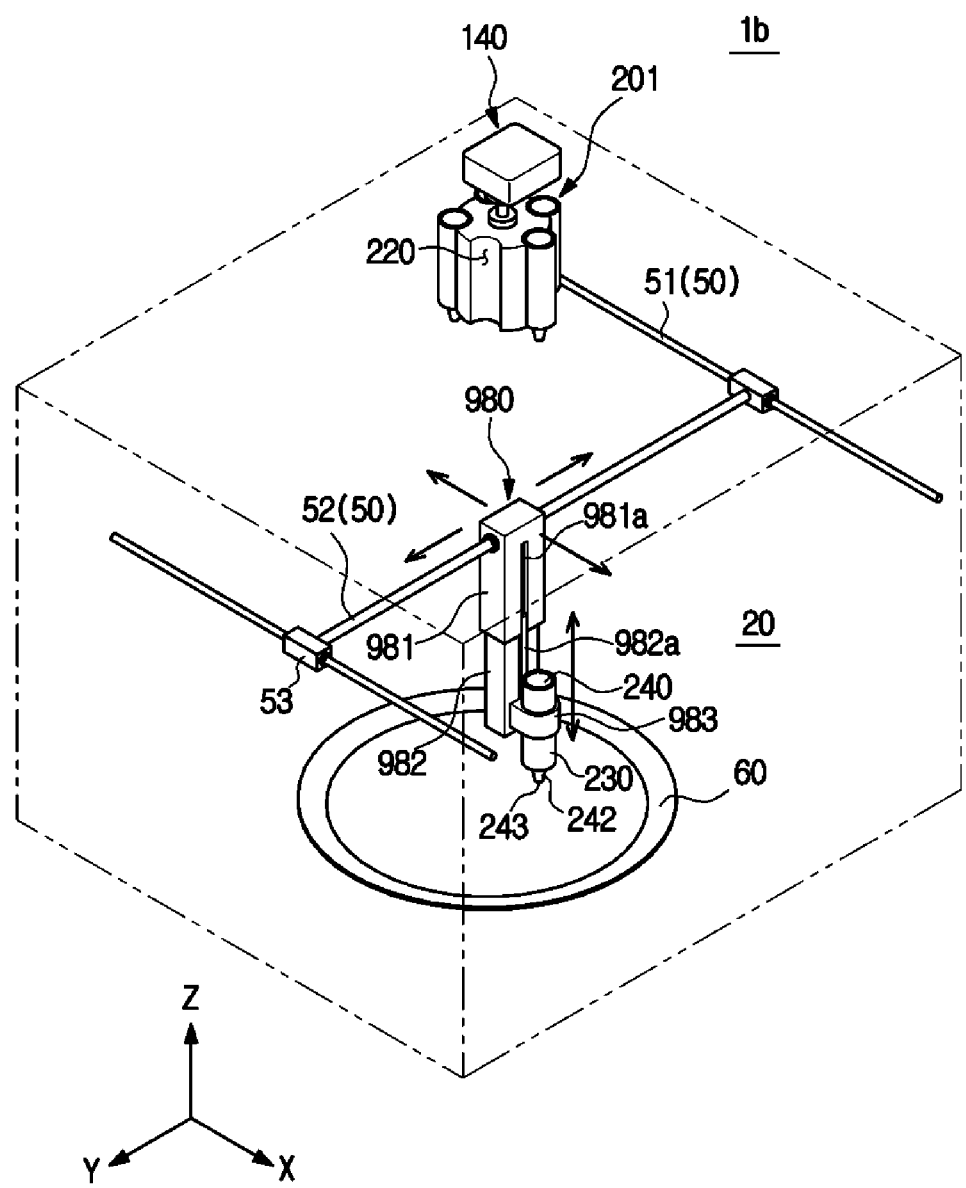

FIGS. 36A, 36B, and 36C are views illustrating a process in which a cartridge is separated from a cartridge body and is individually moved in a cooking apparatus according to still another embodiment. Refer to FIG. 2 for unmarked reference numerals.

Referring to FIGS. 36A, 36B, and 36C, a cooking apparatus 1c may include the main body 10. The main body 10 may form an exterior of the cooking apparatus 1c.

The cooking apparatus 1c may also include the cooking compartment 20 provided in the main body 10. The cooking compartment 20 may be defined by an upper surface (not illustrated), the bottom surface 21, a rear surface (not illustrated), both of the side surfaces 22, and the open front surface 23. An insulating member (not illustrated) may be arranged in the space between the cooking compartment 20 and the main body 10 to insulate the cooking compartment 20.

The cooking apparatus 1c may also include the door 30. A description of the door 30 will be omitted because the description overlaps that made with reference to FIG. 2.

The cooking apparatus 1c may also include the control panel 40 for controlling operation of the cooking apparatus 1c. A description of the control panel 40 will be omitted because the description overlaps that made with reference to FIG. 2.

The cooking apparatus 1c may also include a cartridge assembly 201. The cartridge assembly 201 may be rotatably arranged in the cooking compartment 20. Specifically, the cartridge assembly 201 may be rotatably installed at one side of the upper surface of the cooking compartment 20.

The cartridge assembly 201 may include the cartridge body 210. The cartridge body 210 may have a cylindrical shape. However, the shape of the cartridge body 210 is not limited to the above example, and may be changed in various ways. The plurality of cartridge mounts 220 may be formed in the cartridge body 210. When the cartridge body 210 has a cylindrical shape, the plurality of cartridge mounts 220 may be recessed in a side surface of the cartridge body 210 along the circumferential direction of the cartridge body 210. The rotating shaft coupler 211 may be provided in the cartridge body 210 so that the rotating shaft 141 of the rotation adjusting unit 140 can be coupled thereto.

The cartridge assembly 201 may also include the plurality of cartridges 240 mounted on the plurality of cartridge mounts 220. Food ingredients may be accommodated in the plurality of cartridges 240. The food ingredients may be in a liquid state or a solid state. Also, the food ingredients may be in a powder form. Each of the plurality of cartridges 240 may include the accommodator 241 and the nozzle 242 connected to the accommodator 241 and having the outlet 243.

Different food ingredients may be accommodated in the plurality of cartridges 240.

The cooking apparatus 1c may also include the rotation adjusting unit 140 configured to rotate the cartridge assembly 201. The rotation adjusting unit 140 may include the rotating shaft 141 coupled to the cartridge assembly 201. The rotating shaft 141 may be coupled to the cartridge body 210 so that the cartridge assembly 201 can be rotated. Also, the rotation adjusting unit 140 may also include the driving motor 142. The driving motor 142 is connected to the rotating shaft 141 to provide a rotational force to the rotating shaft 141. Also, the driving motor 142 may be fixed and installed at one side of the upper surface of the cooking compartment 20.

The cooking apparatus 1c may also include a cartridge carrier 980. The cartridge carrier 980 may be installed in the cooking compartment 20 to individually move each of the plurality of cartridges 240 coupled to the cartridge body 210. The cartridge carrier 980 may be installed in the cooking compartment 20 to be capable of linear motion. Specifically, the cartridge carrier 980 may move in the front-rear direction X of the cooking apparatus 1c, the left-right direction Y of the cooking apparatus 1c, and the up-down direction Z of the cooking apparatus 1c. Movement of the cartridge carrier 980 will be described in detail below.

The cartridge carrier 980 may include a casing 981 having a guide 981a. The casing 981 may be coupled to the movable rod 52 to move along the movable rod 52.

The cartridge carrier 980 may also include a movable member 982 slidably coupled to the casing 981. The movable member 982 may be coupled to the casing 981 to be movable in the up-down direction Z of the cooking apparatus 1c. The movable member 982 may include a rib 982a coupled to the guide 981a. The movable member 982 may move in the up-down direction Z of the cooking apparatus 1c while the rib 982a is coupled to the guide 981a.

The cartridge carrier 980 may also include a cartridge holder 983 on which the plurality of cartridges 240 are mounted. As an example, the cartridge carrier 980 may include a single cartridge holder 983 to individually move each of the plurality of cartridges 240. However, the number of the cartridge holders 983 is not limited to one, and may be changed in various ways. The cartridge holder 983 may be formed in the movable member 982.

The cooking apparatus 1c may also include the guide rod 50 provided to guide the cartridge carrier 980. The guide rod 50 may include the fixed rods 51 fixed and installed at both of the side surfaces 22 of the cooking compartment 20. The fixed rods 51 may be fixed and installed at both of the side surfaces 22 of the cooking compartment 20 to longitudinally extend in the front-rear direction X of the cooking apparatus 1c. The fixed rods 51 installed at both of the side surfaces 22 of the cooking compartment 20 may be parallel to each other. The guide rod 50 may also include the movable rod 52 configured to move along the fixed rods 51. The movable rod 52 may longitudinally extend in the left-right direction Y of the cooking apparatus 1c, and both of the ends of the movable rod 52 may be coupled to the fixed rods 51. Specifically, both of the ends of the movable rod 52 may be coupled to the fixed rods 51 by the binding members 53 so that the movable rod 52 can move along the fixed rods 51 in the front-rear direction X of the cooking apparatus 1c. The cartridge carrier 980 may be movably coupled to the movable rod 52. Specifically, the cartridge carrier 980 may be coupled to the movable rod 52 to be movable along the movable rod 52 in the left-right direction Y of the cooking apparatus 1c.

The cartridge carrier 980 may move in the front-rear direction X of the cooking apparatus 1c. Movement of the cartridge carrier 980 in the front-rear direction X of the cooking apparatus 1c may be realized by movement of the movable rod 52 moving along the fixed rods 51.

The cartridge carrier 980 may move in the left-right direction Y of the cooking apparatus 1c. The cartridge carrier 980 may be coupled to the movable rod 52 to be movable along the movable rod 52 in the left-right direction Y of the cooking apparatus 1c.

The cartridge carrier 980 may move in the up-down direction Z of the cooking apparatus 1c. Movement of the cartridge carrier 980 in the up-down direction Z of the cooking apparatus 1c may be realized by an action of the movable member 982 movably coupled to the casing 981. Specifically, when the movable member 982 moves toward a lower portion of the cooking apparatus 1c, the plurality of cartridges 240 mounted on the cartridge holder 983 also move toward the lower portion of the cooking apparatus 1c. Conversely, when the movable member 982 moves toward an upper portion of the cooking apparatus 1c, the plurality of cartridges 240 mounted on the cartridge holder 983 also move toward the upper portion of the cooking apparatus 1c. Movement of the movable member 982 may be guided in the up-down direction Z of the cooking apparatus 1c by coupling between the rib 982a and the guide 981a.

The cooking apparatus 1c may also include the tray 60 arranged on the bottom surface 21 of the cooking compartment 20. A description of the tray 60 will be omitted because the description overlaps that made with reference to FIG. 2.

The cooking apparatus 1c may also include the one or more heaters 70 for heating food. A description of the one or more heaters 70 will be omitted because the description overlaps that made with reference to FIG. 2.

Referring to FIGS. 36A, 36B, and 36C, the plurality of cartridges 240 may be separated from the cartridge body 210 and individually move. For convenience of description, it is assumed that different food ingredients are accommodated in the plurality of cartridges 240.

When a command to select a specific cartridge which accommodates a specific food ingredient among the plurality of cartridges 240 is input to the cooking apparatus 1c, the specific cartridge is searched for. Here, the cartridge assembly 201 may rotate about the rotating shaft 141. When the specific cartridge is found, the specific cartridge is separated from the cartridge body 210 and mounted on the cartridge holder 983 of the cartridge carrier 980. Here, the specific cartridge may be separated from the cartridge body 210 and mounted on the cartridge holder 983 in the up-down direction Z of the cooking apparatus 1c. The specific cartridge may freely move in the cooking compartment 20 integrally with the cartridge carrier 980 while mounted on the cartridge holder 983.

Figure 37:
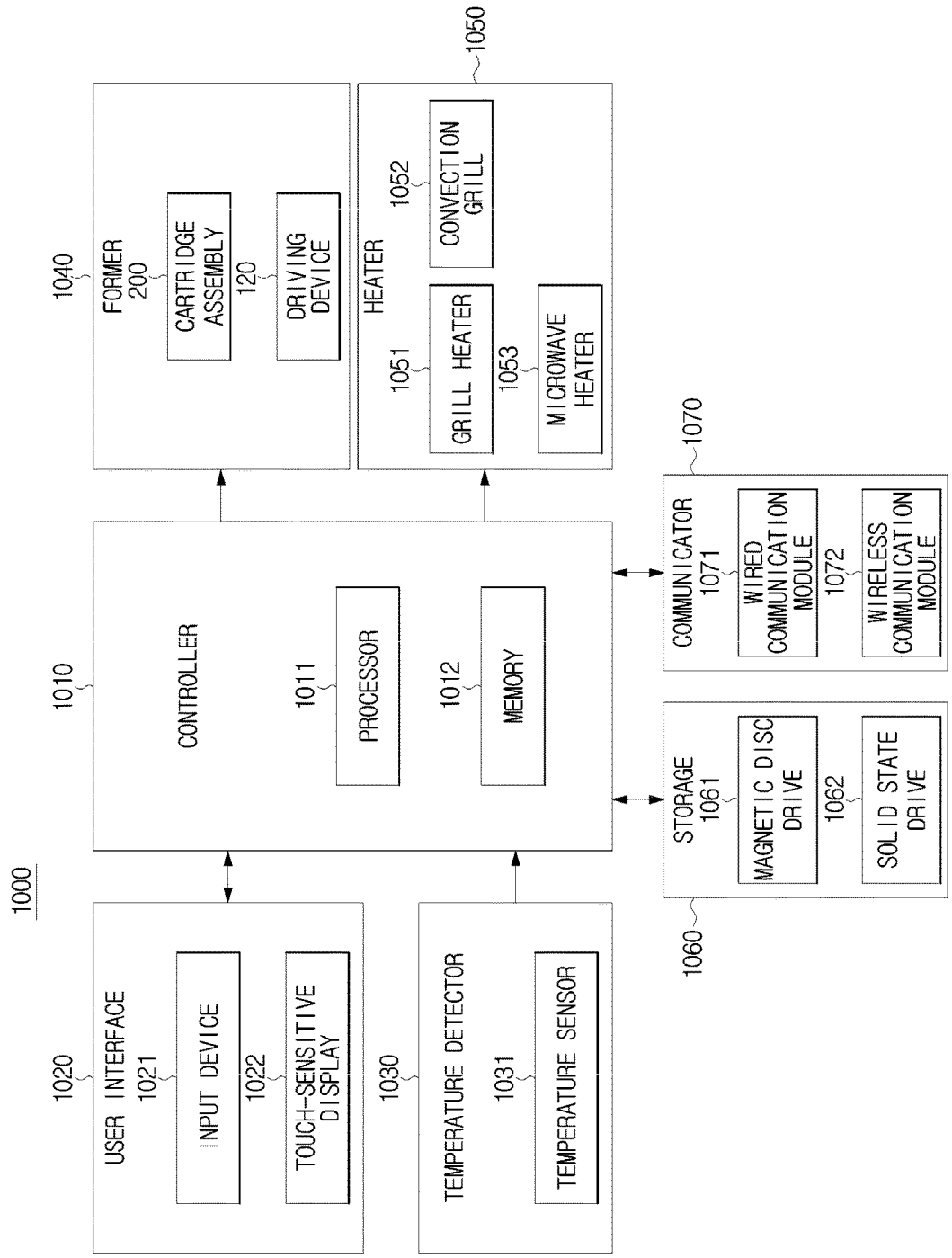
FIG. 37 illustrates a block diagram of a cooking apparatus according to an embodiment of the present disclosure.

FIG. 37 illustrates a block diagram of a cooking apparatus according to an embodiment of the present disclosure.

Referring to FIG. 37, a cooking apparatus 1000 may include a user interface 1020 configured to interact with a user, a temperature detector 1030 (e.g., a temperature sensor or sensing device) configured to detect a temperature of a cooking compartment, a former 1040 (e.g., a shaping device) configured to form food, a heater 1050 (e.g., a heating device) configured to heat the food, a storage 1060 (e.g., a memory) configured to store a program and data, a communicator 1070 (e.g., a transceiver) configured to communicate with external devices, and a controller 1010 (e.g., at least one processor) configured to control operation of the cooking apparatus 1000.

The user interface 1020 may include an input device 1021 configured to receive a user command and a touch-sensitive display 1022 configured to receive a user's touch input and display information in response to the received touch input.

The input device 1021 may include various types of inputters such as a push button, a keyboard, a touch button, a lever, a slide switch, a joystick, a jog dial, and a shuttle dial, which are configured to receive a user command.

The input device 1021 may receive a pre-assigned user command. For example, the input device 1021 may include a power button configured to receive a power-on command and a power-off command of the cooking apparatus 1000, an operation button configured to receive a start button and a stop button for an operation of the cooking apparatus 1000, and a time setting dial configured to set an operation time of the cooking apparatus 1000.

The touch-sensitive display 1022 may receive a touch input of a user and display information in response to the user's touch input.

The touch-sensitive display 1022 may include a touch panel configured to receive a touch input of a user, a display panel configured to visually display information, and a controller configured to control operation of the touch-sensitive display 1022. The touch panel may be laminated on the display panel.

The touch-sensitive display 1022 may display various graphic user interfaces and receive a touch input of a user corresponding to the graphic user interfaces. For example, the touch-sensitive display 1022 may display a screen through which a food model, i.e., a 3D shape, ingredients, a color, and the like of food, are input and may receive an input of a food model according to a touch input of a user.

The touch panel of the touch-sensitive display 1022 may include a capacitance type touch panel, a resistive film type touch panel, an ultrasonic type touch panel, an infrared type touch panel, or the like. Also, the display panel of the touch-sensitive display 1022 may include a liquid crystal display (LCD) panel, a light emitting diode (LED) panel, an organic LED (OLED) panel, or the like.

The temperature detector 1030 may include a temperature sensor 1031 configured to detect the temperature of a cooking compartment in which food is heated and output an electrical signal according to the detected temperature. The temperature sensor 1031 may be provided in the cooking compartment and include a thermistor whose electrical resistance varies with temperature.

The former 1040 corresponds to the above-described food forming module and may form food according to a shape, ingredients, and a color of food (hereinafter, referred to as a "food model") input by a user.

The former 1040 may include the cartridge assembly 200 and the driving device 120 configured to drive the cartridge assembly 200.

The cartridge assembly 200 may store food ingredients and discharge the food ingredients according to food formation data of the controller 1010.

The driving device 120 may move the cartridge assembly 200 and place the cartridge assembly 200 at a position set by the food formation data of the controller 1010.

Specifically, the cartridge assembly 200 may discharge the food ingredients while repeatedly being moved and stopped by the driving device 120. The food ingredients discharged by the cartridge assembly 200 may form food.

The heater 1050 may heat food in the cooking compartment in various ways. For example, the heater 1050 may include a grill heater 1051 (e.g., a grill heating device) configured to emit radiant heat into the cooking compartment, a convection grill 1052 configured to supply hot air into the cooking compartment, a microwave heater 1053 configured to emit microwaves into the cooking compartment, and the like.

The grill heater 1051 may include a hot wire configured to convert electrical energy into thermal energy. The hot wire of the grill heater 1051 may be provided at an upper portion of the cooking compartment and may emit radiant heat toward food in the cooking compartment from the upper portion of the cooking compartment.

The convection grill 1052 may include a hot wire configured to convert electrical energy into thermal energy, a fan configured to circulate air, and a motor configured to drive the fan. The hot wire of the convection grill 1052 may heat surrounding air, and the fan may supply the air heated by the hot wire into the cooking compartment.

The microwave heater 1053 may include a magnetron configured to generate microwaves, an antenna configured to emit the generated microwaves into the cooking compartment, and the like. The microwave heater 1053 may generate microwaves having a frequency of about 2.4 giga-hertz (GHz) to 2.5 GHz. The microwave heater 1053 may heat food by water molecules in the food being agitated by microwaves.

A user may select various cooking methods according to food and a cooked food item, and one or more of the grill heater 1051, the convection grill 1052, and the microwave heater 1053 may be operated according to the cooking methods. For example, the convection grill 1052 may be operated when the user cooks a cookie or pizza, and the grill heater 1051 may be operated when the user cooks meat such as a sausage.

The storage 1060 may include a control program for controlling operation of the cooking apparatus 1000. For example, an operating system (OS) configured to manage resources (software and hardware) included in the cooking apparatus 1000, a modeling program configured to receive information on a shape, ingredients, and a color of food via the user interface 1020, a food forming program configured to control the former 1040 to form food according to a food model, a food heating program configured to control the heater 1050 to heat food according to a cooking method, and the like may be stored in the storage 1060.

Also, the storage 1060 may store a plurality of food models and a database that includes cooking methods for each of the plurality of food models. A food model may include a shape, ingredients, color, and the like of food, and a cooking method may include the heater 1050 being operated, a cooking temperature in the cooking compartment, a cooking time during which the heater 1050 is operated, and the like.

The storage 1060 may include a magnetic disc drive 1061, a solid state drive 1062, and the like configured to store a program and data for a long period of time.

The communicator 1070 may receive information from a user device and transmit information to the user device. For example, the communicator 1070 may receive information on a food model from a user device and transmit information on operation of the cooking apparatus 1000 to the user device.

The communicator 1070 may include a wired communication module 1071 configured to transmit and receive information to and from a user device in a wired manner and a wireless communication module 1072 configured to wirelessly transmit and receive information to and from the user device.

The wired communication module 1071 may transmit and receive information using various wired communication protocols such as ethernet or universal serial bus (USB) communication. Specifically, the wired communication module 1071 may transmit information to a user device or an information relay apparatus via a communication cable and receive information from the user device or the information relay apparatus via the communication cable. The wired communication module 1071 may include a transceiver, a communication port, and the like.

The wireless communication module 1072 may use various wireless communication protocols such as Wi-Fi™ and Bluetooth® (BT) to transmit and receive information. Specifically, the wireless communication module 1072 may transmit information to a user device or an information relay apparatus via radio waves and receive information from the user device or the information relay apparatus via radio waves. The wireless communication module 1072 may include a transceiver, an antenna, and the like.

The controller 1010 may include a processor 1011 configured to generate a control signal for controlling operation of the cooking apparatus 1000 and a memory 1012 (e.g., a storage) configured to store a program and data for controlling operation of the cooking apparatus 1000.

The processor 1011 may process a touch input of a user that is input via the user interface 1020 and generate a food model on the basis of the touch input.

Also, the processor 1011 may process data related to a food model that is input via the user interface 1020, received via the communicator 1070, or stored in the storage 1060 and generate food formation data for forming food on the basis of the food model. For example, the food formation data may include information on food ingredients constituting food, information on coordinates at which food ingredients will be discharged, and information on an amount of discharged food ingredients. The former 1040 may form food according to the food formation data output by the processor 1011.

Also, the processor 1011 may process data related to a cooking method that is input via the user interface 1020, received via the communicator 1070, or stored in the storage 1060 and generate food heating data for heating food on the basis of the cooking method. For example, the food heating data may include information on heating devices 1051, 1052, 1053, and 1054 being operated, information on a temperature of the cooking compartment, and information on a cooking time during which the heating devices 1051, 1052, 1053, and 1054 are operated. The heater 1050 may heat food according to the food heating data output by the processor 1011.

The memory 1012 may store a program for receiving inputs of a food model and a cooking method via the user interface 1020 and a program for processing data related to a food model and/or data related to a cooking method and generating food formation data and/or food heating data. Also, the memory 1012 may temporarily store data related to a food model and/or data related to a cooking method to be processed by the processor 1011 and temporarily store food formation data and/or food heating data output by the processor 1011.

The memory 1012 may include a volatile memory, such as a static random access memory (SRAM) and a dynamic RAM (DRAM), and a nonvolatile memory such as a read-only memory (ROM), an erasable programmable ROM (EPROM), and an electrically erasable PROM (EEPROM).

In this way, the controller 1010 may generate data related to a food model and/or data related to a cooking method according to a touch input that is input via the user interface 1020 and output food formation data for controlling operation of the former 1040 according to the food model and food heating data for controlling operation of the heater 1050 according to the cooking method.

Figure 38:
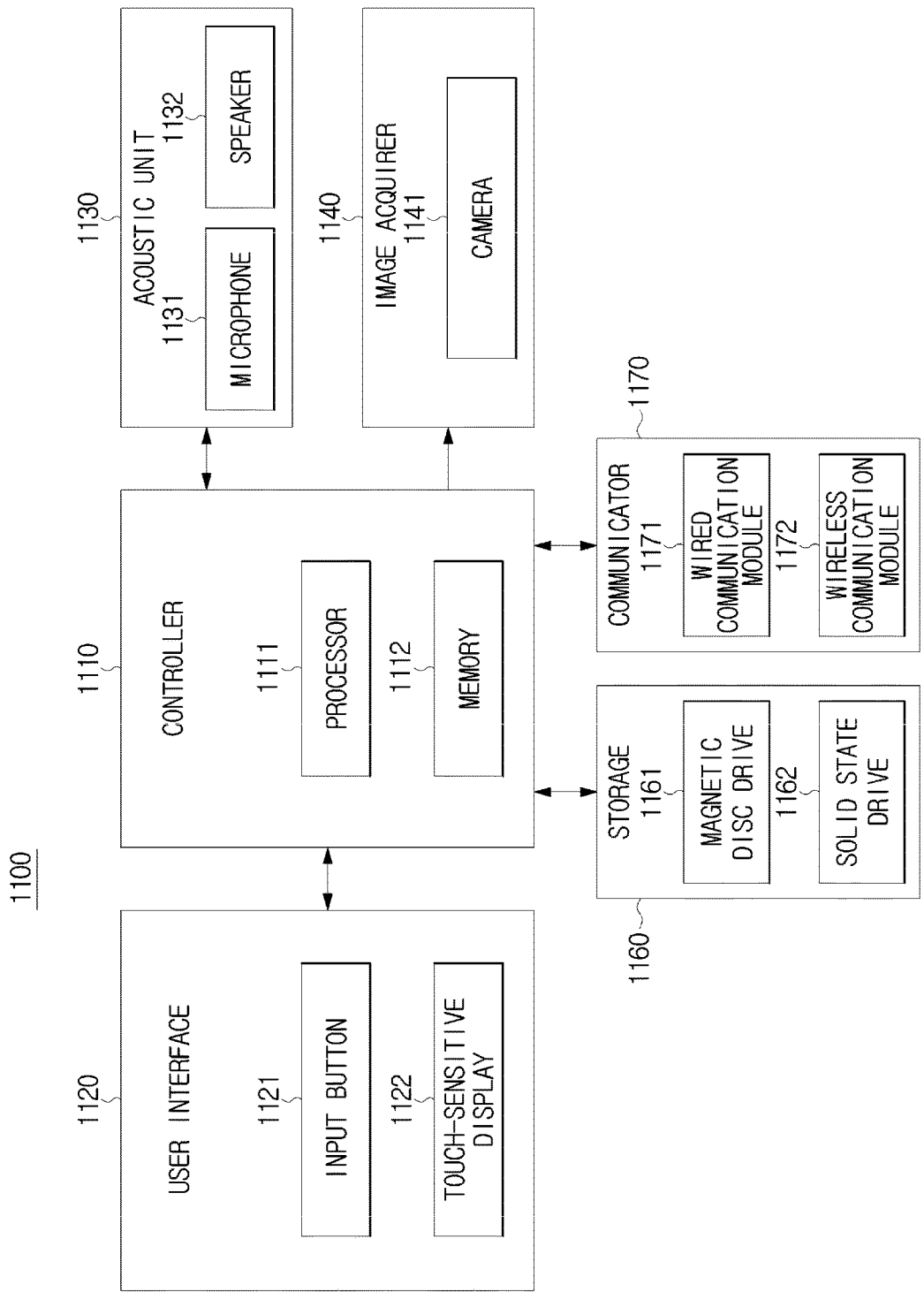
FIG. 38 illustrates a block diagram of a user device according to an embodiment of the present disclosure.

FIG. 38 illustrates a block diagram of a user device according to an embodiment of the present disclosure.

Referring to FIG. 38, a user device 1100 may include a user interface 1120 configured to interact with a user, an acoustic unit 1130 (e.g., an acoustic device or a sound device) configured to receive and output a sound, an image acquirer 1140 (e.g., an image acquisition device) configured to acquire an image, a storage 1160 (e.g., a memory) configured to store a program and data, a communicator 1170 (e.g., a transceiver) configured to communicate with external devices, and a controller 1110 (e.g., at least one processor) configured to control operation of the user device 1100.

The user interface 1120 may include an input button 1121 (e.g., an input device) configured to receive a user command and a touch-sensitive display 1122 configured to display information in response to a received touch input.

The input button 1121 (e.g., an input device) may include various types of inputters such as a push button, a keyboard, a touch button, a lever, a slide switch, a joystick, a jog dial, a shuttle dial, a mouse, and a track ball, which are configured to receive a user command.

The input button 1121 may receive a pre-assigned user command. For example, the input button 1121 may include a power button configured to receive a power-on command and a power-off command of the user device 1100, a volume button configured to adjust a volume of a sound output by the acoustic unit 1130 of the user device 1100, and the like.

The touch-sensitive display 1122 may receive a touch input of a user and display information in response to the user's touch input.

The touch-sensitive display 1122 may include a touch panel configured to receive a touch input of a user, a display panel configured to visually display information, and a controller configured to control an operation of the touch-sensitive display 1122. The touch panel may be laminated on the display panel.

The touch-sensitive display 1122 may display various graphic user interfaces and receive a touch input of a user corresponding to the graphic user interfaces. For example, the touch-sensitive display 1122 may display a screen through which a food model, i.e., a 3D shape, ingredients, color, and the like of food, are input and may receive an input of a food model according to a touch input of a user.

The acoustic unit 1130 may include a microphone 1131 configured to receive a sound from a user and a speaker 1132 configured to output a sound. The microphone 1131 may acquire an acoustic signal and output an electrical signal corresponding to the acquired acoustic signal. Also, the speaker 1132 may receive an electrical signal and output an acoustic signal corresponding to the received electrical signal.

The image acquirer 1140 may include a camera 1141 configured to capture an image. The camera 1141 may include a plurality of optical sensors configured to output an electrical signal corresponding to color and intensity of light reflected from an object or emitted from an object. The plurality of optical sensors may be arranged in two-dimensions so that the camera 1141 can convert an image into image data which is an electrical signal. The image data may include information on a shape and color of an object.

The storage 1160 may include a control program for controlling operation of the user device 1100. For example, an OS configured to manage resources (software and hardware) included in the user device 1100, a modeling program configured to receive information on a shape, ingredients, and a color of food via the user interface 1120, an imaging program configured to process an image acquired by the image acquirer 1140 and store the processed image, and the like may be stored in the storage 1160.

Also, the storage 1160 may store a plurality of food models and a database that includes cooking methods for each of the plurality of food models. A food model may include the shape, ingredients, color, and the like of food, and a cooking method may include the heater 1050 of the cooking apparatus 1000 being operated, a cooking temperature in the cooking compartment of the cooking apparatus 1000, a cooking time during which the heater 1050 of the cooking apparatus 1000 is operated, and the like.

The storage 1160 may include a magnetic disc drive 1161, a solid state drive 1162, and the like configured to store a program and data for a long period of time.

The communicator 1170 may receive information from a cooking apparatus and transmit information to the cooking apparatus. For example, the communicator 1170 may transmit information on a food model to a cooking apparatus and receive information on operation of the cooking apparatus from the cooking apparatus.

The communicator 1170 may include a wired communication module 1171 configured to transmit and receive information to and from a cooking apparatus in a wired manner and a wireless communication module 1172 configured to wirelessly transmit and receive information to and from the cooking apparatus.

The wired communication module 1171 may transmit and receive information using various wired communication protocols such as ethernet or universal serial bus (USB) communication. Specifically, the wired communication module 1171 may transmit information to a user device or an information relay apparatus via a communication cable and receive information from the user device or the information relay apparatus via the communication cable. The wired communication module 1171 may include a transceiver, a communication port, and the like.

The wireless communication module 1172 may use short-range wireless communication, such as Wi-Fi™ and Bluetooth®, and/or mobile communication, such as GSM, CDMA, wideband CDMA (WCDMA), universal mobile telecommunication system (UMTS), time division multiple access (TDMA), and long term evolution (LTE), to transmit and receive information. Specifically, the wireless communication module 1172 may transmit information to the user device or an information relay apparatus via radio waves and receive information from the user device or the information relay apparatus via radio waves. The wireless communication module 1172 may include a transceiver, an antenna, and the like.

The controller 1110 may include a processor 1111 configured to generate a control signal for controlling operation of the user device 1100 and a memory 1112 configured to store a program and data for controlling operation of the user device 1100.

The processor 1111 may process a touch input of a user that is input via the user interface 1120 and generate data related to a food model and data related to a cooking method on the basis of the touch input. Also, the processor 1111 may generate a communication control signal for transmitting the data related to a food model and the data related to a cooking method to the cooking apparatus 1000. The communicator 1170 may transmit the data related to a food model and the data related to a cooking method to the cooking apparatus 1000 according to the communication control signal.

The memory 1112 may store a program for receiving inputs of a food model and a cooking method via the user interface 1120. Also, the memory 1112 may temporarily store data related to a food model and data related to a cooking method generated by the processor 1111.

The memory 1112 may include a volatile memory, such as an SRAM and a DRAM, and a nonvolatile memory, such as a ROM, an EPROM, and an EEPROM.

In this way, the controller 1110 may generate data related to a food model and/or data related to a cooking method according to a touch input that is input via the user interface 1120 and transmit the data related to a food model and/or the data related to a cooking method to the cooking apparatus 1000 via the communicator 1170.

Hereinafter, a cooking operation of the cooking apparatus 1000 will be described.

Figure 39:
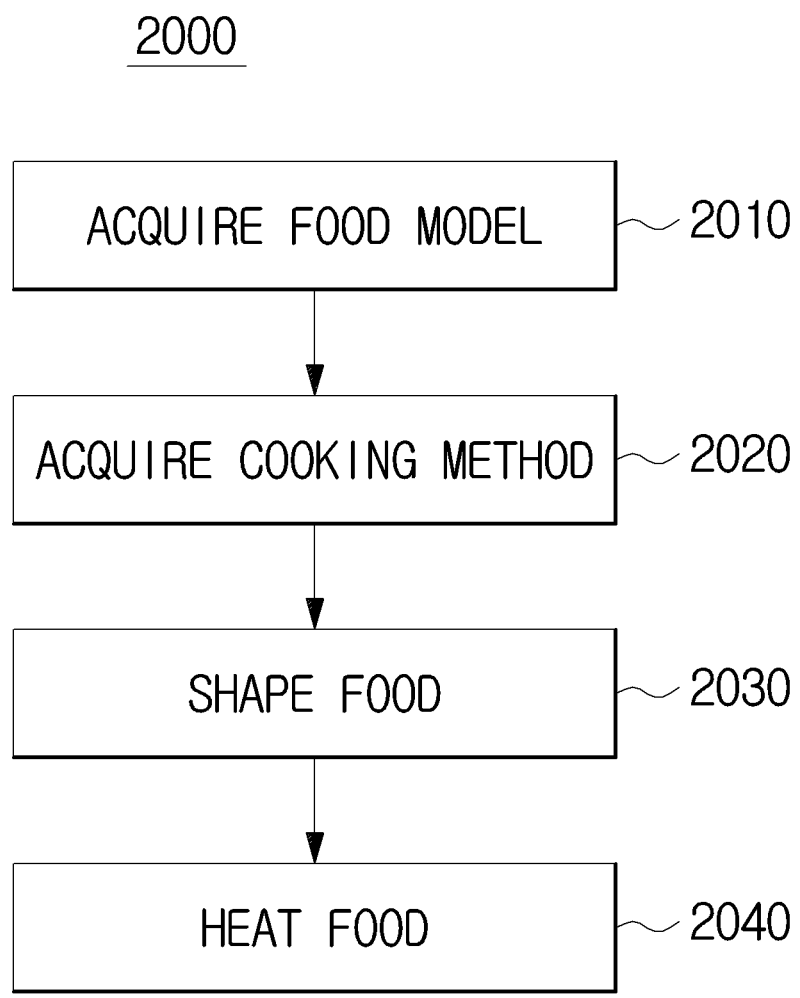
FIG. 39 illustrates a cooking operation of the cooking apparatus according to an embodiment of the present disclosure.

FIG. 39 illustrates a cooking operation of the cooking apparatus according to an embodiment of the present disclosure.

Referring to FIG. 39, a cooking operation (2000) of the cooking apparatus 1000 may include acquiring a food model in operation 2010, acquiring a cooking method in operation 2020, forming food in operation 2030, and heating the food in operation 2040.

The acquiring of the food model in operation 2010 may include a series of process in which inputs of a shape, ingredients, and a color of food are received and a food model including the shape, the ingredients, and the color of the food is generated.

For example, the cooking apparatus 1000 may generate a food model according to a touch input of a user that is input via the user interface 1020, load data related to a food model from the storage 1060, or receive data related to a food model via the communicator 1070.

The generating of the food model is not performed only by the cooking apparatus 1000. For example, the user device 1100 may generate the food model on the basis of the user's touch input that is input via the user interface 1120 and transmit the data related to the food model to the cooking apparatus 1000 via the communicator 1170.

The acquiring of the cooking method in operation 2020 may include a series of process in which a heating device (e.g., a grill heater, a convection grill, a microwave heater, or the like) configured to heat the food is selected, a cooking temperature in a cooking compartment is set, and a cooking time is set.

For example, the cooking apparatus 1000 may select the heater 1050 according to a touch input of the user that is input via the user interface 1020 and set the cooking temperature and the cooking time.

The acquiring of the cooking method is not performed only by the cooking apparatus 1000. For example, the user device 1100 may select the heater 1050 of the cooking apparatus 1000 according to the user's touch input that is input via the user interface 1120 and set the cooking temperature and the cooking time. Also, the user device 1100 may transmit data related to a cooking method to the cooking apparatus 1000 via the communicator 1170.

The forming or shaping of the food in operation 2030 may include a series of process in which the former 1040 of the cooking apparatus 1000 forms the food according to the food model.

For example, the cooking apparatus 1000 may determine food ingredients constituting the food according to the food model, calculate coordinates at which the food ingredients will be discharged, and calculate a discharge amount of the food ingredients to be discharged. The food ingredients, the discharge coordinates, and the discharge amount may constitute food formation data. Also, the cooking apparatus 1000 may select a cartridge in which a food ingredient is accommodated, move the cartridge to the discharge coordinates, and drive the cartridge according to the discharge amount.

The heating of the food in operation 2040 may include a series of process in which the heater 1050 of the cooking apparatus 1000 heats the food according to the cooking method.

For example, the cooking apparatus 1000 may select the heating devices 1051, 1052, 1053, and 1054 which are operated according to the cooking method and operate the heating devices 1051, 1052, 1053, and 1054 until a temperature of the cooking compartment reaches the cooking temperature. Also, when the temperature of the cooking compartment reaches the cooking temperature, the cooking apparatus 1000 may repeatedly operate the heating devices 1051, 1052, 1053, and 1054 and stop the operation thereof so that the temperature of the cooking compartment is maintained at the cooking temperature. Also, when the cooking time is elapsed after the operation of the heating devices 1051, 1052, 1053, and 1054 start, the cooking apparatus 1000 may end the operation of the heating devices 1051, 1052, 1053, and 1054.

As described above, the cooking apparatus 1000 may cook food having a shape desired by a user by acquiring a food model and a cooking method and forming/heating the food.

Figure 40:
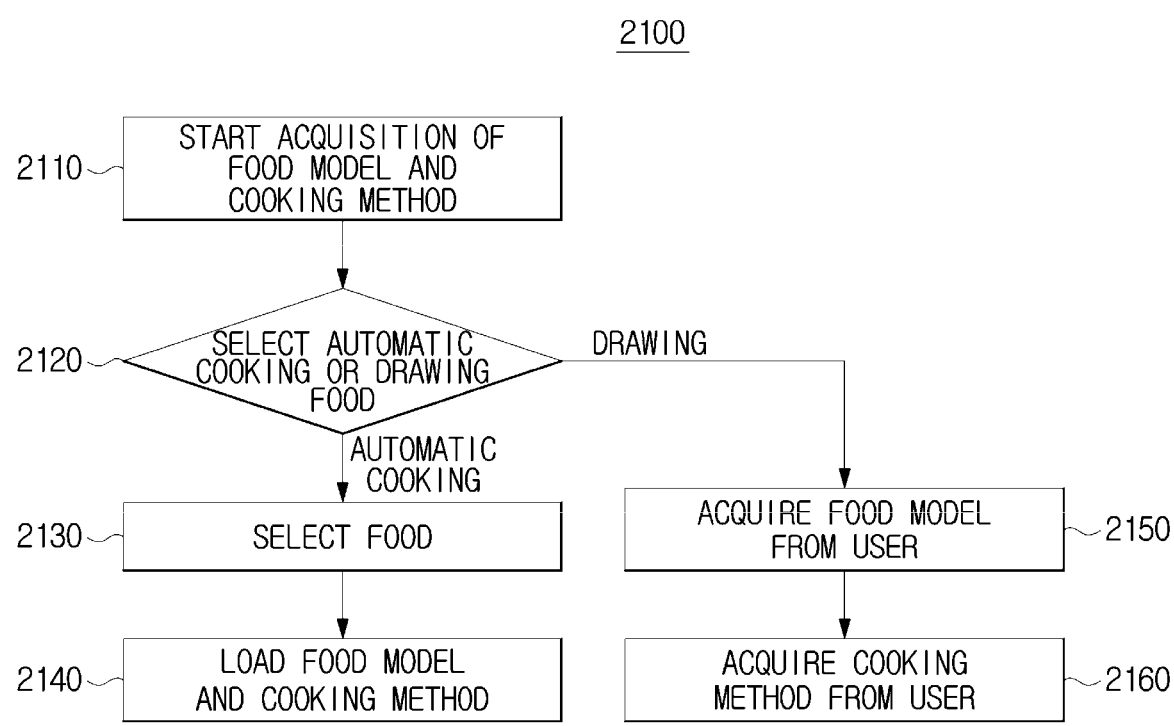
FIG. 40 illustrates a method of acquiring a food model and a cooking method according to an embodiment of the present disclosure.
Figure 41:
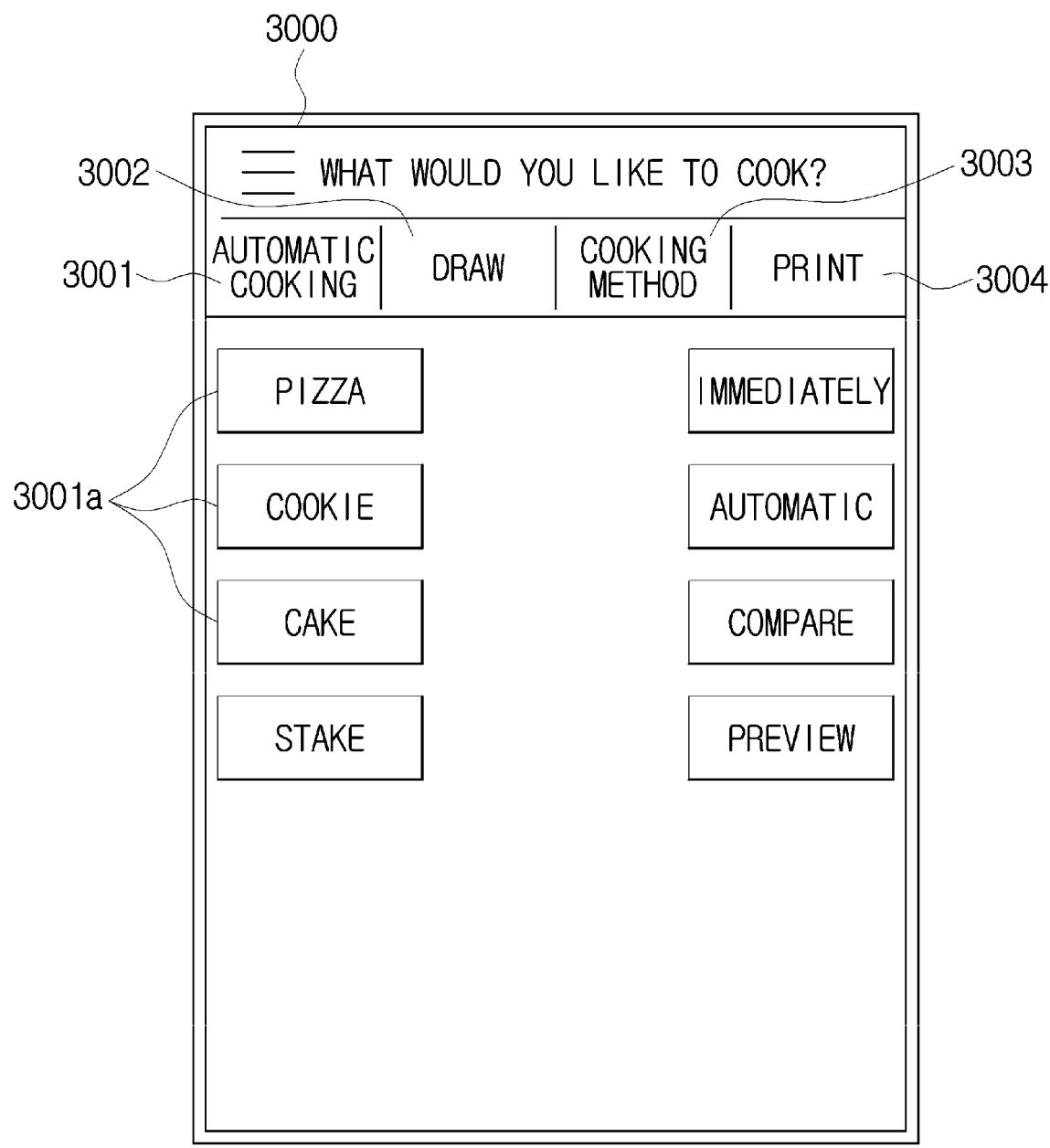
FIG. 41 illustrates a main screen according to an embodiment of the present disclosure.
Figure 42:
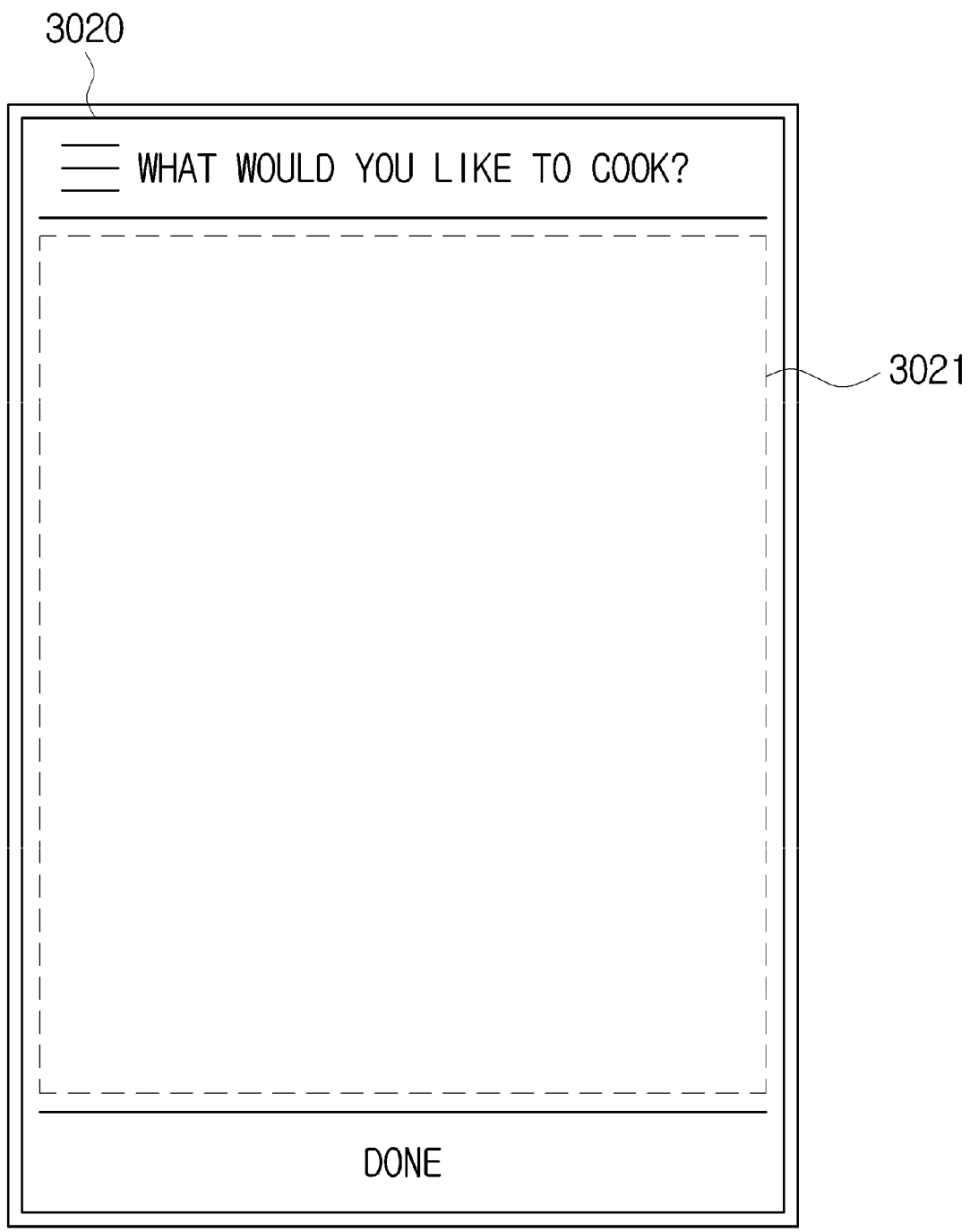
FIG. 42 illustrates a model production screen for producing a food model according to an embodiment of the present disclosure.
Figure 43:
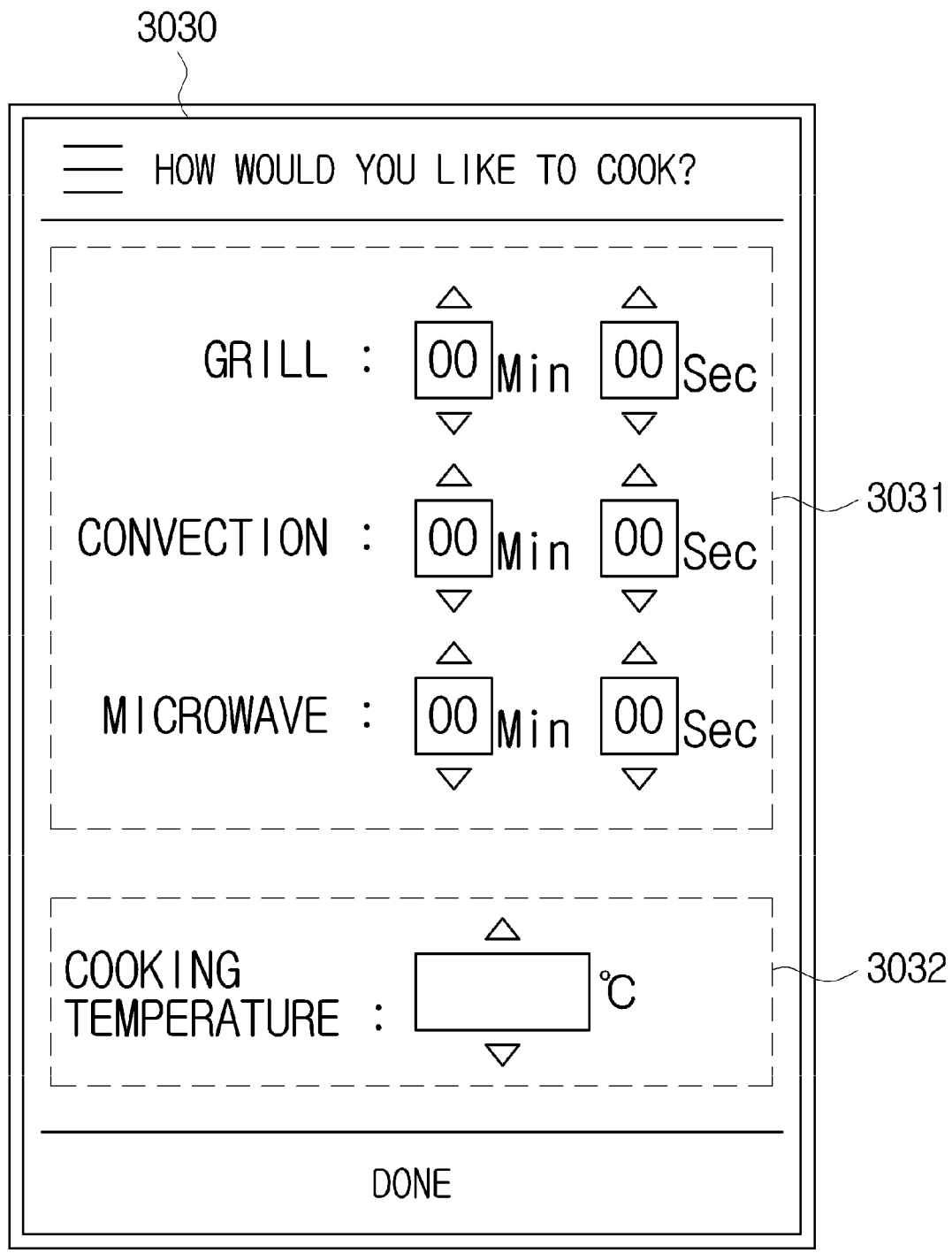
FIG. 43 illustrates a cooking method setting screen for setting a method of cooking food according to an embodiment of the present disclosure.

FIG. 40 illustrates a method of acquiring a food model and a cooking method according to an embodiment of the present disclosure. FIG. 41 illustrates a main screen according to an embodiment of the present disclosure. FIG. 42 illustrates a model production screen for producing a food model according to an embodiment. Also, FIG. 43 illustrates a cooking method settings screen for setting a method of cooking food according to an embodiment.

A method of acquiring a food model and a cooking method (2100) will be described with reference to FIGS. 40, 41, 42, and 43.

Acquisition of a food model and a cooking method is started in operation 2110.

The cooking apparatus 1000 may start acquiring the food model and the cooking method in response to a food forming/cooking command input by a user via the user interface 1020.

As described above, the acquiring of the food model and the cooking method is not performed only by the cooking apparatus 1000. The user device 1100 may also start acquiring the food model and the cooking method in response to the food forming/cooking command input by the user via the user interface 1120.

Automatic cooking or drawing food is selected by the user in operation 2120.

The cooking apparatus 1000 may acquire the food model and the cooking method through various methods.

The cooking apparatus 1000 may use a pre-produced food model and a preset cooking method (automatic cooking) or receive an input of a food model and a cooking method from the user (drawing food). In automatic cooking, the cooking apparatus 1000 may use a pre-produced food model and a preset cooking method to automatically form food and heat the formed food. In drawing food, the cooking apparatus 1000 may receive an input of a food model and a cooking method from the user, form food according to the input food model, and heat the food according to the input cooking method.

The user may select a method through which the cooking apparatus 1000 acquires the food model and the cooking method. For example, the controller 1010 of the cooking apparatus 1000 may display a main screen 3000 for selecting a method of acquiring a food model and a cooking method via the user interface 1020.

The main screen 3000 may include an automatic cooking button 3001 for using the pre-produced food model and the preset cooking method, a model producing button 3002 for directly receiving an input of a food model from the user, a cooking method setting button 3003 for receiving an input of a cooking method from the user, a print button 3004 for forming and heating food, and the like. Automatic cooking may be selected when the user touches the automatic cooking button 3001 of the main screen 3000, and drawing food may be selected when the user touches the model producing button 3002 of the main screen 3000.

The user may also select the method of acquiring a food model and a cooking method via the user device 1100. For example, the controller 1110 of the user device 1100 may display the main screen 3000 including the automatic cooking button 3001, the model producing button 3002, and the cooking method setting button 3003 illustrated in FIG. 41 on the user interface 1120. Automatic cooking or drawing food may be selected according to a touch input of the user on the main screen 3000.

When automatic cooking is selected ("automatic cooking" from operation 2120), food is selected by the user in operation 2130.

When automatic cooking is selected the user may select food to be cooked. For example, the controller 1010 of the cooking apparatus 1000 may display the main screen 3000 illustrated in FIG. 41 on the user interface 1020. The main screen 3000 may include food buttons 3001a that indicate names of various kinds of food such as cookie, pizza, cake, and steak. The user may check a name of food displayed on the plurality of food buttons 3001a and touch any one of the plurality of food buttons 3001a.

Also, the user may select food via the user device 1100. For example, the controller 1110 of the user device 1100 may display the main screen 3000 including the food buttons 3001a that indicate names of various kinds of food illustrated in FIG. 41 on the user interface 1120. Food may be selected according to a touch input of the user on the food buttons 3001a.

The food model and the cooking method related to the food selected by the user are acquired in operation 2140.

The cooking apparatus 1000 may acquire a pre-produced food model and a preset cooking method related to the food selected via the food button 3001a of the main screen 3000 using various methods. For example, the controller 1010 of the cooking apparatus 1000 may load data related to the food model and data related to the cooking method from the storage 1060. The data related to the food model and the data related to the cooking method may be pre-stored in the storage 1060 of the cooking apparatus 1000. Food models and cooking methods in the storage 1060 may be pre-generated and pre-stored by a designer of the cooking apparatus 1000 or may be generated and stored by the user.

As another example, the controller 1010 of the cooking apparatus 1000 may acquire the food model and the cooking method from an external device via the communicator 1070. The controller 1010 may request the food model and the cooking method from the user device 1100 and other server devices via the communicator 1170, and may receive the data related to the food model and the data related to the cooking method from the user device 1100 and the other server devices.

The user device 1100 may also acquire the pre-produced food model and the preset cooking method related to the food using various methods. For example, the controller 1110 of the user device 1100 may load the data related to the food model and the data related to the cooking method from the storage 1160 or receive the data related to the food model and the data related to the cooking method from the other server devices via the communicator 1170. Then, the user device 1100 may transmit the data related to the food model and the data related to the cooking method to the cooking apparatus 1000 according to a user command.

In this way, during automatic cooking, the cooking apparatus 1000 or the user device 1100 may acquire a pre-produced food model and a preset cooking method. Also, the cooking apparatus 1000 may form food according to the pre-produced food model and heat the food according to the preset cooking method.

When drawing food is selected ("draw food" from (2120)), the food model is input by the user in operation 2150.

When drawing food is selected, the user may produce the food model via the cooking apparatus 1000. For example, the controller 1010 of the cooking apparatus 1000 may display a model production screen 3020 for producing a food model illustrated in FIG. 42 on the user interface 1020. The model production screen 3020 may include a model drawing area 3021 in which the user may directly draw the food model. The user may touch the model drawing area 3021 and draw the food model in the model drawing area 3021 by moving a touched point.

The user may also produce the food model also via the user device 1100. For example, the controller 1110 of the user device 1100 may display the model production screen 3020 including the model drawing area 3021 for producing a food model illustrated in FIG. 42 on the user interface 1120. The user may draw the food model in the model drawing area 3021 displayed on the user device 1100, and the controller 1110 of the user device 1100 may transmit the data related to the food model to the cooking apparatus 1000.

A method of cooking the food is input by the user in operation 2160.

When drawing food is selected, the user may set a method of cooking food via the cooking apparatus 1000. For example, the controller 1010 of the cooking apparatus 1000 may display a cooking method settings screen 3030 for setting a method of cooking food illustrated in FIG. 43 on the user interface 1020. The cooking method settings screen 3030 may include a first settings area 3031 for setting a heater (e.g., a grill, a convection, a microwave, or the like) and setting a cooking time for cooking by the heater and a second settings area 3032 for setting a cooking temperature for cooking food. The user may select a heater and set a cooking time and a cooking temperature using the first settings area 3031 and the second settings area 3032 of the cooking method settings screen 3030.

The user may also set the method of cooking food via the user device 1100. For example, the controller 1110 of the user device 1100 may display the cooking method settings screen 3030 for setting a method of cooking food illustrated in FIG. 43 on the user interface 1120. After the cooking method is set by the user, the controller 1110 of the user device 1100 may transmit the data related to the cooking method to the cooking apparatus 1000 via the communicator 1170.

In this way, during drawing food, the cooking apparatus 1000 or the user device 1100 may receive an input of a food model and a cooking method from a user. Also, the cooking apparatus 1000 may form food according to the food model produced by the user and heat the food according to the cooking method set by the user.

Figure 44:
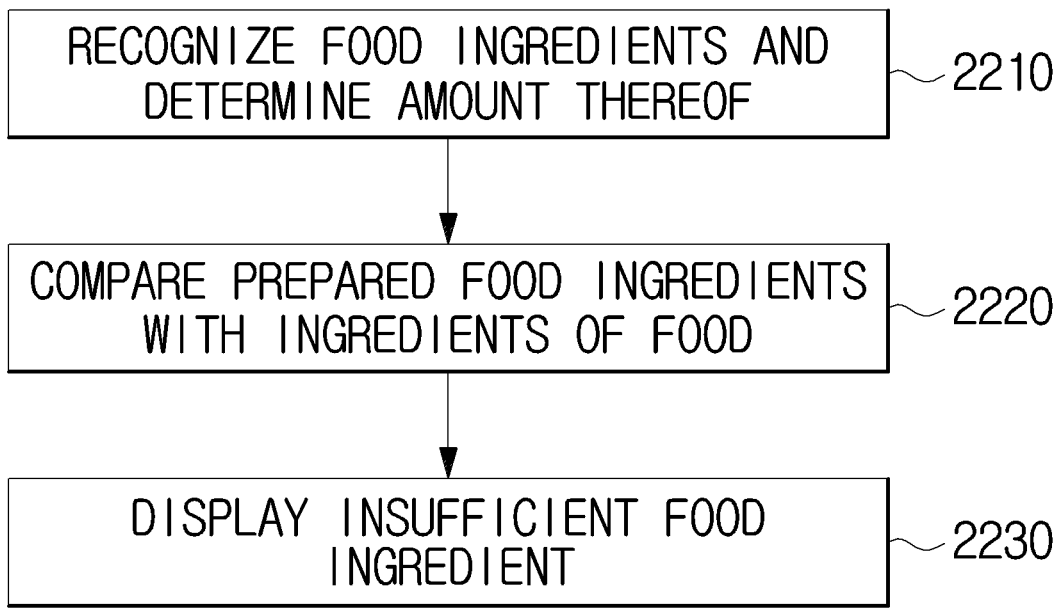
FIG. 44 illustrates a method of indicating an insufficient food ingredient according to an embodiment of the present disclosure.
Figure 45:
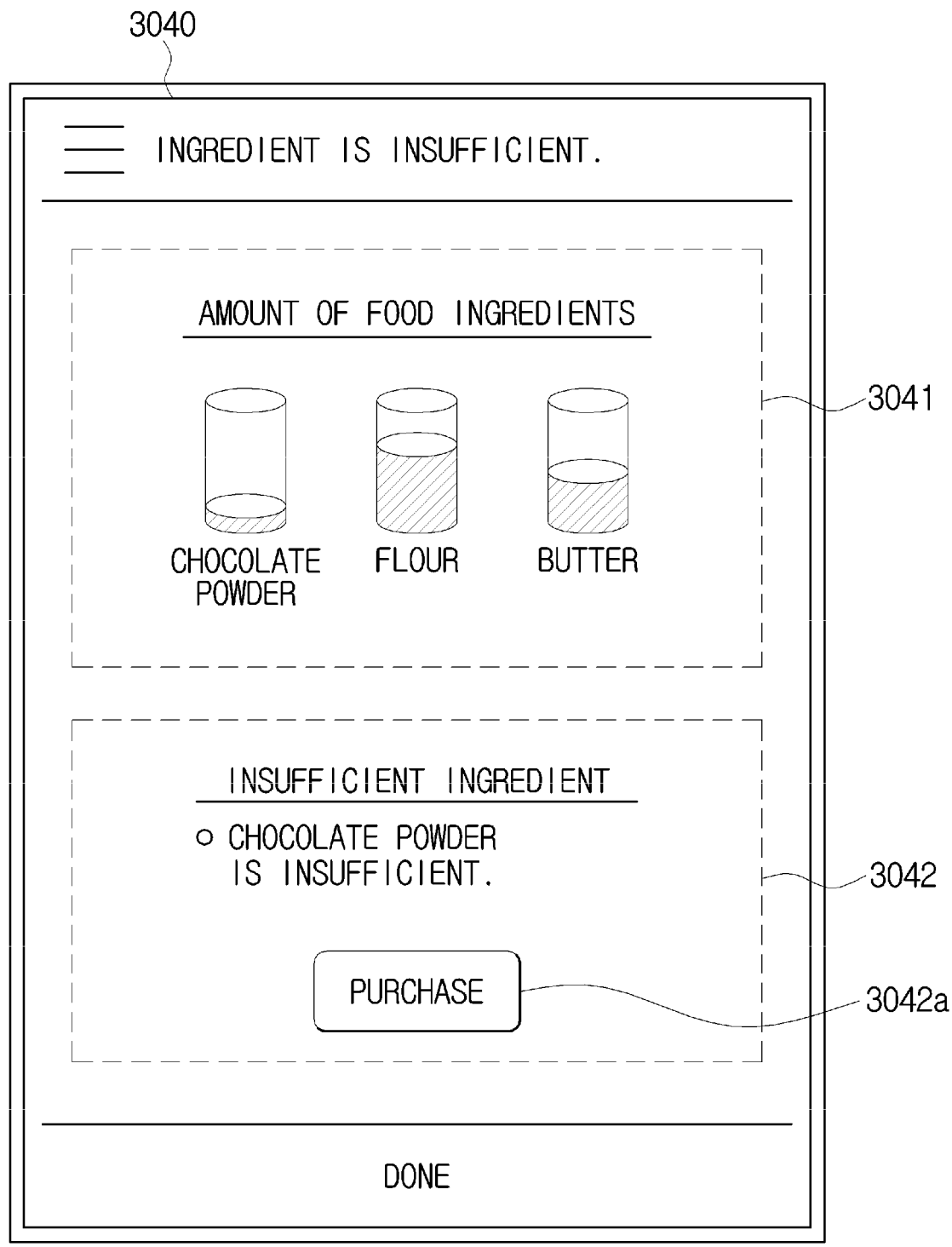
FIG. 45 illustrates an insufficient ingredient notification screen for notifying a user of an insufficient food ingredient according to an embodiment of the present disclosure.

FIG. 44 illustrates a method of indicating an insufficient food ingredient during automatic cooking according to an embodiment of the present disclosure. Also, FIG. 45 illustrates an insufficient ingredient notification screen for notifying a user of an insufficient food ingredient according to an embodiment of the present disclosure.

When forming food according to the above-described automatic cooking, food ingredients required for forming the food may be insufficient. In such a case, the cooking apparatus 1000 or the user device 1100 may notify a user of an insufficient food ingredient.

A method of indicating an insufficient food ingredient (2200) will be described with reference to FIGS. 44 and 45.

Prepared food ingredients are recognized and the amount of the prepared food ingredients is determined in operation 2210.

The cooking apparatus 1000 or the user device 1100 may recognize food ingredients prepared in the cooking apparatus 1000 and determine the amount of the prepared food ingredients.

The cooking apparatus 1000 may identify a cartridge assembly installed in the cooking apparatus 1000 to recognize the prepared food ingredients. For example, the cooking apparatus 1000 may use a bar code, a quick response (QR) code, or radio-frequency identification (RFID) to identify the cartridge assembly. Specifically, a bar code, a QR code, or an RF tag which contains identification information of a cartridge assembly may be attached to the cartridge assembly, and the cooking apparatus 1000 may detect the identification information of the cartridge assembly via a bar code reader, a QR code reader, or an RF reader.

Also, the controller 1010 of the cooking apparatus 1000 may record information on a service life of a cartridge assembly in the storage 1060 to determine the amount of the prepared food ingredients. For example, when the cartridge assembly is used, the controller 1010 may record an amount of discharged food ingredients, the number of times of discharge of the food ingredients, a time taken for the discharge of the food ingredients, or the like of the cartridge assembly in the storage 1060. The controller 1010 may determine the amount of food ingredients on the basis of the information on the service life of the cartridge assembly.

The controller 1110 of the user device 1100 may request the cooking apparatus 1000 for the amount of food ingredients via the communicator 1170 to recognize the prepared food ingredients. In response to the request from the user device 1100, the controller 1010 of the cooking apparatus 1000 may identify the cartridge assembly and determine the amount of food ingredients on the basis of the information on the service life of the cartridge assembly. Then, the controller 1010 of the cooking apparatus 1000 may transmit the amount of food ingredients to the user device 1100 via the communicator 1170.

The prepared food ingredients are compared with ingredients of food selected by the user in operation 2220.

The cooking apparatus 1000 or the user device 1100 may compare the prepared food ingredients with the ingredients of the food selected by the user.

The controller 1010 of the cooking apparatus 1000 may extract information on food ingredients from a food model of the food selected by the user and compare the extracted information on food ingredients with the food ingredients filled in the cartridge assembly. Also, the controller 1010 of the cooking apparatus 1000 may compare the amount of food ingredients extracted from the food model with the amount of food ingredients filled in the cartridge assembly.

The controller 1110 of the user device 1100 may also extract the information on food ingredients from the food model of the food selected by the user and compare the extracted information on food ingredients with the food ingredients filled in the cartridge assembly.

An insufficient food ingredient is displayed in operation 2230.

The cooking apparatus 1000 or the user device 1100 may display the food ingredient which is determined to be insufficient as a result of the comparison between the prepared food ingredients and the ingredients of the food selected by the user.

For example, the controller 1010 of the cooking apparatus 1000 may display an insufficient ingredient notification screen 3040 for notifying a user of an insufficient food ingredient illustrated in FIG. 45 on the user interface 1020. The insufficient ingredient notification screen 3040 may include an amount display area 3041 in which amounts of the food ingredients prepared in the cooking apparatus 1000 are displayed and an insufficient ingredient display area 3042 in which the insufficient food ingredient and an amount thereof are displayed. Also, a purchase button 3042a linked to an online market at which the insufficient food ingredient can be purchased may be displayed in the insufficient ingredient display area 3042.

The controller 1110 of the user device 1100 may also display the insufficient ingredient notification screen 3040 illustrated in FIG. 45 on the user interface 1120. The user may be notified of the insufficient food ingredient via the insufficient ingredient notification screen 3040.

In this way, the cooking apparatus 1000 or the user device 1100 may inform a user of an insufficient food ingredient.

Figure 46:
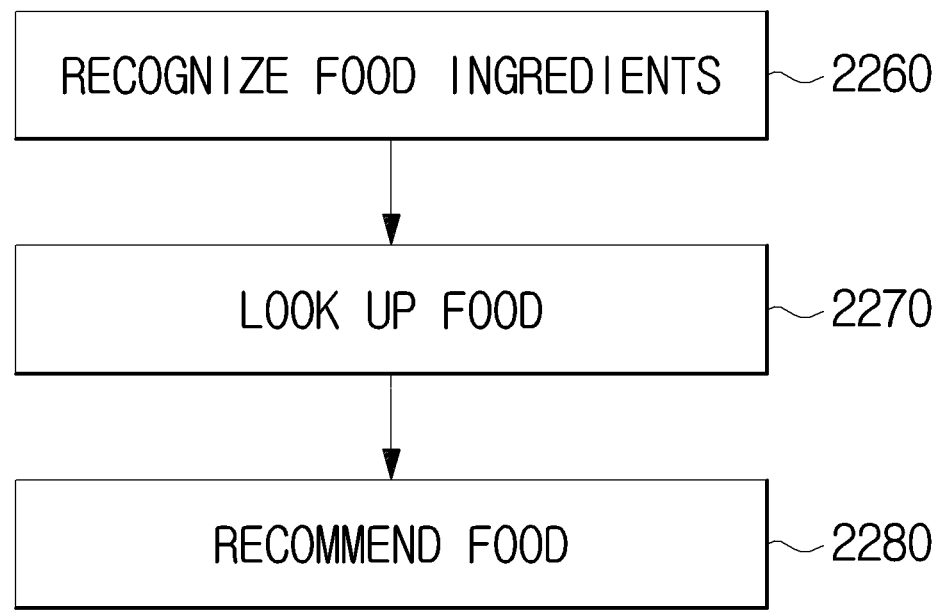
FIG. 46 illustrates a method of recommending food according to an embodiment of the present disclosure.
Figure 47:
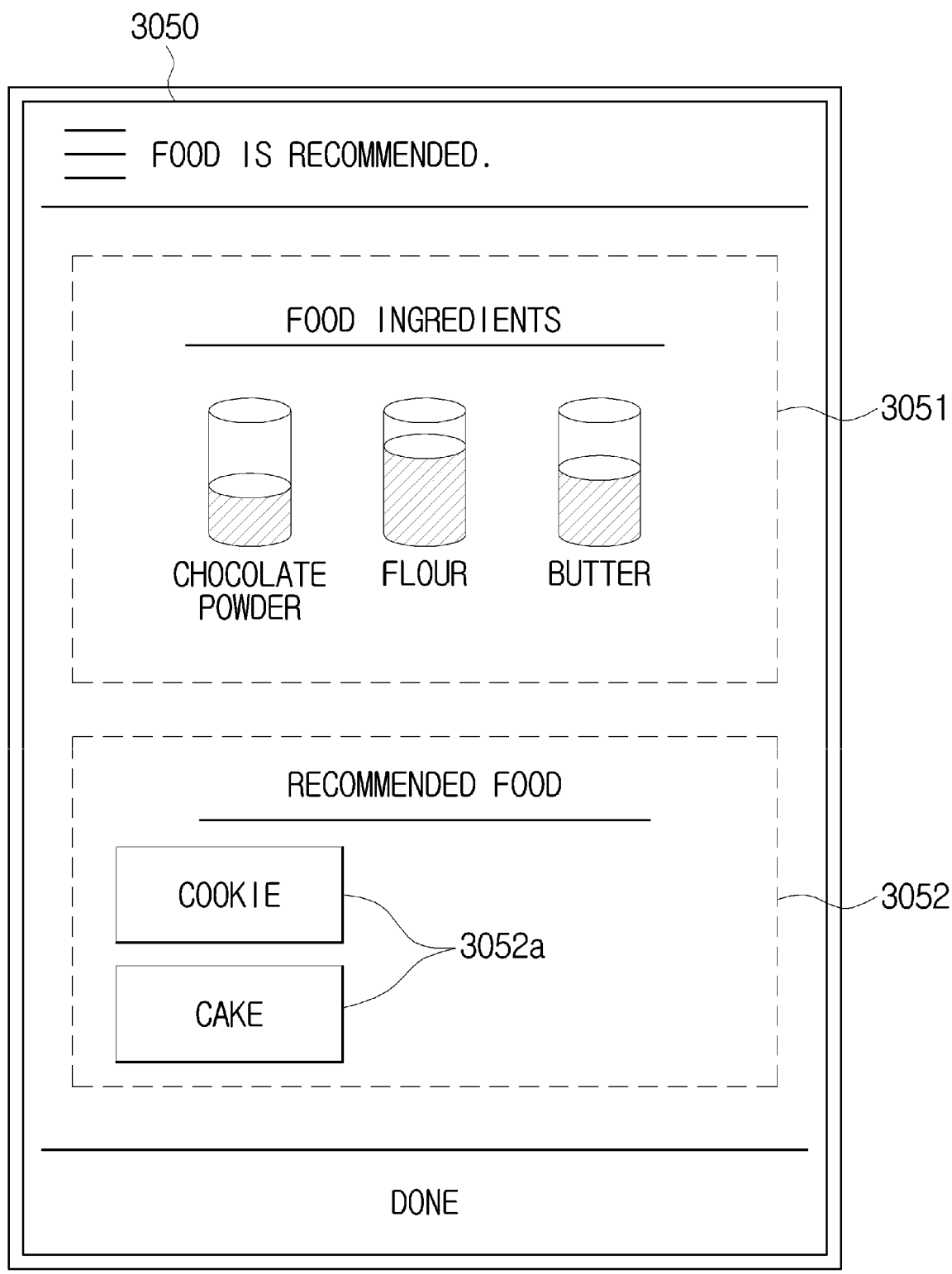
FIG. 47 illustrates a food recommendation screen for recommending food according to an embodiment of the present disclosure.

FIG. 46 illustrates a method of recommending food during automatic cooking according to an embodiment of the present disclosure. FIG. 47 illustrates a food recommendation screen for recommending food according to an embodiment of the present disclosure.

When food is formed according to the above-described automatic cooking, the cooking apparatus 1000 or the user device 1100 may recommend food to a user according to prepared food ingredients.

A method of recommending food (2250) will be described with reference to FIGS. 46 and 47.

Prepared food ingredients are recognized in operation 2260.

The cooking apparatus 1000 or the user device 1100 may recognize food ingredients prepared in the cooking apparatus 1000.

The cooking apparatus 1000 may identify a cartridge assembly installed in the cooking apparatus 1000 to recognize the prepared food ingredients. For example, the cooking apparatus 1000 may use a bar code, a QR code, or RFID to identify the cartridge assembly.

Also, the user device 1100 may request data related to food ingredients from the cooking apparatus 1000 to recognize the prepared food ingredients. In response to the request from the user device 1100, the cooking apparatus 1000 may identify the cartridge assembly installed in the cooking apparatus 1000 and transmit data related to food ingredients filled in the cartridge assembly to the user device 1100.

Food is looked up on the basis of the prepared food ingredients in operation 2270.

The cooking apparatus 1000 or the user device 1100 may look up food on the basis of the prepared food ingredients.

For example, the cooking apparatus 1000 may look up a food model stored in the storage 1060 on the basis of the prepared food ingredients or request a food model that includes the prepared food ingredients from an external server device. The user device 1100 may also look up a food model stored in the storage 1160 on the basis of the prepared food ingredients or request the food model that includes the prepared food ingredients from the external server device.

Food is recommended on the basis of the prepared food ingredients in operation 2280.

When the food model is looked up, the cooking apparatus 1000 or the user device 1100 may recommend food to the user.

For example, the controller 1010 of the cooking apparatus 1000 may display a food recommendation screen 3050 illustrated in FIG. 47 on the user interface 1020. The food recommendation screen 3050 may include a food ingredient display area 3051 in which the food ingredients prepared in the cooking apparatus 1000 are displayed and a food recommendation area 3052 in which the food is recommended. Also, a selection button 3052a for selecting the recommended food may be displayed in the food recommendation area 3052.

The controller 1110 of the user device 1100 may also display the food recommendation screen 3050 illustrated in FIG. 47 on the user interface 1120. Food may be recommended to and selected by the user via the food recommendation screen 3050.

In this way, the cooking apparatus 1000 or the user device 1100 may recommend food to be cooked to a user according to prepared food ingredients.

Figure 48:
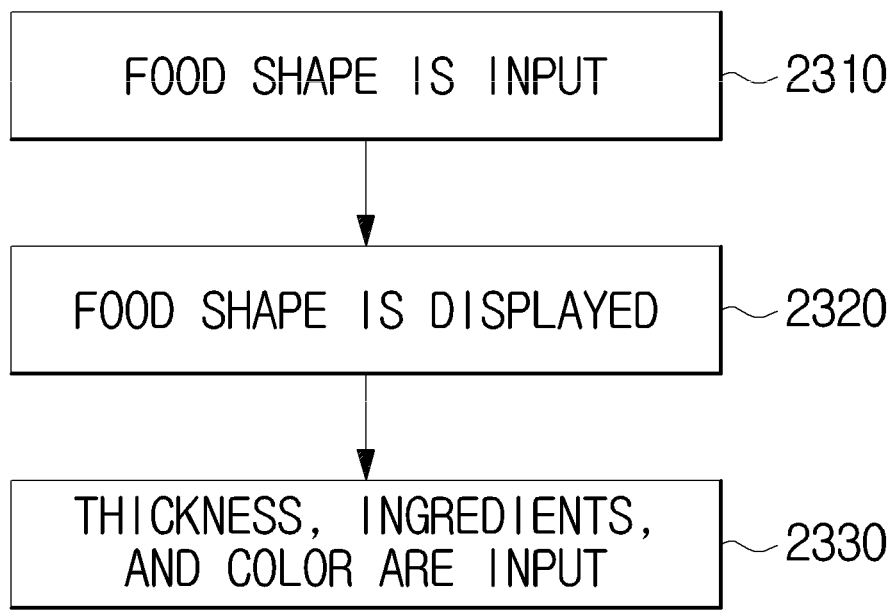
FIG. 48 illustrates an example of a method of generating a food model according to an embodiment of the present disclosure.

FIG. 48 illustrates an example of a method of generating a food model according to an embodiment of the present disclosure. FIGS. 49, 50, 51, 52, and 53 illustrate examples of receiving an input of a food model according to an embodiment of the present disclosure.

A user may directly input information on a shape, a thickness, ingredients, and a color of food that constitutes a food model.

A method of generating a food model (2300) will be described with reference to FIGS. 48, 49, 50, 51, 52, and 53.

A food shape is input in operation 2310, and the food shape is displayed in operation 2320.

The cooking apparatus 1000 or the user device 1100 may receive an input of the food shape from a user and display the input food shape in real time.

Figure 49:
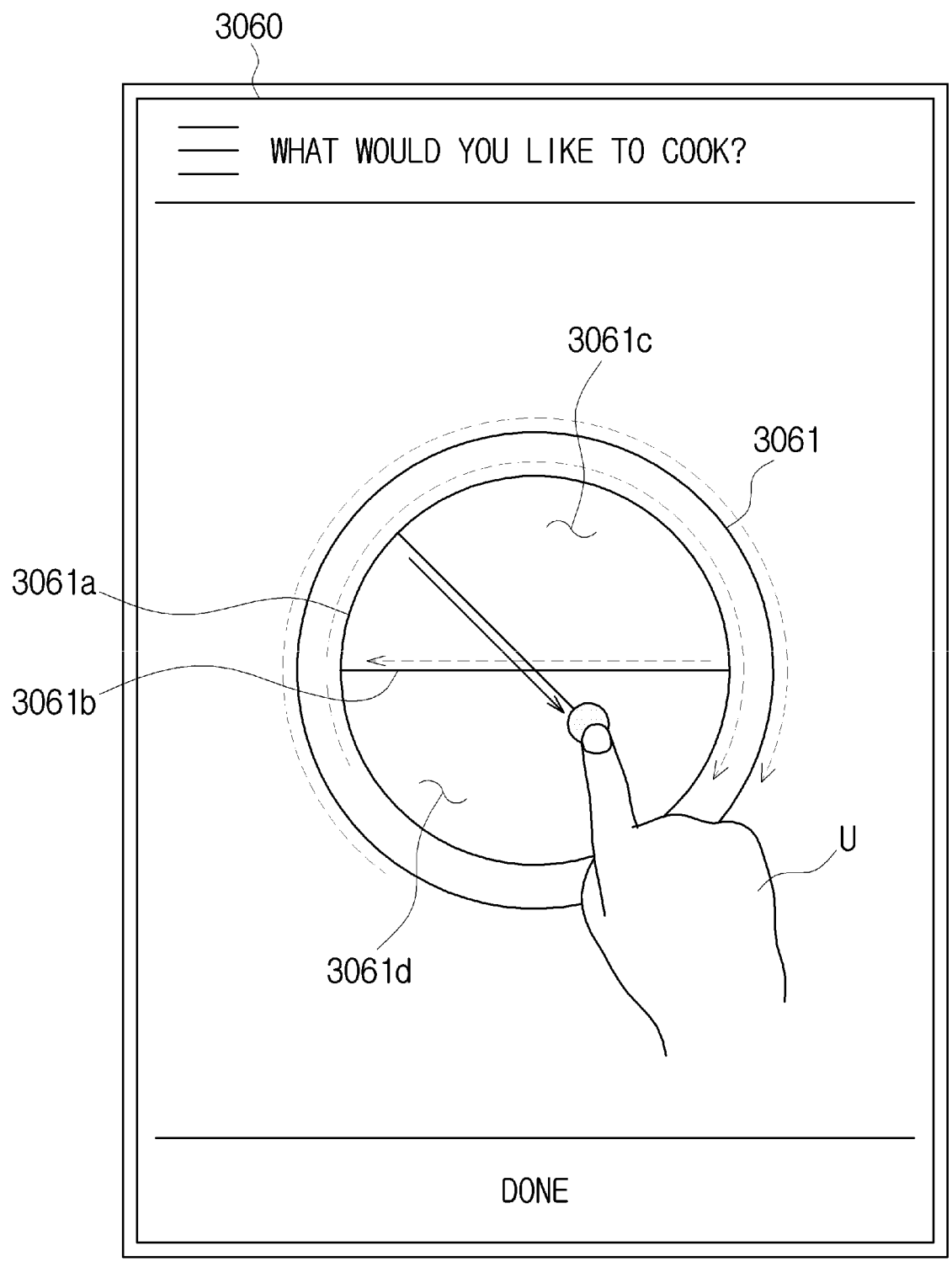
FIGS. 49, 50, 51, 52, and 53 illustrate examples of receiving an input of a food model according to an embodiment of the present disclosure.

For example, the controller 1010 of the cooking apparatus 1000 may display a model production screen 3060 for producing a food model illustrated in FIG. 49 on the user interface 1020. The user may touch one point on the model production screen 3060 and move the touched point. The controller 1010 may store coordinates of a movement path of the point touched by the user and display a line that indicates the movement path of the point touched by the user. A food shape 3061 may be formed by the line.

In other words, the user (U) may draw the food shape 3061 on the user interface 1020, and the controller 1010 may store the food shape 3061 drawn on the user interface 1020 and display the food shape 3061 on the user interface 1020.

The food shape 3061 may be divided into a plurality of sections by lines input by the user, and each of the divided sections may be separately managed. For example, when the user draws a line 3061b that crosses a circle 3061a, a pair of semi-circles 3061c and 3061d partitioned by the line 3061b may be separately managed. In other words, the first semi-circle 3061c and the second semi-circle 3061d may have different thicknesses, different ingredients, or different colors.

The controller 1110 of the user device 1100 may also display the model production screen 3060 illustrated in FIG. 49 on the user interface 1120, and the user may draw the food shape 3061 on the user interface 1120.

Figure 50:
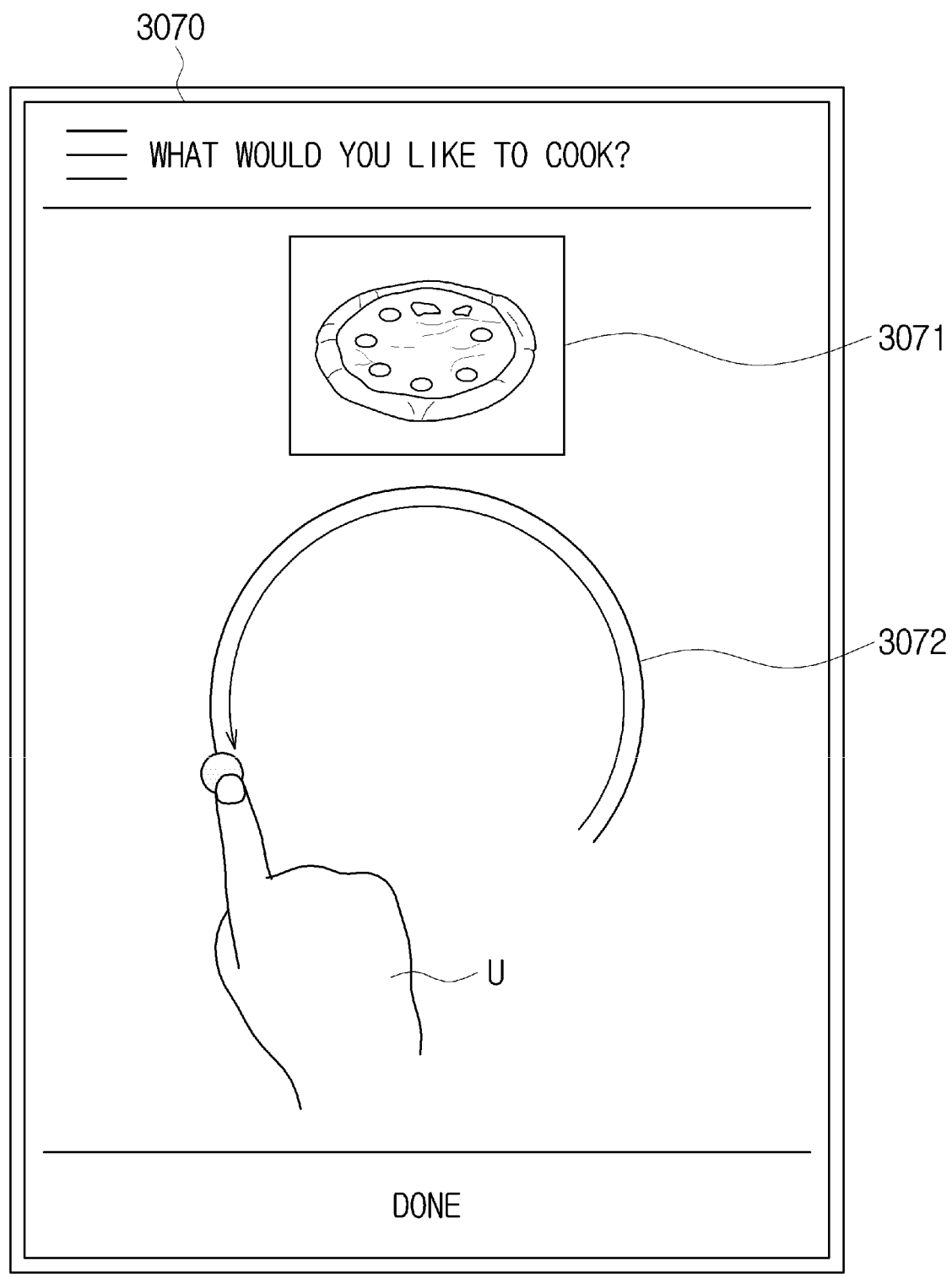

As another example, the controller 1010 of the cooking apparatus 1000 may display a model production screen 3070 illustrated in FIG. 50 on the user interface 1020. The model production screen 3070 may include a reference image 3071. The reference image 3071 may be an image that represents food selected by the user.

The user may draw a food shape on the user interface 1020 with reference to the reference image 3071. The controller 1010 may store a food shape 3072 drawn on the user interface 1020 by the user and display the food shape 3072 on the user interface 1020.

The controller 1110 of the user device 1100 may also display the model production screen 3070 illustrated in FIG. 50 on the user interface 1120, and the user may draw the food shape 3072 on the user interface 1120 with reference to the reference image 3071.

Figure 51:
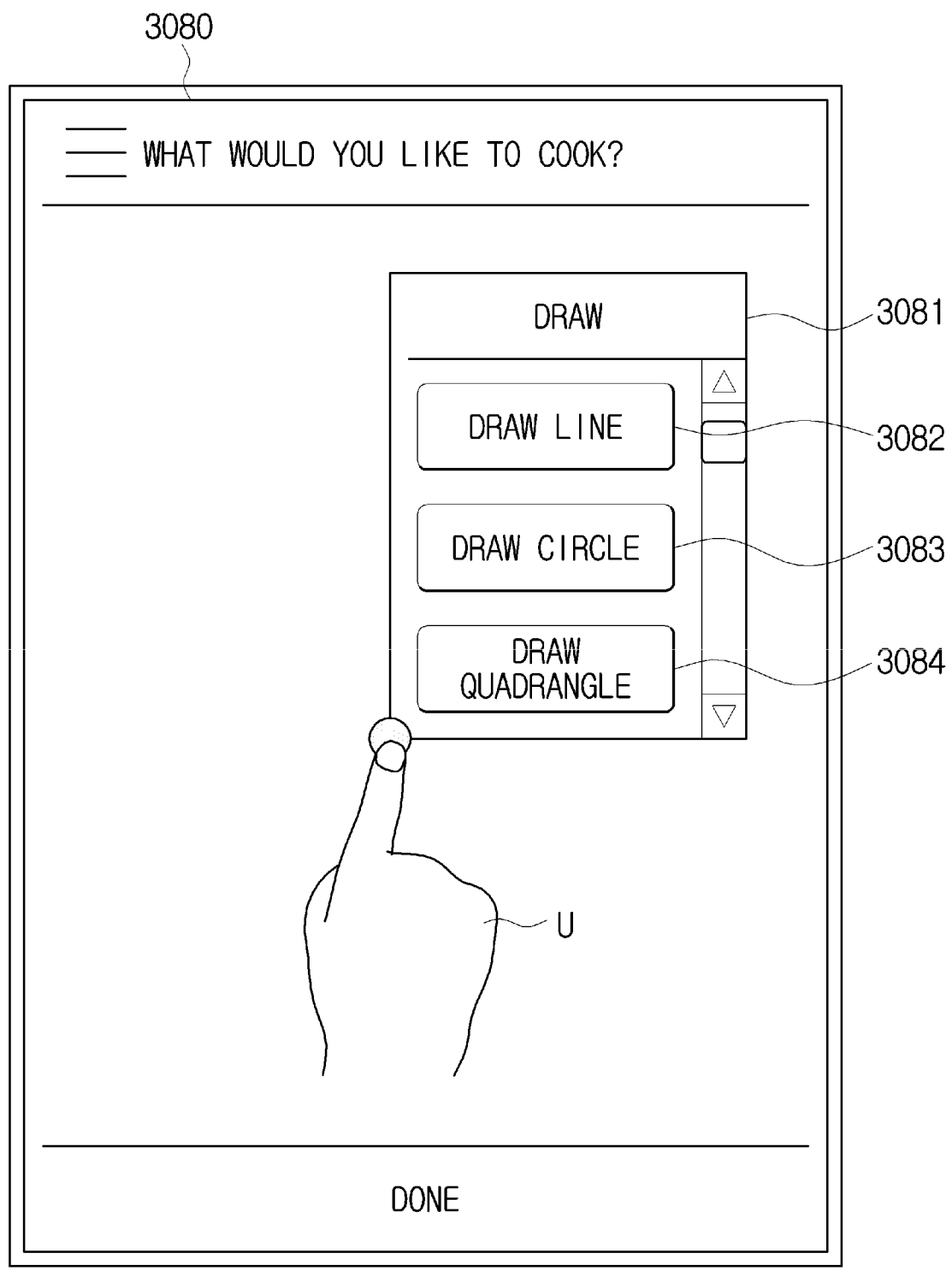

As still another example, the controller 1010 of the cooking apparatus 1000 may display a model production screen 3080 illustrated in FIG. 51 on the user interface 1020. The controller 1010 may display a shape drawing menu 3081 on the model production screen 3080 according to a touch input of a user. When the user touches the user interface 1020 for a predetermined amount of time or longer or two or more times within the predetermined amount of time, the controller 1010 may display the shape drawing menu 3081 on the model production screen 3080.

The shape drawing menu 3081 may include a line drawing button 3082, a circle drawing button 3083, a quadrangle drawing button 3084, and the like to enable the user to easily draw a food shape. The user may easily draw a food shape including a line, a circle, a quadrangle, a triangle, and the like using the shape drawing menu 3081. The controller 1010 may store the food shape drawn by the user using a line, a circle, a quadrangle, a triangle, and the like and display the food shape on the user interface 1020.

The controller 1110 of the user device 1100 may also display the model production screen 3080 illustrated in FIG. 51 on the user interface 1120, and the user may draw a food shape on the user interface 1120 by using the shape drawing menu 3081 on the model production screen 3080.

After production of the food shape is completed, a thickness, ingredients, and a color of the food are input in operation 2330.

The cooking apparatus 1000 or the user device 1100 may receive an input of the thickness, the ingredients, and the color of the food from the user.

Figure 52:
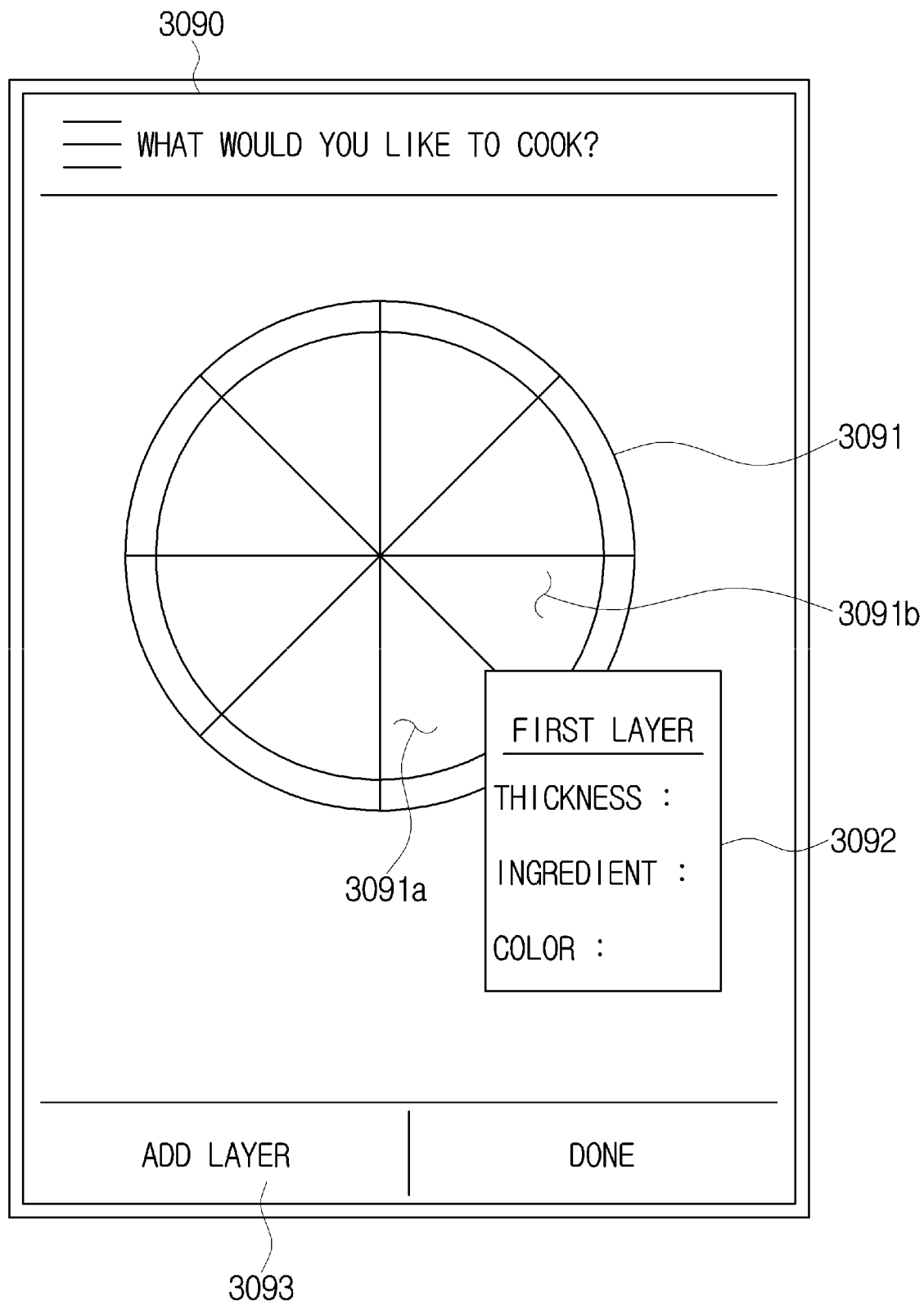

For example, the controller 1010 of the cooking apparatus 1000 may display a model production screen 3090 for producing a food model illustrated in FIG. 52 on the user interface 1020.

When the user touches an inside of a food shape 3091 after production of the food shape 3091 is completed, the controller 1010 may display a first additional information input menu 3092 through which a thickness, ingredients, and a color of the food can be input. The user may input the thickness, the ingredients, and the color of the food via the first additional information input menu 3092.

Specifically, a section in which a food model is defined by the thickness, the ingredients, and the color of the food input by the user is limited to a section within a closed curve touched by the user. For example, a thickness, ingredients, and a color of the food input by the user with regard to a first section 3091a of the food shape 3091 define a thickness, ingredients, and a color of only the first section 3091a. In other words, an unselected second section 3091b may have a thickness, ingredients, and a color different from those of the first section 3091a.

The controller 1010 may generate a food model using the thickness, the ingredients, and the color of the food input via the first additional information input menu 3092 and a previously drawn food shape.

Also, the model production screen 3090 may include a layer adding button 3093 for inputting a thickness, ingredients, and a color of each layer of food that consists of a plurality of layers (for example, a pizza may consist of a dough layer, a cheese layer, and a sauce layer).

Figure 53:
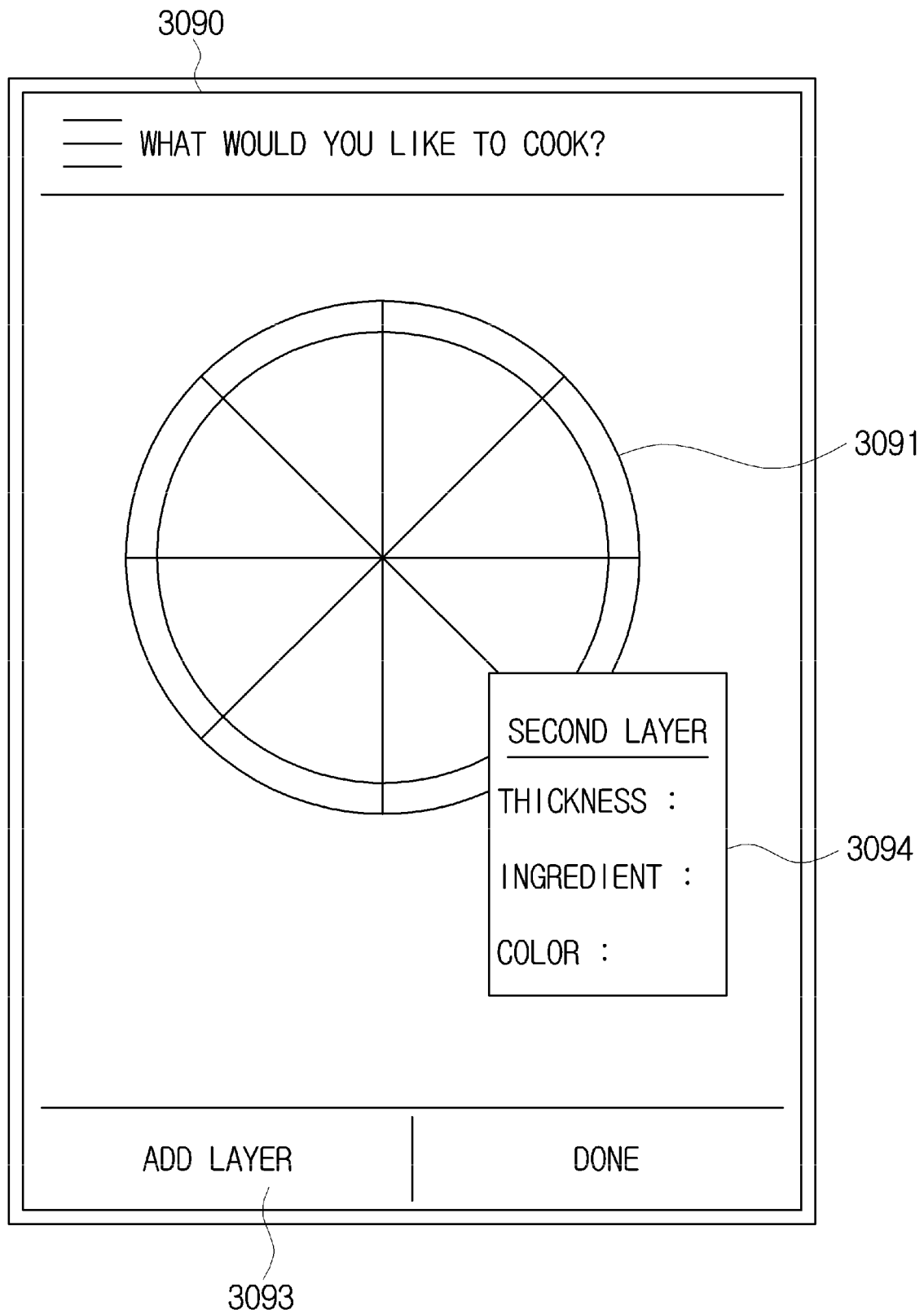

When the layer adding button 3093 is touched by the user, the controller 1010 may display a second additional information input menu 3094, through which a thickness, ingredients, and a color of a second layer of the food can be input, illustrated in FIG. 53. The user may input the thickness, the ingredients, and the color of the food via the second additional information input menu 3094.

Also, the controller 1010 may generate a food model using the thickness, the ingredients, and the color of a first layer of the food input via the first additional information input menu 3092, the thickness, the ingredients, and the color of the second layer of the food input via the second additional information input menu 3094, and the previously drawn food shape.

The controller 1110 of the user device 1100 may also display the model production screen 3090 illustrated in FIGS. 52 and 53 on the user interface 1120, and the user may input the thickness, the ingredients, and the color of the food via the first additional information input menu 3092 and the second additional information input menu 3094.

As described above, the user may draw a food shape on the user interfaces 1020 and 1120, and the cooking apparatus 1000 or the user device 1100 may store the food shape drawn on the user interfaces 1020 and 1120. Also, the cooking apparatus 1000 or the user device 1100 may receive an input of a thickness, ingredients, and a color of the food via the user interfaces 1020 and 1120 and generate a food model from the input shape, thickness, ingredients, and color of the food.

Figure 54:
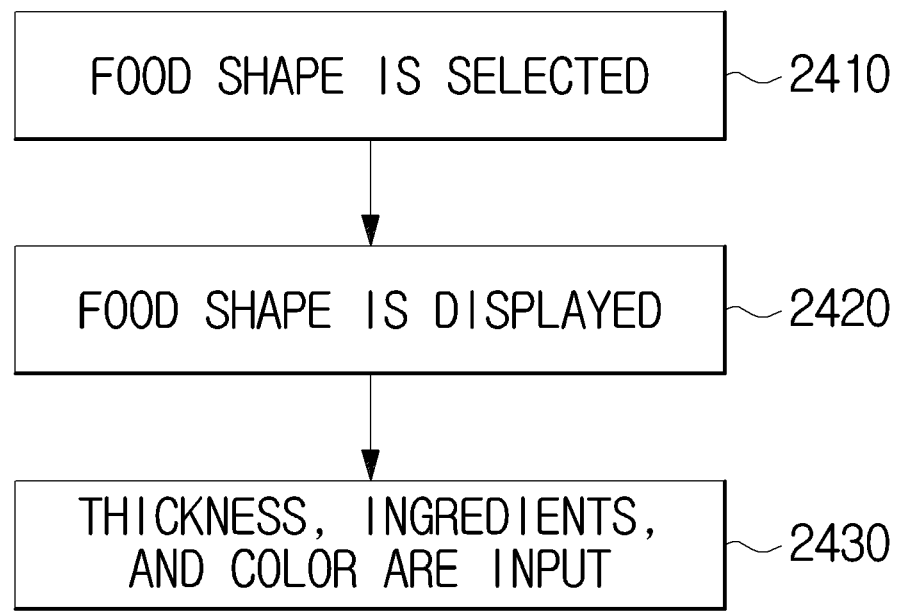
FIG. 54 illustrates another example of a method of generating a food model according to an embodiment of the present disclosure.
Figure 55:
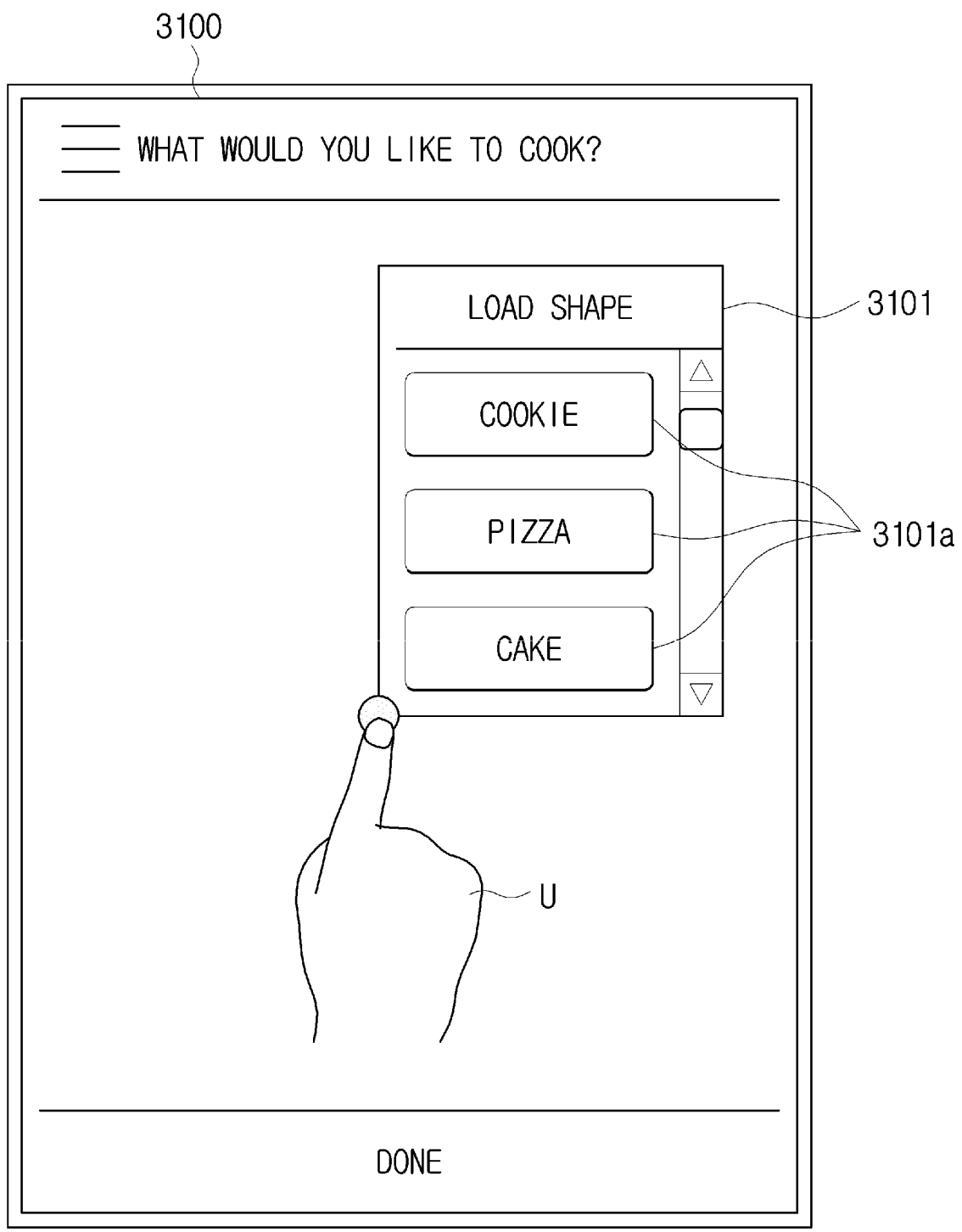
FIGS. 55 and 56 illustrate other examples of receiving an input of a food model according to an embodiment of the present disclosure.
Figure 56:
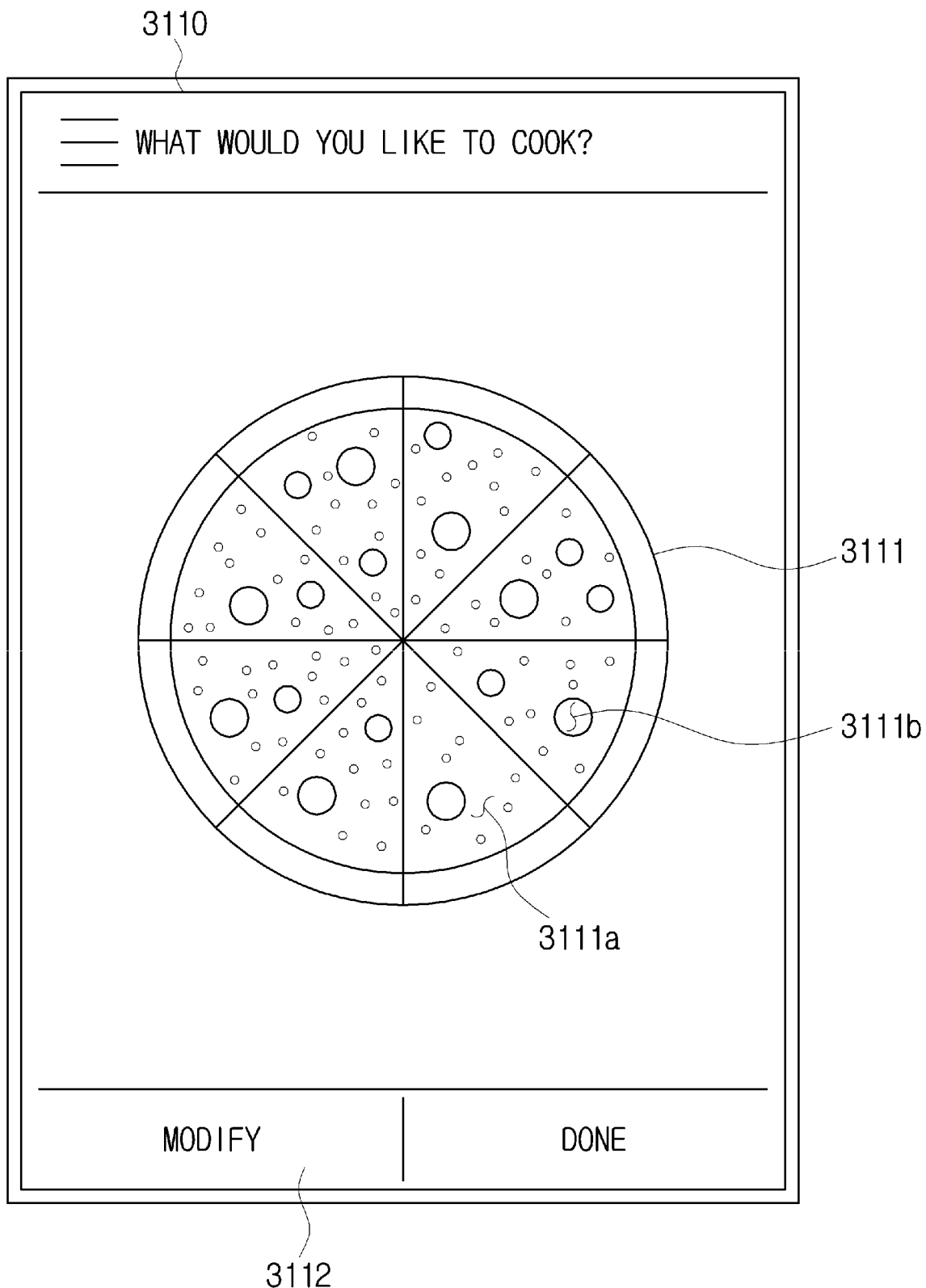

FIG. 54 illustrates another example of a method of generating a food model according to an embodiment of the present disclosure. Also, FIGS. 55 and 56 illustrate other examples of receiving an input of a food model according to an embodiment of the present disclosure.

A user may use a pre-stored food shape to generate a food model and directly input information on a thickness, ingredients, and a color of food.

A method of generating a food model (2400) will be described with reference to FIGS. 54, 55, and 56.

A pre-stored food shape is selected in operation 2410.

The cooking apparatus 1000 or the user device 1100 may receive a selection of the food shape from a user. The food shape does not include information on a thickness, ingredients, and a color of food but may include information related to an outer shape of the food.

For example, the controller 1010 of the cooking apparatus 1000 may display a model production screen 3100 for producing a food model illustrated in FIG. 55 on the user interface 1020. The controller 1010 may display a food shape selection menu 3101 on the model production screen 3100 according to a touch input of a user. When the user touches the user interface 1020 for a predetermined amount of time or longer or two or more times within the predetermined amount of time, the controller 1010 may display the food shape selection menu 3101 on the model production screen 3100.

The food shape selection menu 3101 may include food buttons 3101a that indicate names of various kinds of food such as cookie, pizza, cake, and steak. The user may check a name of the food displayed on each of the plurality of food buttons 3101a and touch any one of the plurality of food buttons 3101a.

In response to a selection of the user, the controller 1010 may load data related to the selected food shape from the storage 1060 or receive the data related to the food shape from an external device via the communicator 1070.

The controller 1110 of the user device 1100 may also display the model production screen 3100 illustrated in FIG. 55 on the user interface 1120 and may display the food shape selection menu 3101 according to a touch input of the user.

The food shape selected by the user is displayed in operation 2420.

The cooking apparatus 1000 or the user device 1100 may display the food shape selected by the user.

The controller 1010 of the cooking apparatus 1000 may display the food shape selected by the user on the user interface 1020. For example, the controller 1010 of the cooking apparatus 1000 may display a model production screen 3110, which includes a food shape 3111, illustrated in FIG. 56 on the user interface 1020. Also, the model production screen 3110 may include a shape modification button 3112 for modifying the food shape 3111.

When the user touches the shape modification button 3112, the user may edit the food shape 3111 displayed on the model production screen 3110.

The controller 1110 of the user device 1100 may also display the food shape 3111 illustrated in FIG. 56 on the user interface 1120 according to the selection of the user.

After the food shape is selected, a thickness, ingredients, and a color of the food are input in operation 2430.

The cooking apparatus 1000 or the user device 1100 may receive an input of the thickness, the ingredients, and the color of the food from the user. For example, when the user touches an inside of the food shape displayed on the user interface 1020 after the selection of the food shape is completed, the user may input the thickness, the ingredients, and the color of the food.

Specifically, a section in which a food model is defined by the thickness, the ingredients, and the color of the food input by the user is limited to within a closed curve touched by the user. For example, a thickness, ingredients, and a color of food input by the user with regard to a first section 3111a of the food shape 3111 illustrated in FIG. 56 define the thickness, the ingredients, and the color of only the first section 3111a. In other words, an unselected second section 3111b may have a thickness, ingredients, and a color different from those of the first section 3111a.

The controller 1010 may generate a food model using the input thickness, ingredients, and color of the food and the input food shape.

As described above, the cooking apparatus 1000 or the user device 1100 may display a plurality of food shapes, and the user may select any one of the plurality of food shapes. Also, the cooking apparatus 1000 or the user device 1100 may receive an input of a thickness, ingredients, and a color of food from the user and generate a food model from the food shape and the thickness, the ingredients, and the color of the food.

Figure 57:
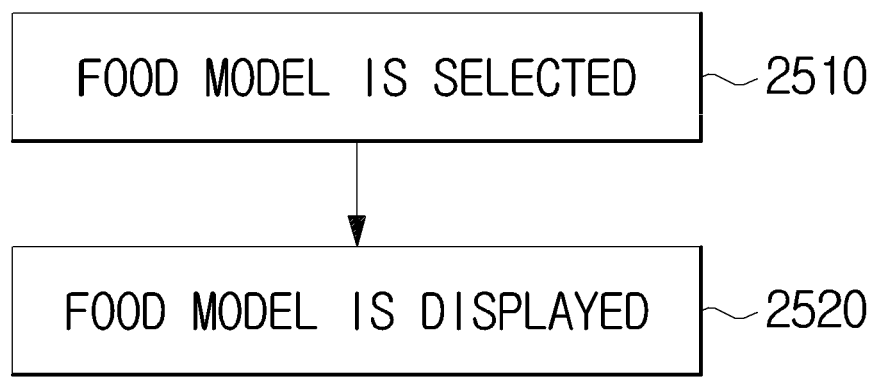
FIG. 57 illustrates still another example of a method of generating a food model according to an embodiment of the present disclosure.
Figure 58:
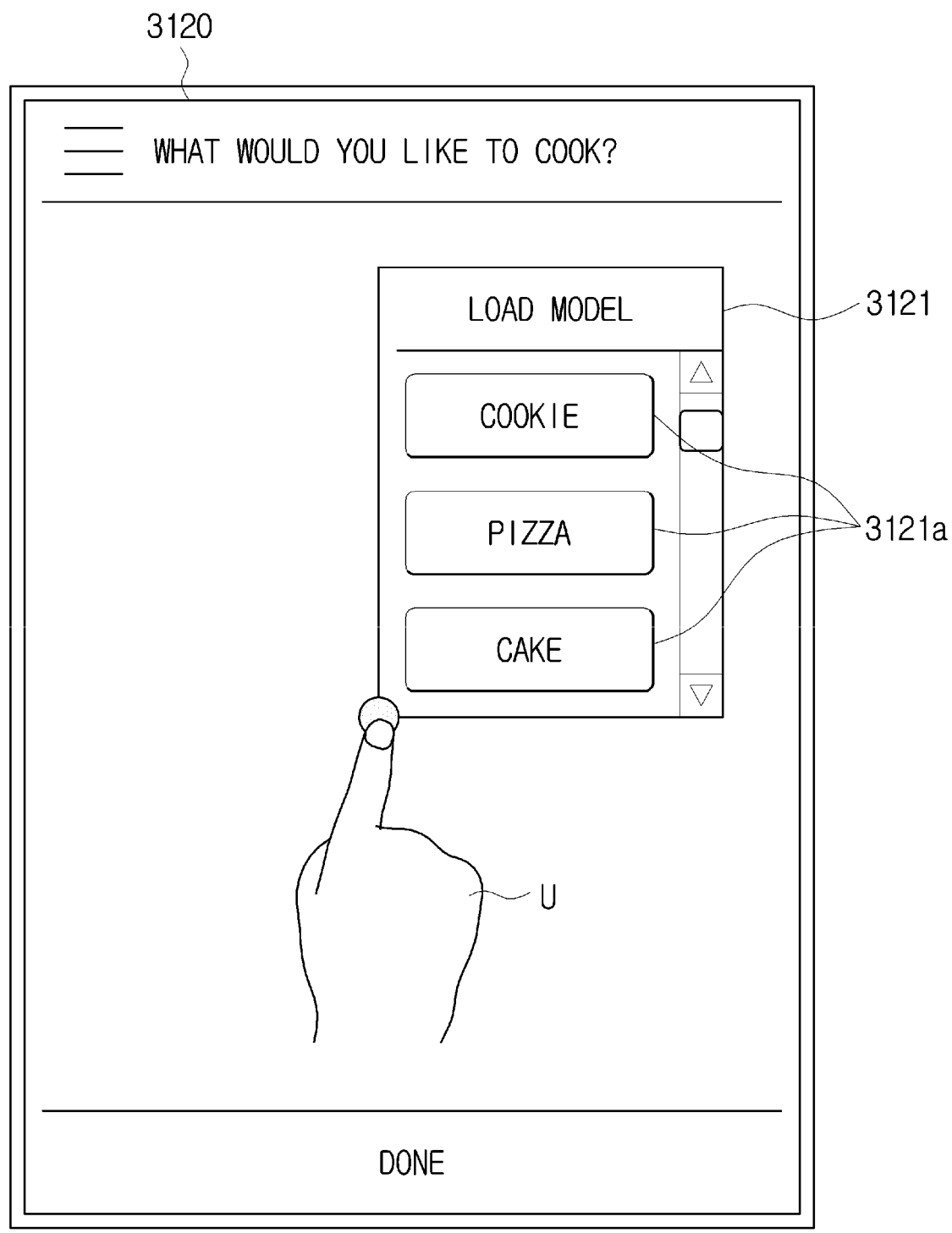
FIGS. 58 and 59 illustrate still other examples of receiving an input of a food model according to an embodiment of the present disclosure.
Figure 59:
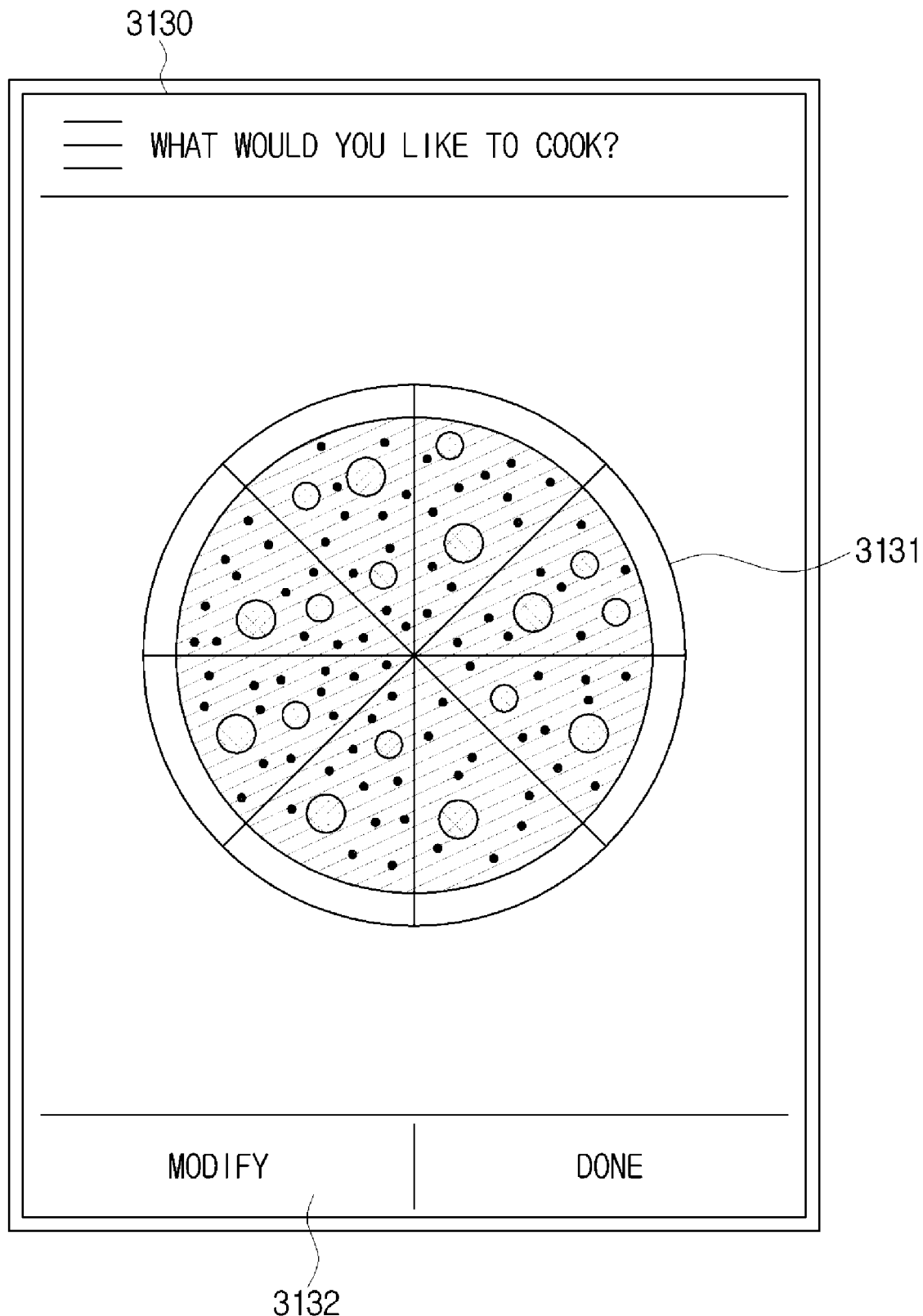

FIG. 57 illustrates still another example of a method of generating a food model according to an embodiment of the present disclosure. Also, FIGS. 58 and 59 illustrate still other examples of receiving an input of a food model according to an embodiment of the present disclosure.

A user may use a pre-stored food model to generate a food model.

A method of generating a food model (2500) will be described with reference to FIGS. 57, 58, and 59.

A pre-stored food model is selected in operation 2510.

The cooking apparatus 1000 or the user device 1100 may receive a selection of a food model from a user. The food model may include a food shape and all sorts of information related to the food shape such as a thickness, ingredients, and a color.

For example, the controller 1010 of the cooking apparatus 1000 may display a model production screen 3120 for producing a food model illustrated in FIG. 58 on the user interface 1020. The controller 1010 may display a food model selection menu 3121 on the model production screen 3120 according to a touch input of the user. When the user touches the user interface 1020 for a predetermined amount of time or longer or two or more times within the predetermined amount of time, the controller 1010 may display the food model selection menu 3121 on the model production screen 3120.

The food model selection menu 3121 may include food buttons 3121a that indicate names of various kinds of foods such as cookie, pizza, cake, and steak. The user may a check name of the food displayed on each of the plurality of food buttons 3121a and touch any one of the plurality of food buttons 3121a.

In response to a selection of the user, the controller 1010 may load data related to the selected food model from the storage 1060 or receive the data related to the food model from an external device via the communicator 1070.

The controller 1110 of the user device 1100 may also display the model production screen 3120 illustrated in FIG. 58 on the user interface 1120 and may display the food model selection menu 3121 according to a touch input of the user.

The food model selected by the user is displayed in operation 2520.

The cooking apparatus 1000 or the user device 1100 may display the food model selected by the user.

The controller 1010 of the cooking apparatus 1000 may display the food model selected by the user on the user interface 1020. For example, the controller 1010 of the cooking apparatus 1000 may display a model production screen 3130, which includes a food model 3131, illustrated in FIG. 59 on the user interface 1020. Also, the model production screen 3130 may include a model modification button 3132 for modifying the food model 3131.

When the user touches the model modification button 3132, the user may edit the food model 3131 displayed on the model production screen 3130. In other words, the user may edit all of a shape, a thickness, ingredients, and a color of food.

The controller 1110 of the user device 1100 may also display the food model 3131 illustrated in FIG. 59 on the user interface 1120 according to a selection of the user.

As described above, the cooking apparatus 1000 or the user device 1100 may display a plurality of food models, and the user may select any one of the plurality of food models.

Figure 60:
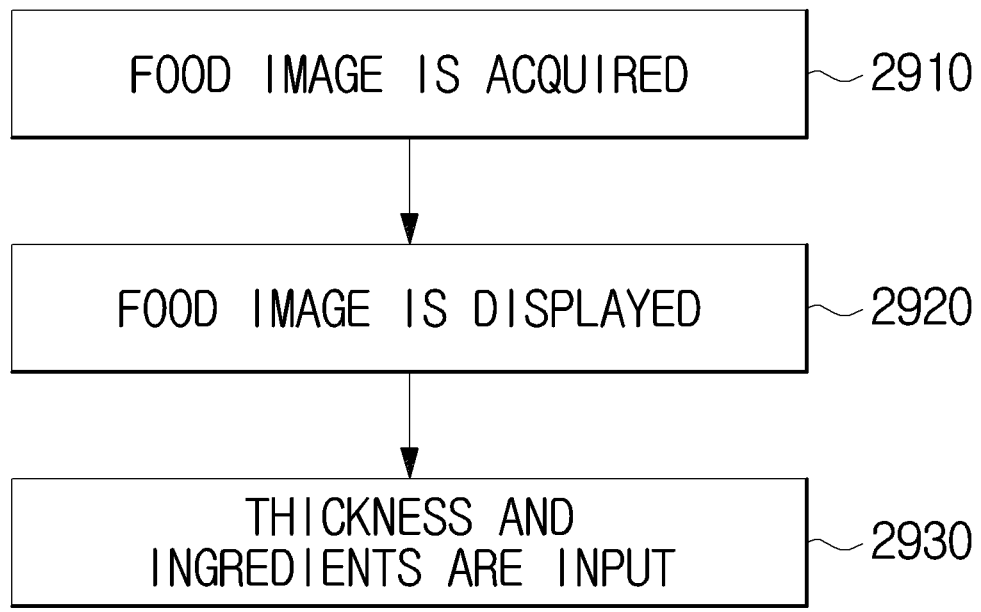
FIG. 60 illustrates yet another example of a method of generating a food model according to an embodiment of the present disclosure.
Figure 61:
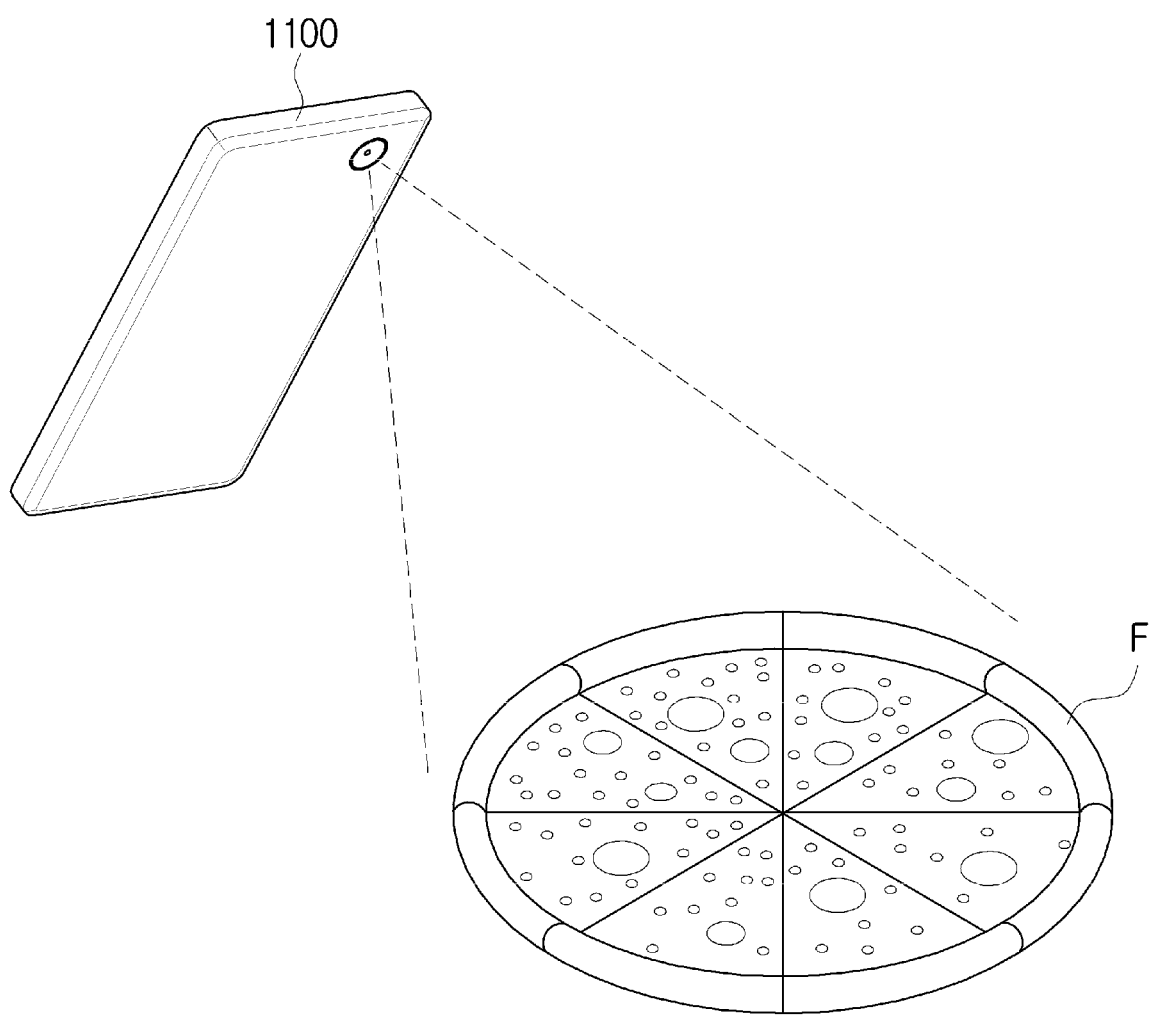
FIG. 61 illustrates an example of acquiring a food image according to an embodiment of the present disclosure.
Figure 62:
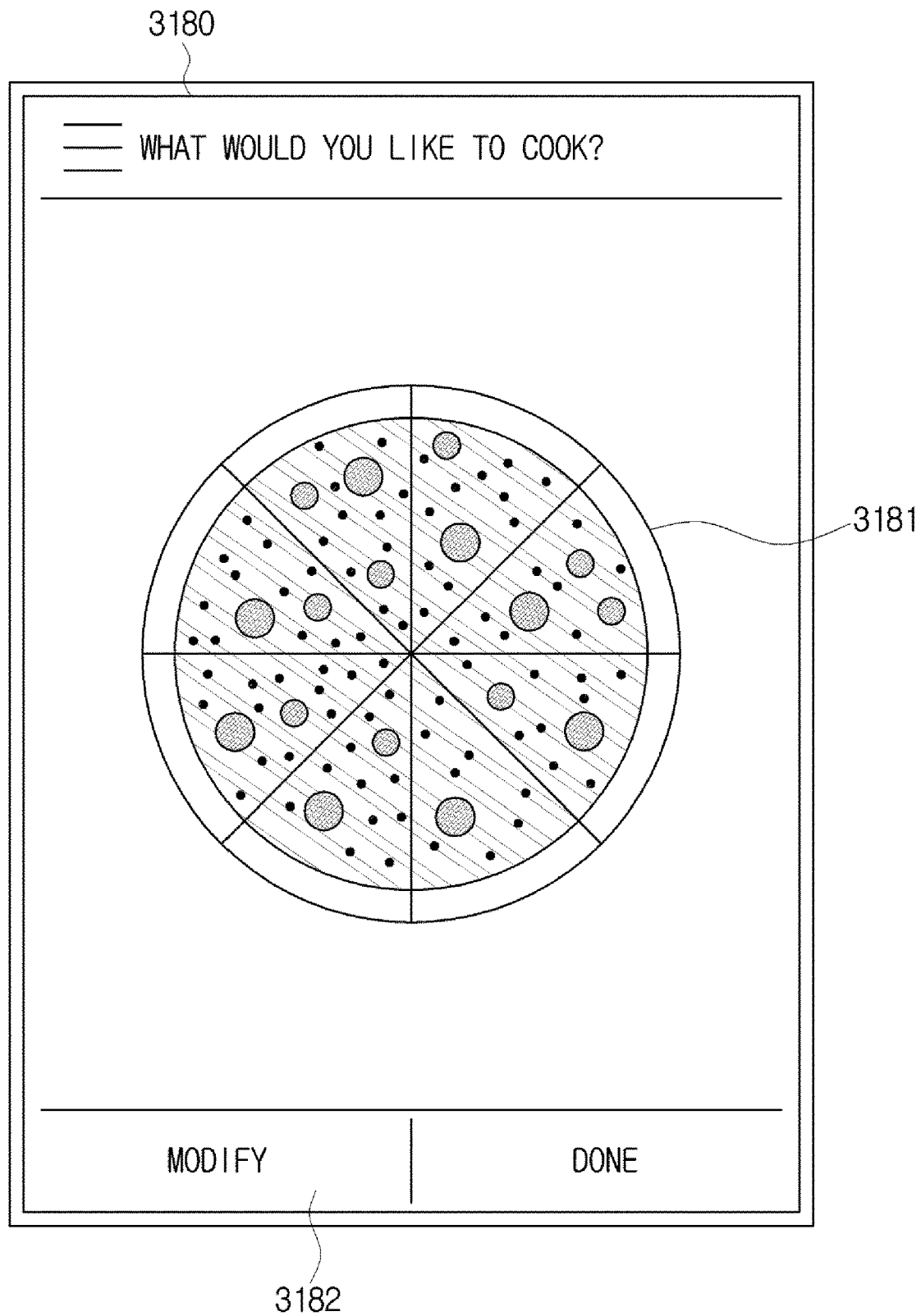
FIG. 62 illustrates an example of displaying a food image according to an embodiment of the present disclosure.

FIG. 60 illustrates yet another example of a method of generating a food model according to an embodiment of the present disclosure. FIG. 61 illustrates an example of acquiring a food image according to an embodiment of the present disclosure. Also, FIG. 62 illustrates an example of displaying a food image according to an embodiment of the present disclosure.

A user may acquire a food image using a camera or the like and generate a food model from the food image.

A method of generating a food model (2900) will be described with reference to FIGS. 60, 61, and 62.

A food image is acquired in operation 2910.

The controller 1110 of the user device 1100 may acquire the food image via the image acquirer 1140. For example, as illustrated in FIG. 61, a user may capture food F using the user device 1100. When the user captures the food F, the controller 1110 may store data related to the food image in the storage 1160.

The controller 1110 of the user device 1100 may transmit the food image to the cooking apparatus 1000 via the communicator 1170 according to an input of a user.

The captured food image is displayed in operation 2920.

The controller 1110 of the user device 1100 may display the food image on the user interface 1120. For example, the controller 1110 may display a model production screen 3180, which includes a food image 3181, illustrated in FIG. 62 on the user interface 1120. The food image 3181 may include a shape of the food and a color of the food. The model production screen 3180 may include an image modification button 3182 for editing the shape or color of the food included in the food image 3181.

When the user touches the image modification button 3182, the user may edit the food image 3181 displayed on the model production screen 3180. In other words, the user may modify the shape or color of the food in the food image 3181.

The controller 1010 of the cooking apparatus 1000 may also display the food image on the user interface 1020. The controller 1010 may receive the food image from the user device 1100 via the communicator 1070 and display the received food image on the user interface 1020, as illustrated in FIG. 62. Also, the user may modify the food image displayed on the user interface 1020 of the cooking apparatus 1000.

A thickness and ingredients of the food are input in operation 2930.

The cooking apparatus 1000 or the user device 1100 may receive an input of a thickness and ingredients of the food from the user. As described above, the food image includes information on the shape and the color of the food. Consequently, information on the thickness and the ingredients of the food may be additionally input to generate a food model. For example, when the user touches an inside of a food image displayed on the user interface 1020 or 1120, the user may input a thickness and ingredients of food.

Also, the cooking apparatus 1000 or the user device 1100 may estimate the thickness and the ingredients of the food from the food image. For example, the controller 1010 of the cooking apparatus 1000 may look up a food model having a similar shape and color as the food image from the plurality of food models stored in the storage 1060. When a food model having a similar shape and color as the food image is found, the controller 1010 may match the food image to the food model and estimate the thickness and the ingredients of the food according to a result of the matching. Then, the controller 1010 may generate the food model using the input image, thickness, and ingredients of the food.

As described above, the cooking apparatus 1000 or the user device 1100 may capture food and generate a food model from a captured image of the food.

Figure 63:
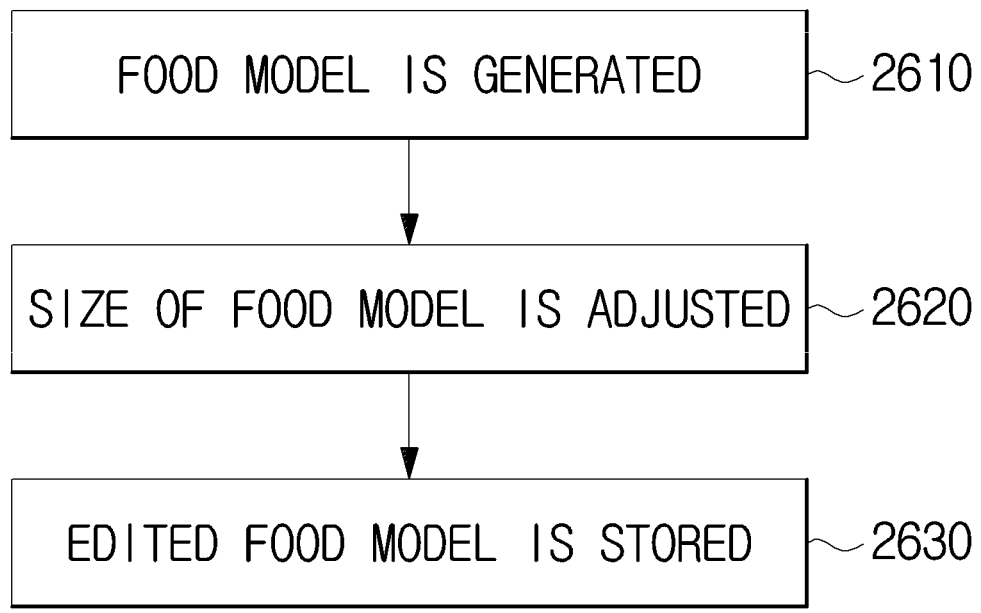
FIG. 63 illustrates an example of a method of editing a food model according to an embodiment of the present disclosure.
Figure 64:
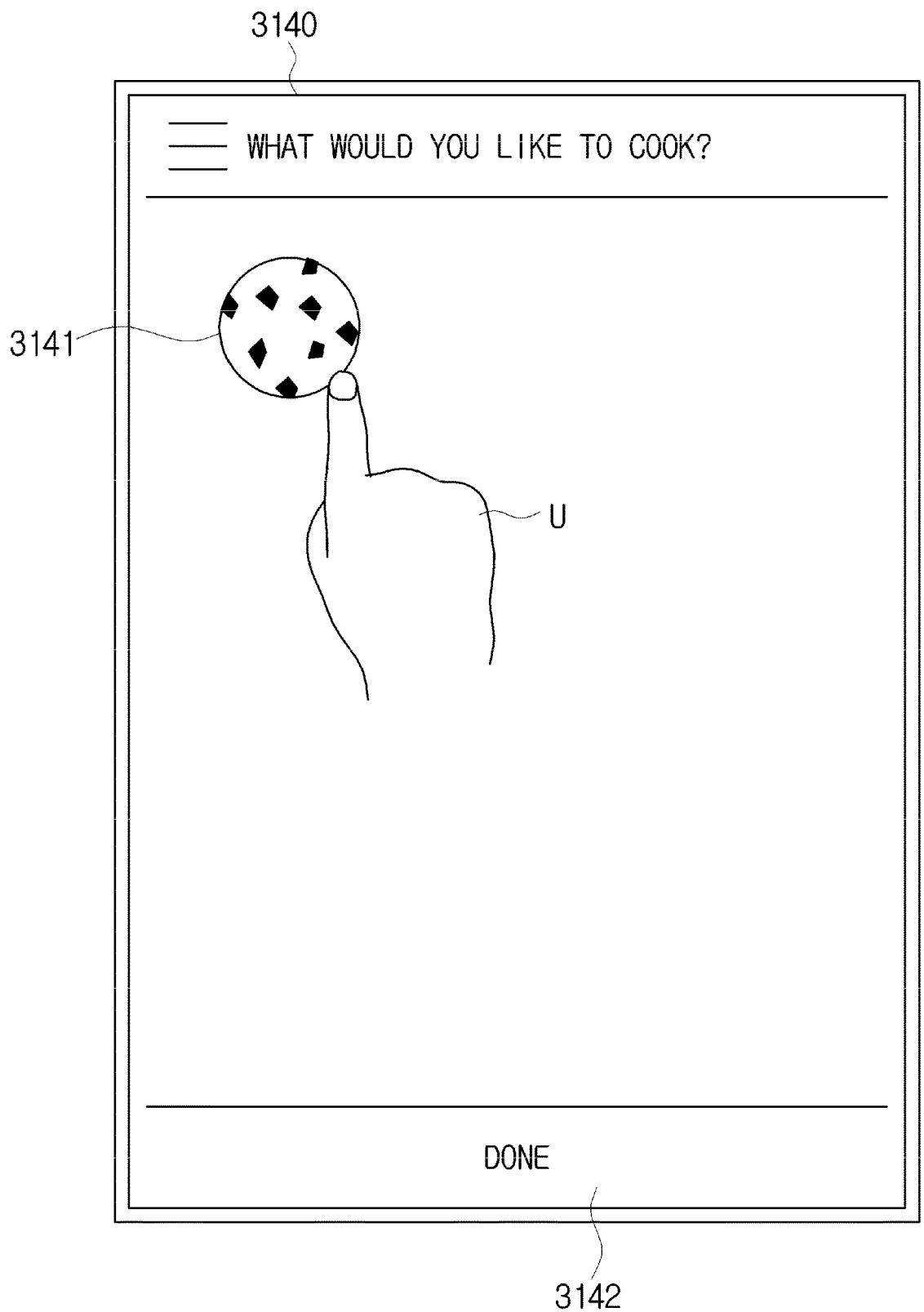
FIGS. 64 and 65 illustrate examples of editing a food model according to an embodiment of the present disclosure.
Figure 65:
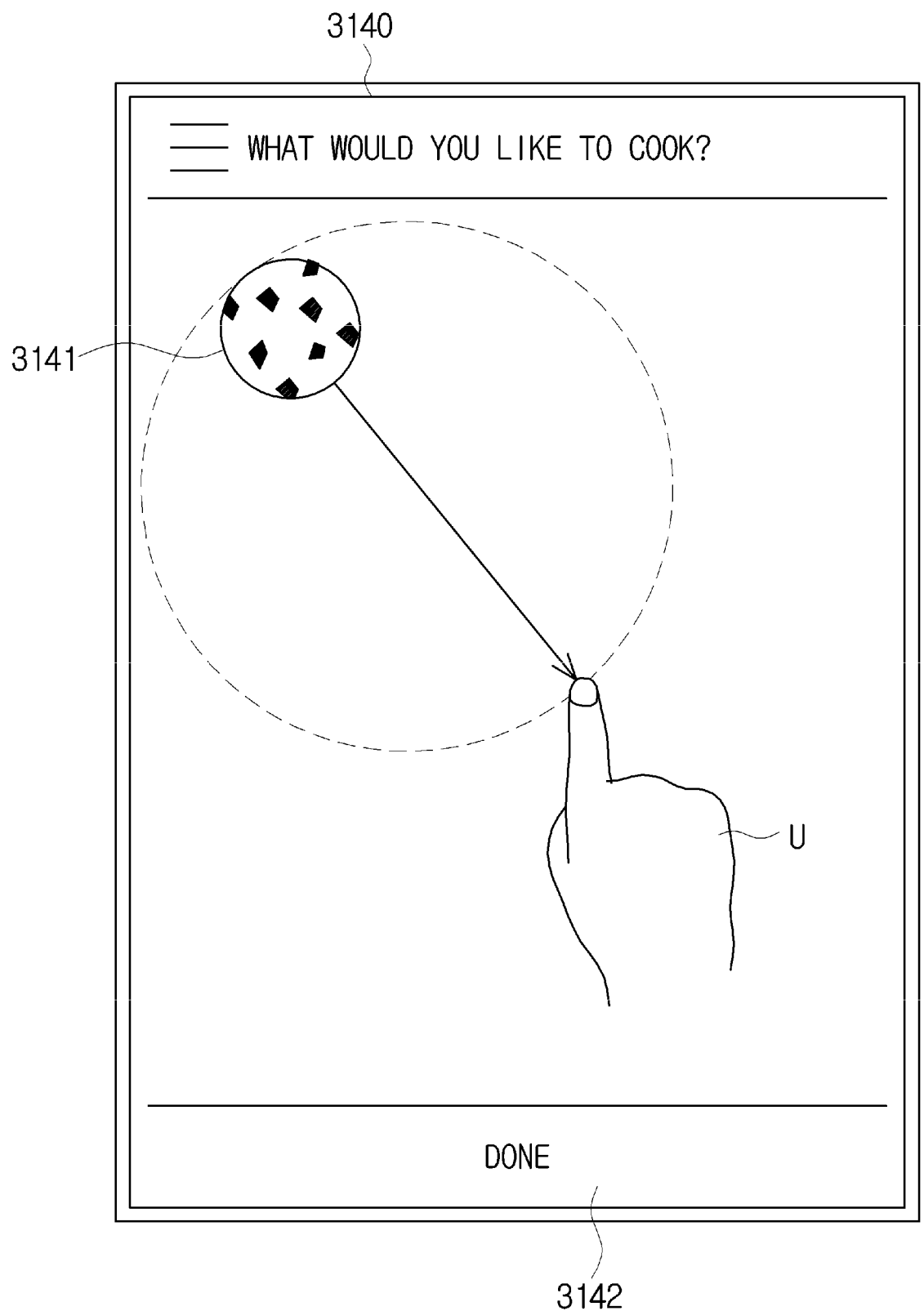

FIG. 63 illustrates an example of a method of editing a food model according to an embodiment of the present disclosure. Also, FIGS. 64 and 65 illustrate examples of editing a food model according to an embodiment.

After generation of a food model is completed, a user may adjust a size of the food model.

A method of editing a food model (2600) will be described with reference to FIGS. 63 and 64.

A food model is generated in operation 2610.

The cooking apparatus 1000 or the user device 1100 may receive an input of a shape, a thickness, ingredients, and a color of food from a user and generate the food model from the shape, the thickness, the ingredients, and the color of the food.

Also, the cooking apparatus 1000 or the user device 1100 may load data related to a food model stored in the storage 1060 or 1160 or receive the data related to the food model from an external device via the communicators 1070 and 1170.

A size of the food model is adjusted in operation 2620.

The cooking apparatus 1000 or the user device 1100 may display the food model, and the user may adjust the size of the food model.

For example, the controller 1010 of the cooking apparatus 1000 may display a model editing screen 3140, which includes a generated food model 3141, illustrated in FIG. 64 on the user interface 1020.

The controller 1010 may enlarge or reduce the food model 3141 according to a touch input of a user. When the user touches one point of the food model 3141 displayed on the user interface 1020 and then moves the touched point outward from the food model 3141, the controller 1010 may enlarge the food model 3141 according to a movement distance of the touched point, as illustrated in FIG. 65. In other words, magnification of the food model 3141 may increase as the movement distance of the touched point increases. Then, when the user stops touching on the model editing screen 3140, the controller 1010 may display the food model 3141 which is enlarged according to a distance from a touch start point to a touch end point.

Also, when the user touches one point of the food model 3141 displayed on the user interface 1020 and then moves the touched point inward from the food model 3141, the controller 1010 may reduce the food model 3141 according to the movement distance of the touched point.

The controller 1110 of the user device 1100 may also enlarge or reduce the food model 3141 according to a touch input of the user.

The edited food model is stored in operation 2630.

The cooking apparatus 1000 or the user device 1100 may store the food model with the adjusted size.

For example, when the user touches a done button 3142 included in the model editing screen 3140, the controller 1010 of the cooking apparatus 1000 may store the food model with the adjusted size in the storage 1060.

The controller 1110 of the user device 1100 may also store the food model with the adjusted size in the storage 1160.

As described above, the cooking apparatus 1000 or the user device 1100 may display a food model and adjust a size of the food model according to a touch input of a user.

Figure 66:
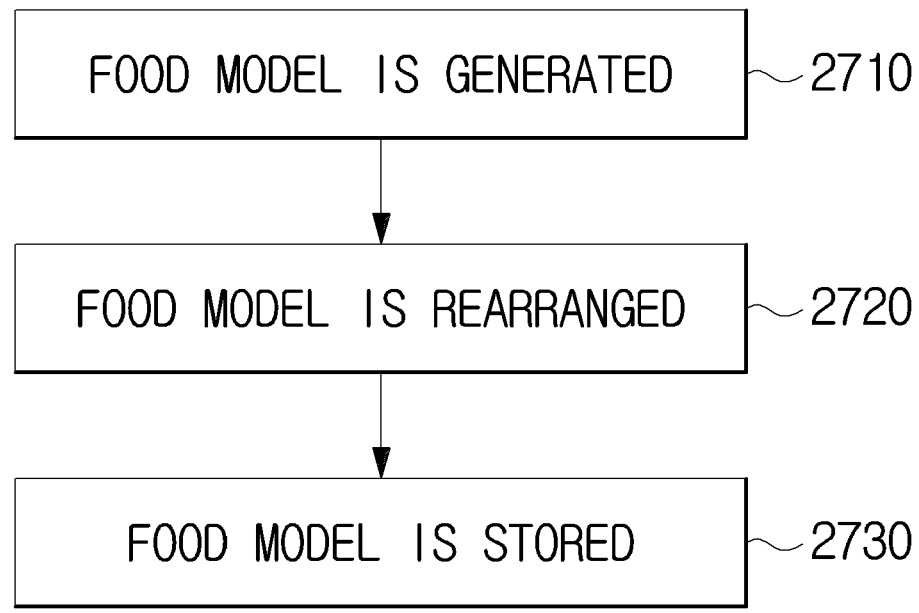
FIG. 66 illustrates another example of a method of editing a food model according to an embodiment of the present disclosure.
Figure 67:
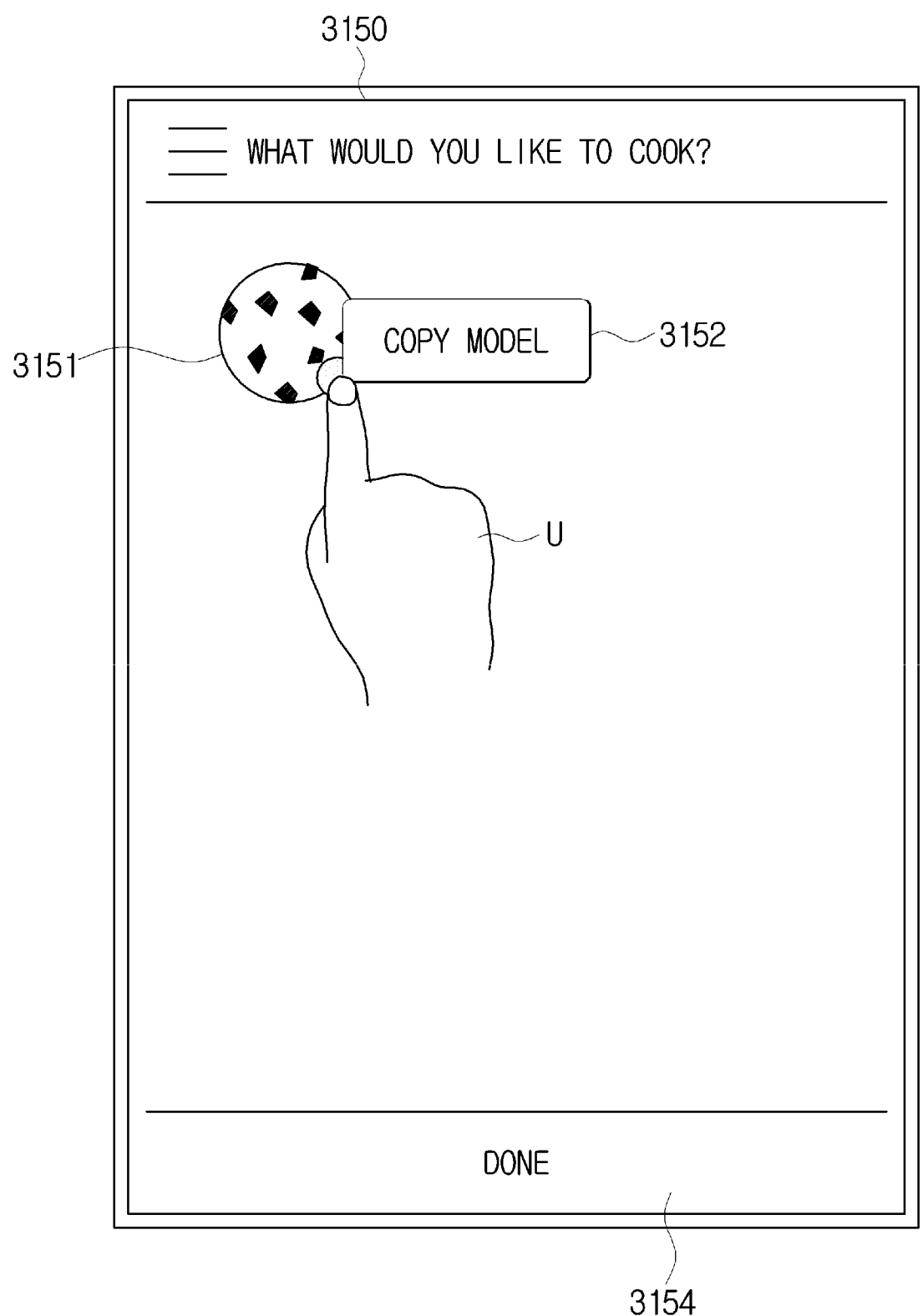
FIGS. 67, 68, 69, and 70 illustrate other examples of editing a food model according to an embodiment of the present disclosure.
Figure 68:
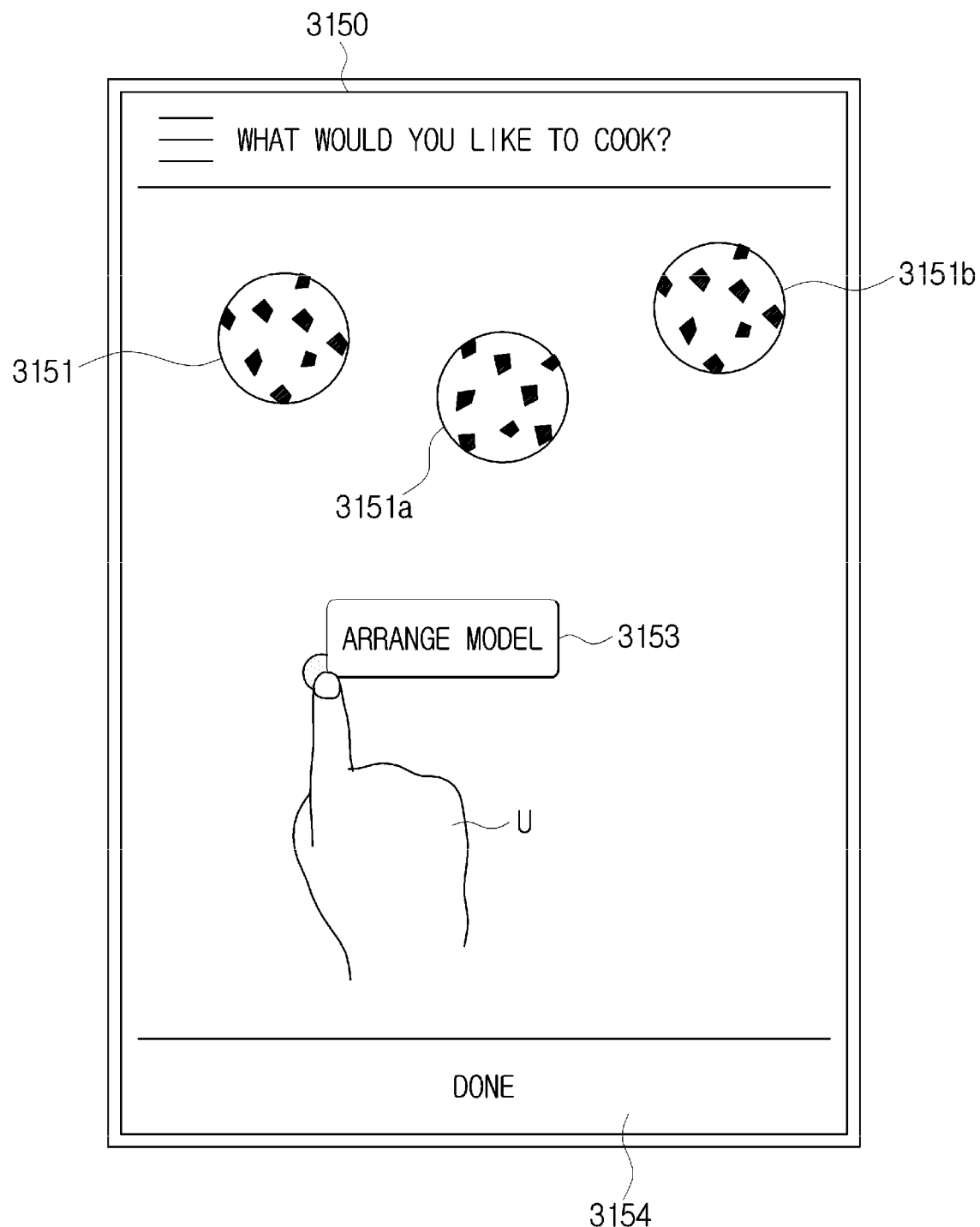
Figure 69:
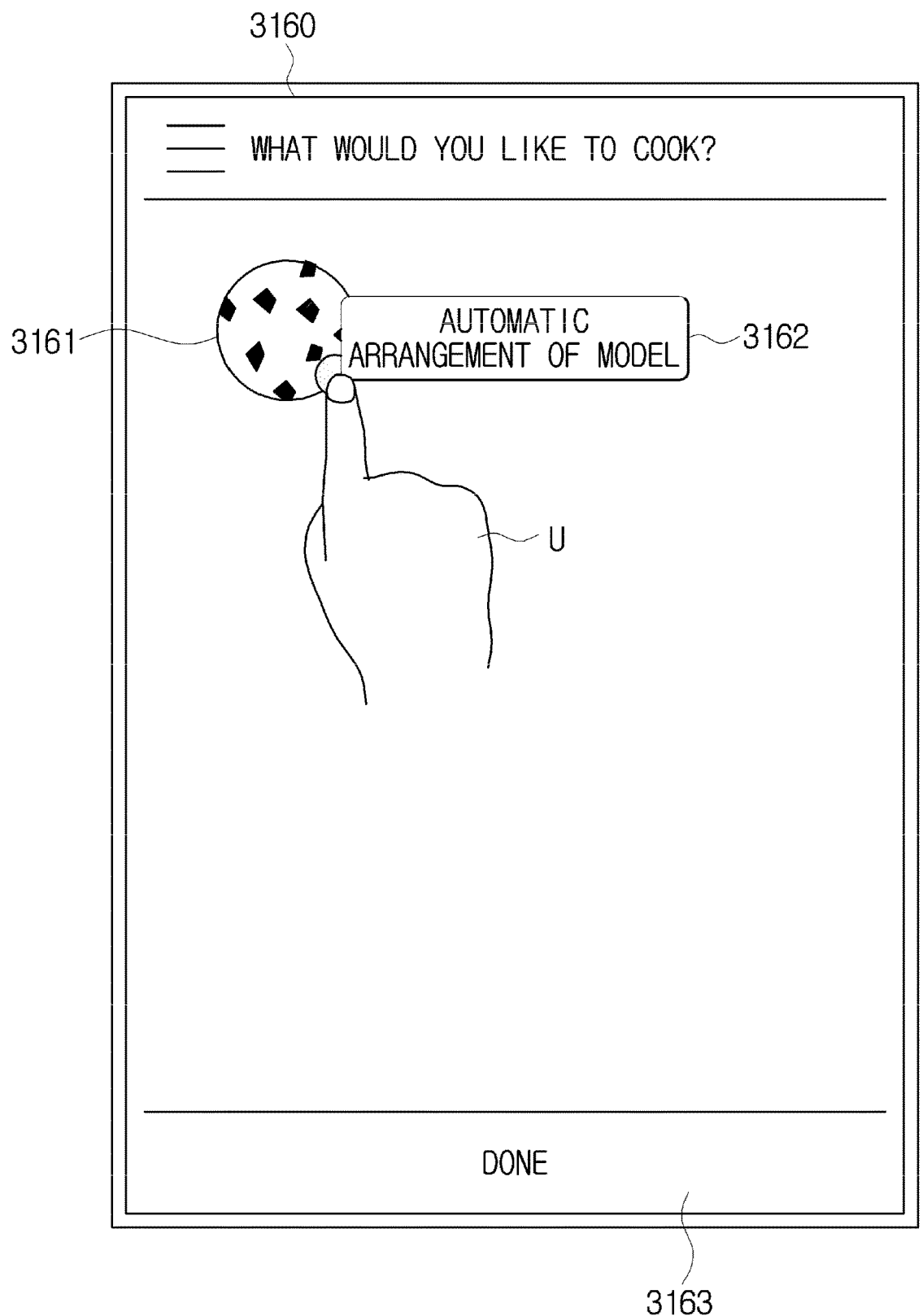

FIG. 66 illustrates another example of a method of editing a food model according to an embodiment of the present disclosure. Also, FIGS. 67, 68, 69, and 70 illustrate other examples of editing a food model according to an embodiment of the present disclosure.

After generation of a food model is completed, the user may rearrange the food model.

A method of editing a food model (2700) will be described with reference to FIGS. 66, 67, 68, 69, and 70.

A food model is generated in operation 2710.

The cooking apparatus 1000 or the user device 1100 may receive an input of a shape, a thickness, ingredients, and a color of food from a user and generate the food model from the shape, the thickness, the ingredients, and the color of the food.

Also, the cooking apparatus 1000 or the user device 1100 may load data related to a food model stored in the storage 1060 or 1160 or receive the data related to the food model from an external device via the communicator 1070 or 1170.

The food model is rearranged in operation 2720.

The cooking apparatus 1000 or the user device 1100 may display the food model, and a user may rearrange the food model.

For example, the controller 1010 of the cooking apparatus 1000 may display a model editing screen 3150 including a generated food model 3151 on the user interface 1020.

The controller 1010 may copy the food model 3151 according to a touch input of the user. When the user touches the food model 3151 displayed on the user interface 1020 for a predetermined amount of time or longer or touches the food model 3151 two or more times within the predetermined amount of time, the controller 1010 may display a model copy button 3152 illustrated in FIG. 67. When the user touches the model copy button 3152, the controller 1010 may temporarily store data related to the food model 3151.

Then, the controller 1010 may arrange the food model 3151 according to a touch input of the user. When the user touches a point on the model editing screen 3150 at which the food model 3151 is not arranged for the predetermined amount of time or longer or touches the point two or more times within the predetermined amount of time, the controller 1010 may display a model arrangement button 3153 illustrated in FIG. 68 at the touched point. When the user touches the model arrangement button 3153, the controller 1010 may arrange the food model 3151 at the touched point. In other words, the controller 1010 may generate a new food model 3151 at the touched point while keeping the existing food model 3151 without change.

The copied food model 3151 is not only arranged once, and the copied food model 3151 may be arranged several times (e.g., food models 3151a and 3151b in FIG. 6B). Consequently, the controller 1010 may generate a plurality of food models 3151 from a single food model 3151 and arrange the plurality of food models 3151 at points touched by the user.

The controller 1110 of the user device 1100 may also copy the food model 3151 according to a touch input of the user and arrange the food model 3151 according to the user's touch input.

As another example, the controller 1010 of the cooking apparatus 1000 may display a model editing screen 3160 including a generated food model 3161 on the user interface 1020.

The controller 1010 may automatically copy and automatically arrange the food model 3161 according to a touch input of a user. When the user touches the food model 3161 displayed on the user interface 1020 for a predetermined amount of time or longer or touches the food model 3161 two or more times within the predetermined amount of time, the controller 1010 may display an automatic model arrangement button illustrated in FIG. 70.

Figure 70:
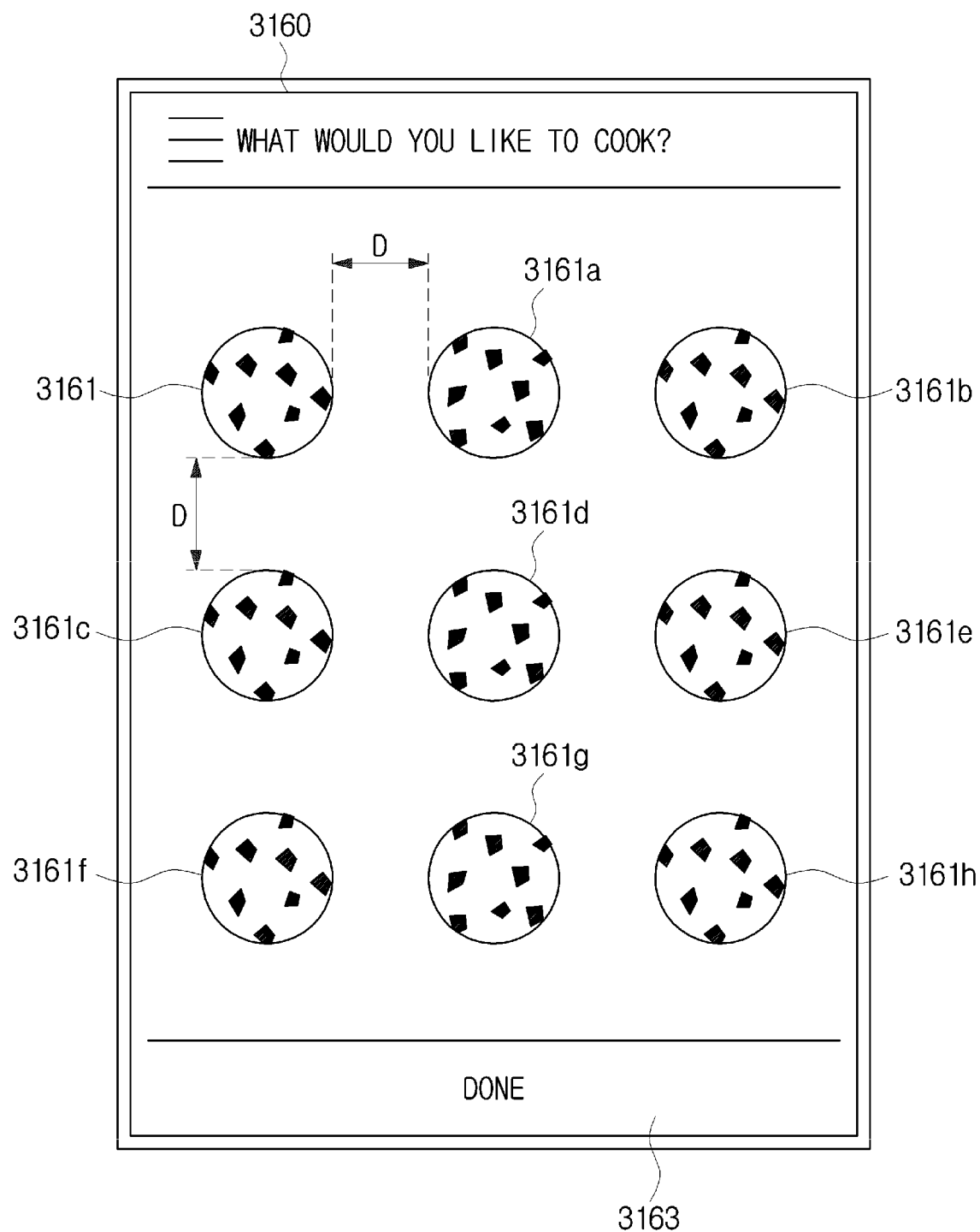

When the user touches the automatic model arrangement button, the controller 1010 may arrange the food model 3161 each predetermined distance D as illustrated in FIG. 70.

Specifically, the controller 1010 may calculate the number of pieces of food that can be arranged in the cooking compartment from a horizontal width and a vertical width in which food can be arranged in the cooking compartment, a width of each of the pieces of food, and an interval between the pieces of food. Then, for example, the controller 1010 may copy the food model 3161 as many times as the number of the pieces of food that can be arranged in the cooking compartment and arrange copied food models 3161a to 3161h in the model editing screen 3160, as illustrated in FIG. 70.

Also, the controller 1010 may calculate the number of the pieces of food that can be arranged in the cooking compartment from a ratio between an area in which food can be arranged in the cooking compartment and an area of the piece of food. Then, the controller 1010 may copy the food model 3161 and arrange the copied food models 3161a to 3161h in the model editing screen 3160 as illustrated in FIG. 70.

The controller 1110 of the user device 1100 may also rearrange the food model 3161 in the model editing screen 3160 according to a touch input of the user.

The edited food model is stored in operation 2730.

The cooking apparatus 1000 or the user device 1100 may store the rearranged food model.

For example, when the user touches done buttons 3154 and 3163 respectively included in the model editing screens 3150 and 3160, the controller 1010 of the cooking apparatus 1000 may store the rearranged food model in the storage 1060.

The controller 1110 of the user device 1100 may also store the rearranged food model in the storage 1160.

As described above, the cooking apparatus 1000 or the user device 1100 may display a food model and rearrange the food model according to a touch input of a user.

Figure 71:
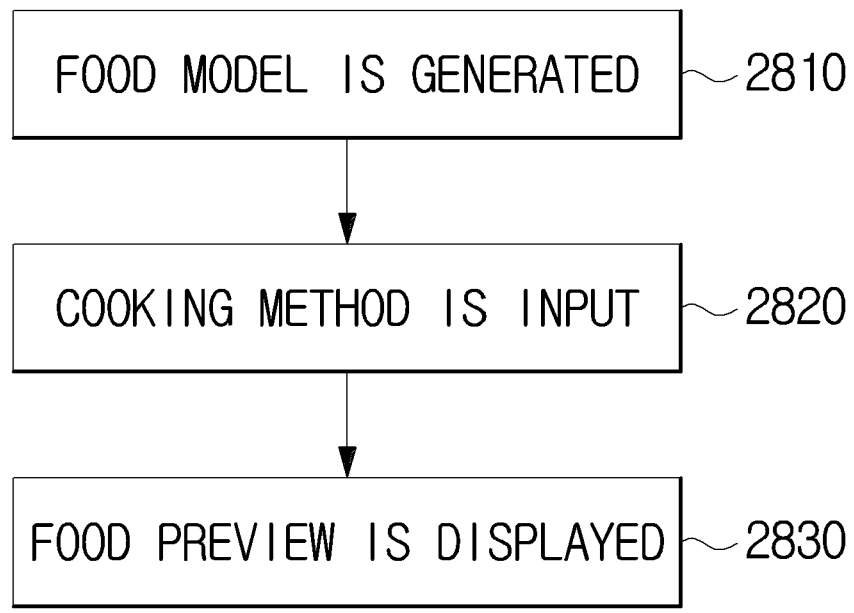
FIG. 71 illustrates a method of generating a food preview according to an embodiment of the present disclosure.
Figure 73:
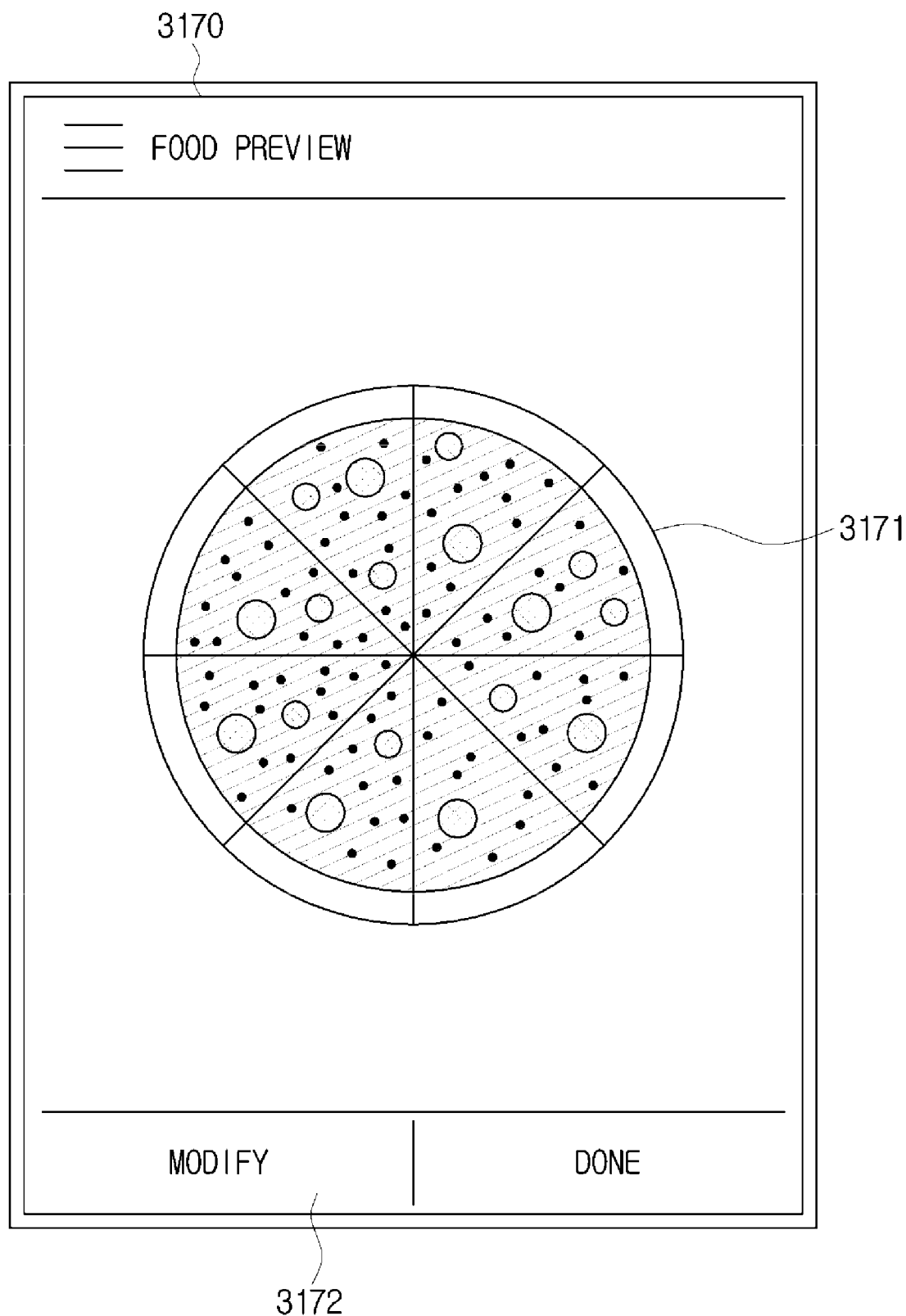
FIG. 73 illustrates an example of a food preview according to an embodiment of the present disclosure.

FIG. 71 illustrates a method of generating a food preview according to an embodiment of the present disclosure. FIG. 72 illustrates an example of data for generating a food preview according to an embodiment. Also, FIG. 73 illustrates an example of a food preview according to an embodiment of the present disclosure.

After production of a food model is completed, a user may check a preview of cooked food.

A method of generating a food preview (2800) will be described with reference to FIGS. 71, 72, and 73.

A food model is generated in operation 2810.

The cooking apparatus 1000 or the user device 1100 may receive an input of a shape, a thickness, ingredients, and a color of food from a user and generate a food model from the shape, the thickness, the ingredients, and the color of the food.

Also, the cooking apparatus 1000 or the user device 1100 may load data related to a food model stored in the storage 1060 or 1160 or receive the data related to the food model from an external device via the communicator 1070 or 1170.

A cooking method is input in operation 2820.

The cooking apparatus 1000 or the user device 1100 may receive an input of a selection of a heating device, a setting of a cooking temperature, and a setting of a cooking time, and generate a cooking method from the selected heating device and the set cooking temperature and cooking time.

Also, the cooking apparatus 1000 or the user device 1100 may load data related to a cooking method stored in the storage 1060 or 1160 or receive the data related to the cooking method from an external device via the communicator 1070 or 1170.

A food preview is displayed in operation 2830.

The cooking apparatus 1000 or the user device 1100 may display a food preview on the basis of the food model and the cooking method. The food preview shows an appearance of food when the food is formed with the food model and cooked using the cooking method.

For example, the controller 1010 of the cooking apparatus 1000 may simulate heating the food model according to the cooking method. Specifically, the storage 1060 of the cooking apparatus 1000 may store a preview database for generating a preview of a food model.

The preview database may include data related to changes in shape and color of food according to ingredients and a color of a food model, a heating device, a cooking temperature, and a cooking time. For example, as illustrated in FIG. 72, the preview database may include changes in color of dough according to a cooking temperature and a cooking time when a convection grill is operated. In FIG. 72, it can be seen that a color of food darkens as the cooking temperature and the cooking time increase.

The preview database may include data related to changes in shape of food according to a cooking temperature and a cooking time as well as changes in color of the food according to the cooking temperature and the cooking time.

The controller 1010 may use the preview database stored in the storage 1060 to estimate a shape of cooked food from ingredients and a color of a food model, a heating device, a cooking temperature, and a cooking time and display the estimated food shape on the user interface 1020.

For example, the controller 1010 may display a food preview screen 3170 illustrated in FIG. 73. The food preview screen 3170 may include a food preview 3171 that is generated from ingredients and a color of a food model, a heating device, a cooking temperature, and a cooking time. The user may check the food preview and modify the food model. For this, the food preview screen 3170 may also include a modification button 3172 for modifying a food model.

The controller 1110 of the user device 1100 may also generate the food preview from the ingredients and the color of the food model, the heating device, the cooking temperature, and the cooking time and display the food preview.

As described above, the cooking apparatus 1000 or the user device 1100 may display a food preview to a user.

Figure 74:
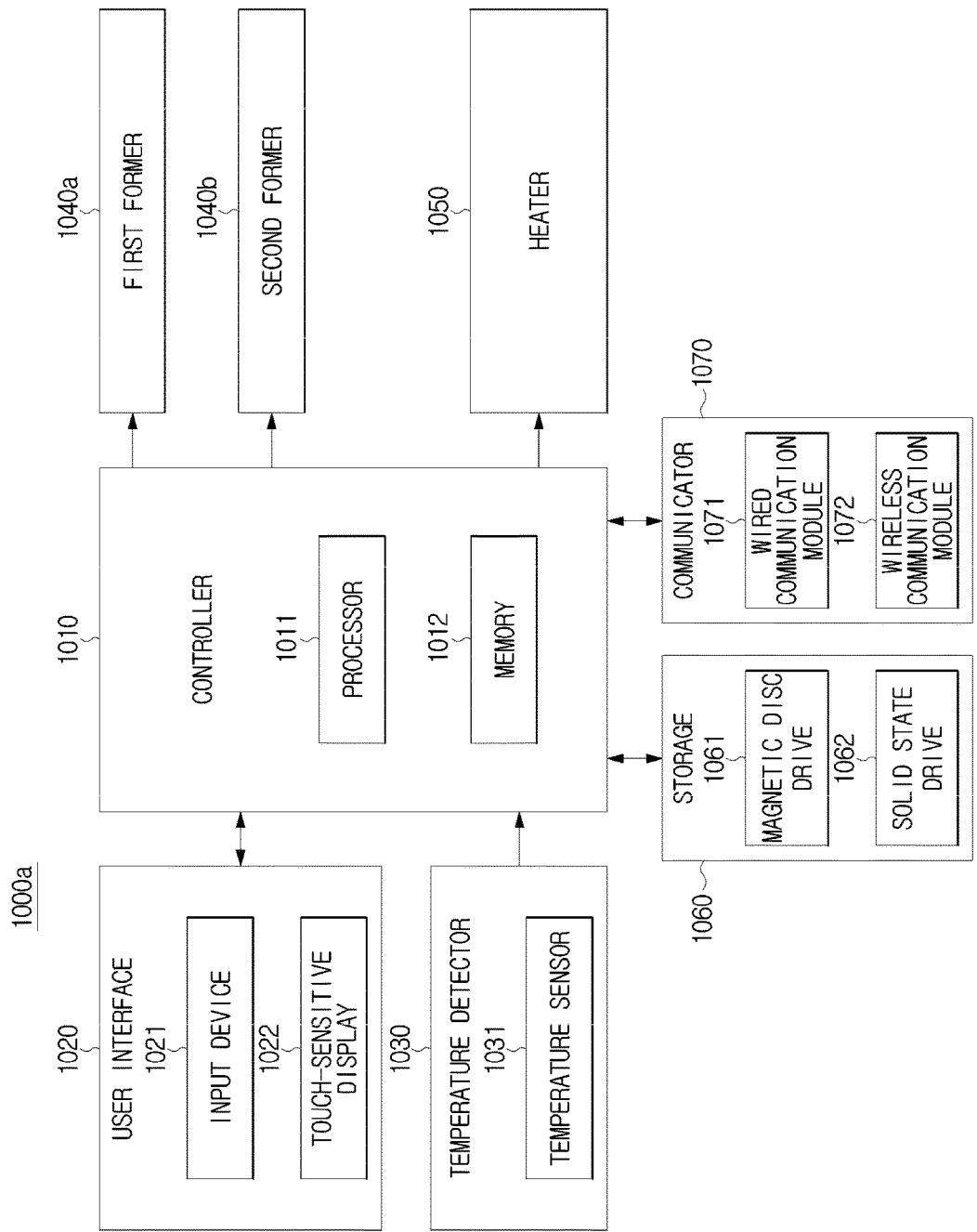
FIG. 74 illustrates a block diagram of a cooking apparatus according to an embodiment of the present disclosure.
Figure 75:
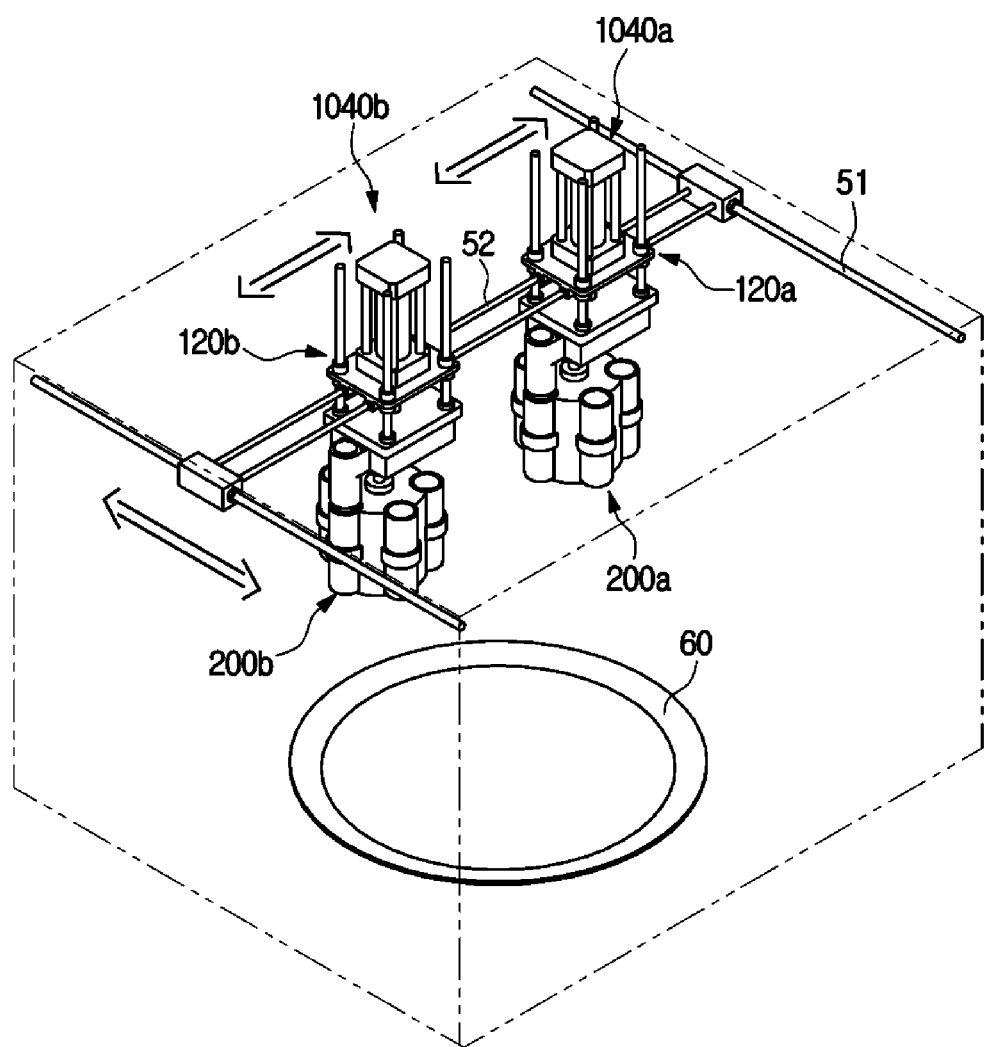
FIGS. 75, 76, and 77 illustrate examples of a former included in the cooking apparatus according to an embodiment of the present disclosure.
Figure 76:
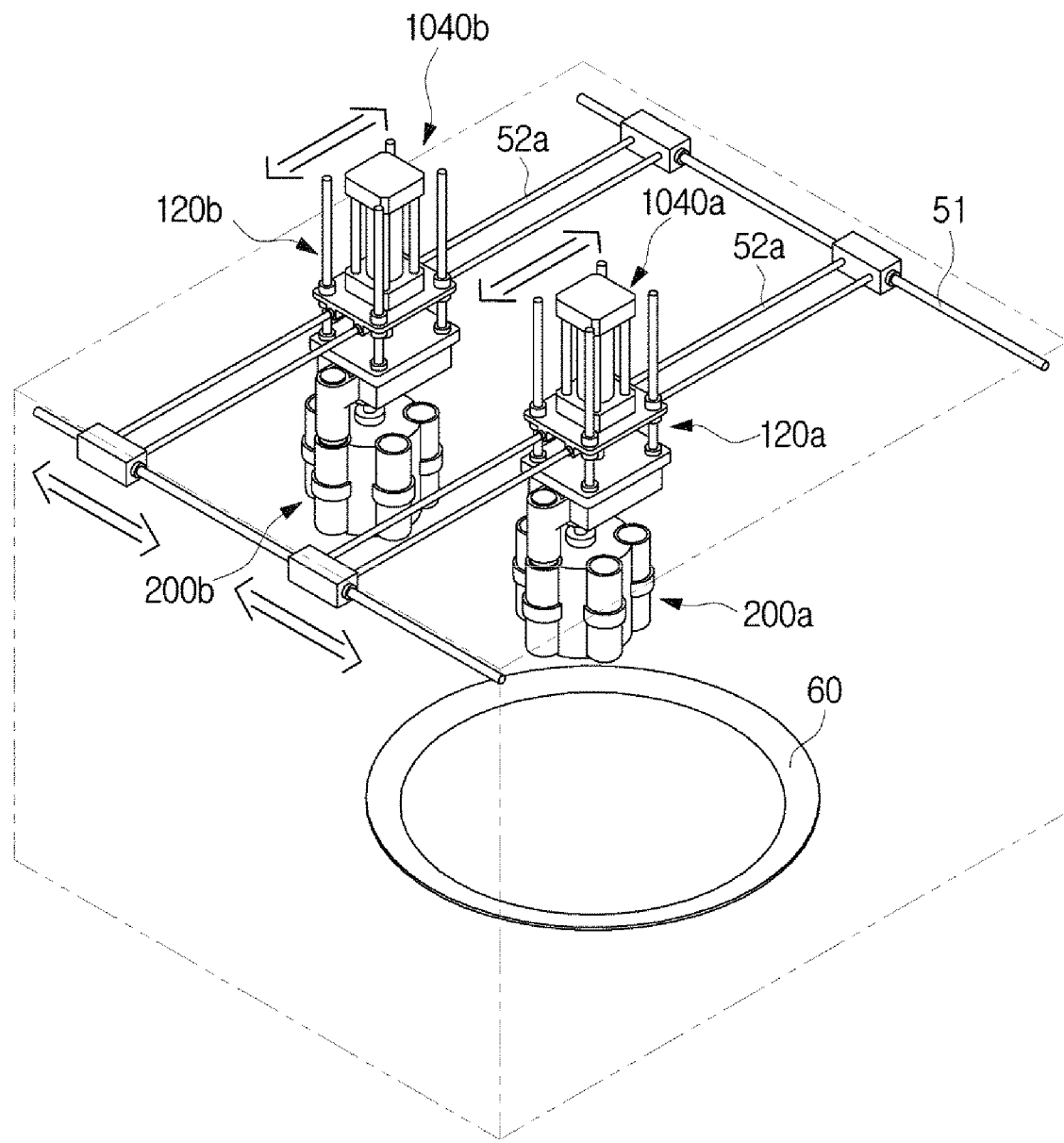
Figure 77:
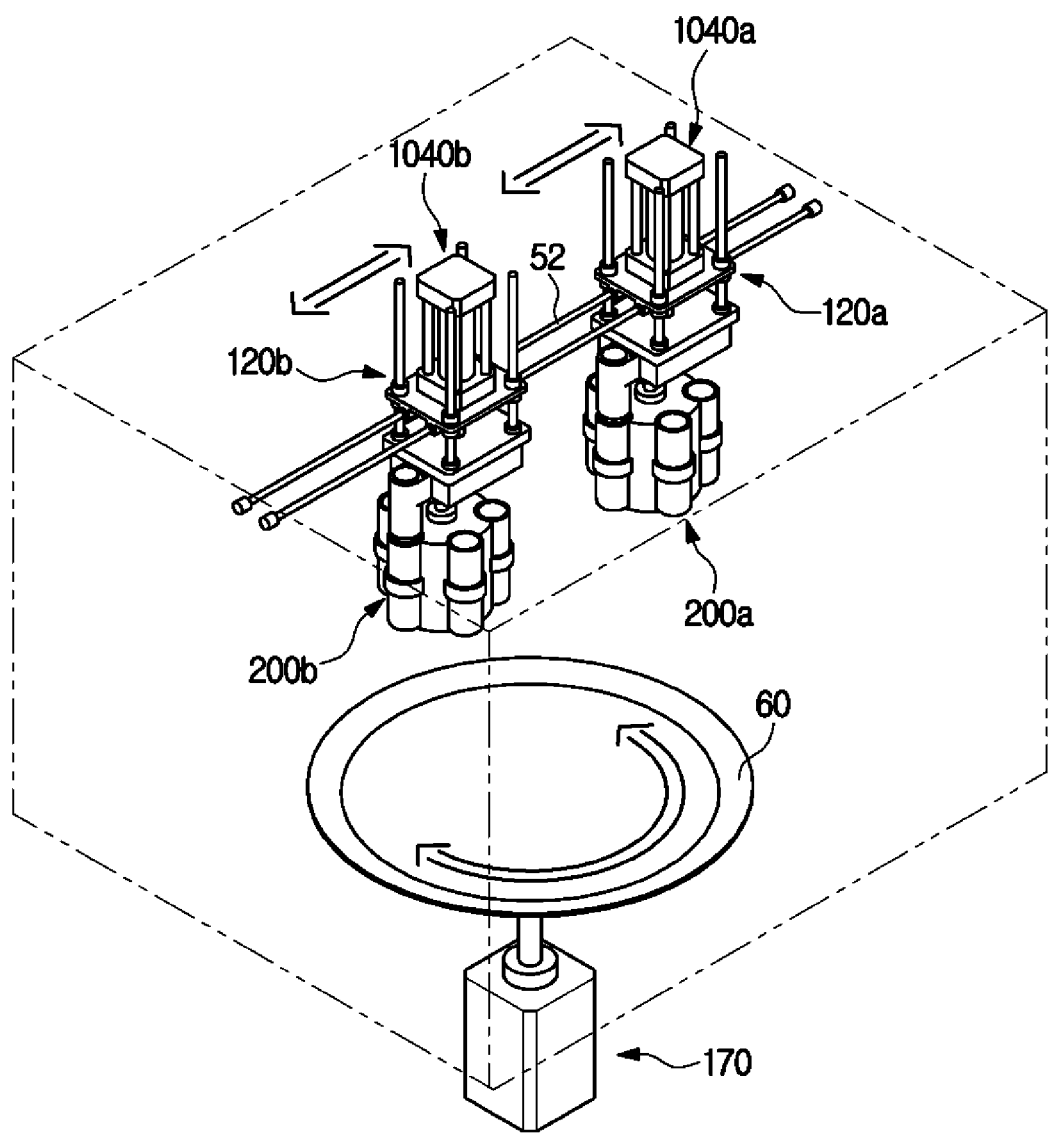

FIG. 74 illustrates a block diagram of a cooking apparatus according to an embodiment of the present disclosure. Also, FIGS. 75, 76, and 77 illustrate examples of a former (e.g., a food former or a food shaping unit or device) included in the cooking apparatus according to an embodiment of the present disclosure.

To shorten a food formation time, a cooking apparatus may include a plurality of formers.

Referring to FIGS. 74, 75, 76, and 77, a cooking apparatus 1000a may include the user interface 1020 configured to interact with a user, the temperature detector 1030 configured to detect a temperature of a cooking compartment, a first former 1040a and a second former 1040b configured to form food, the heater 1050 configured to heat the food, the storage 1060 configured to store a program and data, the communicator 1070 configured to communicate with external devices, and the controller 1010 configured to control operation of the cooking apparatus 1000a.

Detailed descriptions of configurations and operations of the user interface 1020, the temperature detector 1030, the heater 1050, the storage 1060, and the communicator 1070 will be omitted because the descriptions overlap those of the user interface, the temperature detector, the heater, the storage, and the communicator described above with reference to FIG. 37.

Each of the first former 1040a and the second former 1040b may independently form food according to a shape, ingredients, and a color of food input by the user.

The first former 1040a may include a first cartridge assembly 200a and a first driving device 120a. The first cartridge assembly 200a may store food ingredients and discharge the food ingredients according to food formation data of the controller 1010. The first driving device 120a may move the first cartridge assembly 200a and place the first cartridge assembly 200a at a position set by the food formation data of the controller 1010.

The second former 1040b may include a second cartridge assembly 200b and a second driving device 120b. The second cartridge assembly 200b may store food ingredients and discharge the food ingredients according to the food formation data of the controller 1010. The second driving device 120b may move the second cartridge assembly 200b and place the second cartridge assembly 200b at a position set by the food formation data of the controller 1010.

For example, as illustrated in FIG. 75, the first former 1040a and the second former 1040b may move along the movable rod 52 provided in the cooking apparatus 1000a. Also, the movable rod 52 may move along the fixed rods 51 provided in the cooking apparatus 1000a.

Specifically, the first former 1040a may move within a right half of the movable rod 52, and the second former 1040b may move within a left half of the movable rod 52. As a result, the first former 1040a may form food within a right half of the cooking compartment, and the second former 1040b may form food within a left half of the cooking compartment.

In this way, the first former 1040*a* may form food on the basis of a right half of a food model, and the second former 1040*b* may form food on the basis of a left half of the food model.

As another example, as illustrated in FIG. 76, the first former 1040*a* may move along a first movable rod 52*a* provided in the cooking apparatus 1000*a*, and the second former 1040*b* may move along a second movable rod 52*b* provided in the cooking apparatus 1000*a*. Also, the first movable rod 52*a* and the second movable rod 52 may move along the fixed rods 51.

Specifically, the first movable rod 52*a* at which the first former 1040*a* is installed may move in a front half of the fixed rods 51, and the second movable rod 52*b* in which the second former 1040*b* is installed may move in a rear half of the fixed rods 51. As a result, the first former 1040*a* may form food in a front half of the cooking compartment, and the second former 1040*b* may form food in a rear half of the cooking compartment.

In this way, the first former 1040*a* may form food on the basis of a front half of a food model, and the second former 1040*b* may form food on the basis of a rear half of the food model.

As still another example, as illustrated in FIG. 77, the first former 1040*a* and the second former 1040*b* may move along fixed rods 52 provided in the cooking apparatus 1000*a*, and the fixed rods 52 may be fixed in the cooking compartment. Specifically, the first former 1040*a* may move in a right half of the fixed rods 52, and the second former 1040*b* may move in a left half of the fixed rod 52.

Also, the tray 60 on which food is formed may be provided in the cooking compartment, and the tray 60 may be rotated by a tray rotating unit 180.

While the tray 60 rotates, the first former 1040*a* and the second former 1040*b* may move leftward and rightward along the fixed rods 52 and form food.

The controller 1010 may include the processor 1011 and the memory 1012.

The processor 1011 may generate food formation data for forming food on the basis of a food model.

Specifically, the processor 1011 may divide a food model into a plurality of model parts and distribute the plurality of model parts to the first former 1040*a* and the second former 1040*b*. For example, the processor 1011 may divide a food model that represents a single piece of food into two model parts or divide a food model that represents multiple pieces of food into two model parts according to the number of pieces of food.

The processor 1011 may generate food formation data for forming food on the basis of a plurality of model parts. Each of the first former 1040*a* and the second former 1040*b* may form a portion of a piece of food according to food formation data of a model part.

Also, the processor 1011 may process data related to a cooking method, which is input via the user interface 1020, received via the communicator 1070, or stored in the storage 1060, and generate food heating data for heating food on the basis of the cooking method.

The memory 1012 may store a program for receiving inputs of a food model and a cooking method via the user interface 1020 and a program for processing data related to the food model and/or data related to the cooking method and generating the food formation data and/or the food heating data.

In this way, the cooking apparatus 1000*a* may include the plurality of formers 1040*a* and 1040*b* configured to form food, and each of the plurality of formers 1040*a* and 1040*b* may form food together or independently from each other. Consequently, the cooking apparatus 1000*a* may more quickly form food.

Figure 78:
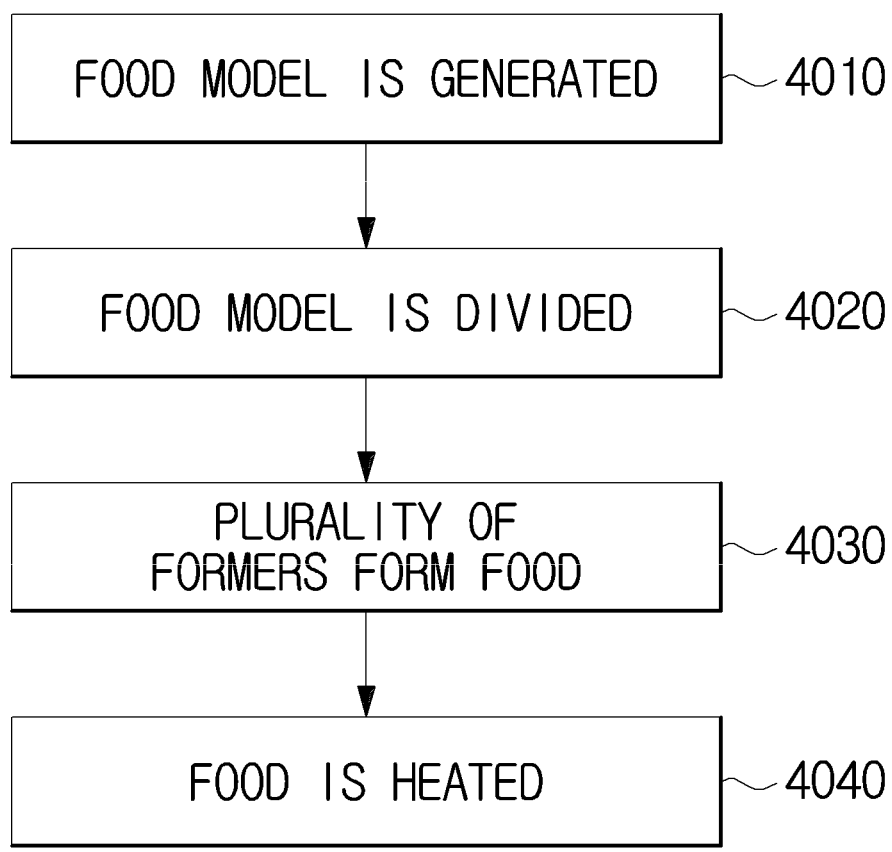
FIG. 78 illustrates a method of forming food according to another embodiment of the present disclosure.
Figure 79:
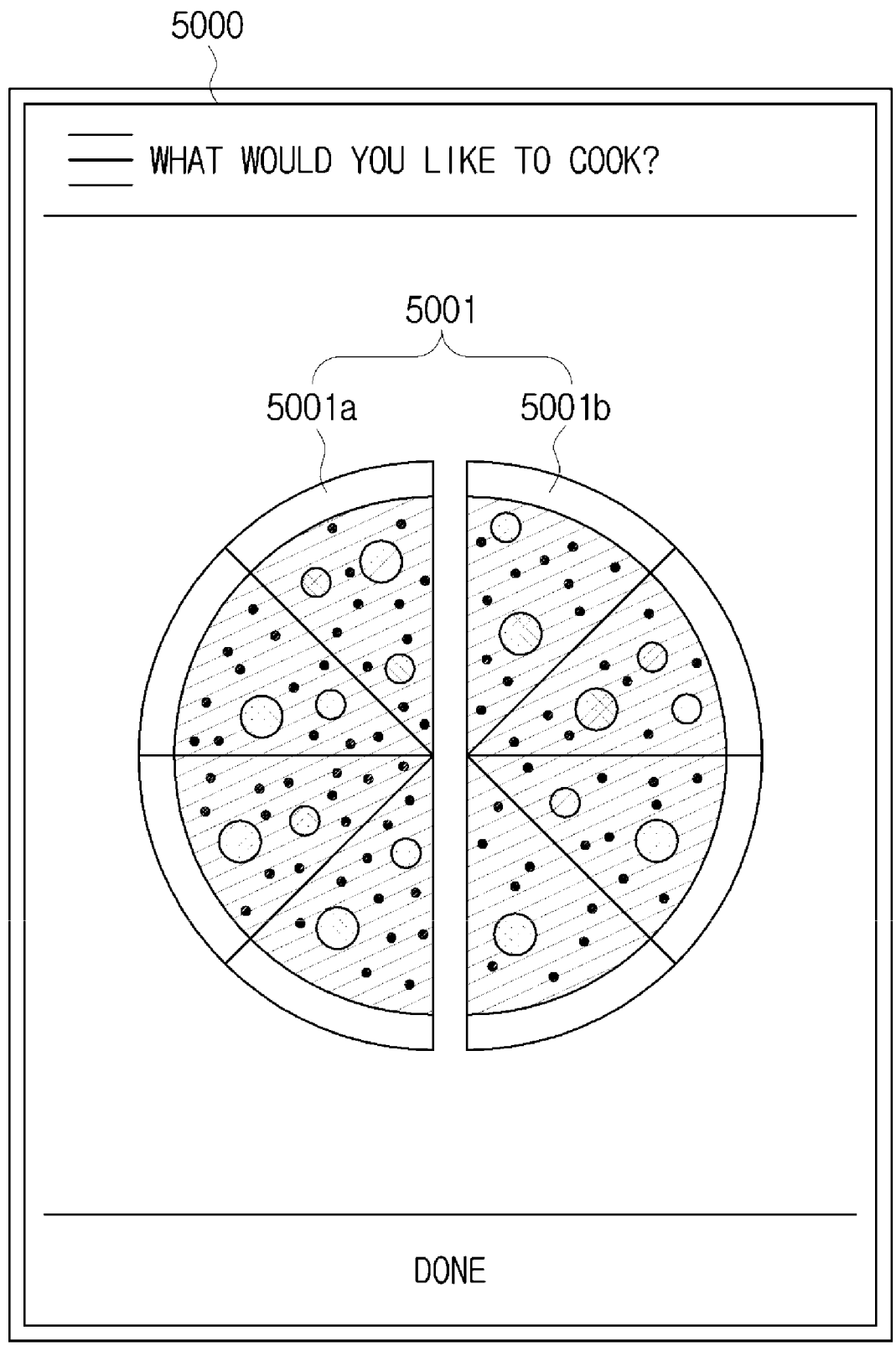
FIGS. 79 and 80 illustrate examples of dividing a food model according to an embodiment of the present disclosure.
Figure 80:
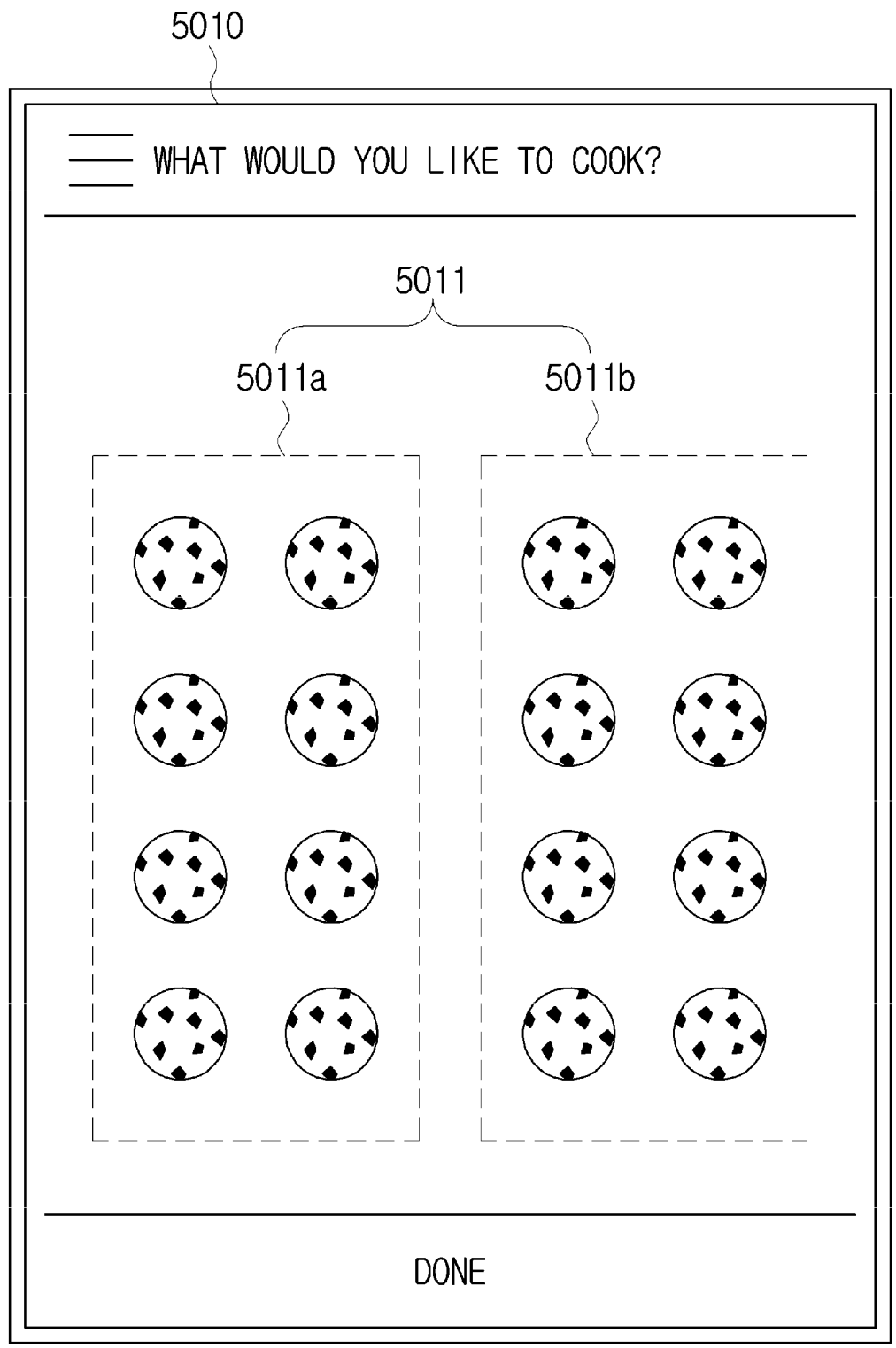

FIG. 78 illustrates a method of forming food according to an embodiment of the present disclosure. Also, FIGS. 79 and 80 illustrate examples of dividing a food model according to another embodiment of the present disclosure.

A method of forming food (4000) will be described with reference to FIGS. 78, 79, and 80.

A food model is generated in operation 4010.

The cooking apparatus 1000*a* or the user device 1100 may receive an input of a shape, a thickness, ingredients, and a color of food from a user and generate a food model from the shape, the thickness, the ingredients, and the color of the food.

Also, the cooking apparatus 1000*a* or the user device 1100 may load data related to a food model stored in the storage 1060 or 1160 or receive the data related to the food model from an external device via the communicator 1070 or 1170.

The food model is divided in operation 4020.

The cooking apparatus 1000*a* or the user device 1100 may divide a food model to quickly form food.

The controller 1010 of the cooking apparatus 1000*a* including the first former 1040*a* and the second former 1040*b* may divide the food model into two model parts.

For example, the controller 1010 may display a model division screen 5000 for dividing a food model illustrated in FIG. 79 on the user interface 1020. The model division screen 5000 may include a food model 5001, and the food model 5001 may represent a single piece of food. Also, the food model 5001 may be divided into a first model part 5001*a* that represents a portion of the food and a second model part 5001*b* that represents the remaining portion of the food.

The food model 5001 may be divided into the first model part 5001*a* and the second model part 5001*b* on the basis of a size of the food. Specifically, the first model part 5001*a* and the second model part 5001*b* preferably have the same size.

Also, the food model 5001 may be divided into the first model part 5001*a* and the second model part 5001*b* on the basis of ingredients. Specifically, ingredients that constitute the first model part 5001*a* are preferably similar to each other, and ingredients that constitute the second model part 5001*b* are preferably similar to each other.

Also, the food model 5001 may be divided into the first model part 5001*a* and the second model part 5001*b* on the basis of color. Specifically, colors that represent the first model part 5001*a* are preferably similar to each other, and colors that represent the second model part 5001*b* are preferably similar to each other.

As another example, the controller 1010 may display a model division screen 5010 for dividing a food model illustrated in FIG. 80 on the user interface 1020. The model division screen 5010 may include a food model 5011, and the food model 5011 may represent multiple pieces of food. The food model 5011 may be divided into a first model part 5011*a* that represents some of the multiple pieces of food and a second model part 5011*b* that represents the rest of the multiple pieces of food.

The food model 5011 may be divided into the first model part 5011*a* and the second model part 5011*b* on the basis of the number of pieces of food. Specifically, the first model part 5011*a* and the second model part 5011*b* preferably represent the same number of pieces of food.

Also, the food model 5011 may be divided into the first model part 5011*a* and the second model part 5011*b* on the basis of similarity of the pieces of food. Specifically, the multiple pieces of food constituting the first model part 5011a are preferably the same as one another, and the multiple pieces of food constituting the second model part 5011b are preferably the same as one another.

The controller 1110 of the user device 1100 may also divide a food model into a plurality of model parts and transmit the plurality of model parts to the cooking apparatus 1000a including the first former 1040a and the second former 1040b.

Food is formed by the plurality of formers 1040a and 1040b in operation 4030.

The controller 1010 of the cooking apparatus 1000a may distribute the plurality of model parts to the plurality of formers 1040a and 1040b. For example, the controller 1010 may distribute the first model part 5001a illustrated in FIG. 79 to the first former 1040a and distribute the second model part 5001b to the second former 1040b. Also, the controller 1010 may distribute the first model part 5011a illustrated in FIG. 80 to the first former 1040a and distribute the second model part 5011b to the second former 1040b.

Each of the plurality of formers 1040a and 1040b may form a portion of food according to a model part distributed thereto or form some of multiple pieces of food. For example, the first former 1040a may form a portion of food (a pizza) according to the first model part 5001a illustrated in FIG. 79, and the second former 1040b may form the remaining portion of the food (the pizza) according to the second model part 5001b.

The food is heated in operation 4040.

The controller 1010 of the cooking apparatus 1000a may control the heater 1050 to heat the food according to a cooking method. For example, any one heating device of a grill heater, a convection grill, and a microwave heater may be selected according to the cooking method. Also, the selected heating device may be controlled so that a temperature of the cooking compartment is maintained at a cooking temperature during a cooking time.

As described above, the cooking apparatus 1000a may include the plurality of formers 1040a and 1040b, and each of the plurality of formers 1040a and 1040b may independently form food. As a result, the cooking apparatus 1000a may more quickly form food.

Figure 81:
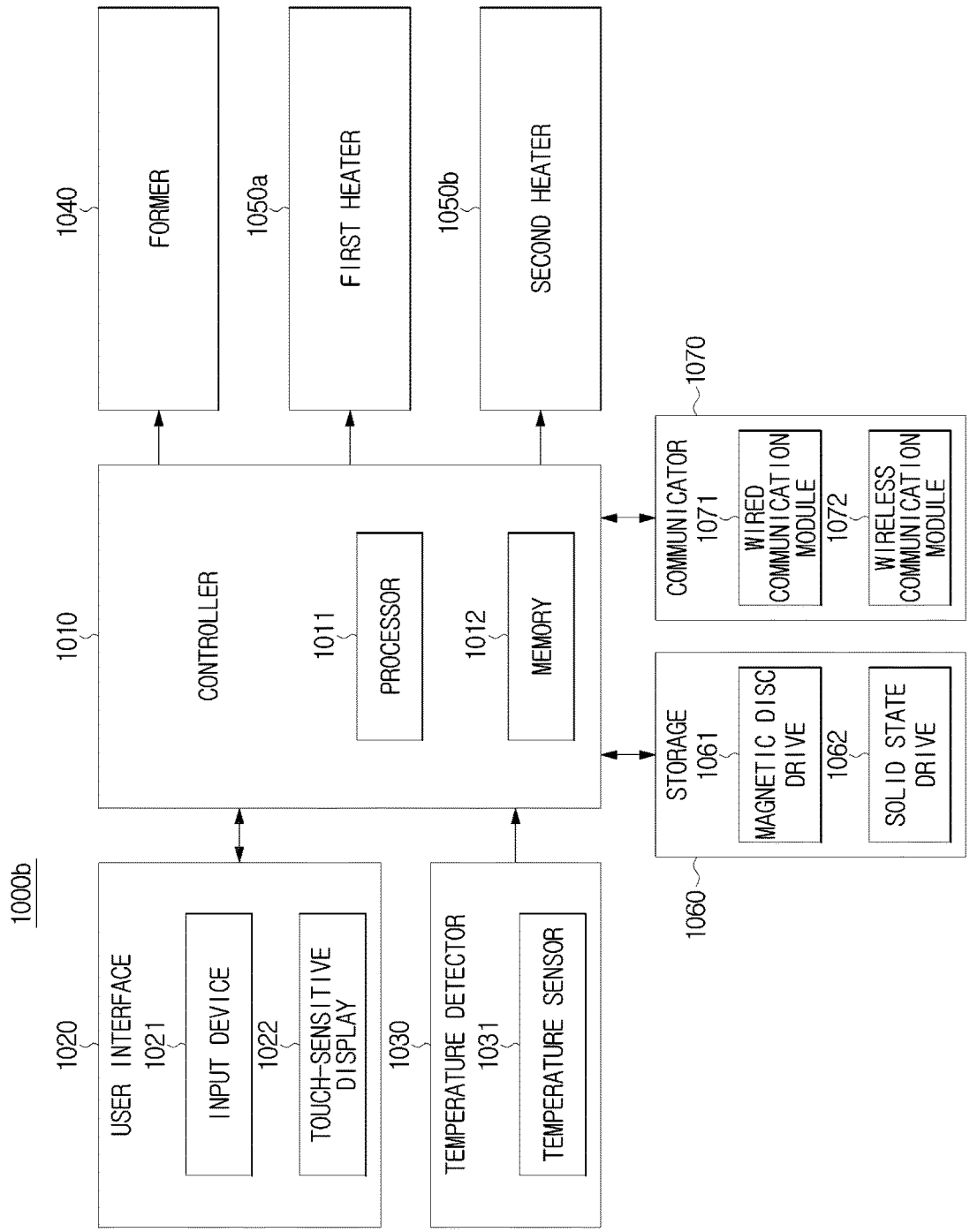
FIG. 81 illustrates a block diagram of a cooking apparatus according to still an embodiment of the present disclosure.

FIG. 81 illustrates a block diagram of a cooking apparatus according to an embodiment of the present disclosure. Also, FIG. 82 illustrates an exterior of the cooking apparatus according to an embodiment of the present disclosure.

To shorten a heating time of food, a cooking apparatus may include a plurality of heaters.

Figure 82:
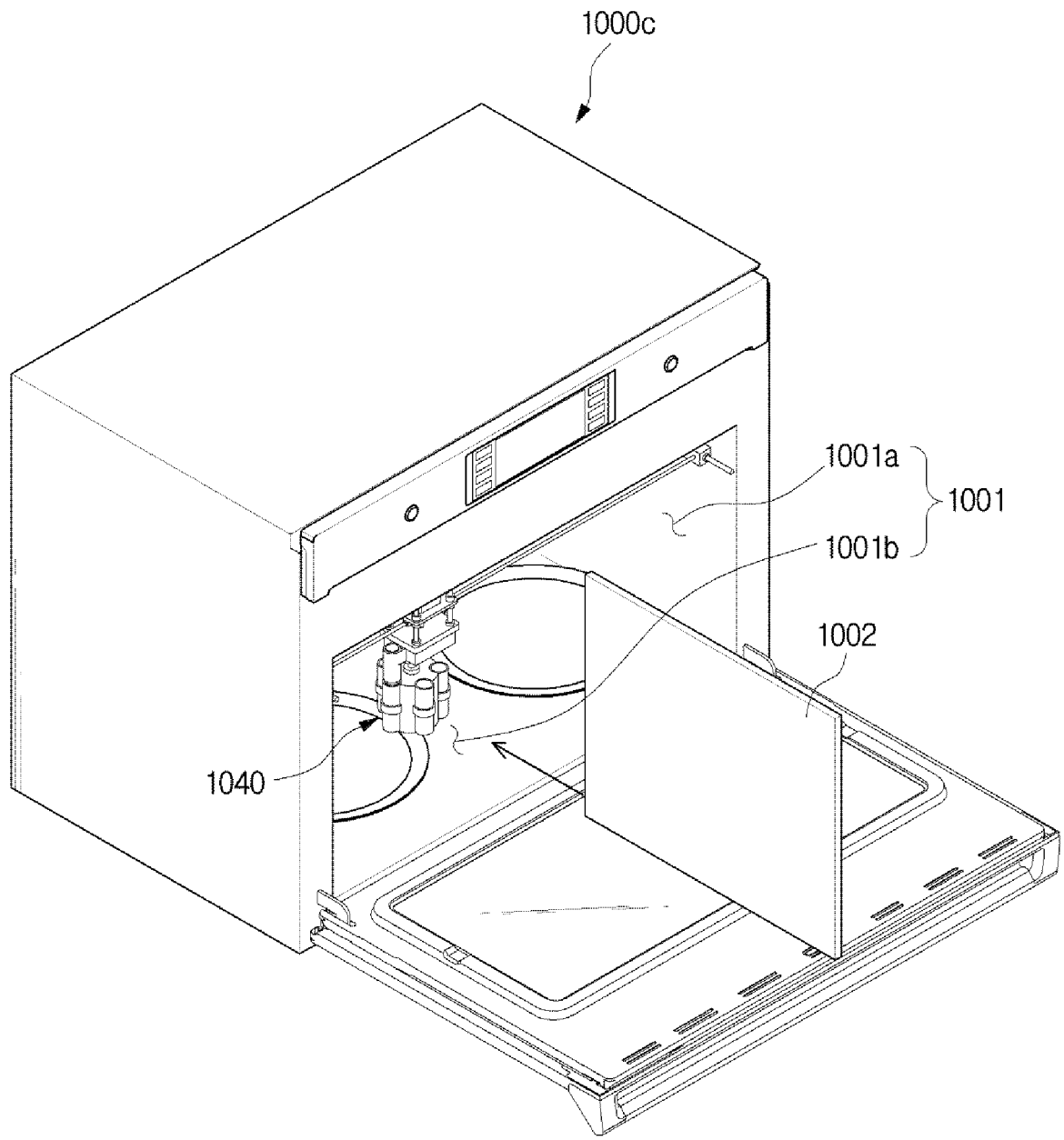
FIG. 82 illustrates an exterior of the cooking apparatus according to still an embodiment of the present disclosure.

Referring to FIGS. 81 and 82, a cooking apparatus 1000b may include the user interface 1020 configured to interact with a user, the temperature detector 1030 configured to detect a temperature of a cooking compartment, the former 1040 configured to form food, a first heater 1050a and a second heater 1050b configured to heat the food, the storage 1060 configured to store a program and data, the communicator 1070 configured to communicate with external devices, and the controller 1010 configured to control operation of the cooking apparatus 1000b.

Detailed descriptions of configurations and operations of the user interface 1020, the temperature detector 1030, the former 1040, the storage 1060, and the communicator 1070 will be omitted because the descriptions overlap those of the user interface, the temperature detector, the former, the storage, and the communicator described above with reference to FIG. 37.

Each of the first heater 1050a and the second heater 1050b may include various heating devices. For example, each of the first heater 1050a and the second heater 1050b may include a grill heater, a convection grill, a microwave heater, and the like.

Also, the cooking compartment of the cooking apparatus 1000b may be divided by a divider, and the first heater 1050a and the second heater 1050b may heat food in divided portions of the cooking compartment. For example, as illustrated in FIG. 82, the first heater 1050a may heat food in a first cooking compartment 1001a, and the second heater 1050b may heat food in a second cooking compartment 1001b.

The first heater 1050a and the second heater 1050b may operate independently from each other. The first heater 1050a and the second heater 1050b may heat food using different cooking methods. For example, the grill heater of the first heater 1050a may be operated to heat food in the first cooking compartment 1001a, and the convection grill of the second heater 1050b may be operated to heat food in the second cooking compartment 1001b. A partitioning frame 1002 may be separably disposed in the internal space of the cooking apparatus 1000c, as illustrated in FIG. 82.

As another example, the first heater 1050a may be operated so that a temperature of the first cooking compartment 1001a is maintained at a first cooking temperature, and the second heater 1050b may be operated so that a temperature of the second cooking compartment 1001b is maintained at a second cooking temperature.

As still another example, the first heater 1050a may be operated for a first cooking time, and the second heater 1050b may be operated for a second cooking time.

The controller 1010 may include the processor 1011 and the memory 1012.

The processor 1011 may process data related to a food model that is input via the user interface 1020, received via the communicator 1070, or stored in the storage 1060, and generate food formation data for forming food on the basis of the food model.

Also, the processor 1011 may process data related to a cooking method that is input via the user interface 1020, received via the communicator 1070, or stored in the storage 1060, and generate food heating data for heating food on the basis of the cooking method.

Specifically, the processor 1011 may divide a food model into a plurality of model parts and distribute food formed by the plurality of model parts to the first heater 1050a and the second heater 1050b. For example, the processor 1011 may divide a food model that represents a single piece of food into two model parts or divide a food model that represents multiple pieces of food into two model parts according to the number of foods.

The processor 1011 may generate food heating data for heating each of the plurality of model parts. Each of the first heater 1050a and the second heater 1050b may heat a portion of food according to food heating data of a model part.

The memory 1012 may store a program for receiving inputs of a food model and a cooking method via the user interface 1020 and a program for processing data related to the food model and/or data related to the cooking method and generating the food formation data and/or the food heating data.

In this way, the cooking apparatus 1000b may include the plurality of heaters 1050a and 1050b configured to heat food, and each of the plurality of heaters 1050a and 1050b may heat food together or independently from each other. Consequently, the cooking apparatus 1000b may more quickly heat food.

Figure 83:
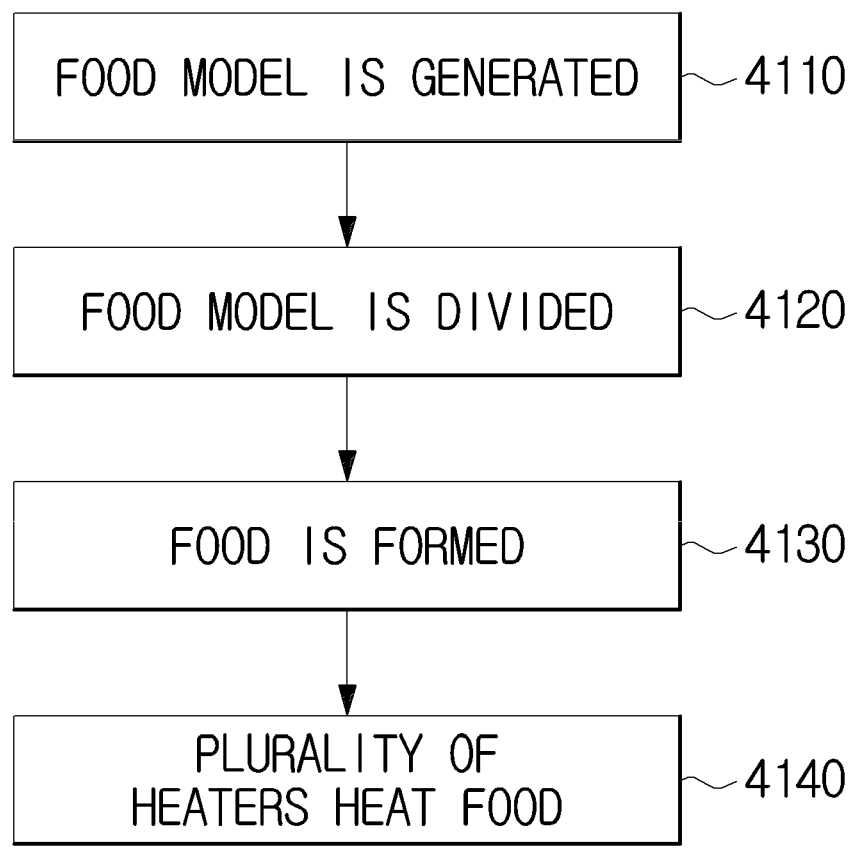
FIG. 83 illustrates a method of forming food according to still an embodiment of the present disclosure.
Figure 84:
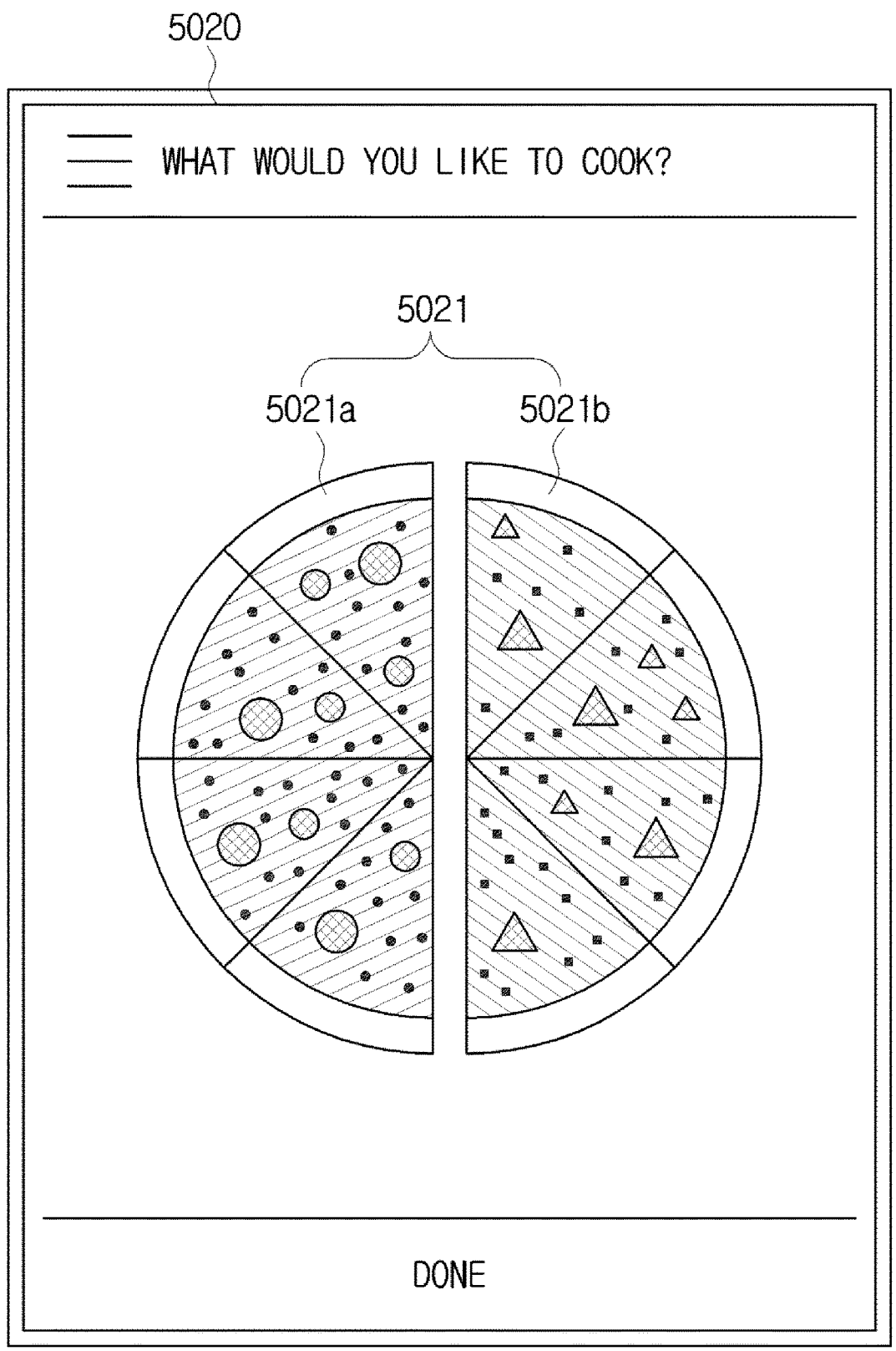
FIGS. 84 and 85 illustrate examples of dividing a food model according to an embodiment of the present disclosure.
Figure 85:
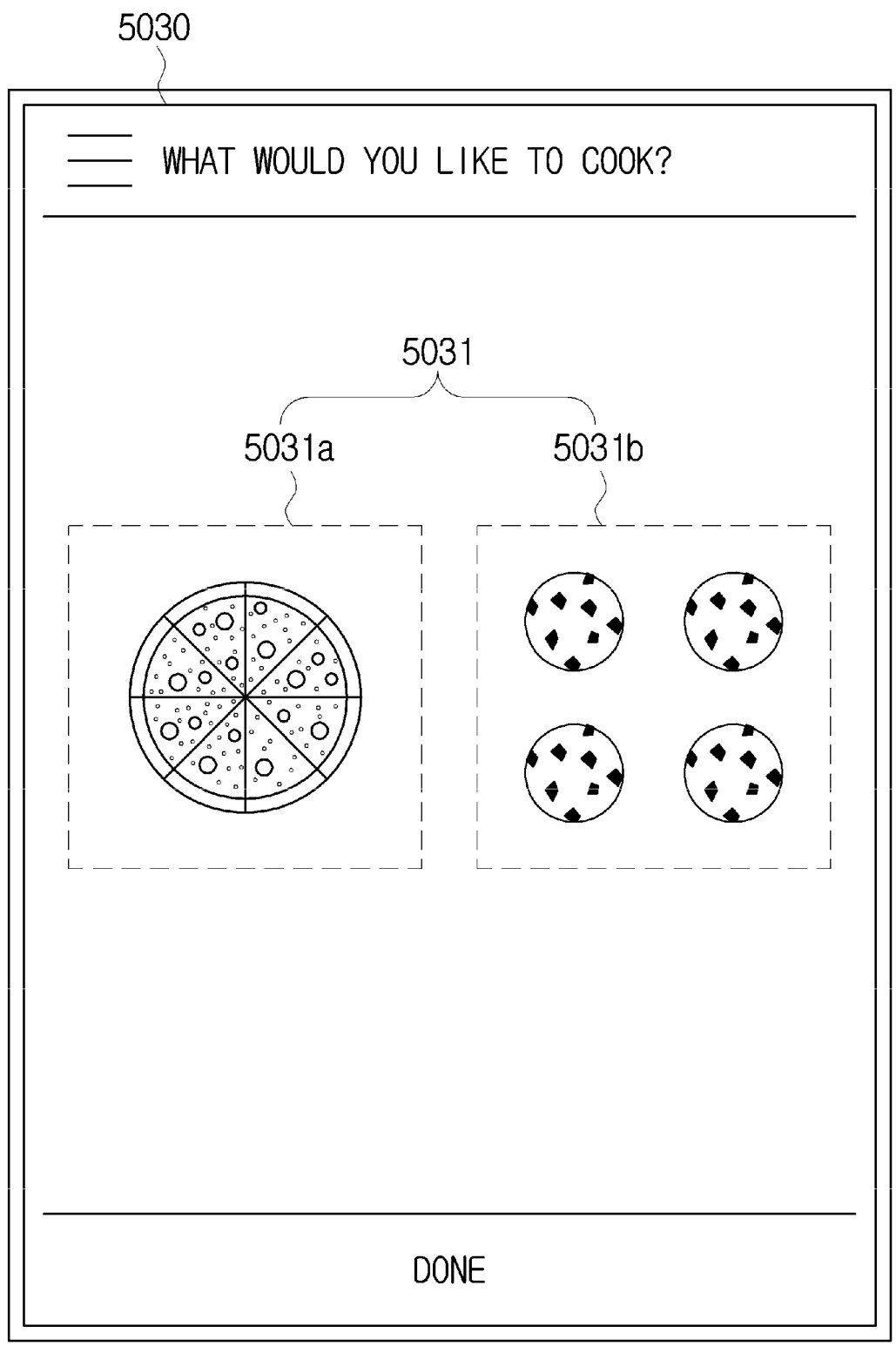

FIG. 83 illustrates a method of forming food according to still another embodiment of the present disclosure. Also, FIGS. 84 and 85 illustrate examples of dividing a food model according to an embodiment of the present disclosure.

A method of forming food (4100) will be described with reference to FIGS. 83, 84, and 85.

A food model is generated in operation 4110.

The cooking apparatus 1000b or the user device 1100 may receive an input of a shape, a thickness, ingredients, and a color of food from a user and generate a food model from the shape, the thickness, the ingredients, and the color of the food.

Also, the cooking apparatus 1000b or the user device 1100 may load data related to a food model stored in the storage 1060 or 1160 or receive the data related to the food model from an external device via the communicator 1070 or 1170.

The food model is divided in operation 4120.

The cooking apparatus 1000b or the user device 1100 may divide a food model to quickly form food.

The controller 1010 of the cooking apparatus 1000b including the first heater 1050a and the second heater 1050b may divide a food model into two model parts.

For example, the controller 1010 may display a model division screen 5020 for dividing a food model illustrated in FIG. 84 on the user interface 1020. The model division screen 5020 may include a food model 5021, and the food model 5021 may represent a single piece of food. Also, the food model 5021 may be divided into a first model part 5021a that represents a portion of the food and a second model part 5021b that represents the remaining portion of the food.

The food model 5021 may be divided into the first model part 5021a and the second model part 5021b according to a heating method. For example, a food portion made with the first model part 5021a may be heated by the grill heater of the first heater 1050a, and a food portion made with the second model part 5021b may be heated by the convection grill of the second heater 1050b.

The food model 5021 may be divided into the first model part 5021a and the second model part 5021b according to a cooking temperature. For example, the food portion made with the first model part 5021a may be heated at 100° C., and the food portion made with the second model part 5021b may be heated at 120° C.

The food model 5021 may be divided into the first model part 5021a and the second model part 5021b according to a cooking time. For example, the food portion made with the first model part 5021a may be heated for 30 minutes, and the food portion made with the second model part 5021b may be heated for 40 minutes.

As another example, the controller 1010 may display a model division screen 5030 for dividing a food model illustrated in FIG. 85 on the user interface 1020. The model division screen 5030 may include a food model 5031, and the food model 5031 may represent multiple pieces of food. The food model 5031 may be divided into a first model part 5031a that represents some of the multiple pieces of food and a second model part 5031b that represents the rest of the multiple pieces of food.

The food model 5031 may be divided into the first model part 5031a and the second model part 5031b according to at least one of a heating method, a cooking temperature, and a cooking time.

The controller 1110 of the user device 1100 may also divide a food model into a plurality of model parts and transmit the plurality of model parts to the cooking apparatus 1000b including the first heater 1050a and the second heater 1050b.

Food is formed in operation 4130.

The controller 1010 of the cooking apparatus 1000b may control the former 1040 to form food according to the plurality of model parts.

The former 1040 may form the different model parts in the different cooking compartments 1001a and 1001b. For example, the former 1040 may form food made with the first model parts 5021a and 5031a in the first cooking compartment 1001a and form food made with the second model parts 5021b and 5031b in the second cooking compartment 1001b.

The food is heated by the plurality of heaters 1050a and 1050b in operation 4140.

The controller 1010 of the cooking apparatus 1000b may control the plurality of heaters 1050a and 1050b to heat the food.

Each of the plurality of heaters 1050a and 1050b may heat food according to a plurality of cooking methods. The first heater 1050a may heat the food formed in the first cooking compartment 1001a according to a cooking method for the first model parts 5021a and 5031a. For example, the grill heater of the first heater 1050a may be operated for 30 minutes at 100° C. to heat the food in the first cooking compartment 1001a.

Also, the second heater 1050b may heat the food formed in the second cooking compartment 1001b according to a cooking method for the second model parts 5021b and 5031b. For example, the convection grill of the second heater 1050b may be operated for 40 minutes at 120° C. to heat the food in the second cooking compartment 1001b.

As described above, the cooking apparatus 1000b may include the plurality of heaters 1050a and 1050b, and each of the plurality of heaters 1050a and 1050b may independently heat food. As a result, the cooking apparatus 1000b may more quickly heat food.

Figure 86:
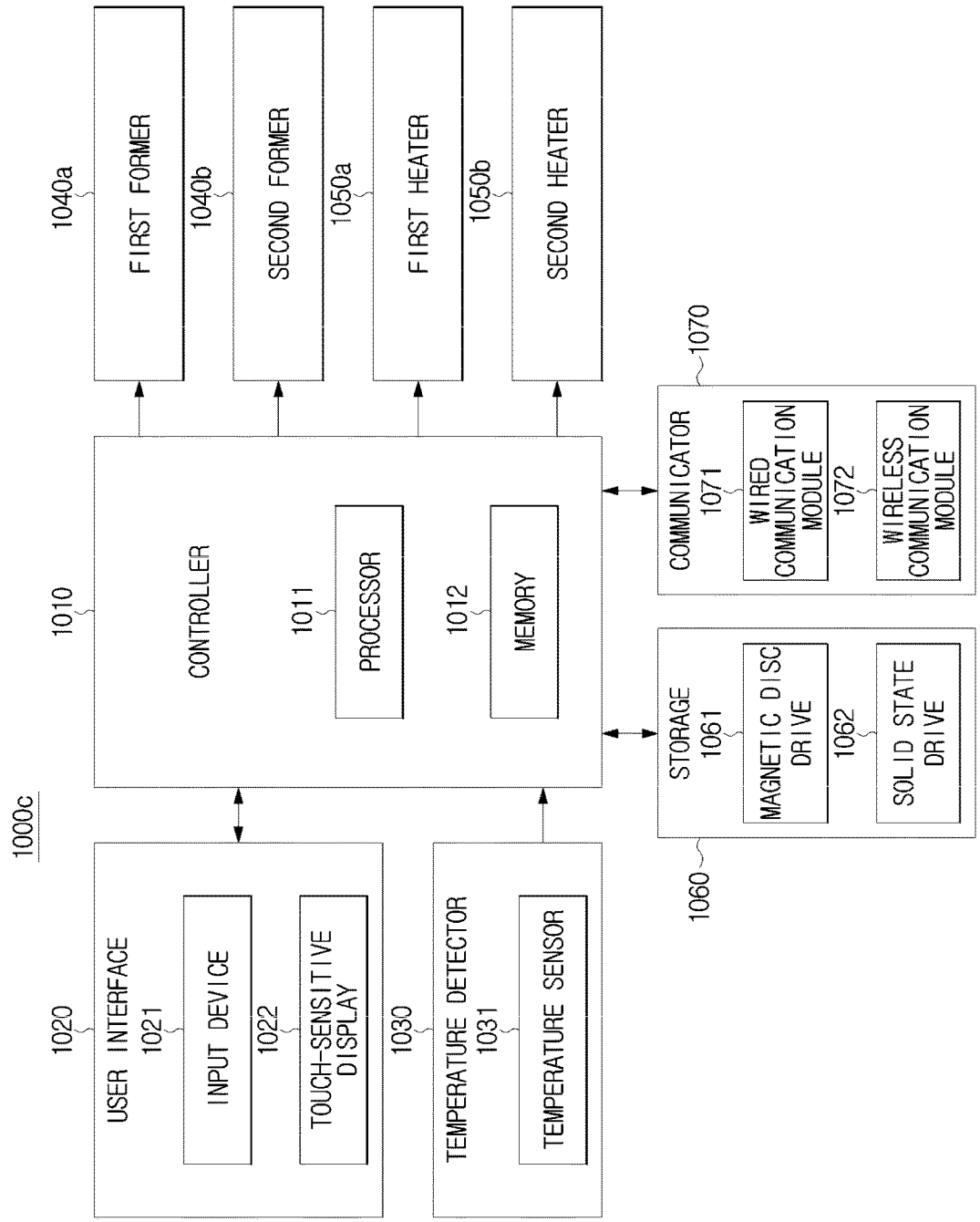
FIG. 86 illustrates a block diagram of a cooking apparatus according to an embodiment of the present disclosure.

FIG. 86 illustrates a block diagram of a cooking apparatus according to yet another embodiment of the present disclosure. Also, FIG. 87 illustrates an exterior of the cooking apparatus according to an embodiment of the present disclosure.

To shorten a heating time of food, a cooking apparatus may include a plurality of formers and a plurality of heaters.

Figure 87:
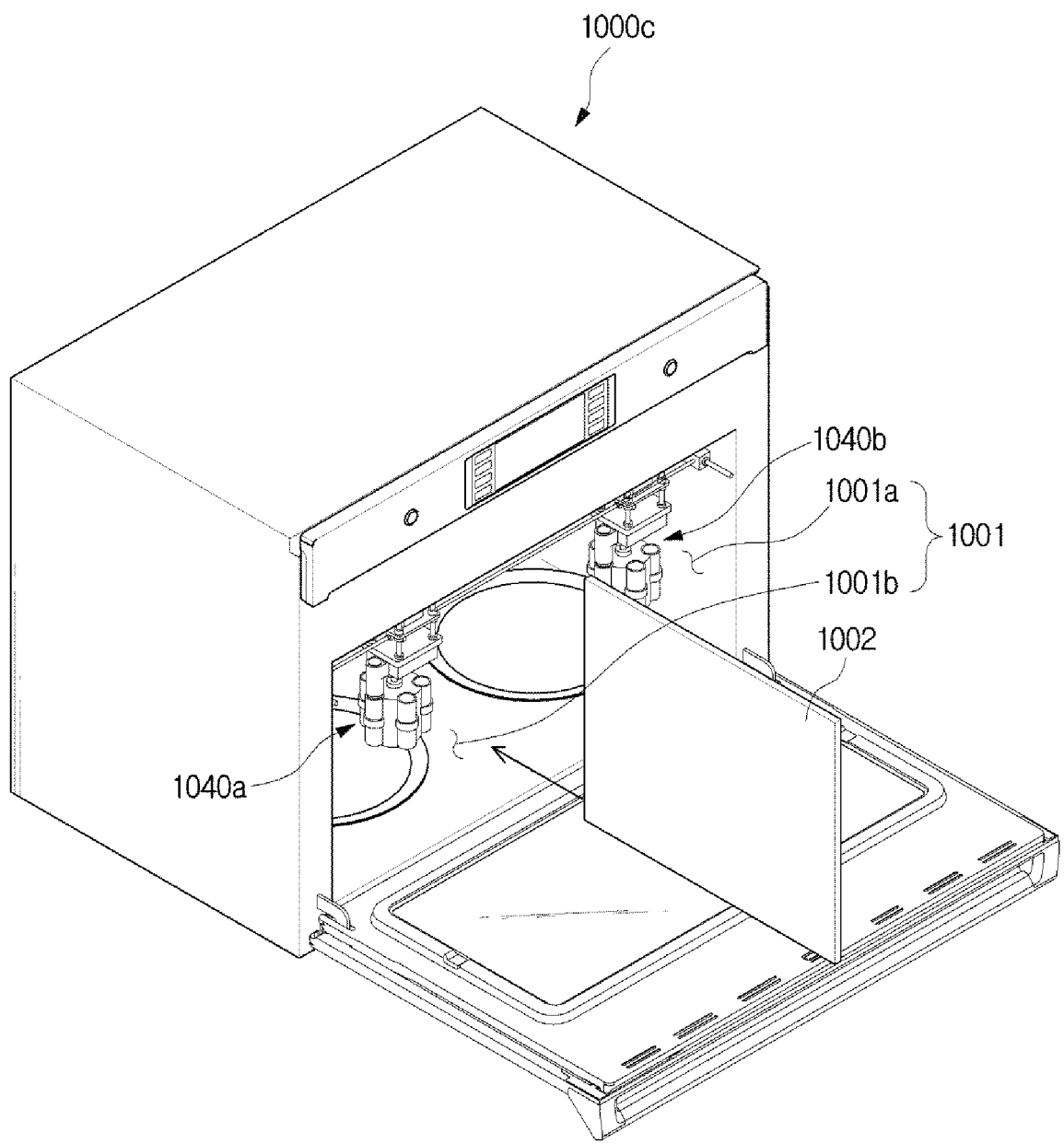
FIG. 87 illustrates an exterior of the cooking apparatus according to an embodiment of the present disclosure.

Referring to FIGS. 86 and 87, a cooking apparatus 1000c may include the user interface 1020 configured to interact with a user, the temperature detector 1030 configured to detect a temperature of a cooking compartment, the first former 1040a and the second former 1040b configured to form food, the first heater 1050a and the second heater 1050b configured to heat the food, the storage 1060 configured to store a program and data, the communicator 1070 configured to communicate with external devices, and the controller 1010 configured to control operation of the cooking apparatus 1000c. A partitioning frame 1002 may be separably disposed in the internal space of the cooking apparatus 1000c as illustrated in FIG. 87.

Detailed descriptions of configurations and operations of the user interface 1020, the temperature detector 1030, the storage 1060, and the communicator 1070 will be omitted because the descriptions overlap those of the user interface, the temperature detector, the storage, and the communicator described above with reference to FIG. 37.

Each of the first former 1040*a* and the second former 1040*b* may independently form food according to a shape, ingredients, and a color of food input by the user. The first former 1040*a* may include the first cartridge assembly 200*a* and the first driving device 120*a*, and the second former 1040*b* may include the second cartridge assembly 200*b* and the second driving device 120*b*.

Also, the cooking compartment of the cooking apparatus 1000*c* may be divided by a divider. The first former 1040*a* and the second former 1040*b* may form food in divided portions of the cooking compartment. For example, as illustrated in FIG. 87, the first former 1040*a* may be provided in the first cooking compartment 1001*a* and form food in the first cooking compartment 1001*a*. The second former 1040*b* may be provided in the second cooking compartment 1001*b* and form food in the second cooking compartment 1001*b*.

Each of the first heater 1050*a* and the second heater 1050*b* may include various heating devices. For example, each of the first heater 1050*a* and the second heater 1050*b* may include a grill heater, a convection grill, a microwave heater, and the like.

Also, the plurality of heaters 1050*a* and 1050*b* may independently heat food in the divided portions of the cooking compartment. For example, as illustrated in FIG. 87, the first heater 1050*a* may heat food in the first cooking compartment 1001*a*, and the second heater 1050*b* may heat food in the second cooking compartment 1001*b*.

The controller 1010 may include the processor 1011 and the memory 1012.

Particularly, the processor 1011 may divide a food model into a plurality of model parts and distribute the plurality of model parts to the first former 1040*a* and the second former 1040*b*. The processor 1011 may generate food formation data for forming food on the basis of the plurality of model parts. Also, the processor 1011 may generate food heating data for heating each of the plurality of model parts, and each of the first heater 1050*a* and the second heater 1050*b* may heat a portion of food according to food heating data of a model part.

The memory 1012 may store a program for receiving inputs of a food model and a cooking method via the user interface 1020 and a program for processing data related to the food model and/or data related to the cooking method and generating the food formation data and/or the food heating data.

In this way, the cooking apparatus 1000*c* may include the plurality of formers 1040*a* and 1040*b* configured to form food and the plurality of heaters 1050*a* and 1050*b* configured to heat the food. Consequently, the cooking apparatus 1000*c* may more quickly form food and more quickly heat food.

Figure 88:
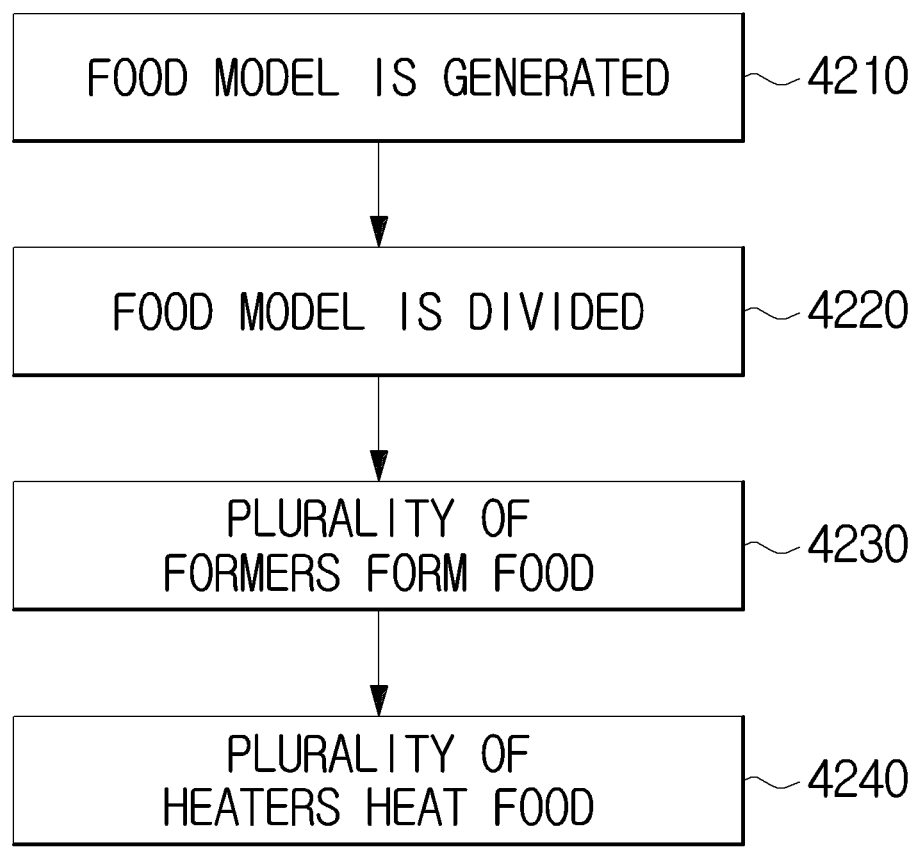
FIG. 88 illustrates a method of forming food according to an embodiment of the present disclosure.

FIG. 88 illustrates a method of forming food according to yet another embodiment.

A method of forming food (4200) will be described with reference to FIG. 88.

A food model is generated in operation 4210.

The cooking apparatus 1000*c* or the user device 1100 may receive an input of a shape, a thickness, ingredients, and a color of food from a user and generate a food model from the shape, the thickness, the ingredients, and the color of the food.

Also, the cooking apparatus 1000*c* or the user device 1100 may load data related to a food model stored in the storage 1060 or 1160 or receive the data related to the food model from an external device via the communicator 1070 or 1170.

The food model is divided in operation 4220.

The cooking apparatus 1000*c* or the user device 1100 may divide the food model to quickly form food.

The controller 1010 of the cooking apparatus 1000*c* including the first former 1040*a*, the second former 1040*b*, the first heater 1050*a*, and the second heater 1050*b* may divide the food model into two model parts.

The food model may be divided into a first model part and a second model part according to various criteria. For example, the food model may be divided into the first model part and the second model part on the basis of at least one of the shape (size), the ingredients, and the color of the food. As another example, the food model may be divided into the first model part and the second model part on the basis of at least one of a heating method, a cooking temperature, and a cooking time.

Food is formed by the plurality of formers 1040*a* and 1040*b* in operation 4230.

The controller 1010 of the cooking apparatus 1000*c* may distribute a plurality of model parts to the plurality of formers 1040*a* and 1040*b*. Each of the plurality of formers 1040*a* and 1040*b* may form a portion of food according to a model part distributed thereto or form some of multiple pieces of food.

The food is heated by the plurality of heaters 1050*a* and 1050*b* in operation 4240.

The controller 1010 of the cooking apparatus 1000*c* may control the plurality of heaters 1050*a* and 1050*b* to heat the food. Each of the plurality of heaters 1050*a* and 1050*b* may heat the food according to a plurality of cooking methods.

As described above, the cooking apparatus 1000*c* may include the plurality of formers 1040*a* and 1040*b* and the plurality of heaters 1050*a* and 1050*b*. As a result, the cooking apparatus 1000*c* may more quickly form food and more quickly heat food.

Forming/heating food according to a food model by a single cooking apparatus has been described above. Hereinafter, forming/heating food according to a food model by a plurality of cooking apparatuses will be described.

Figure 89:
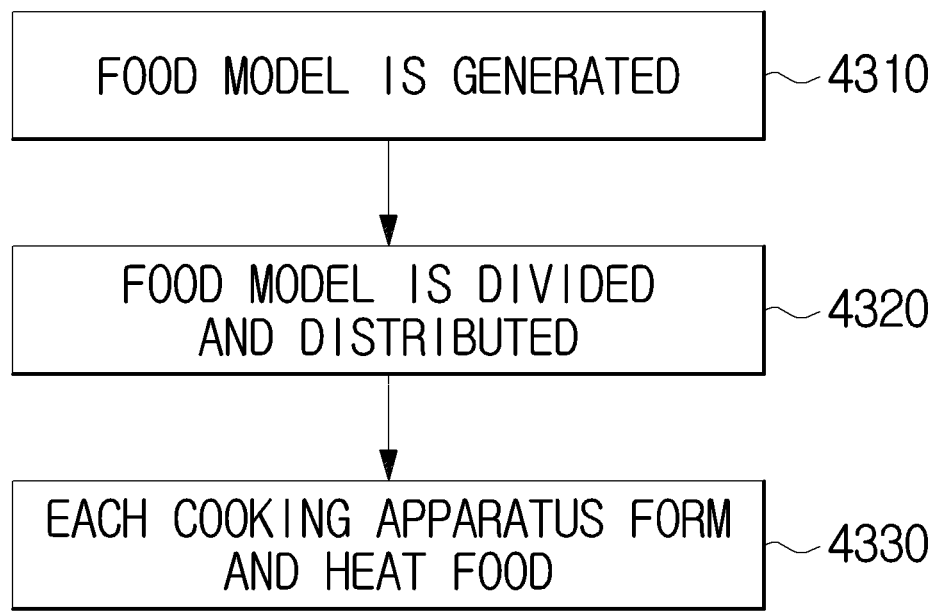
FIG. 89 illustrates an example of a food cooking method of a cooking system according to an embodiment of the present disclosure.
Figure 90:
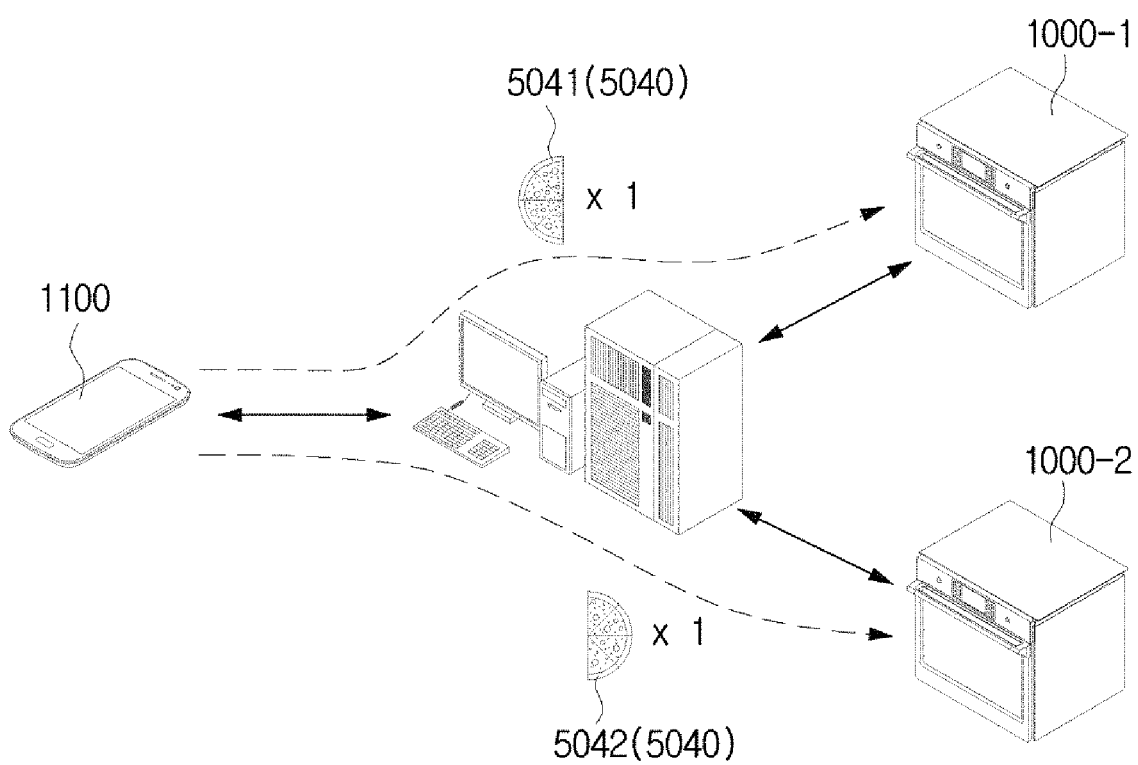
FIG. 90 illustrates an example in which the cooking system distributes a food model according to an embodiment of the present disclosure.
Figure 91:
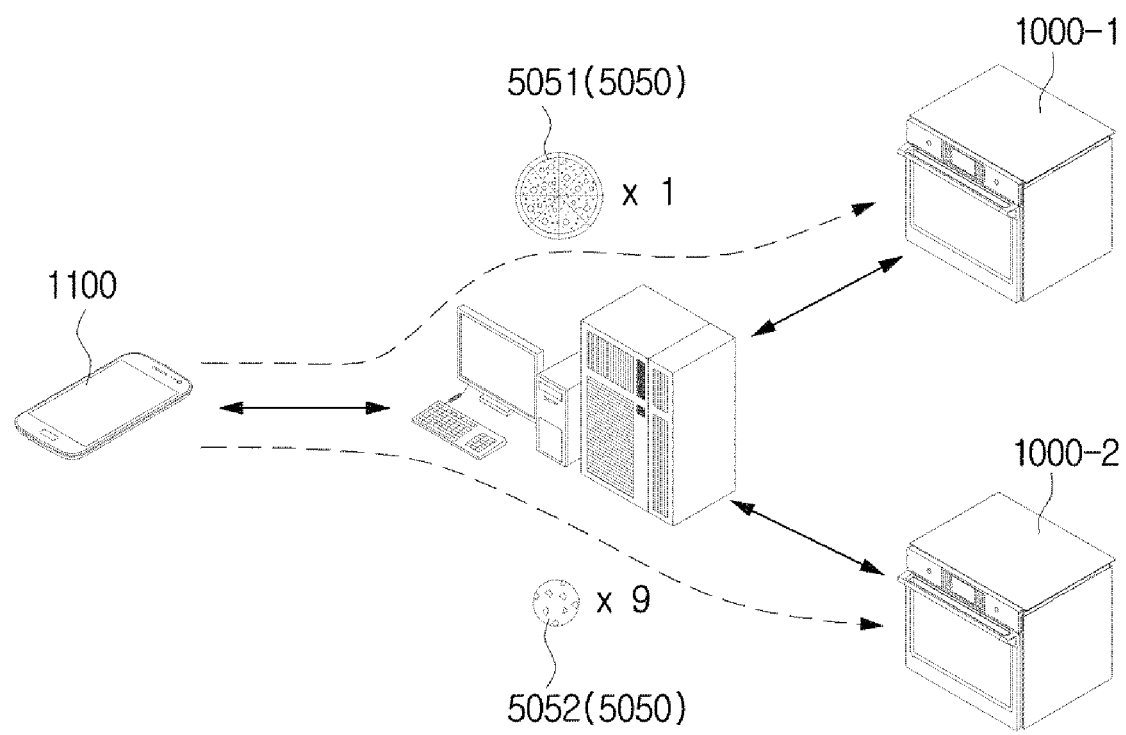
FIG. 91 illustrates another example in which the cooking system distributes a food model according to an embodiment of the present disclosure.

FIG. 89 illustrates an example of a food cooking method of a cooking system according to an embodiment of the present disclosure. FIG. 90 illustrates an example in which the cooking system distributes a food model according to an embodiment of the present disclosure. Also, FIG. 91 illustrates another example in which the cooking system distributes a food model according to an embodiment of the present disclosure.

A food model may be distributed to a plurality of cooking apparatuses in a cooking system that includes the plurality of cooking apparatuses and a user device. Also, each of the plurality of cooking apparatuses may form/heat food.

A method of cooking food (4300) will be described with reference to FIGS. 89, 90, and 91.

A food model is generated in operation 4310.

The user device 1100 may receive an input of a shape, a thickness, ingredients, and a color of food from a user and generate a food model from the shape, the thickness, the ingredients, and the color of the food. Also, the user device 1100 may load data related to a food model stored in the storage or receive the data related to the food model from an external device via the communicator.

Any one of a plurality of cooking apparatuses 1000-1 and 1000-2 may also generate the food model. A specific generating method may be the same as the generating method of the user device 1100.

The food model is divided and distributed to the plurality of cooking apparatuses in operation 4320.

The user device 1100 may divide the food model to quickly form food. The food model may be divided according to the number of the cooking apparatuses 1000-1 and

1000-2. Also, the user device 1100 may distribute a plurality of model parts divided from the food model to the plurality of cooking apparatuses 1000-1 and 1000-2. Also, the user device 1100 may transmit data related to a distributed model part to each of the plurality of cooking apparatuses 1000-1 and 1000-2.

For example, the user device 1100 may divide a food model 5040 that represents a single piece of food into a first model part 5041 that represents a portion of the food and a second model part 5042 that represents the remaining portion of the food.

The food model 5040 may be divided into the first model part 5041 and the second model part 5042 according to various criteria. The food model 5040 may be divided into the first model part 5041 and the second model part 5042 on the basis of at least one of the shape (size), the ingredients, and the color of the food.

Referring to FIG. 90, the user device 1100 may transmit the first model part 5041 to the first cooking apparatus 1000-1 and transmit the second model part 5042 to the second cooking apparatus 1000-2.

Also, while respectively transmitting the first model part 5041 and the second model part 5042 to the first cooking apparatus 1000-1 and the second cooking apparatus 1000-2, the user device 1100 may respectively transmit cooking methods for the first model part 5041 and the second model part 5042 to the first cooking apparatus 1000-1 and the second cooking apparatus 1000-2.

Because the first model part 5041 and the second model part 5042 represent portions of the same food, the cooking methods for the first model part 5041 and the second model part 5042 may be the same. Consequently, the user device 1100 may transmit the same cooking method to the first cooking apparatus 1000-1 and the second cooking apparatus 1000-2.

As another example, the user device 1100 may divide a food model 5050 that represents multiple pieces of food into a first model part 5051 that represents some of the multiple pieces of food and a second model part 5052 that represents the rest of the multiple foods.

The food model 5050 may be divided into the first model part 5051 and the second model part 5052 according to various criteria. The food model 5050 may be divided into the first model part 5051 and the second model part 5052 on the basis of at least one of a heating method, a cooking temperature, and a cooking time.

Referring to FIG. 91, the user device 1100 may transmit the first model part 5051 to the first cooking apparatus 1000-1 and transmit the second model part 5052 to the second cooking apparatus 1000-2.

Also, while respectively transmitting the first model part 5051 and the second model part 5052 to the first cooking apparatus 1000-1 and the second cooking apparatus 1000-2, the user device 1100 may respectively transmit cooking methods for the first model part 5051 and the second model part 5052 to the first cooking apparatus 1000-1 and the second cooking apparatus 1000-2.

Because the first model part 5051 and the second model part 5052 represent different foods, the cooking methods for the first model part 5051 and the second model part 5052 may be different. Consequently, the user device 1100 may transmit different cooking methods to the first cooking apparatus 1000-1 and the second cooking apparatus 1000-2.

Any one of the plurality of cooking apparatuses 1000-1 and 1000-2 may also divide a food model and distribute the divided food model to the plurality of cooking apparatuses 1000-1 and 1000-2. Specific dividing and distributing methods are the same as the dividing and distributing methods of the user device 1100.

Food is formed and heated by the plurality of cooking apparatuses 1000-1 and 1000-2 in operation 4330.

Each of the plurality of cooking apparatuses 1000-1 and 1000-2 may form food according to the model parts received from the user device 1100 and heat the food.

For example, the first cooking apparatus 1000-1 may form a portion of food according to the received first model part 5041 and heat the portion of the food according to the cooking method for the first model part 5041. Also, the second cooking apparatus 1000-2 may form the remaining portion of the food according to the received second model part 5042 and heat the remaining portion of the food according to the cooking method for the second model part 5042.

Because the first model part 5041 and the second model part 5042 represent portions of the same food, the food cooked by the first cooking apparatus 1000-1 and the food cooked by the second cooking apparatus 1000-2 may be the same. Also, the food cooked by the first cooking apparatus 1000-1 and the food cooked by the second cooking apparatus 1000-2 may constitute single food.

As another example, the first cooking apparatus 1000-1 may form the portion of the food according to the received first model part 5051 and heat the portion of the food according to a first cooking method for the first model part 5051. Also, the second cooking apparatus 1000-2 may form the remaining portion of the food according to the received second model part 5052 and heat the remaining portion of the food according to a second cooking method for the second model part 5052.

Because the first model part 5051 and the second model part 5052 represent different foods, the food cooked by the first cooking apparatus 1000-1 and the food cooked by the second cooking apparatus 1000-2 may be different.

As described above, a food model may be divided into a plurality of model parts, and the plurality of model parts may be distributed to a plurality of cooking apparatuses. Also, each of the plurality of cooking apparatuses may form and heat food according to a model part distributed thereto. As a result, a user may quickly cook a single piece or multiple pieces of food using the plurality of cooking apparatuses.

Figure 92:
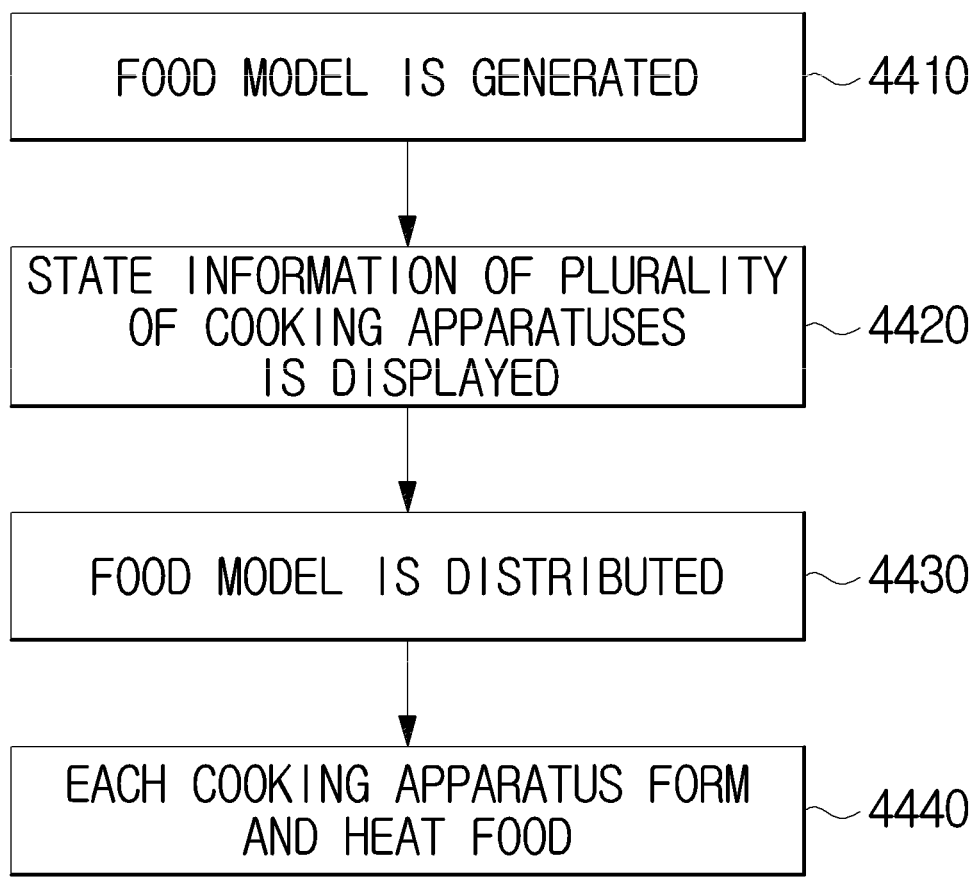
FIG. 92 illustrates another example of a food cooking method of the cooking system according to an embodiment of the present disclosure.
Figure 93:
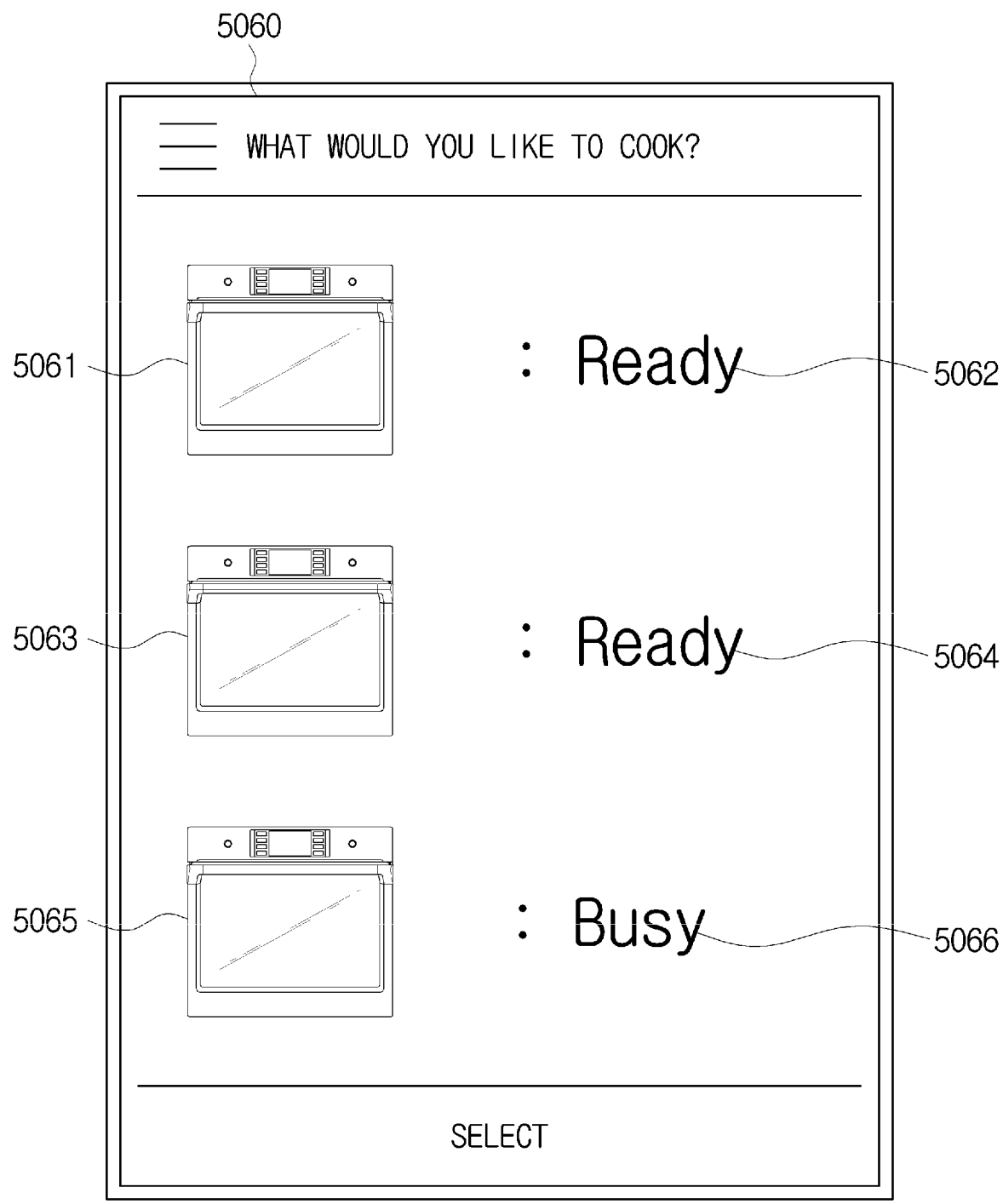
FIGS. 93 and 94 illustrate an example of a model distribution screen for distributing a food model by the cooking system according to an embodiment of the present disclosure.
Figure 94:
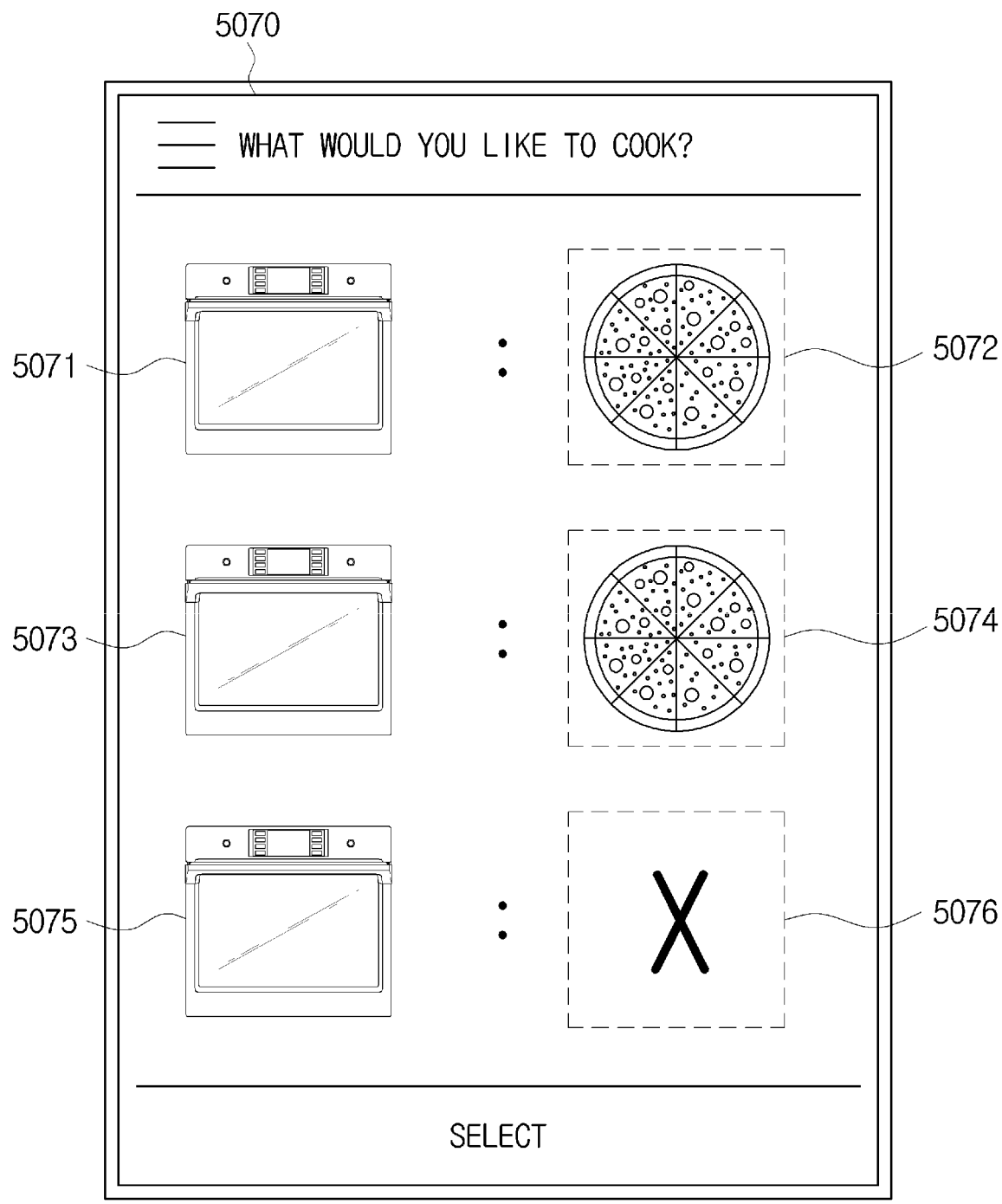
Figure 95:
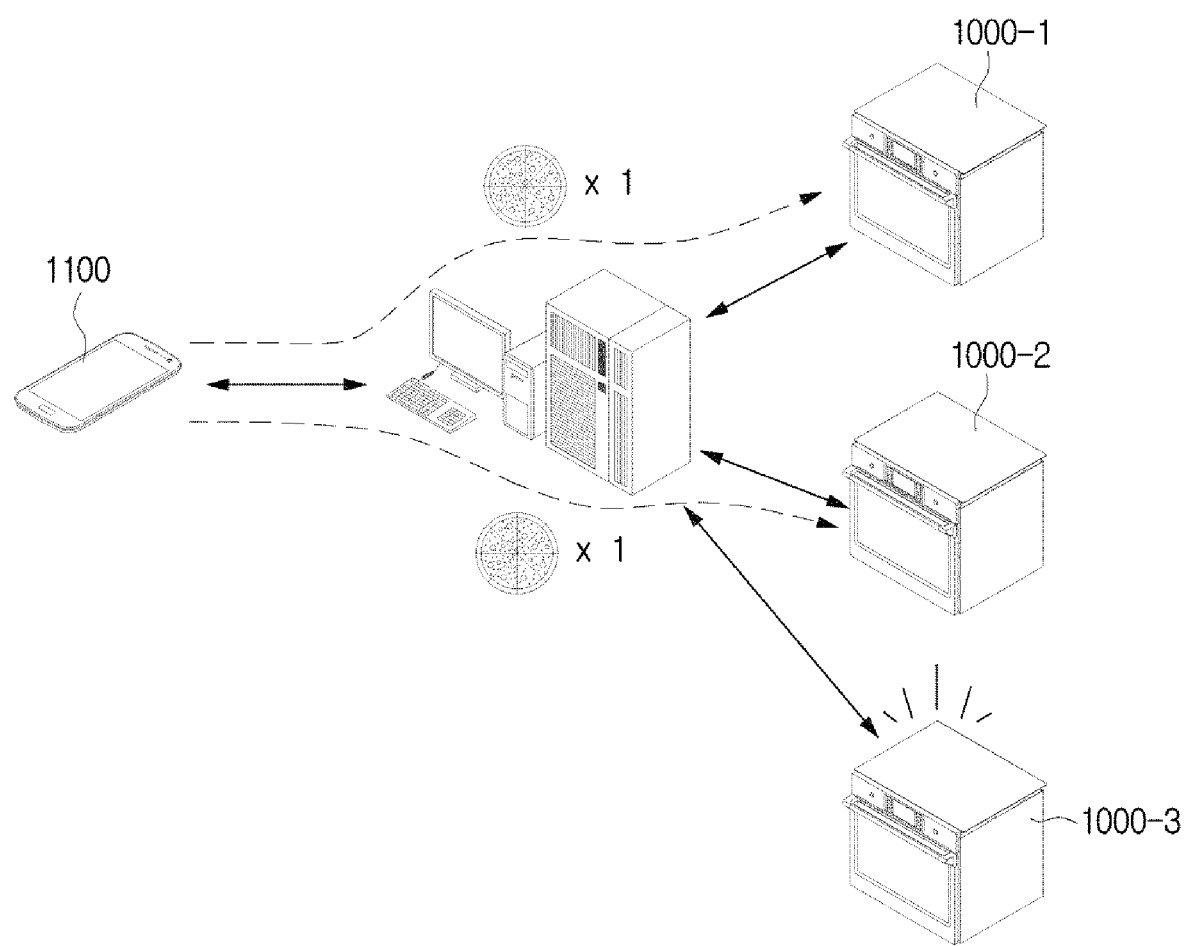
FIG. 95 illustrates still another example in which the cooking system distributes a food model according to an embodiment of the present disclosure.

FIG. 92 illustrates another example of a food cooking method of the cooking system according to an embodiment of the present disclosure. FIGS. 93 and 94 illustrate an example of a model distribution screen for distributing a food model by the cooking system according to various embodiments of the present disclosure. Also, FIG. 95 illustrates still another example in which the cooking system distributes a food model according to an embodiment of the present disclosure.

A food model may be distributed to a plurality of cooking apparatuses according to operational states thereof in a cooking system that includes the plurality of cooking apparatuses and a user device.

A method of cooking food (4400) will be described with reference to FIGS. 92, 93, 94 and 95.

A food model is generated in operation 4410.

The user device 1100 may receive an input of a shape, a thickness, ingredients, and a color of food from a user and generate a food model from the shape, the thickness, the ingredients, and the color of the food. Also, the user device 1100 may load data related to a food model stored in the storage or receive the data related to the food model from an external device via the communicator.

Any one of a plurality of cooking apparatuses 1000-1, 1000-2, and 1000-3 may also generate the food model. A specific generating method may be the same as the generating method of the user device 1100.

State information of the plurality of cooking apparatuses 1000-1, 1000-2, and 1000-3 is displayed in operation 4420.

The user device 1100 may receive the state information of the plurality of cooking apparatuses 1000-1, 1000-2, and 1000-3 from the plurality of cooking apparatuses 1000-1, 1000-2, and 1000-3.

For example, the controller 1110 of the user device 1100 may request the state information from the plurality of cooking apparatuses 1000-1, 1000-2, and 1000-3 via the communicator 1170. In response to the request from the user device 1100, the plurality of cooking apparatuses 1000-1, 1000-2, and 1000-3 may transmit the state information to the user device 1100. The state information transmitted by the plurality of cooking apparatuses 1000-1, 1000-2, and 1000-3 may include information on whether a cooking apparatus is broken down, information on whether the cooking apparatus is operating, a remaining cooking time until cooking is done, etc.

The user device 1100 may display the state information of the plurality of cooking apparatuses 1000-1, 1000-2, and 1000-3.

Referring to FIG. 93, the controller 1110 may display a state display screen 5060 for showing the state information of the plurality of cooking apparatuses 1000-1, 1000-2, and 1000-3 on the user interface 1120. The state display screen 5060 may include a plurality of cooking apparatus images 5061, 5063, and 5065 that respectively represent the plurality of cooking apparatuses 1000-1, 1000-2, and 1000-3. Also, the state display screen 5060 may include a plurality of state information images 5062, 5064, and 5066 that respectively represent pieces of state information of the plurality of cooking apparatuses 1000-1, 1000-2, and 1000-3.

The user may check states of the plurality of cooking apparatuses 1000-1, 1000-2, and 1000-3 using the plurality of cooking apparatus images 5061, 5063, and 5065 and the plurality of state information images 5062, 5064, and 5066 displayed on the state display screen 5060. Specifically, the user may determine that the cooking apparatuses 1000-1 and 1000-2 can currently cook food and that the cooking apparatus 1000-3 cannot currently cook food.

Any one of the plurality of cooking apparatuses 1000-1, 1000-2, and 1000-3 may also display the state information of the plurality of cooking apparatuses 1000-1, 1000-2, and 1000-3. A specific displaying method may be the same as the displaying method of the user device 1100.

The food model is distributed in operation 4430.

The user device 1100 may distribute the food model to each of the plurality of cooking apparatuses 1000-1, 1000-2, and 1000-3 and transmit the food model to the plurality of cooking apparatuses 1000-1, 1000-2, and 1000-3 according to a user's input.

Referring to FIG. 94, the controller 1110 of the user device 1100 may display a model distribution screen 5070 for distributing the food model according to an input of the user on the user interface 1120. The model distribution screen 5070 may include a plurality of cooking apparatus images 5071, 5073, and 5075 that respectively represent the plurality of cooking apparatuses 1000-1, 1000-2, and 1000-3. Also, the model distribution screen 5070 may include model input areas 5072, 5074, and 5076 for inputting a distributed food model to the plurality of cooking apparatuses 1000-1, 1000-2, and 1000-3.

The user may distribute and input a food model to the model input areas 5072, 5074, and 5076 according to the states of the plurality of cooking apparatuses 1000-1, 1000-2, and 1000-3. For example, the user may input the food model to the cooking apparatuses 1000-1 and 1000-2 which can currently cook food.

The controller 1110 of the user device 1100 may distribute the food model to the cooking apparatuses 1000-1 and 1000-2 according to the food model input to the model input areas 5072, 5074, and 5076 by the user. Also, as illustrated in FIG. 95, the controller 1110 may transmit the data related to the food model and data related to a cooking method to the cooking apparatuses 1000-1 and 1000-2 via the communicator 1170.

Any one of the plurality of cooking apparatuses 1000-1, 1000-2, and 1000-3 may also distribute the food model. A specific distributing method may be the same as the distributing method of the user device 1100.

Food is formed and heated by the plurality of cooking apparatuses 1000-1 and 1000-2 in operation 4440.

Each of the plurality of cooking apparatuses 1000-1 and 1000-2 that received the data related to the food model may form food according to the food model and the cooking method received from the user device 1100 and heat the food.

As described above, the user may check states of a plurality of cooking apparatuses and distribute a food model to each of the plurality of cooking apparatuses. Also, each of the plurality of cooking apparatuses may form and heat food according to a food model distributed thereto. As a result, the user may quickly cook a single piece or multiple pieces of food using the plurality of cooking apparatuses.

By a cooking apparatus to which a food forming module is applied, a user can simultaneously form a 3D shape of food to be cooked and cook the food.

By an additional door being installed in the cooking apparatus, a cartridge assembly arranged in an inner space of the cooking apparatus can be easily replaced.

A cartridge in a cartridge body can be easily replaced using a cartridge carrier.

Food ingredients can be smoothly discharged from the cartridge using various extruding units.

Food ingredients can be smoothly discharged from the cartridge adopting cartridges of various shapes.

Whether food ingredients are discharged and an amount of discharged food ingredients can be efficiently adjusted using an outlet opening-closing member.

The embodiments disclosed herein can be implemented in the form of a recording medium that stores a computer-executable instruction. The instruction may be stored in the form of a program code and can generate a program module and perform operations in the embodiments disclosed herein when executed by a processor. The recording medium may be implemented by a computer-readable recording medium.

The computer-readable recording medium includes all types of recording media in which computer-readable instructions are stored. For example, the computer-readable recording medium may include a read only memory (ROM), a random access memory (RAM), a magnetic tape, a magnetic disc, a flash memory, an optical data storage device, and the like.

While the present disclosure has been shown and described with reference to various embodiments thereof, it will be understood by those skilled in the art that various changes in forms and details may be made therein without departing from the spirit and scope of the present disclosure as defined by the appended claims and their equivalents.

What is claimed is:

1. A cooking apparatus that three-dimensionally forms and cooks food, the cooking apparatus comprising:
   a main body;
   an inner space formed in the main body and including a first space and a second space; and
   a cartridge assembly installed in the inner space,
   wherein the cartridge assembly is configured to be capable of linear motion and rotational motion,
   wherein the cartridge assembly is located in the first space when the food is being formed,
   wherein the cartridge assembly is located in the second space when the formed food is being cooked, and
   wherein the cartridge assembly includes:
      a cartridge body having a plurality of cartridge mounts formed therein,
      a plurality of cartridge cases mounted on the plurality of cartridge mounts, and
      a plurality of cartridges disposed in the plurality of cartridge cases and having food ingredients accommodated therein.

2. The cooking apparatus of claim 1, further comprising:
   a partitioning frame separably arranged in the inner space and configured to partition the first space and the second space from each other.

3. The cooking apparatus of claim 1, further comprising:
   one or more heaters installed in the first space and configured to heat the food.

4. The cooking apparatus of claim 1, further comprising:
   a tray installed in the first space and configured to have the food placed thereon.

5. The cooking apparatus of claim 1,
   wherein each of the plurality of cartridges includes:
      an accommodator, and
      a nozzle connected to the accommodator,
   wherein the nozzle includes an outlet through which a food ingredient, among the food ingredients, is discharged, and
   wherein, in at least a part of the accommodator, a corrugation is formed.

6. The cooking apparatus of claim 1, further comprising:
   an extruder installed in the inner space,
   wherein, when the plurality of cartridges is pressed, the food ingredients are discharged from the plurality of cartridges.

7. The cooking apparatus of claim 6,
   wherein the extruder includes:
      an extruder cylinder, and
      a piston comprising a presser,
   wherein the piston is coupled to the extruder cylinder, and capable of reciprocating motion, and
   wherein the presser is configured to press each of the plurality of cartridges.

8. The cooking apparatus of claim 1,
   wherein the inner space includes an open front surface, and
   wherein the cartridge assembly is installed in the inner space to be capable of front-and-rear movement, left-and-right movement, and up-and-down movement.

9. The cooking apparatus of claim 1, further comprising:
   a rotation adjusting device including a rotating shaft coupled to the cartridge body to enable a rotation of the cartridge assembly.

10. The cooking apparatus of claim 1, wherein the plurality of cartridges is provided so that a portion of each of the plurality of cartridges selectively protrudes from each of the plurality of cartridge cases toward a bottom surface of the inner space.

11. The cooking apparatus of claim 10,
   wherein each of the plurality of cartridge cases includes an opening facing the bottom surface of the inner space, and
   wherein the cartridge assembly further includes an elastic member accommodated in each of the plurality of cartridge cases to be disposed between the cartridge and the opening of the cartridge case corresponding to the cartridge.

12. The cooking apparatus of claim 1,
   wherein the cartridge body has a cylindrical shape, and
   wherein the plurality of cartridge mounts is recessed in a side surface of the cartridge body along a circumferential direction of the cartridge body.

13. The cooking apparatus of claim 1,
   wherein the cartridge body has a cylindrical shape, and
   wherein the plurality of cartridge mounts is formed to pass through the cartridge body.

14. The cooking apparatus of claim 1,
   wherein the main body includes an opening formed at one surface of the main body to allow the cartridge assembly to be replaced, and
   wherein, at the opening, an additional door configured to open and close is installed at the main body.

15. The cooking apparatus of claim 1,
   wherein each of the plurality of cartridges includes an outlet through which a food ingredient, among the food ingredients, is discharged, and
   wherein the cooking apparatus further comprises an outlet opening-closing member configured to selectively open or close the outlet.

* * * * *